April 22, 1958 L. M. WALDEN 2,831,410

EQUIPMENT FOR TYPE SETTING

Filed Oct. 9, 1950 44 Sheets-Sheet 1

INVENTOR.
Lester M. Walden
BY
John Mearder
AGENT

April 22, 1958 L. M. WALDEN 2,831,410

EQUIPMENT FOR TYPE SETTING

Filed Oct. 9, 1950 44 Sheets-Sheet 2

INVENTOR.
Lester M. Walden
BY
John F. Marden
AGENT

April 22, 1958 L. M. WALDEN 2,831,410

EQUIPMENT FOR TYPE SETTING

Filed Oct. 9, 1950 44 Sheets-Sheet 3

INVENTOR.
Lester M. Walden
BY
John [signature]
AGENT

April 22, 1958 L. M. WALDEN 2,831,410

EQUIPMENT FOR TYPE SETTING

Filed Oct. 9, 1950 44 Sheets-Sheet 4

INVENTOR
Lester M. Walden
BY John [signature]
AGENT

April 22, 1958 L. M. WALDEN 2,831,410

EQUIPMENT FOR TYPE SETTING

Filed Oct. 9, 1950 44 Sheets-Sheet 5

INVENTOR
Lester M. Walden
BY
[signature]
AGENT

April 22, 1958 L. M. WALDEN 2,831,410

EQUIPMENT FOR TYPE SETTING

Filed Oct. 9, 1950

44 Sheets-Sheet 6

INVENTOR

Lester M. Walden

BY [signature]

AGENT

April 22, 1958 L. M. WALDEN 2,831,410

EQUIPMENT FOR TYPE SETTING

Filed Oct. 9, 1950 44 Sheets-Sheet 7

INVENTOR
Lester M. Walden
BY
[signature]
AGENT

April 22, 1958 L. M. WALDEN 2,831,410

EQUIPMENT FOR TYPE SETTING

Filed Oct. 9, 1950

44 Sheets-Sheet 8

INVENTOR
Lester M. Walden
BY John [signature]
AGENT

EQUIPMENT FOR TYPE SETTING

Filed Oct. 9, 1950 44 Sheets-Sheet 9

INVENTOR
Lester M. Walden
BY
John T. Meader
AGENT

April 22, 1958 L. M. WALDEN 2,831,410

EQUIPMENT FOR TYPE SETTING

Filed Oct. 9, 1950 44 Sheets-Sheet 10

INVENTOR
Lester M. Walden
BY [signature]
AGENT

April 22, 1958 L. M. WALDEN 2,831,410

EQUIPMENT FOR TYPE SETTING

Filed Oct. 9, 1950 44 Sheets-Sheet 11

INVENTOR
Lester M. Walden
BY
John [signature]
AGENT

April 22, 1958 L. M. WALDEN 2,831,410

EQUIPMENT FOR TYPE SETTING

Filed Oct. 9, 1950 44 Sheets-Sheet 12

INVENTOR

Lester M. Walden

BY John [signature]

AGENT

INVENTOR
Lester M. Walden
BY John [signature]
AGENT

April 22, 1958 L. M. WALDEN 2,831,410

EQUIPMENT FOR TYPE SETTING

Filed Oct. 9, 1950 44 Sheets-Sheet 14

INVENTOR

Lester M. Walden

BY John [signature]

AGENT

April 22, 1958 L. M. WALDEN 2,831,410

EQUIPMENT FOR TYPE SETTING

Filed Oct. 9, 1950 44 Sheets-Sheet 15

INVENTOR
Lester M. Walden
BY John [signature]
AGENT

April 22, 1958 L. M. WALDEN 2,831,410

EQUIPMENT FOR TYPE SETTING

Filed Oct. 9, 1950 44 Sheets-Sheet 16

INVENTOR
Lester M. Walden
BY John [signature]
AGENT

April 22, 1958 L. M. WALDEN 2,831,410

EQUIPMENT FOR TYPE SETTING

Filed Oct. 9, 1950 44 Sheets-Sheet 17

INVENTOR
Lester M. Walden
BY
John [signature]
AGENT

INVENTOR
Lester M. Walden
BY
John [signature]
AGENT

April 22, 1958 L. M. WALDEN 2,831,410

EQUIPMENT FOR TYPE SETTING

Filed Oct. 9, 1950 44 Sheets-Sheet 19

INVENTOR
Lester M. Walden
BY John [signature]
AGENT

April 22, 1958 L. M. WALDEN 2,831,410

EQUIPMENT FOR TYPE SETTING

Filed Oct. 9, 1950 44 Sheets-Sheet 20

INVENTOR
Lester M. Walden
BY John [signature]
AGENT

April 22, 1958 L. M. WALDEN 2,831,410

EQUIPMENT FOR TYPE SETTING

Filed Oct. 9, 1950 44 Sheets-Sheet 21

INVENTOR
Lester M. Walden
BY [signature]
AGENT

April 22, 1958 L. M. WALDEN 2,831,410

EQUIPMENT FOR TYPE SETTING

Filed Oct. 9, 1950

44 Sheets-Sheet 22

INVENTOR

Lester M. Walden

BY

John [signature]

AGENT

April 22, 1958 L. M. WALDEN 2,831,410

EQUIPMENT FOR TYPE SETTING

Filed Oct. 9, 1950 44 Sheets-Sheet 23

INVENTOR
Lester M. Walden
BY John Hearden
AGENT

April 22, 1958 L. M. WALDEN 2,831,410

EQUIPMENT FOR TYPE SETTING

Filed Oct. 9, 1950 44 Sheets-Sheet 24

INVENTOR
Lester M. Walden
BY John [signature]
AGENT

INVENTOR
Lester M. Walden
BY
John [signature]
AGENT

April 22, 1958 L. M. WALDEN 2,831,410

EQUIPMENT FOR TYPE SETTING

Filed Oct. 9, 1950 44 Sheets-Sheet 26

INVENTOR.

Lester M. Walden

BY John [signature]

AGENT

INVENTOR.
Lester M. Walden
BY
AGENT

April 22, 1958 L. M. WALDEN 2,831,410

EQUIPMENT FOR TYPE SETTING

Filed Oct. 9, 1950 44 Sheets-Sheet 28

INVENTOR
Lester M. Walden
BY John [signature]
AGENT

INVENTOR
Lester M. Walden
BY John Meander
AGENT

April 22, 1958 L. M. WALDEN 2,831,410

EQUIPMENT FOR TYPE SETTING

Filed Oct. 9, 1950

44 Sheets-Sheet 30

INVENTOR

Lester M. Walden

BY John [signature]

AGENT

April 22, 1958 L. M. WALDEN 2,831,410

EQUIPMENT FOR TYPE SETTING

Filed Oct. 9, 1950

44 Sheets-Sheet 31

INVENTOR
Lester M. Walden
BY John Lunander
AGENT

April 22, 1958

L. M. WALDEN 2,831,410

EQUIPMENT FOR TYPE SETTING

Filed Oct. 9, 1950

44 Sheets-Sheet 32

INVENTOR
Lester M. Walden
BY John [signature]
AGENT

INVENTOR
Lester M. Walden
BY John [signature]
AGENT

April 22, 1958 L. M. WALDEN 2,831,410

EQUIPMENT FOR TYPE SETTING

Filed Oct. 9, 1950 44 Sheets-Sheet 34

INVENTOR
Lester M. Walden
BY
John Truarden
AGENT

April 22, 1958 L. M. WALDEN 2,831,410

EQUIPMENT FOR TYPE SETTING

Filed Oct. 9, 1950 44 Sheets-Sheet 35

INVENTOR
Lester M. Walden
BY
John Meade
AGENT

INVENTOR
Lester M. Walden
BY John Meader
AGENT

April 22, 1958 L. M. WALDEN 2,831,410

EQUIPMENT FOR TYPE SETTING

Filed Oct. 9, 1950

44 Sheets-Sheet 37

INVENTOR
Lester M. Walden
BY John [signature]
AGENT

April 22, 1958 L. M. WALDEN 2,831,410

EQUIPMENT FOR TYPE SETTING

Filed Oct. 9, 1950 44 Sheets-Sheet 38

INVENTOR
Lester M. Walden
BY [signature]
AGENT

April 22, 1958 L. M. WALDEN 2,831,410

EQUIPMENT FOR TYPE SETTING

Filed Oct. 9, 1950 44 Sheets-Sheet 39

INVENTOR
Lester M. Walden
BY
John [signature]
AGENT

INVENTOR
Lester M. Walden
BY
[signature]
AGENT

April 22, 1958 L. M. WALDEN 2,831,410

EQUIPMENT FOR TYPE SETTING

Filed Oct. 9, 1950 44 Sheets-Sheet 41

INVENTOR
Lester M. Walden
BY
John [signature]

April 22, 1958 L. M. WALDEN 2,831,410

EQUIPMENT FOR TYPE SETTING

Filed Oct. 9, 1950

44 Sheets-Sheet 42

INVENTOR
Lester M. Walden
BY John [signature]
AGENT

INVENTOR
Lester M. Walden
BY
[signature]
AGENT

April 22, 1958 L. M. WALDEN 2,831,410

EQUIPMENT FOR TYPE SETTING

Filed Oct. 9, 1950 44 Sheets-Sheet 44

INVENTOR
Lester M. Walden
BY John Fruarder
AGENT

United States Patent Office 2,831,410

Patented Apr. 22, 1958

2,831,410

EQUIPMENT FOR TYPE SETTING

Lester M. Walden, Cranford, N. J.

Application October 9, 1950, Serial No. 189,221

155 Claims. (Cl. 95—4.5)

Figure 1:
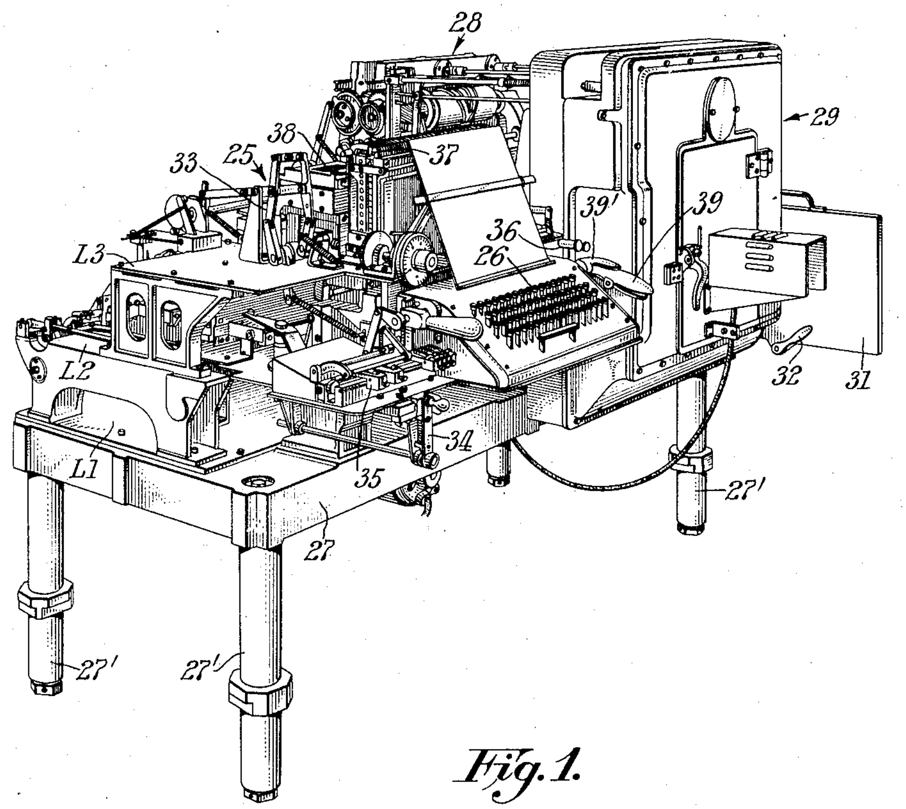

This invention relates to improvements in equipment for type setting.

In its preferred physical embodiment, the invention is adaptable to photographic composing, whereby a photographic film is sequentially exposed through a character bearing mask, the film result, after development, being used for preparing a printing plate or other printing surface. The application of the apparatus of my invention may be directed to letter-press, lithography, or gravure; which are generally considered as the three fundamental methods of producing printing, although it is not considered that the invention is limited to apparatus for these three processes alone as there are other printing procedures wherein it may be found to be equally adaptable as with the above mentioned processes or their modifications.

An important use of the apparatus of the invention resides in the composition of text matter which is largely in columnar form for newspapers, magazines, books, pamphlets, etc. requiring uniform right hand and left hand column margins. As a further requirement in printed matter of this nature, it is necessary to provide for variable column width, for example, from a relatively narrow newspaper column to a relatively wide column, as in the make up of a book. Other variables exist, as where a half-tone or a line cut is to be inserted in a column either flush right or flush left, or where headings or captions are to be centered. Type styles, in most instances of printed text, include various combinations of roman, boldface, and italic characteristics, as well as the more commonly used special characters, points, figures and logotypes.

In the offset lithographic processes, where my invention finds a particularly valuable application, a large percentage of the high quality columnar text matter is presently produced by composing letterpress type in a known manner, either by handsetting or with the use of hot metal line or character casting machines or a combination of the two. A letterpress ink proof is made from the composed type or slugs and the printed sheet thus obtained is used as a photographic subject for a film reproduction, the film, in turn, being used to expose an offset plate. This is, of course, a basic example, subject to the application of various intermediate operations determined by the character of the work.

The various steps in the art of producing composed text matter on printing surfaces with the use of film starting with letterpress type have been handed down in the development of photography and printing. There are many skills introduced as in composing the type, making the proof copy, and producing the photographic film from the proof. Likewise, these procedures require a great variety of expensive mechanical equipment, particularly if hot metal machines are used for type composing. If text type is set by hand, large amounts of time of skilled compositors are required, depending upon the work at hand.

More recently, various apparatus to compose characters directly upon film have been proposed, but have not achieved important commercial success. While there are some common phases in the organization of these photo composing machines, the theories advanced in support of details for their manipulation and operation vary widely, ranging in semblance from modifications of typewriting machines to species of those machines more commonly used for producing composition through the use of hot metal.

With the foregoing introductory explanation in mind, it is the principal object of my invention to provide a method of and equipment for photographically producing composed text type lines successively on film exhibiting a high degree of typographical quality. A further and important object of the invention is to provide equipment to produce this high quality typography on film in a single skill operation and with a keyboard operated machine, the product of the machine being film ready for development, carrying a typographical effect which is complete in character spacing, line spacing and justification. Still further objectives are to provide a machine which is versatile, which avoids the necessity of preparing a record strip, and which will permit variations of a fundamental type style to be quickly and easily adapted directly from the keyboard; and likewise, to provide a machine having novel mechanisms adaptable to the usual variations in printing which represents a saving in investment and floor space, and a saving in the expense of operation as compared with equipment presently required for composition.

Two principal sub-units constitute important components of the machine in the preferred embodiment of my invention which, for descriptive purposes, I have designated as the "A" unit, and the "B" unit. These are interconnected mechanically and functionally in an association which lends itself to maximum efficiency and operability. The "A" unit includes mainly character selection apparatus. Given a size and style of type to be used the operator makes certain pre-operational settings and adjustments, and from that point forward, for each line of composition, follows a routine of operating the keyboard of the "A" unit in a similar manner to the operation of a typewriter keyboard. As the characters are progressively chosen, signals representing each character and representing character spacing are established in signal receiving members or patterns nested in a cradle. The cradle then circulates from the "A" unit to the "B" unit and, in the "B" unit, the character signals which have been established in the patterns in the "A" unit are mechanically interpreted to effect the photographic positioning of a master character plate in a built-in camera apparatus and to effect film positioning. This master plate is a transparency having all of the characters for printing at specific coordinate locations thereon, and in the operation of "B" unit, the master plate changes position both vertically and horizontally to select a character. The character subjects are photographed letter by letter in their proper spacing, whereafter the cradle of patterns is returned to the "A" unit to again be used for selected characters and, meanwhile, the film is shifted for a new line and when a column is completed to a new column. The product of the machine is an exposed film of columnar printing text matter justified and ready to be developed and used for subsequent processing.

It will be understood that the following description and drawings constitute a preferred embodiment of my invention. For the purpose of description, the keyboard is considered to be at the front of the machine and the right and left sides are at the right and left of the operator when operating the machine and, as used herein, the word "character" in connection with composition is considered to include any alphabetical letter or sign, or one of the many points and figures or such combinations as are common in printing. Furthermore, and where spaces are inserted in the composition, the absence of a character may be broadly considered of character value. Mechanical controls predominate in the construction of machines according to the preferred embodiment of my invention, with a minimum of electrical motor drive and to provide camera illumination, although I wish to have it understood that many of the controls and appurtenances could be readily adapted for electrical or pneumatic or other modes of actuation without departing from the invention in substance. To simplify the description, particularly with regard to the drawings, auxiliary equipment such as dust covers, gear casings, cam follower springs, lubricating facilities, and other known apparatus are avoided entirely or in part, although it is further understood that such equipment may be included as with good engineering practice. The quality of workmanship and fits and tolerances may be of the order of that associated with hot metal line casters or other keyboard controlled apparatus. Various changes may, of course, be made in the size and shape and arrangement of parts and other instrumentalities without departing from the invention as defined in the sub-joined claims.

Figure 1A:
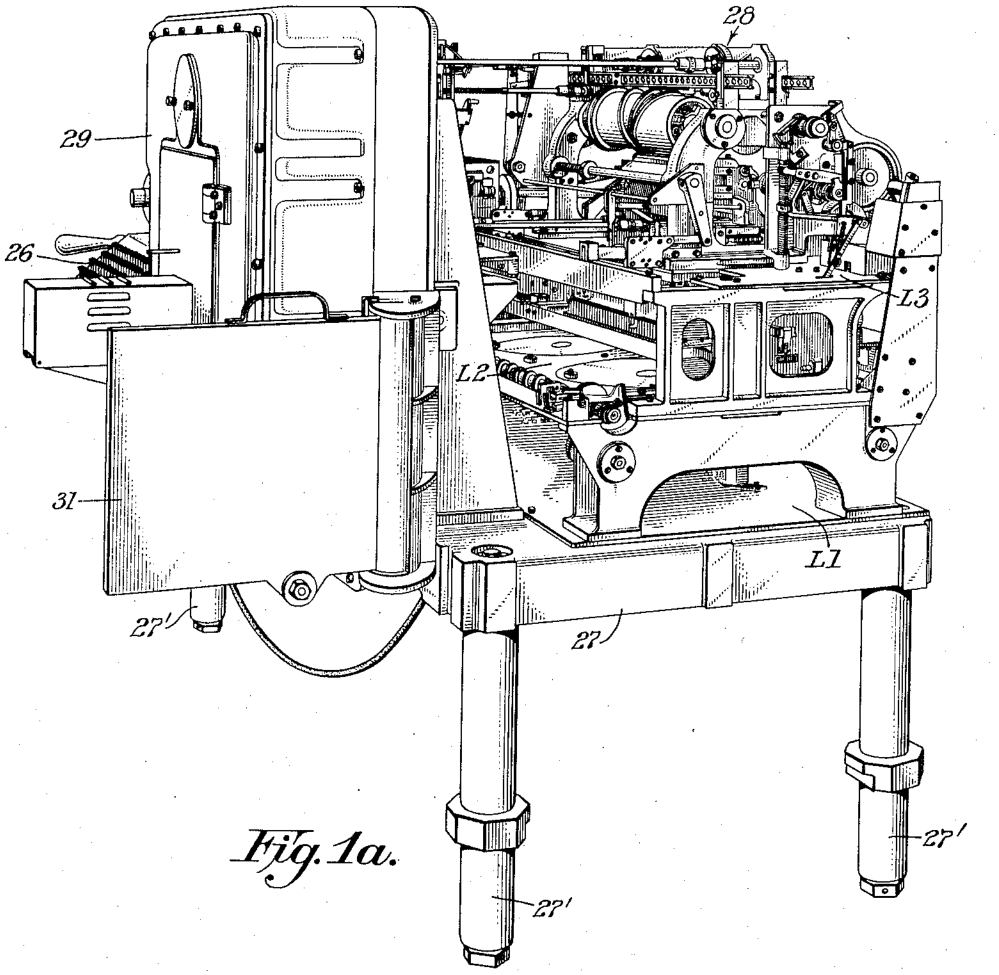
Figure 1B:
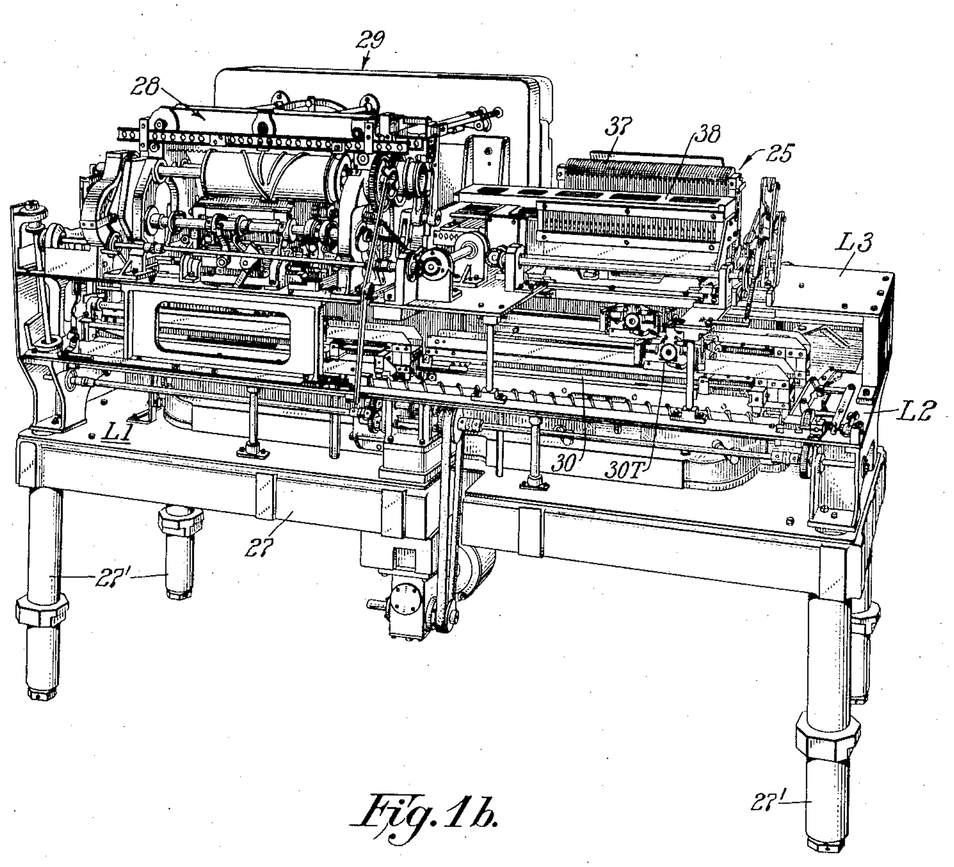
Figure 2:
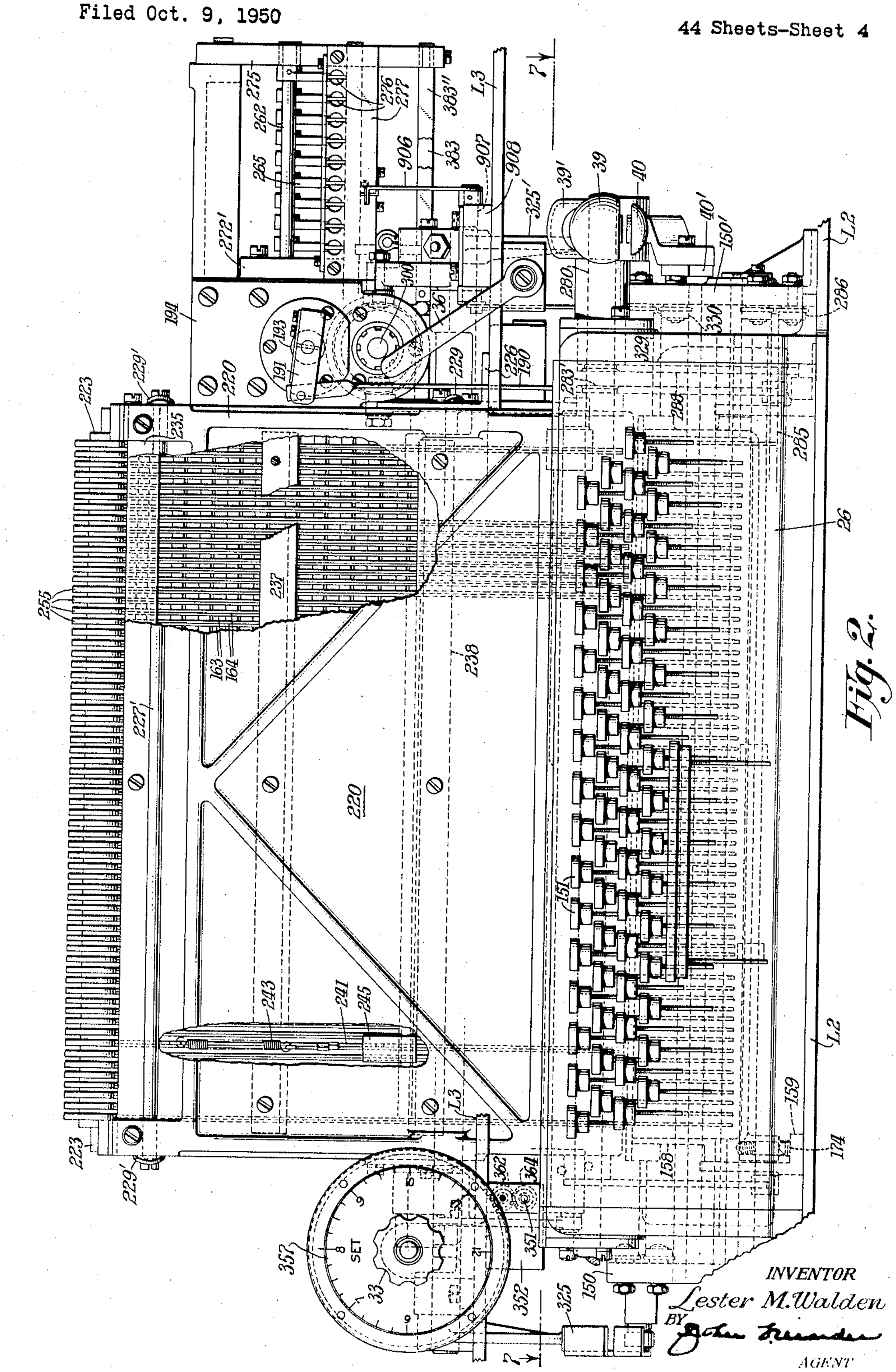
Figure 2A:
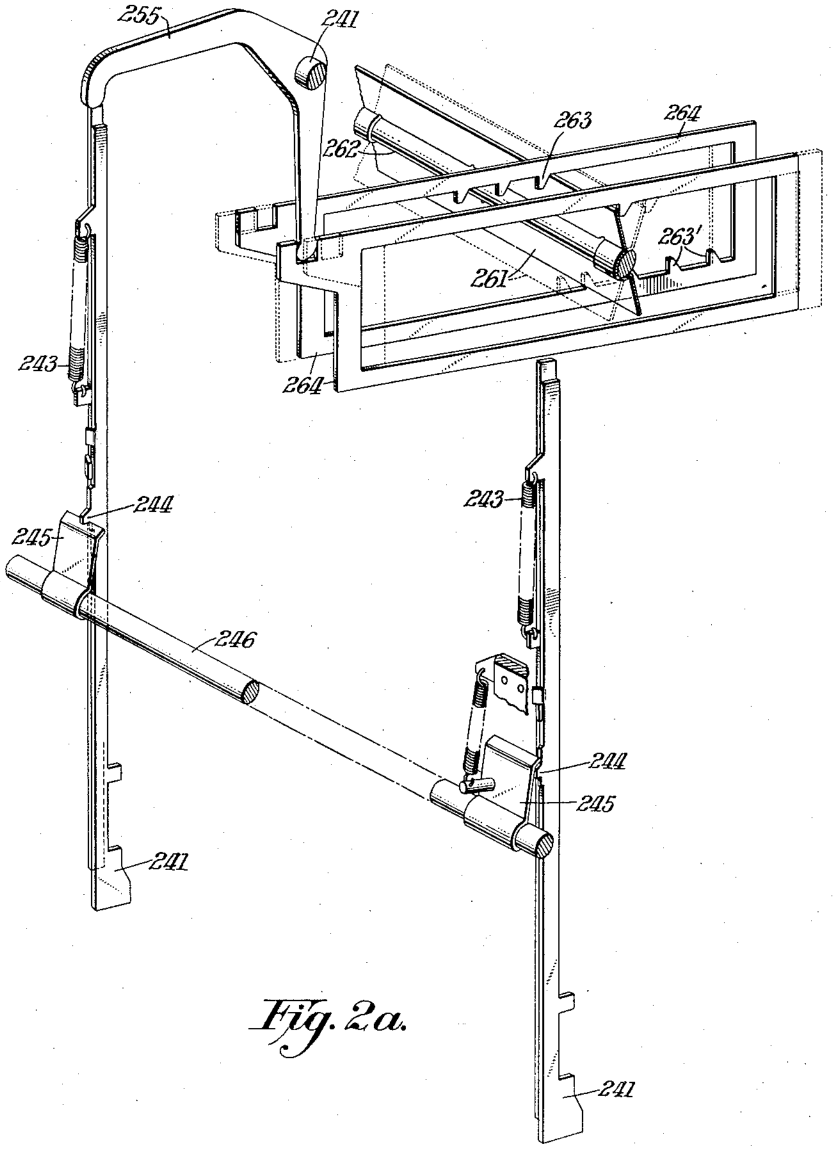
Figures 3, 3A, 3B:
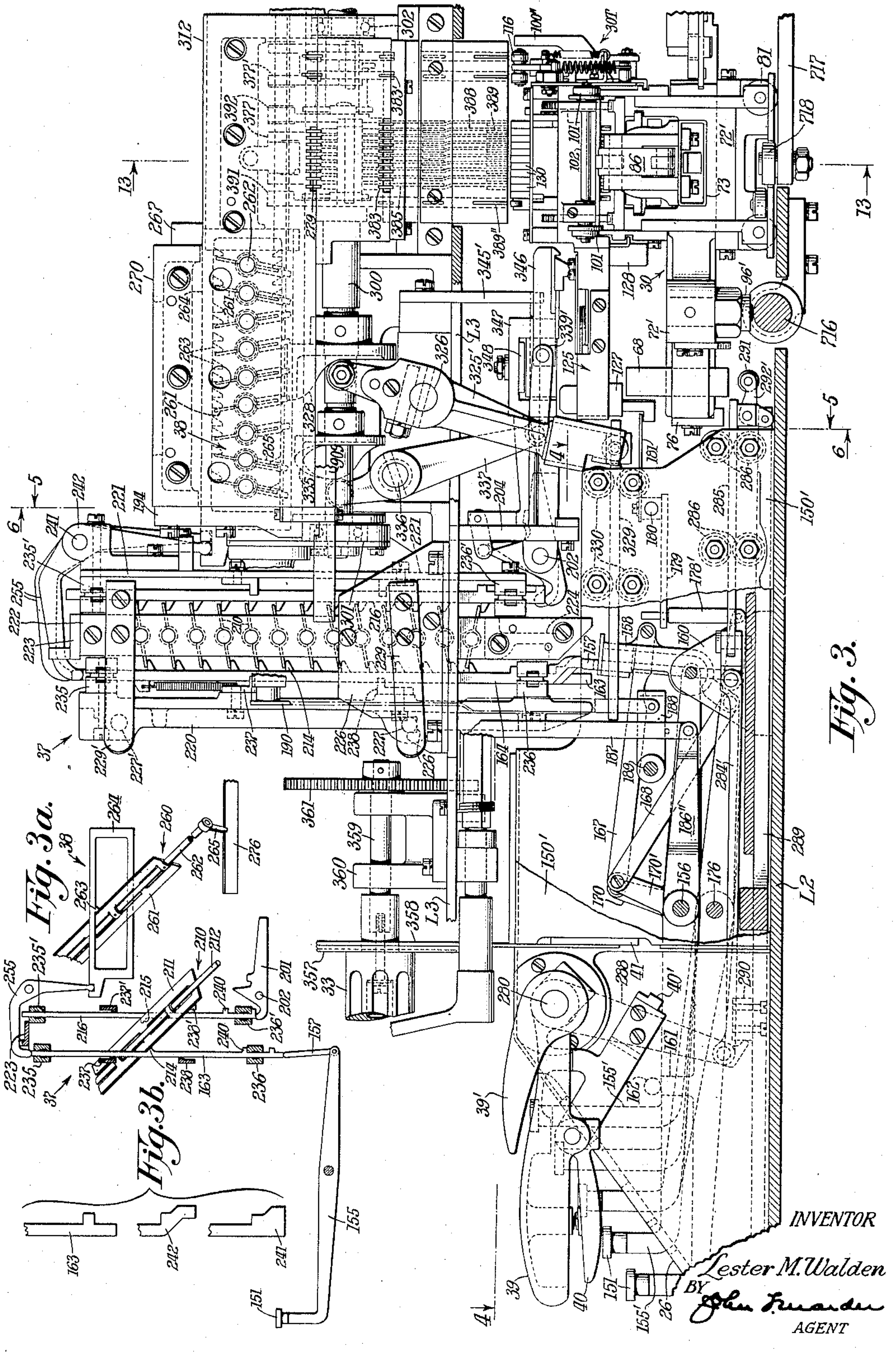
Figures 4, 4A:
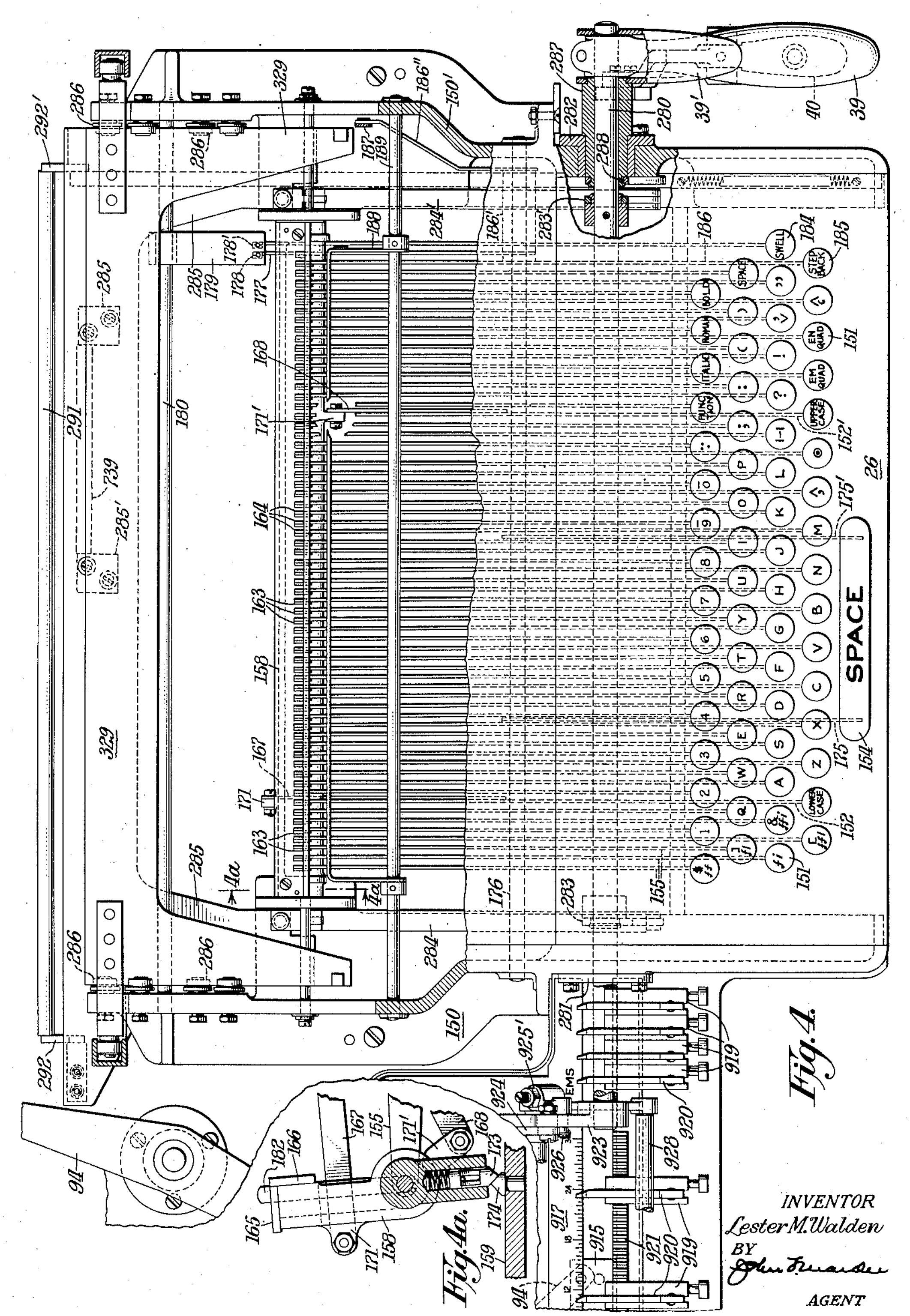
Figure 5:
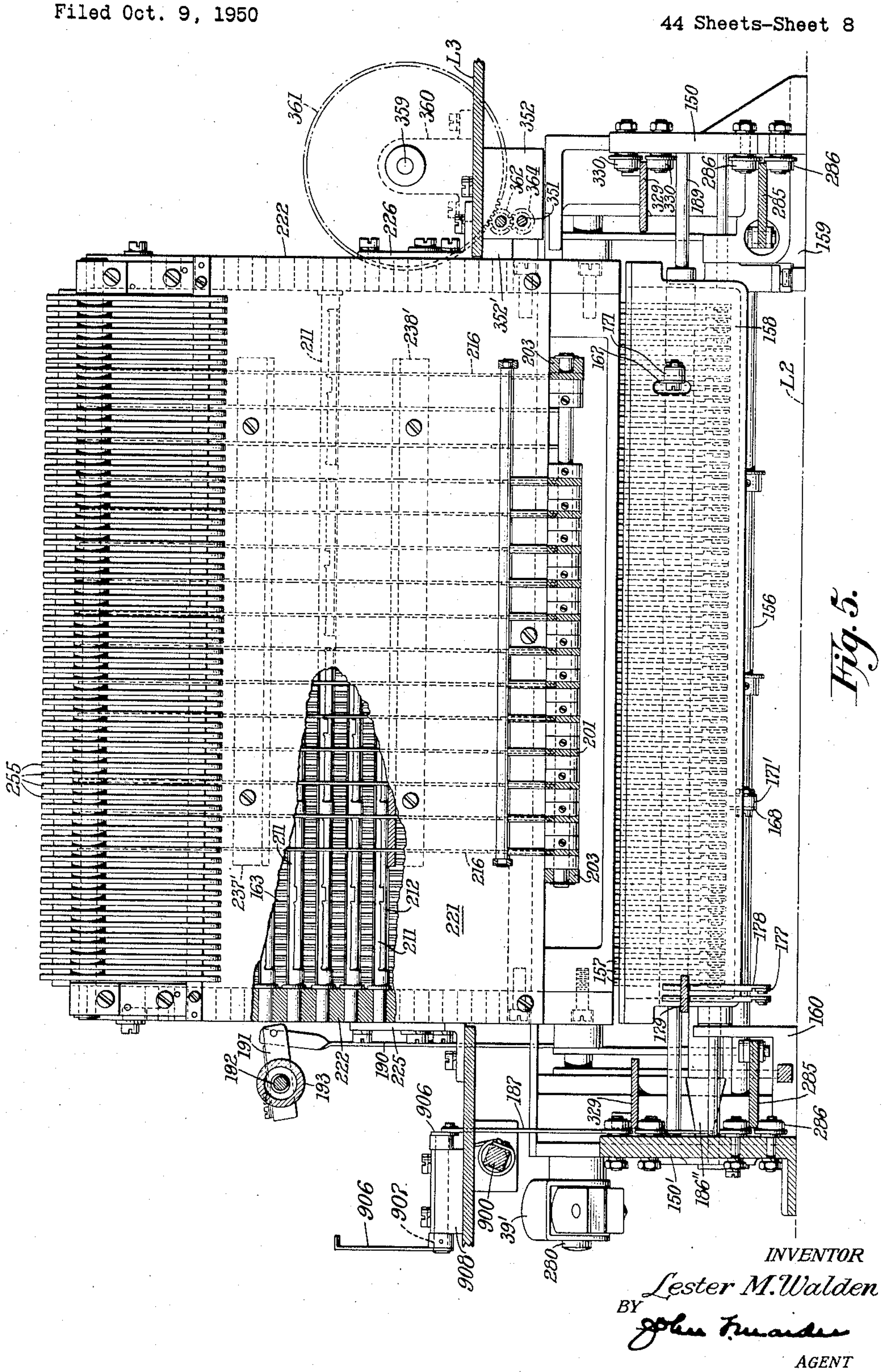
Figures 6, 17, 18:
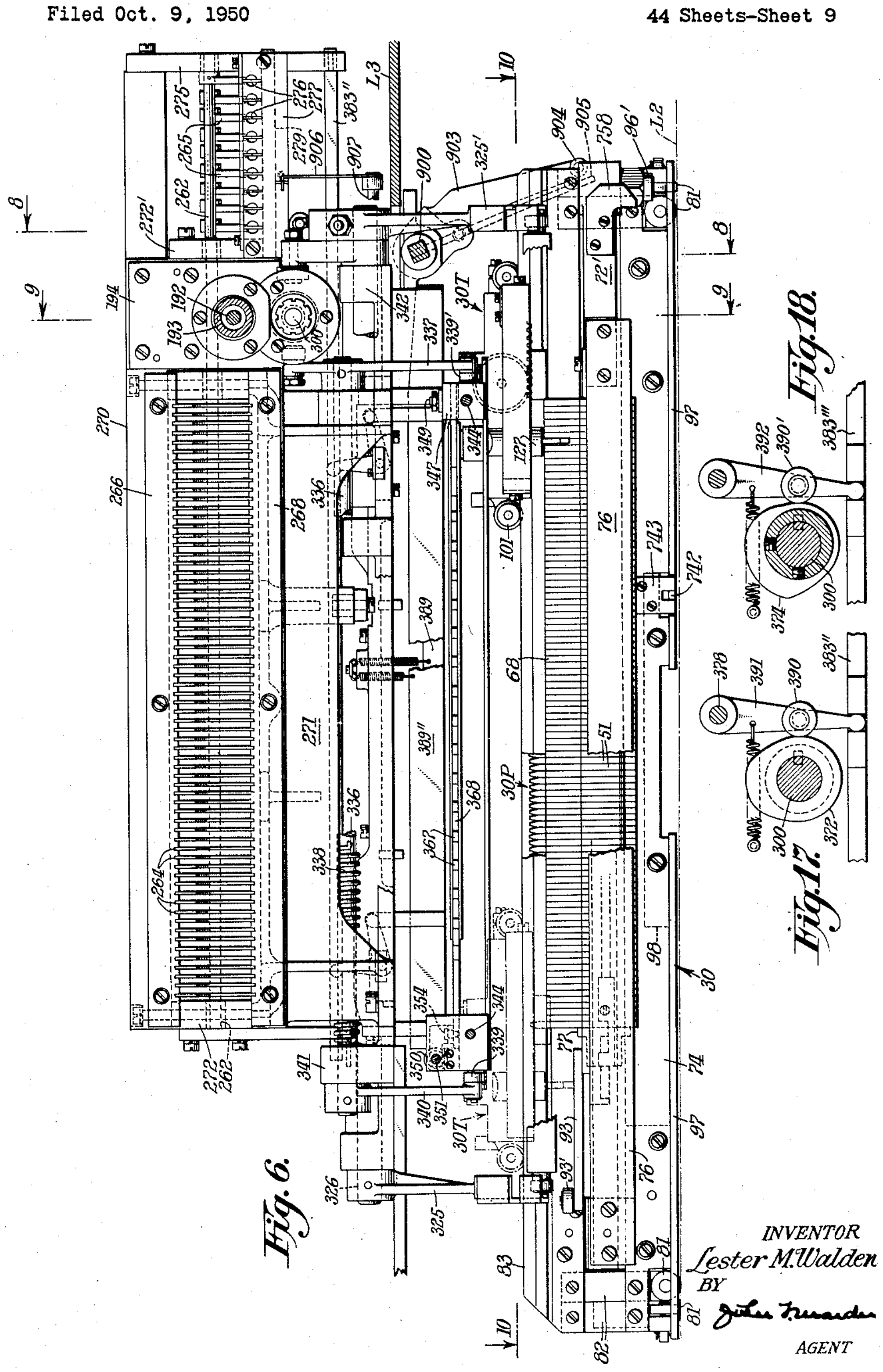
Figure 7:
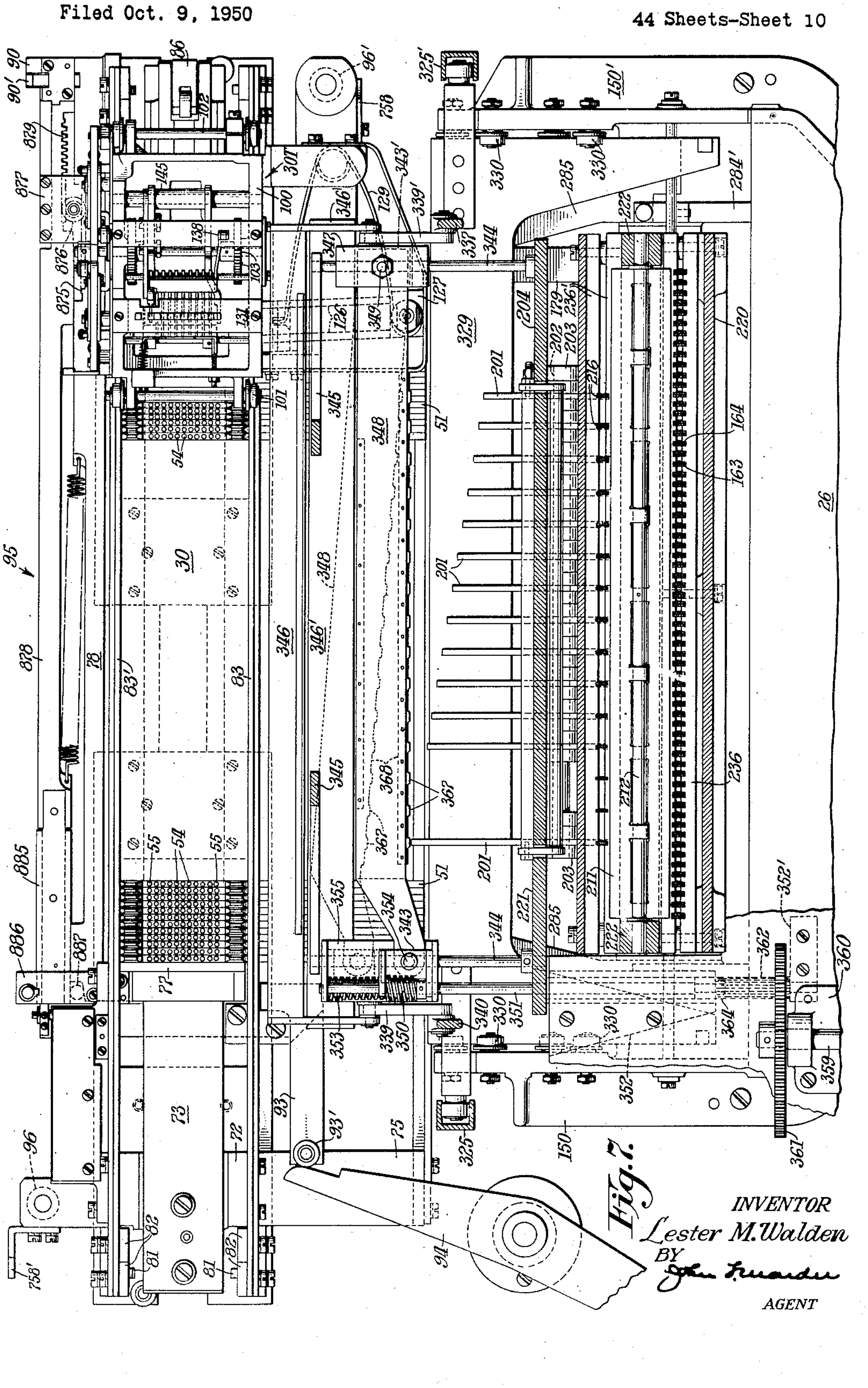
Figure 8:
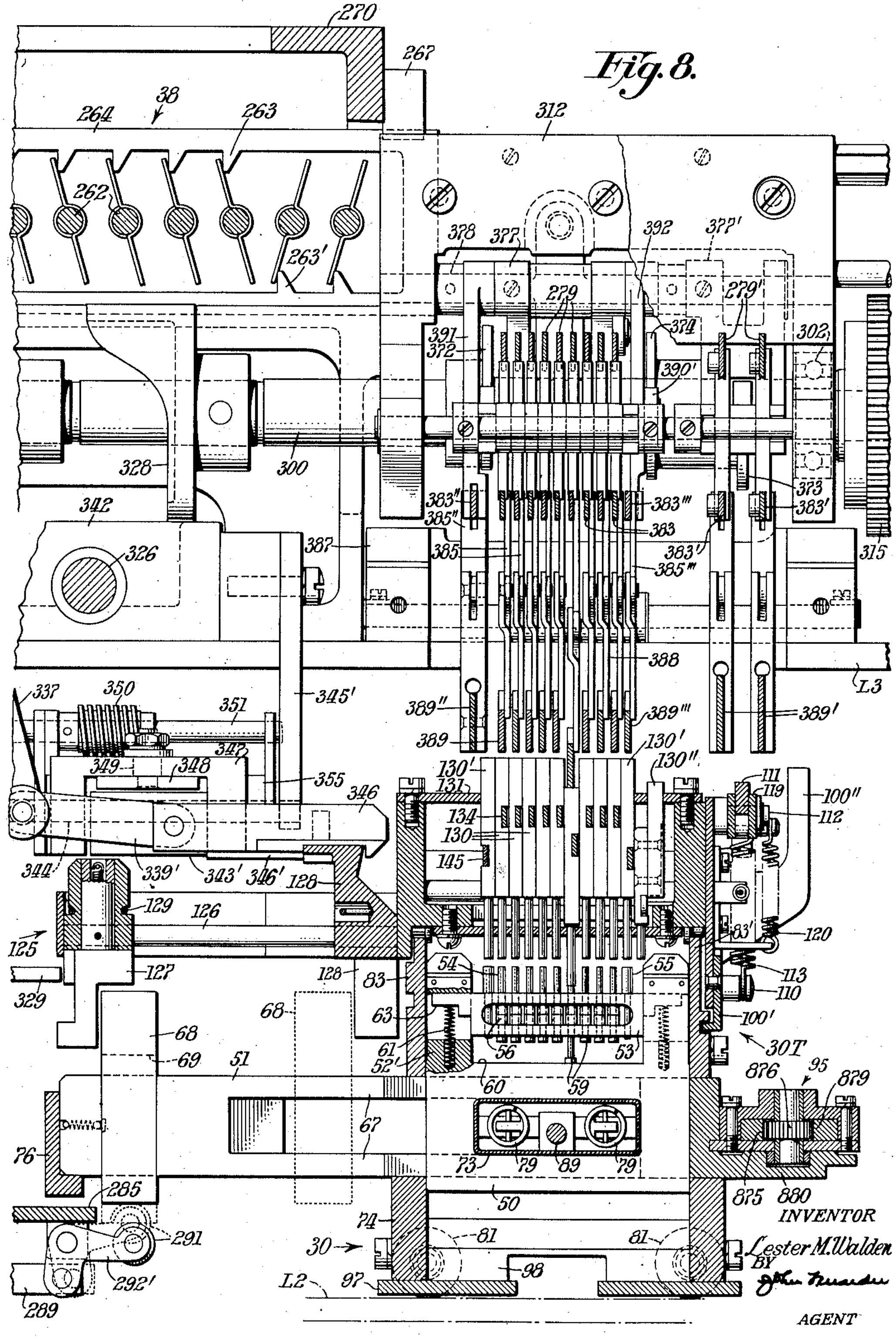
Figure 9:
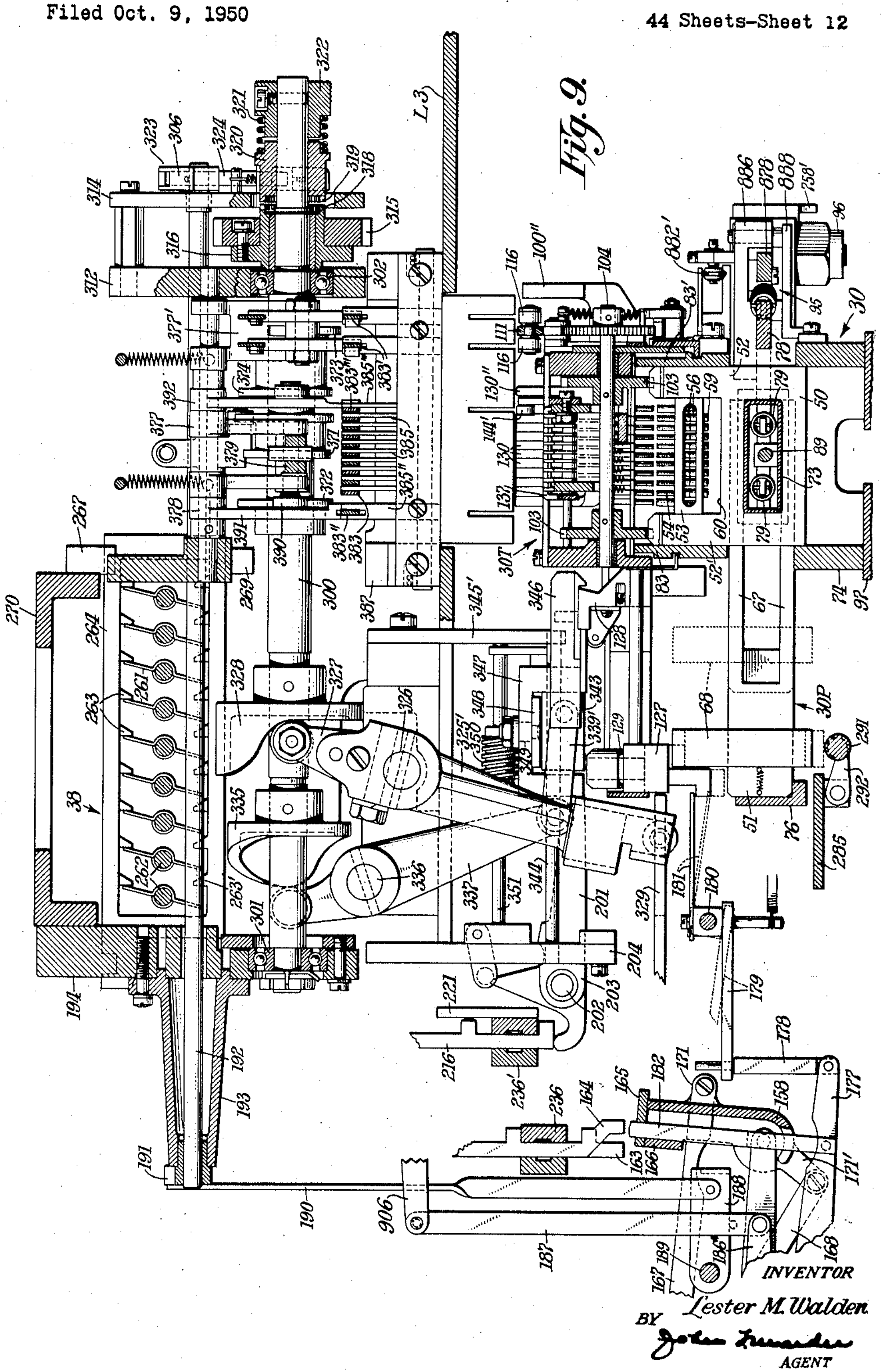
Figure 9A:
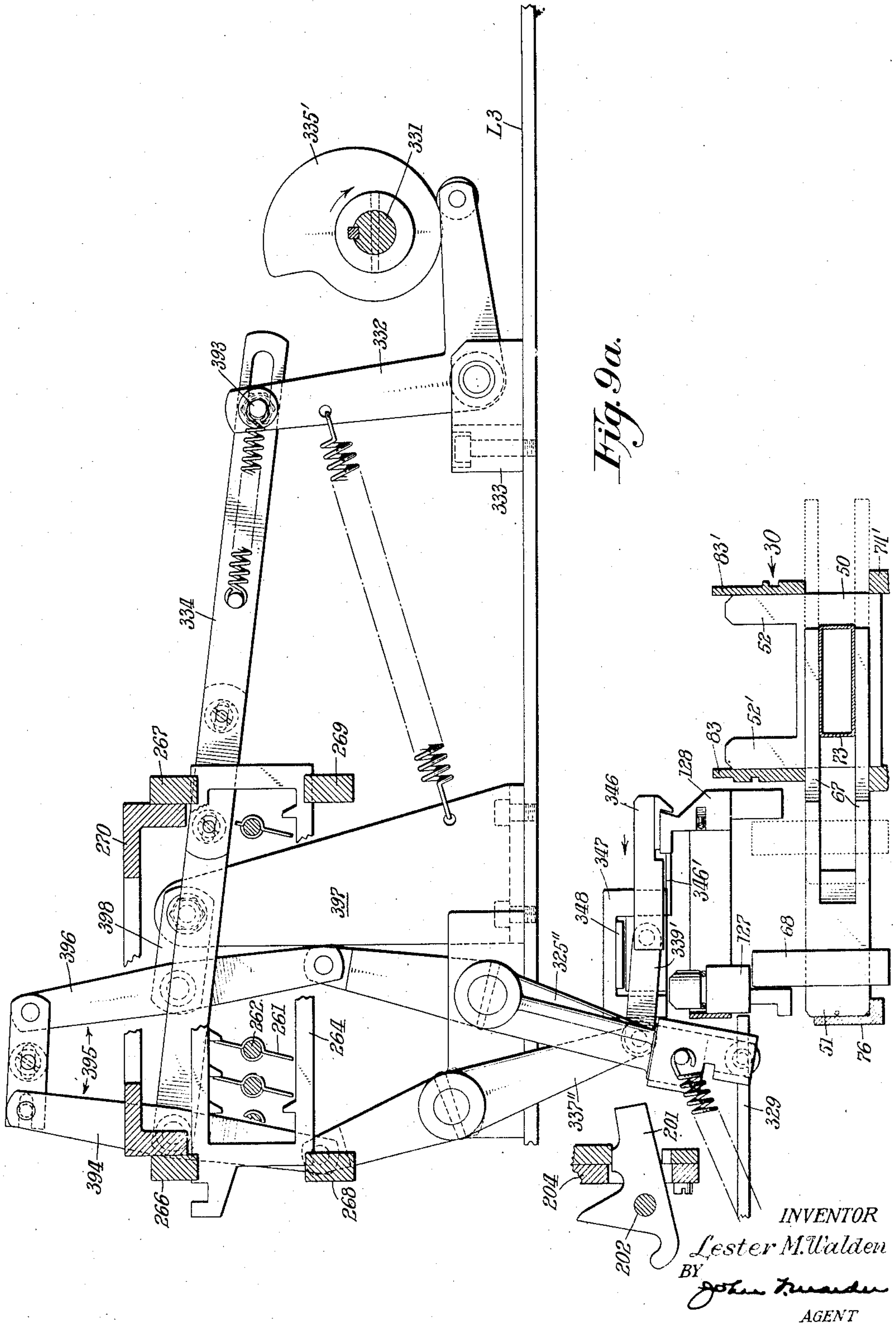
Figures 10, 10A, 10B:
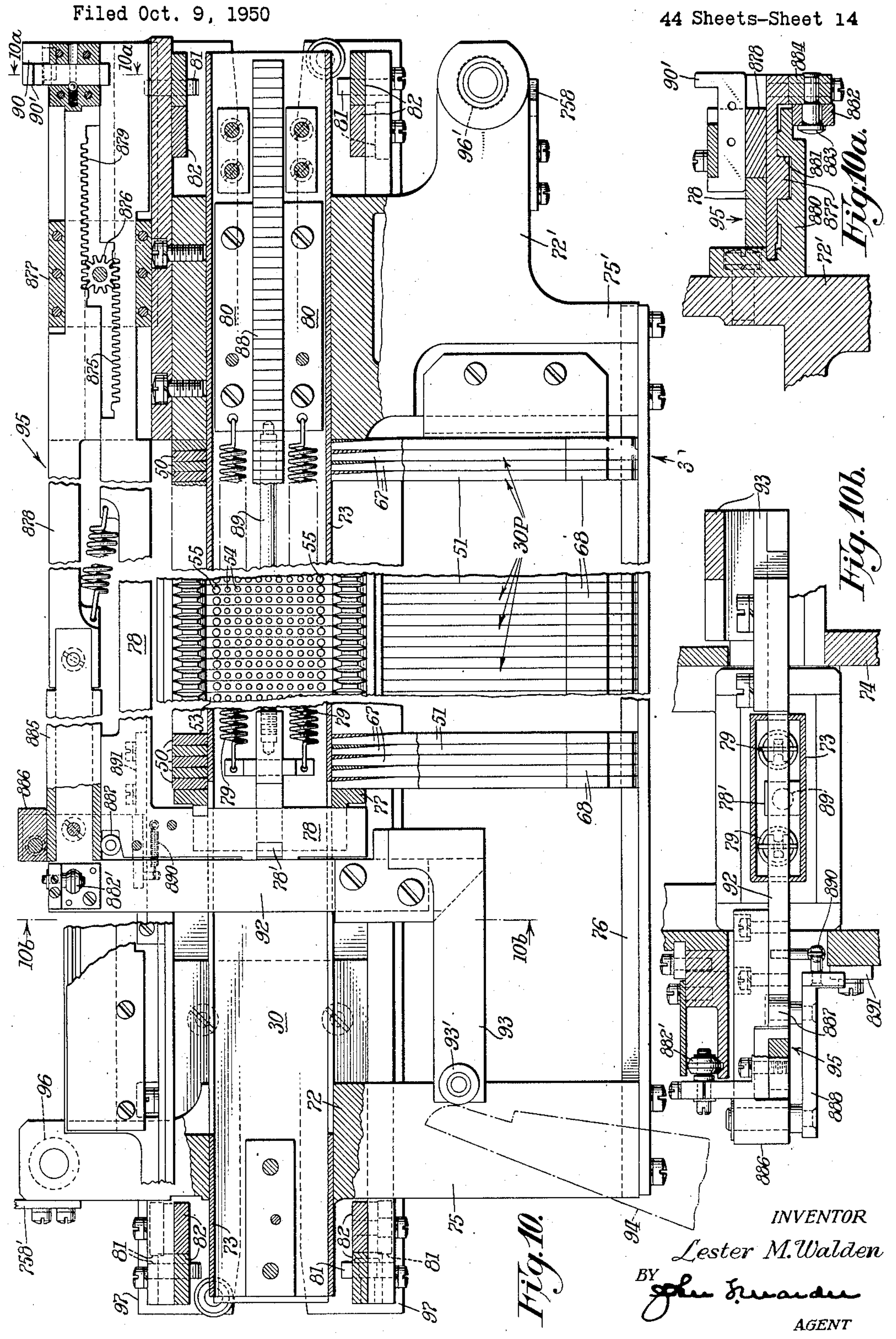
Figures 11, 11A, 12:
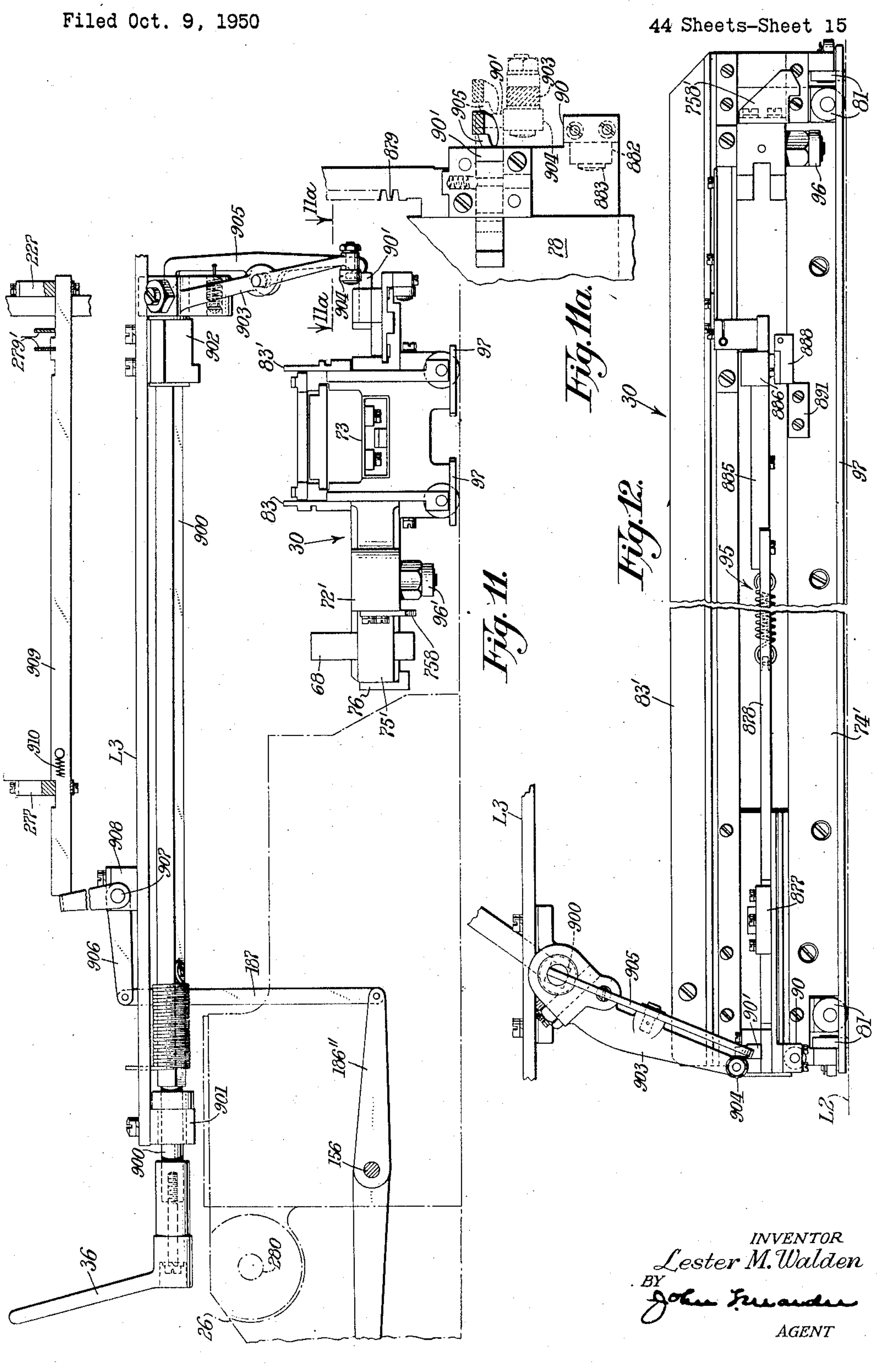
Figure 13:
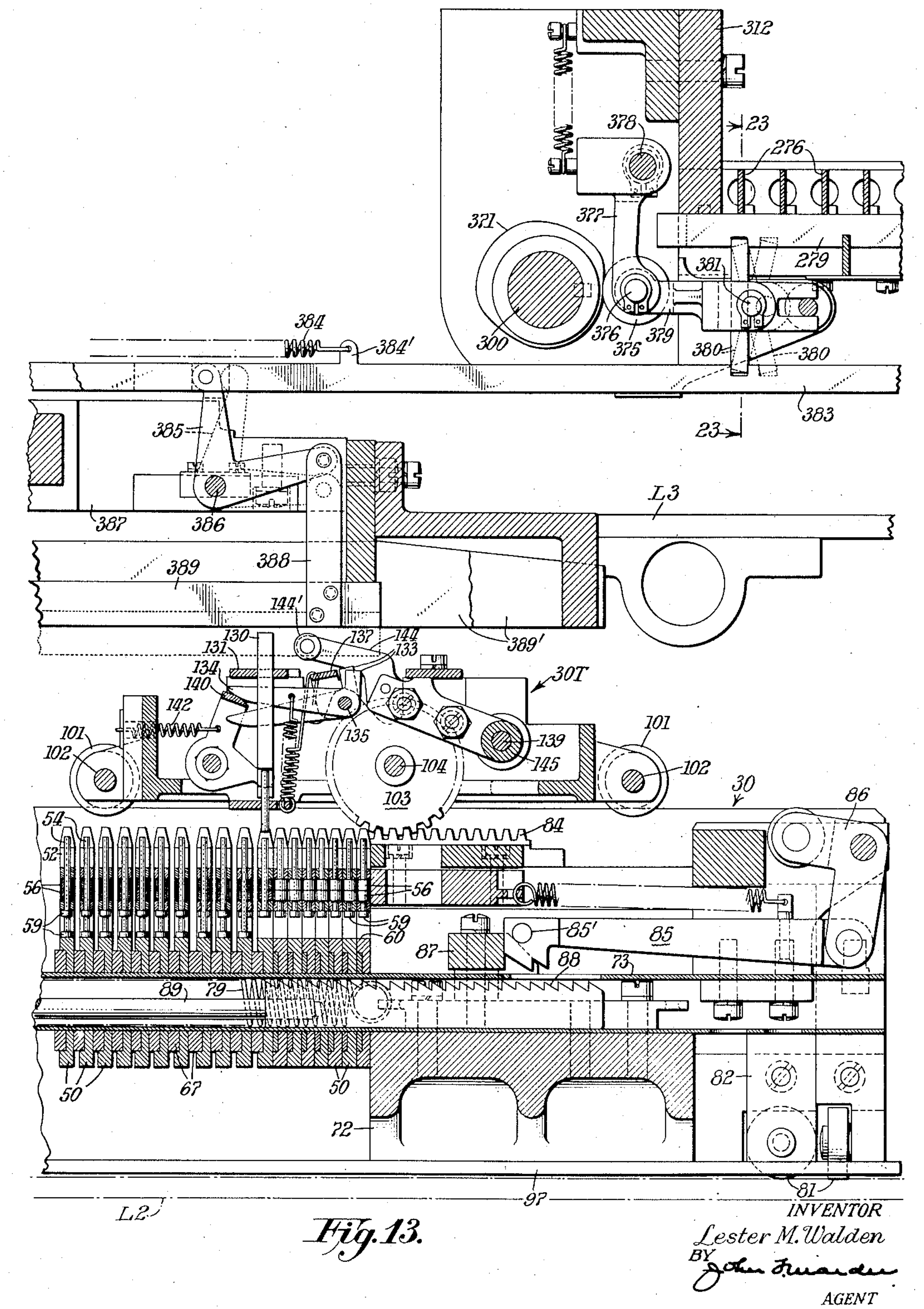
Figure 14:
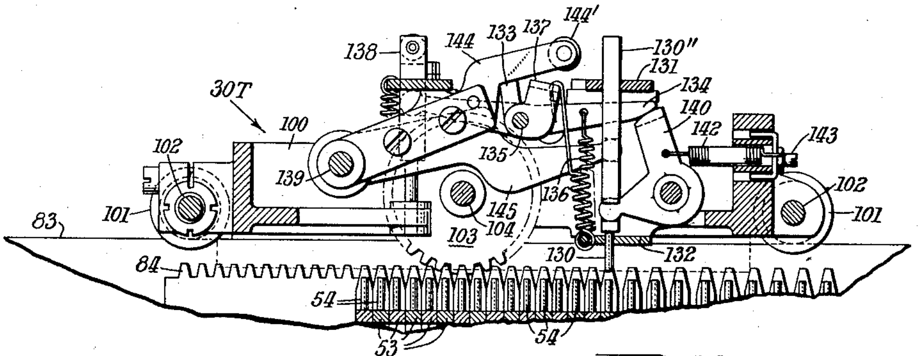
Figure 16:
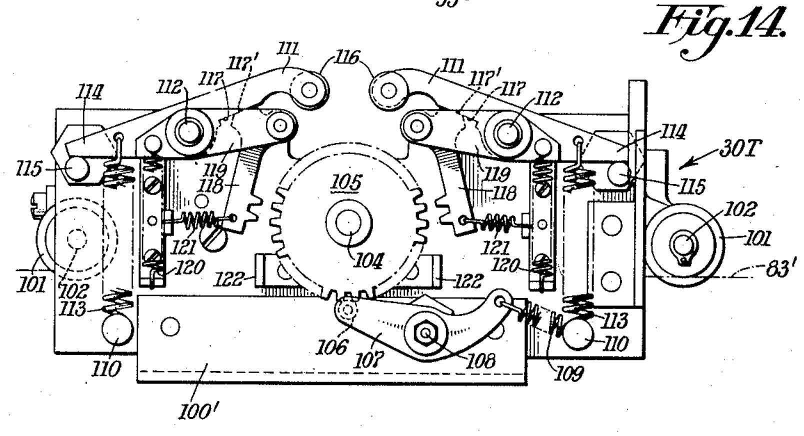
Figures 15, 15A:
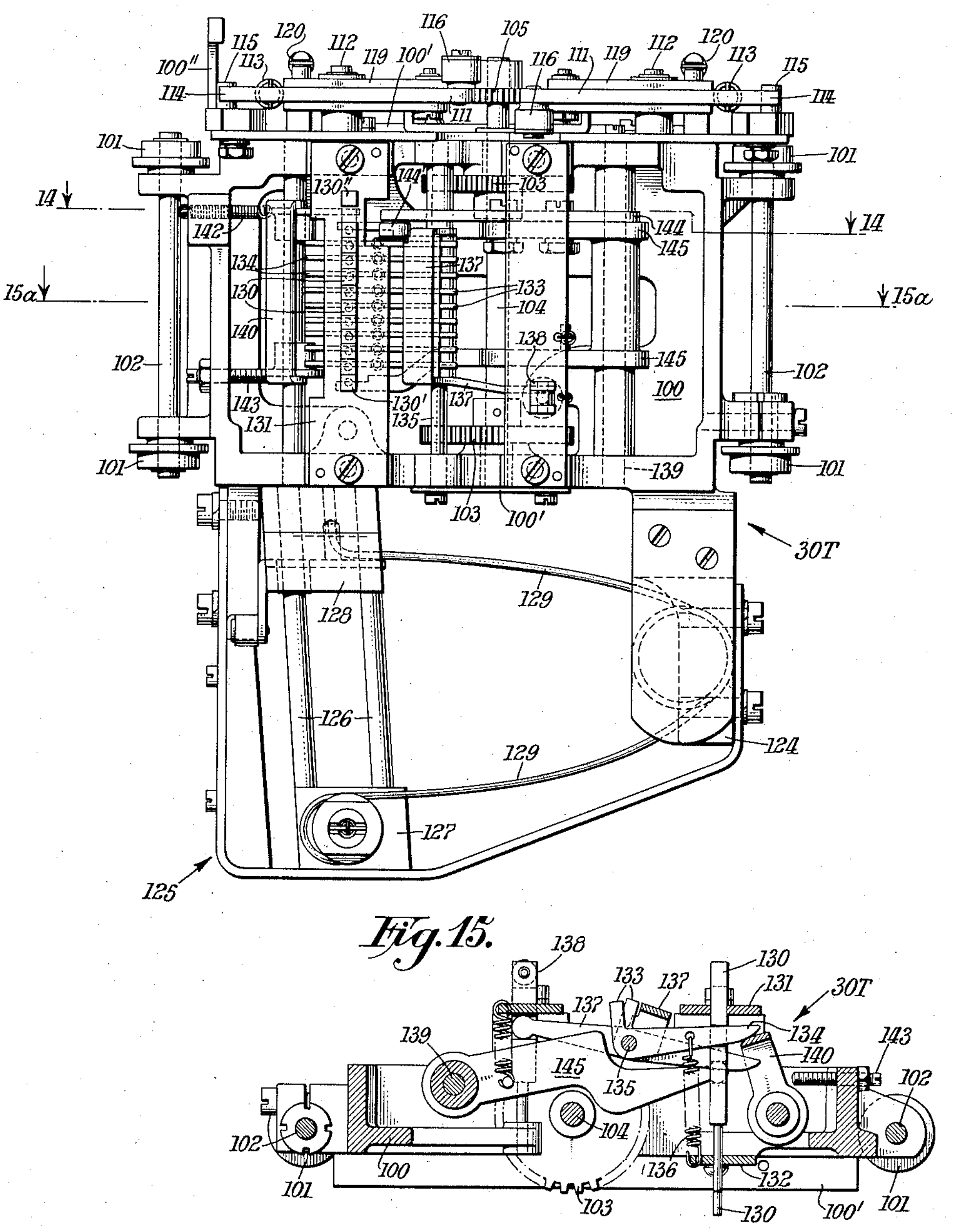
Figure 19:
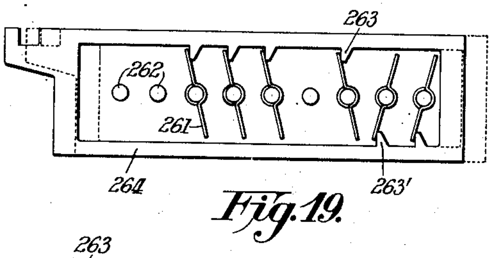
Figure 20:
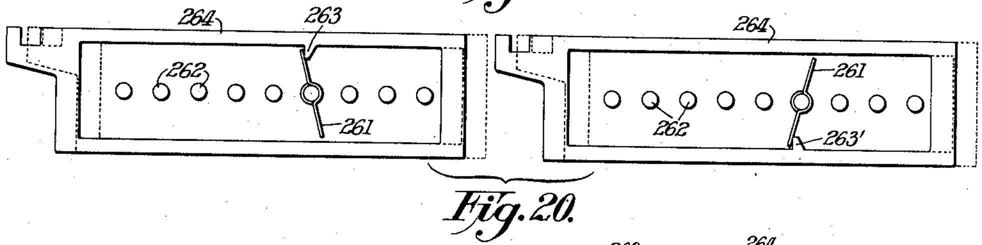
Figures 4B, 4C, 4D, 4E, 21:
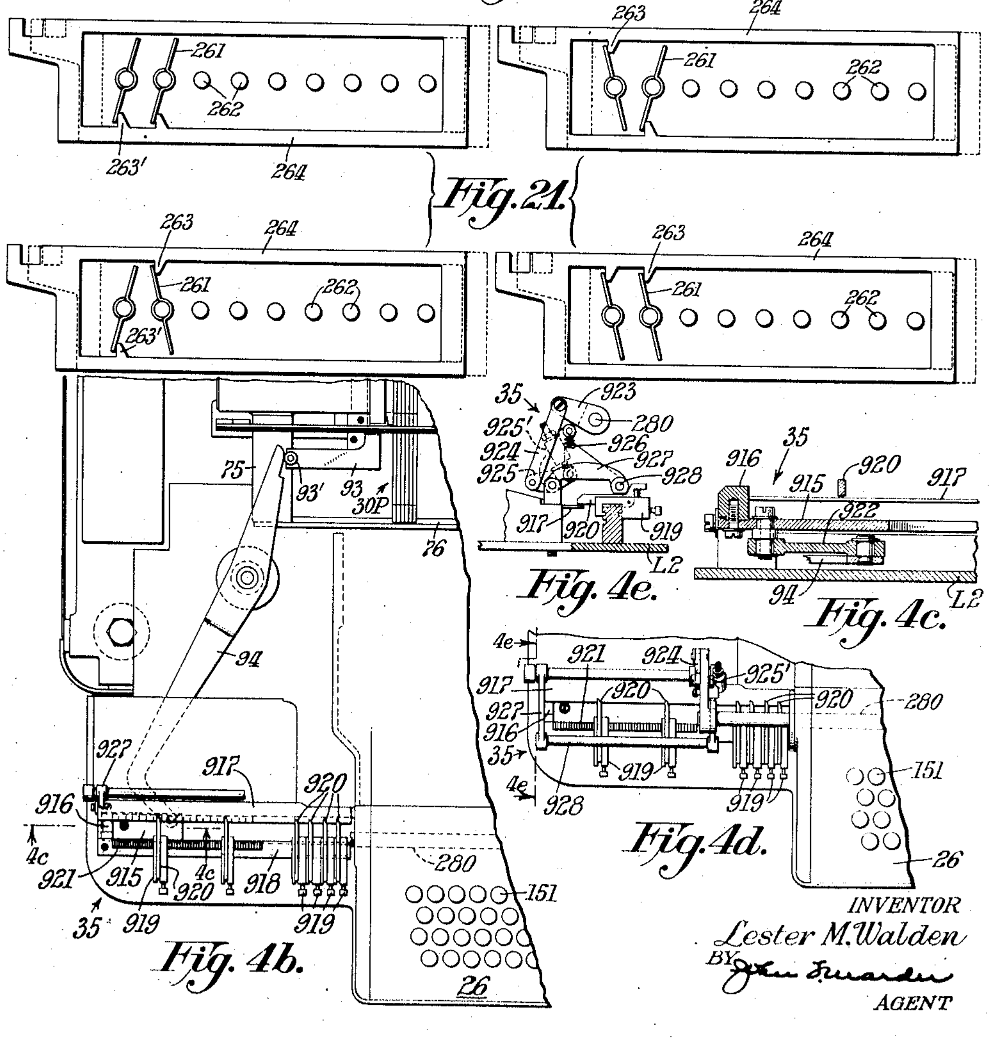
Figures 22, 23, 24:
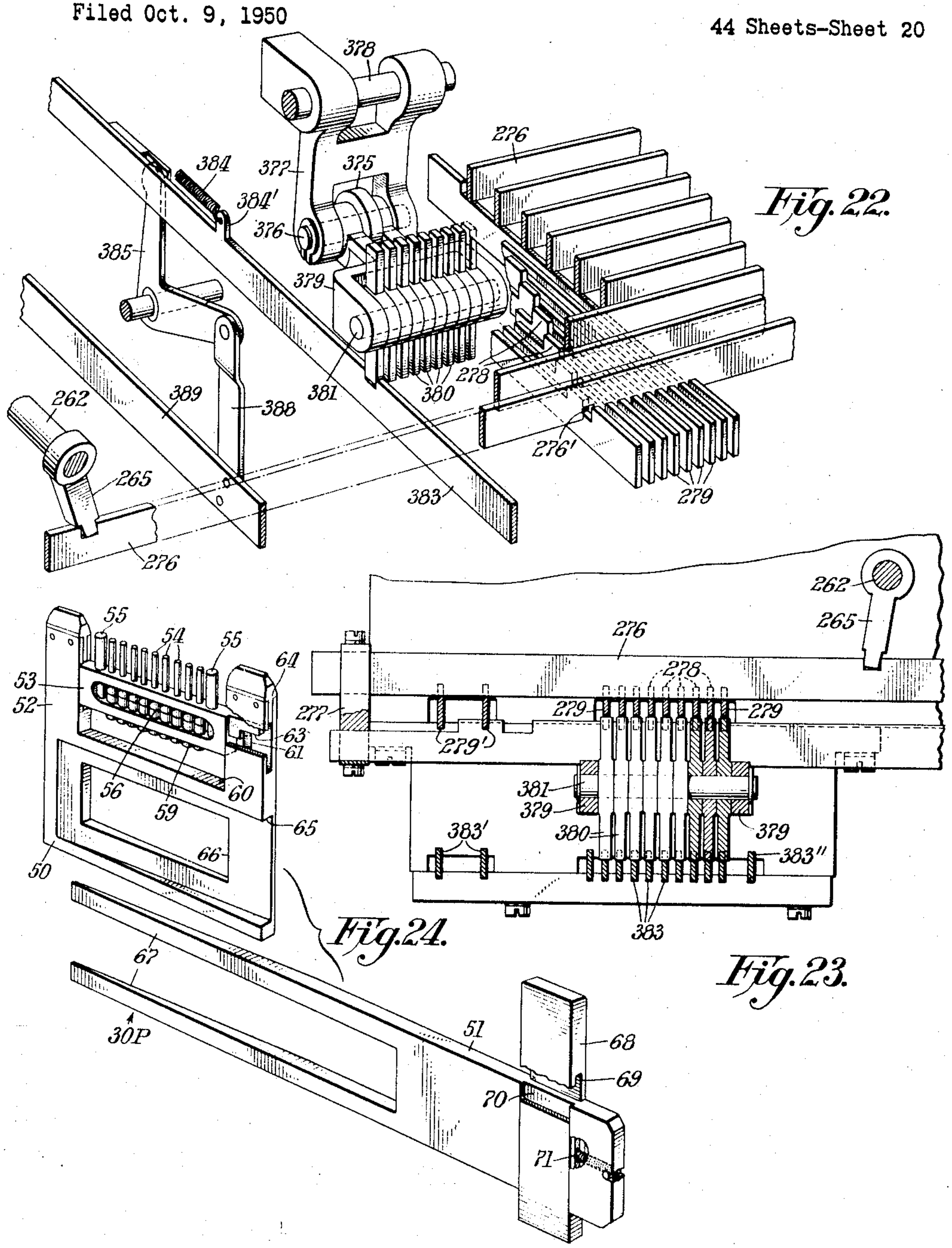
Figure 25:
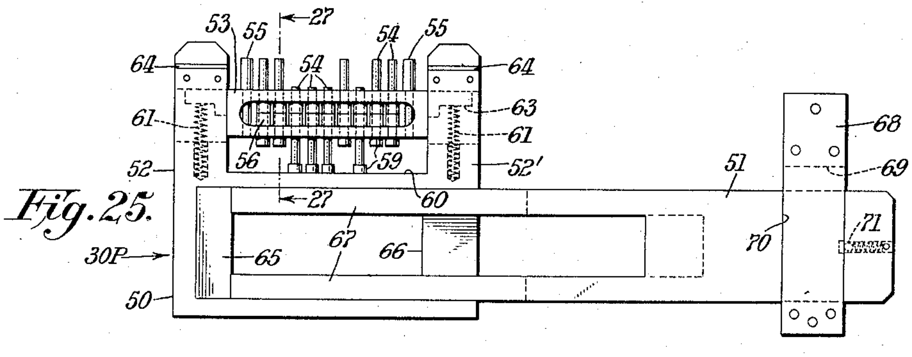
Figure 25A:
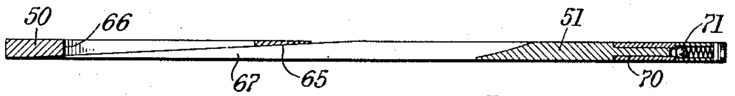
Figure 26:
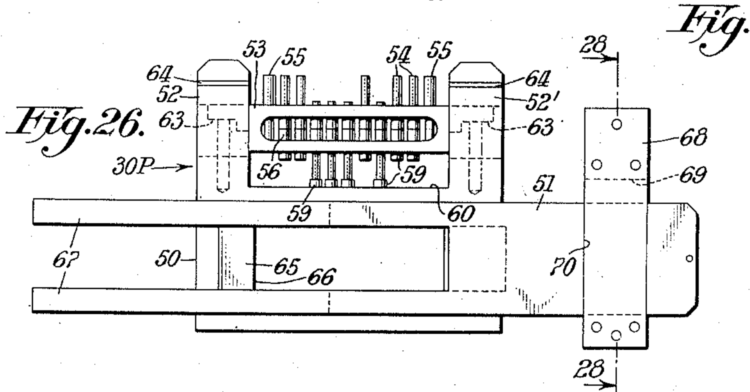
Figure 26A:
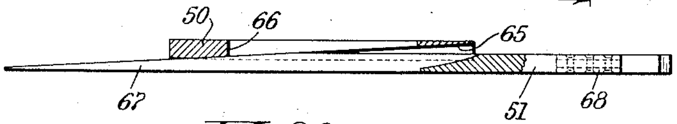
Figure 28:
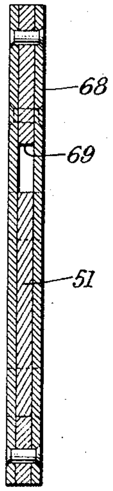
Figure 27:
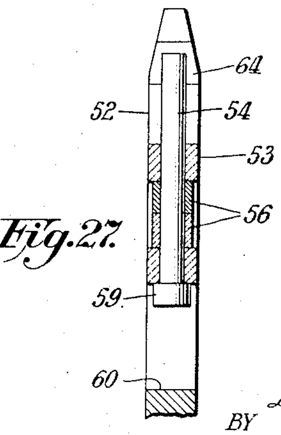

In the drawing:

Figures 1, 1*a*, and 1*b* are perspective views of a machine constructed according to the principles of my invention taken from the front left, front right, and rear respectively to illustrate the general arrangement of component parts, Figure 2 is a front elevation view of the "A" unit showing the keyboard with its associated mechanisms, partly cut away to show details of reeds used to transmit motion to sizing and sensing devices, Figure 2*a* is a diagrammatic perspective view of yielding reed controls for special purpose application, Figure 3 is a right hand side elevation view of the keyboard, and its associated mechanisms in the "A" unit illustrating details of sizing and sensing devices, Figure 3*a* is a diagrammatic view of elementary moving parts of Figure 3, Figure 3*b* is a view in fragmentary form illustrating three types of reed terminals, Figure 4 is a cutaway top plan view of the keyboard taken along the line 4—4 of Figure 3, Figure 4*a* is a fragmentary cross-sectional view of devices for shifting between upper case and lower case, taken on line 4*a*—4*a* of Figure 4, Figure 4*b*, on the sheet with Figures 19, 20, and 21, is a fragmentary top plan view illustrating details at the left side of the keyboard, Figure 4*c* is a cross sectional elevation view of stop mechanisms taken on line 4*c*—4*c* of Figure 4*b*, Figure 4*d* is a fragmentary plan view taken at the left front corner of Figure 4*b* and showing devices omitted in that view for clarity, Figure 4*e* is a side elevation view partly in section taken along line **4*e*—4*e*** of Figure 4*d*, Figure 5 is a rear elevation view of the reed assembly in the "A" unit, partly cutaway to show manual sizing and sensing mechanisms, taken along the vertical line 5—5 of Figure 3, Figure 6 is an elevation view of sizing and sensing devices of my invention, taken along the line 6—6 of Figure 3, Figure 7 is a plan view showing sizing and pattern supporting arrangements, taken centrally of the "A" unit along the line 7—7 of Figure 2, Figure 8 is an enlarged fragmentary vertical cross-section view showing details of pattern setting devices, taken along the line 8—8 of Figure 6, Figure 9 is a view taken along 9—9 of Figure 6 showing principally the clutch and cam shaft of the "A" unit, also operating mechanisms associated therewith, Figure 9*a* is a side elevation view illustrating an alternative construction for certain sizing mechanisms, Figure 10 is a plan view, partly in cross section, showing the pattern cradle with patterns and other associated parts, taken on line 10—10 of Figure 6, Figure 10*a* is a fragmentary cross-section view taken on line **10*a*—10*a*** of Figure 10, Figure 10*b* is a fragmentary cross-section view taken on line **10*b*—10*b*** of Figure 10, Figure 11 is a side elevation view of control devices in the "A" unit employed for line centering and stepback, Figure 11*a* is a fragmentary plan view of a corner of the cradle to illustrate a centering adjustment, Figure 12 is a view of the apparatus of Figure 11, taken from the rear of the cradle, Figure 13 is an enlarged vertical cross-section view, showing parts of the pattern cradle, the transmitter, and operating linkages, taken along lines 13—13 of Figure 3, Figure 14 is a central, vertical, cross-sectional view of the transmitter resting on a cradle, Figure 15, on a sheet apart from that of Figure 14, is a top plan view of the transmitter, Figure 15*a* is a vertical cross-sectional view taken centrally through the transmitter along line **15*a*—15*a* of Figure 15, Figure 16, on the sheet with Figure 14, is a rear elevation view of the transmitter, Figures 17 and 18, on the sheet with Figure 6, are fragmentary cross-sectional views of two of the "A" unit linkage cams with followers, Figures 19, 20 and 21 are diagrammatic illustrations of control reeds, for explanation of sensing combinations, Figure 22 is a fragmentary perspective view of various units of the sensing bar linkages, Figure 23 is a vertical cross-section view of sensing bar linkage parts, taken on line 23—23** of Figure 13, Figure 24 is a perspective view showing the two separable component sub-assemblies comprising the pattern, Figure 25 and 25*a* are respectively side elevation and transverse horizontal cross-sectional views of the pattern, with the components in assembled relationship and with the wedge component fully withdrawn, Figures 26 and 26*a* are side elevation and transverse horizontal cross-sectional views of the pattern with the components in assembled relationship, and with the wedge component fully impressed, Figure 27 is a vertical cross-section view taken through a portion of the pattern on line 27—27 of Figure 25, Figure 28 is a vertical cross-section view through the wedge component of the pattern taken on line 28—28 of Figure 26.

Figure 29:
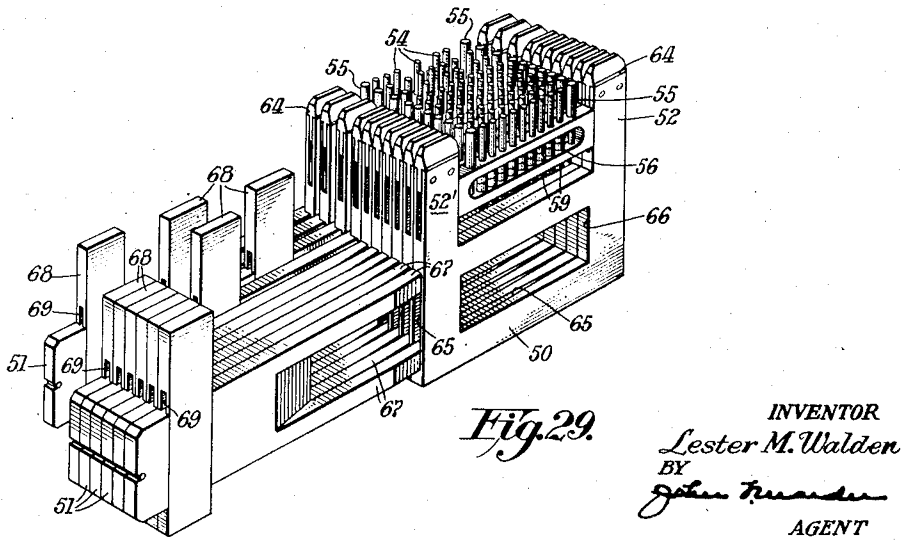
Figure 30:
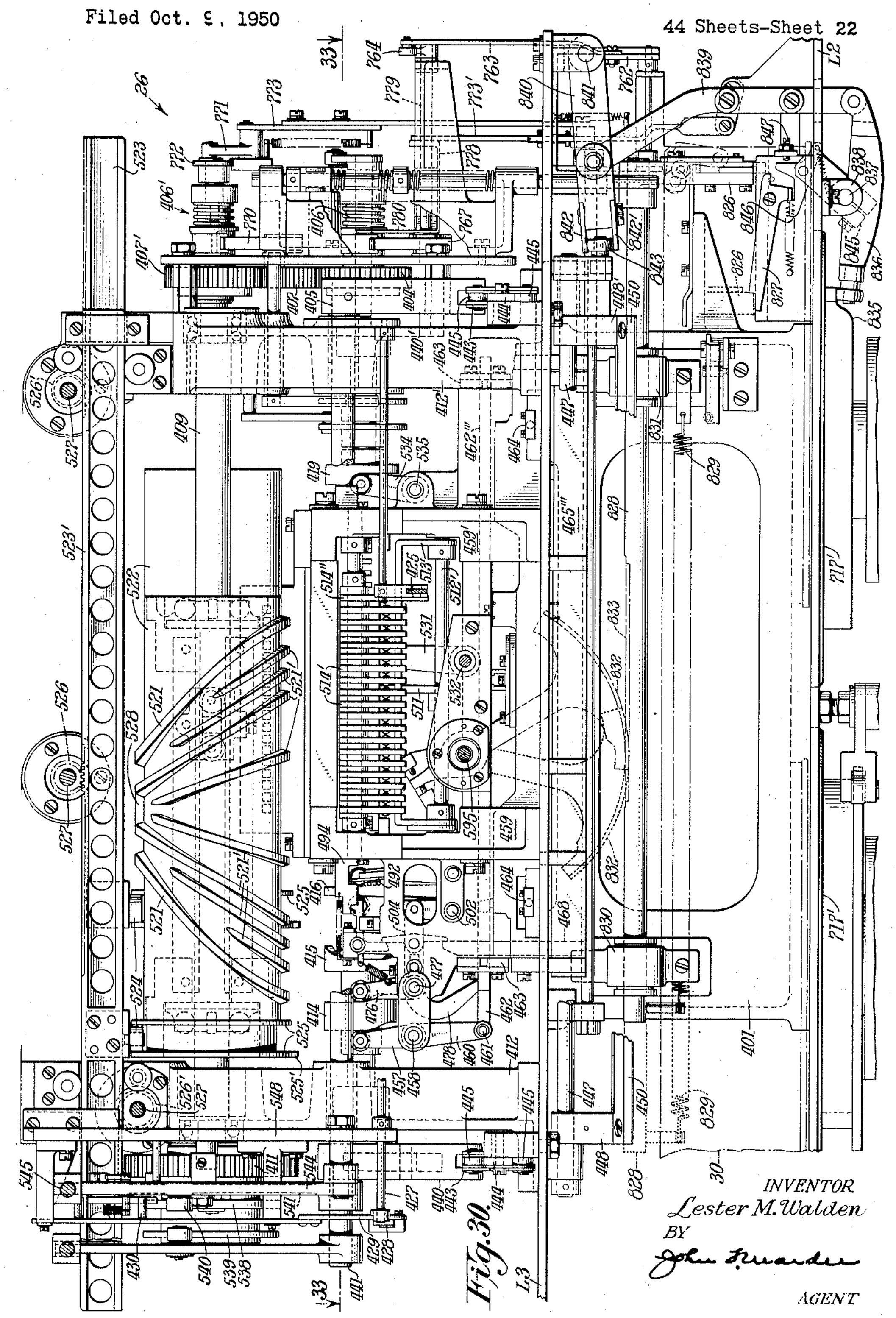
Figure 31:
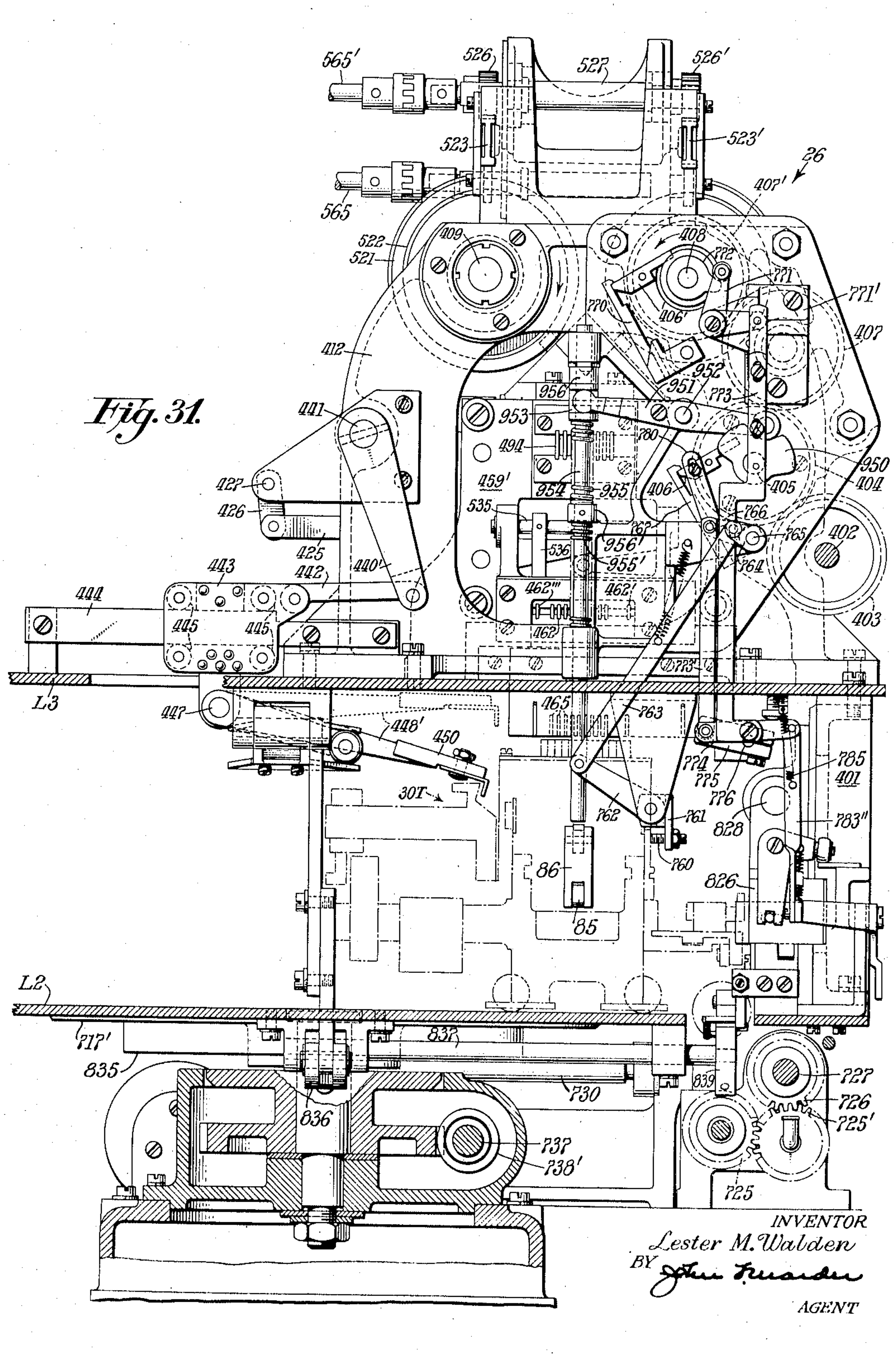
Figure 32:
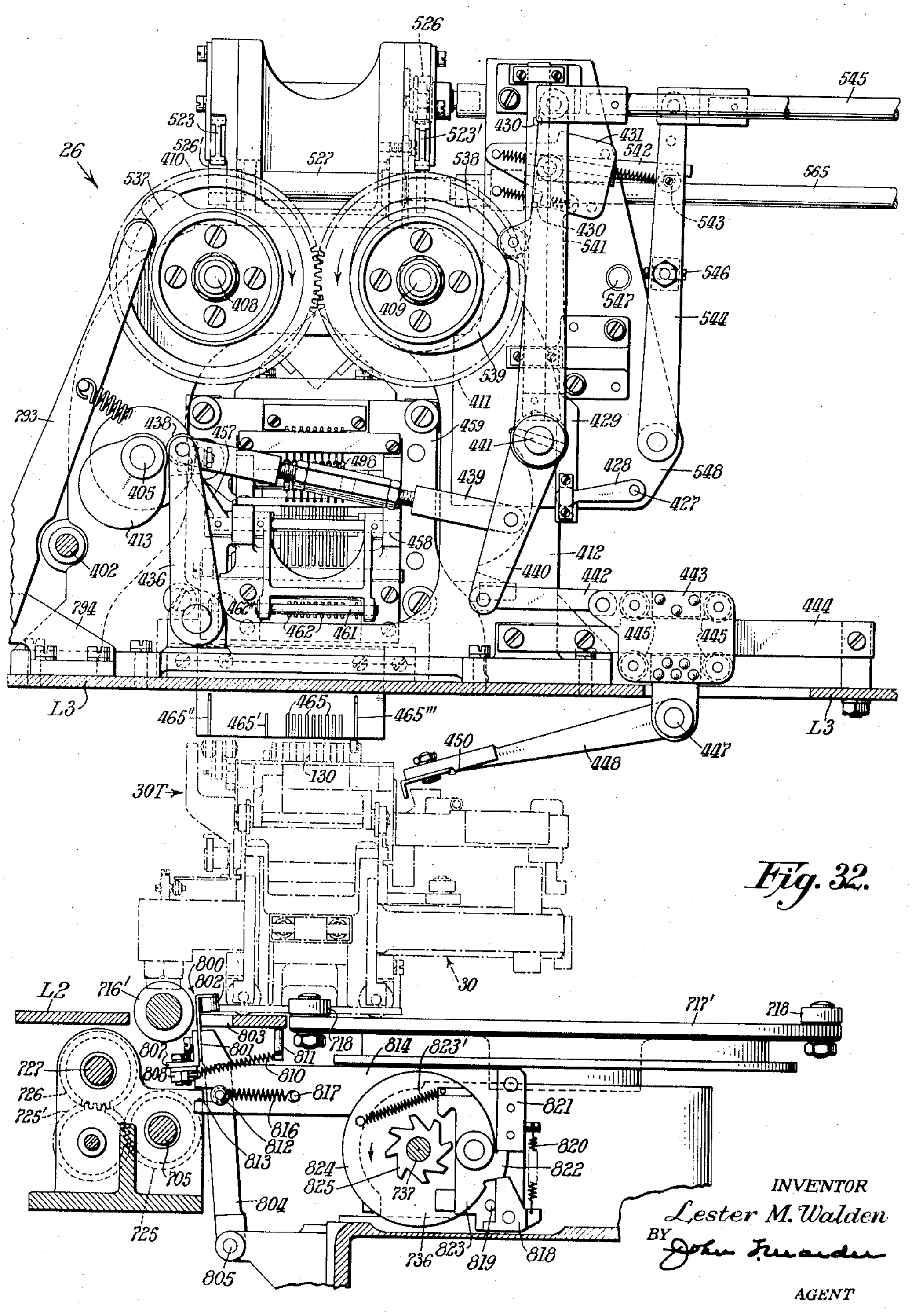
Figures 33, 33A, 33B:
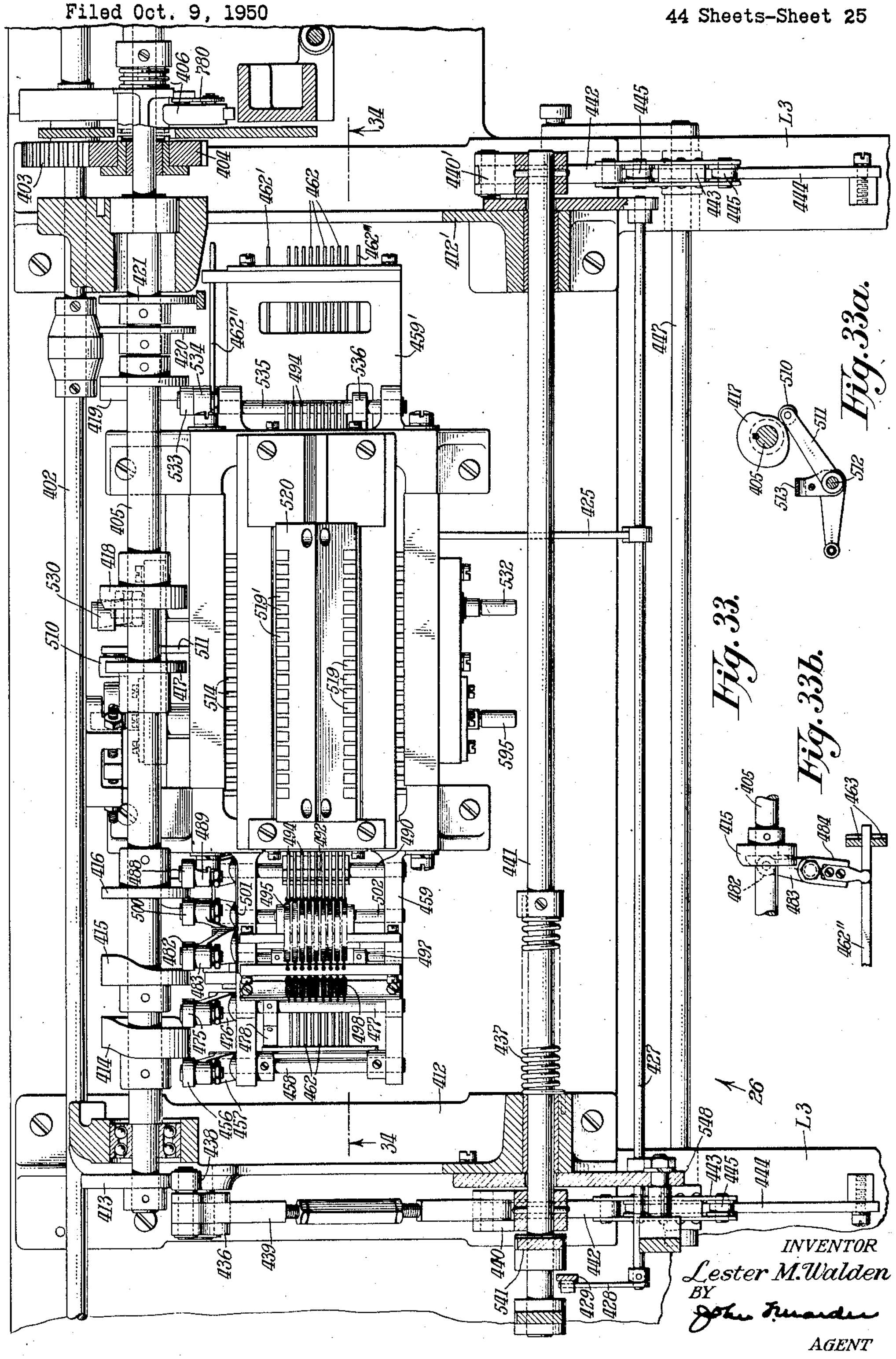
Figure 34:
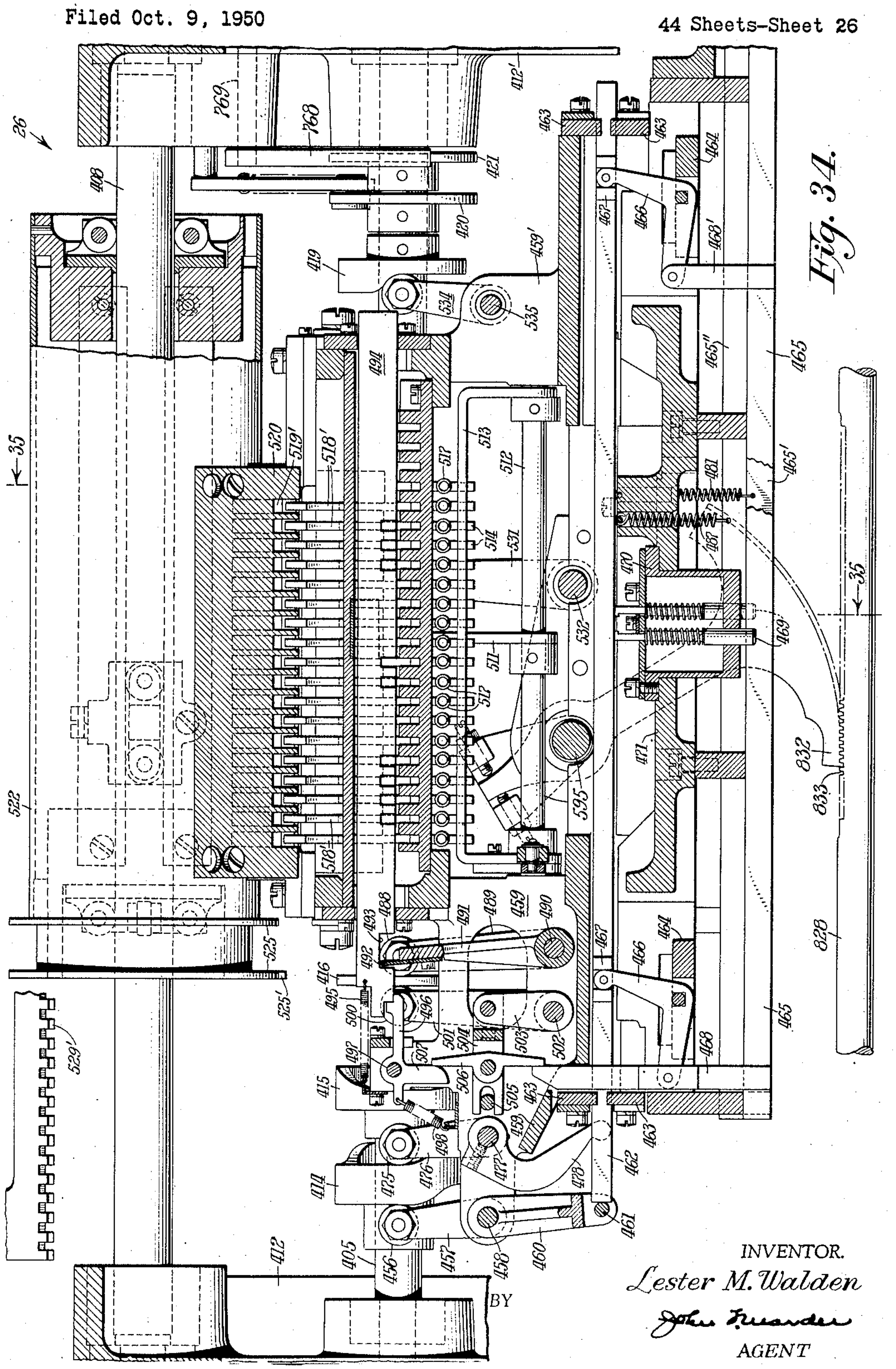
Figures 35, 35A:
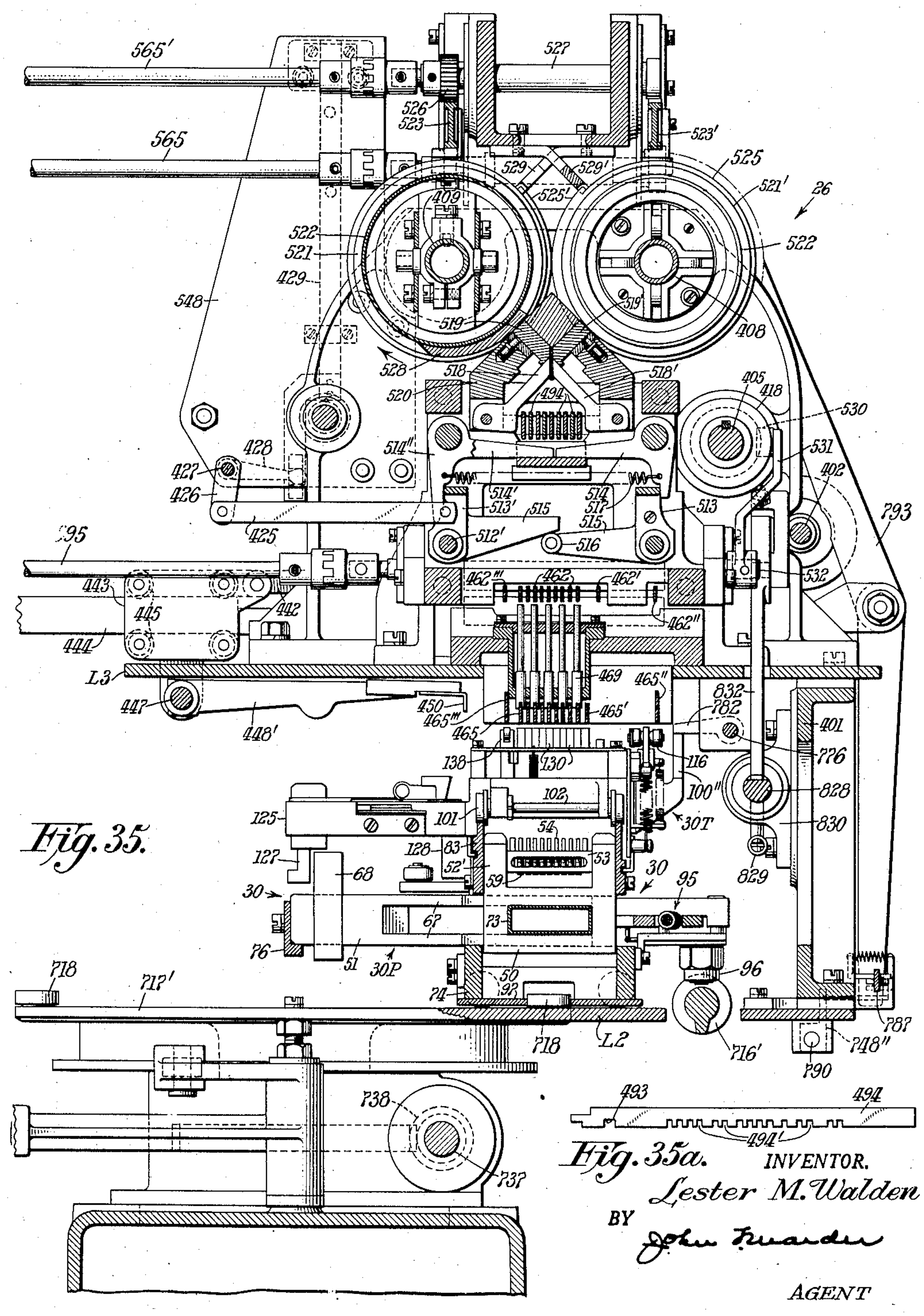
Figures 36, 36A, 36B:
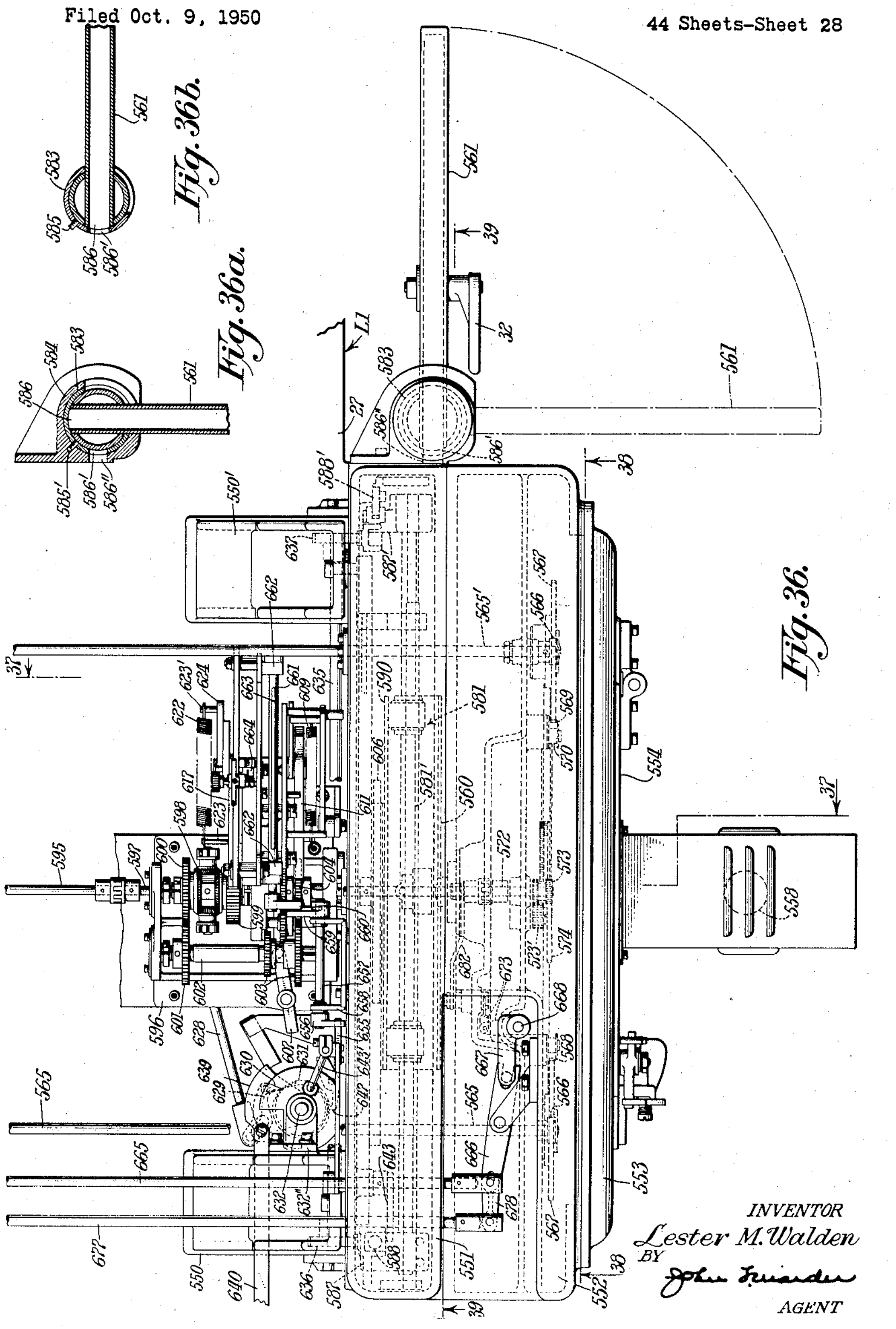

Figure 29, on the sheet with Figures 14 and 16, is a perspective view showing a group of patterns as they are assembled side by side in a cradle, some of the wedges of which have been impressed and in which some pin combinations are set, Figure 30 is a front elevation view of the "B" unit including some details of driving devices and controls therefor, Figure 31 is a right hand side elevation view of the "B" unit, Figure 32 is a left hand side elevation view of the "B" unit showing a cradle and transmitter located therein in phantom, Figure 33 is a horizontal cross-sectional view taken on lines 33—33 of Figure 30 and illustrating driving devices in the "B" unit, Figure 33*a* is a fragmentary view showing the selector operating lever cam with associated parts, Figure 33*b* is a view similar to Figure 33*a* showing the transmitter feed cam and related parts, Figure 34 is a vertical cross-sectional view taken on lines 34—34 of Figure 33 to illustrate details of pattern interpreting linkages, Figure 35 is a vertical cross-section view taken on lines 35—35 of Figure 34 further illustrating the interpreting mechanisms of the "B" unit, and including a cradle and transmitter positioned therewith, Figure 35*a* is a view illustrating a typical code bar, Figure 36 is a top plan view of the camera of my photocomposing machine with power transmission connections shown from the "B" unit, Figure 36*a* is a fragmentary horizontal sectional view taken through the pintle means for mounting the film case, at a point near the upper end of said means, and in the position the parts occupy as shown in broken lines in Figure 36, Figure 36*b* is a similar fragmentary horizontal sectional view taken at a somewhat lower intermediate point through the same pintle means but in the position of the film carrier shown in solid lines in Figure 36.

Figure 37:
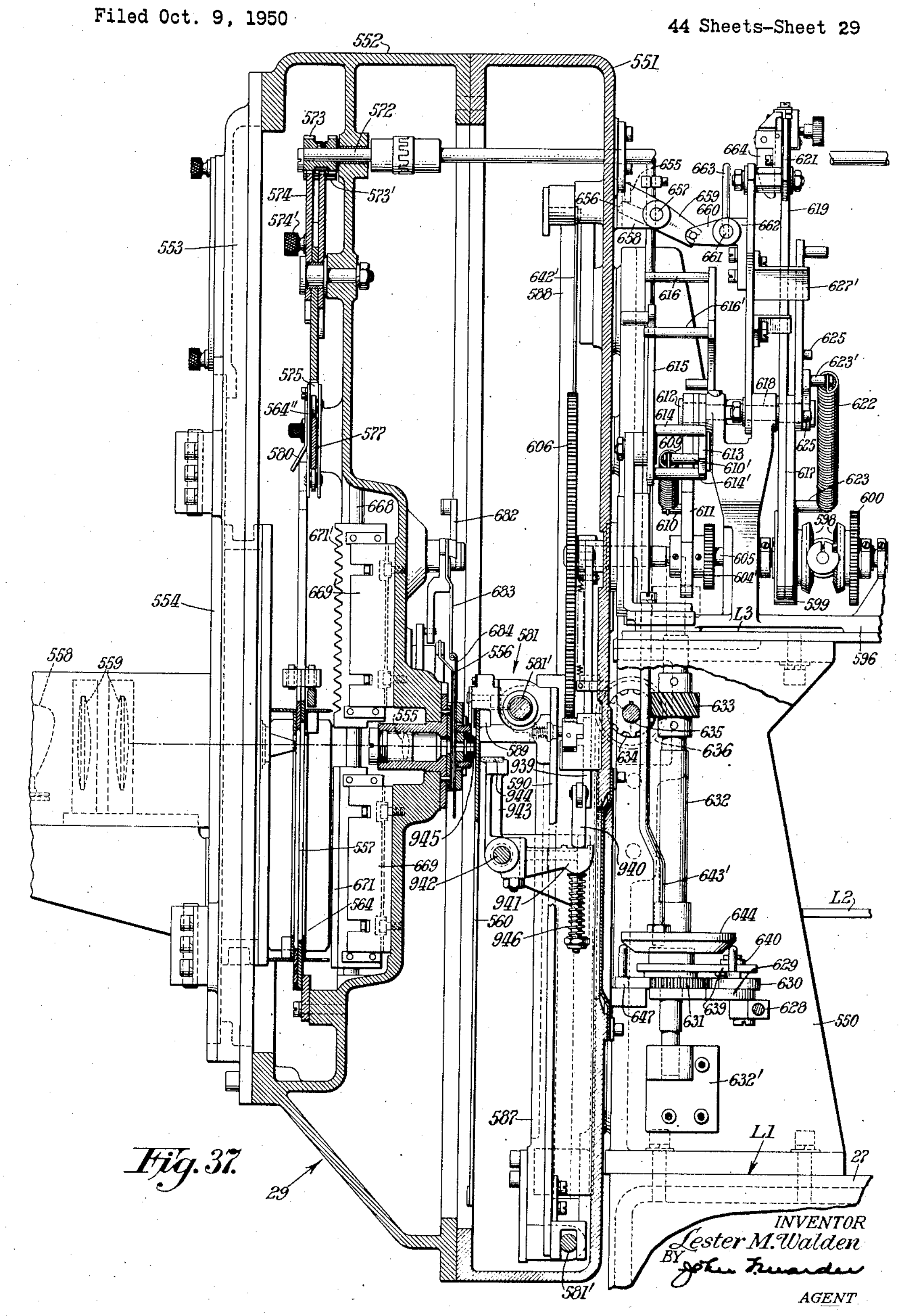
Figure 38:
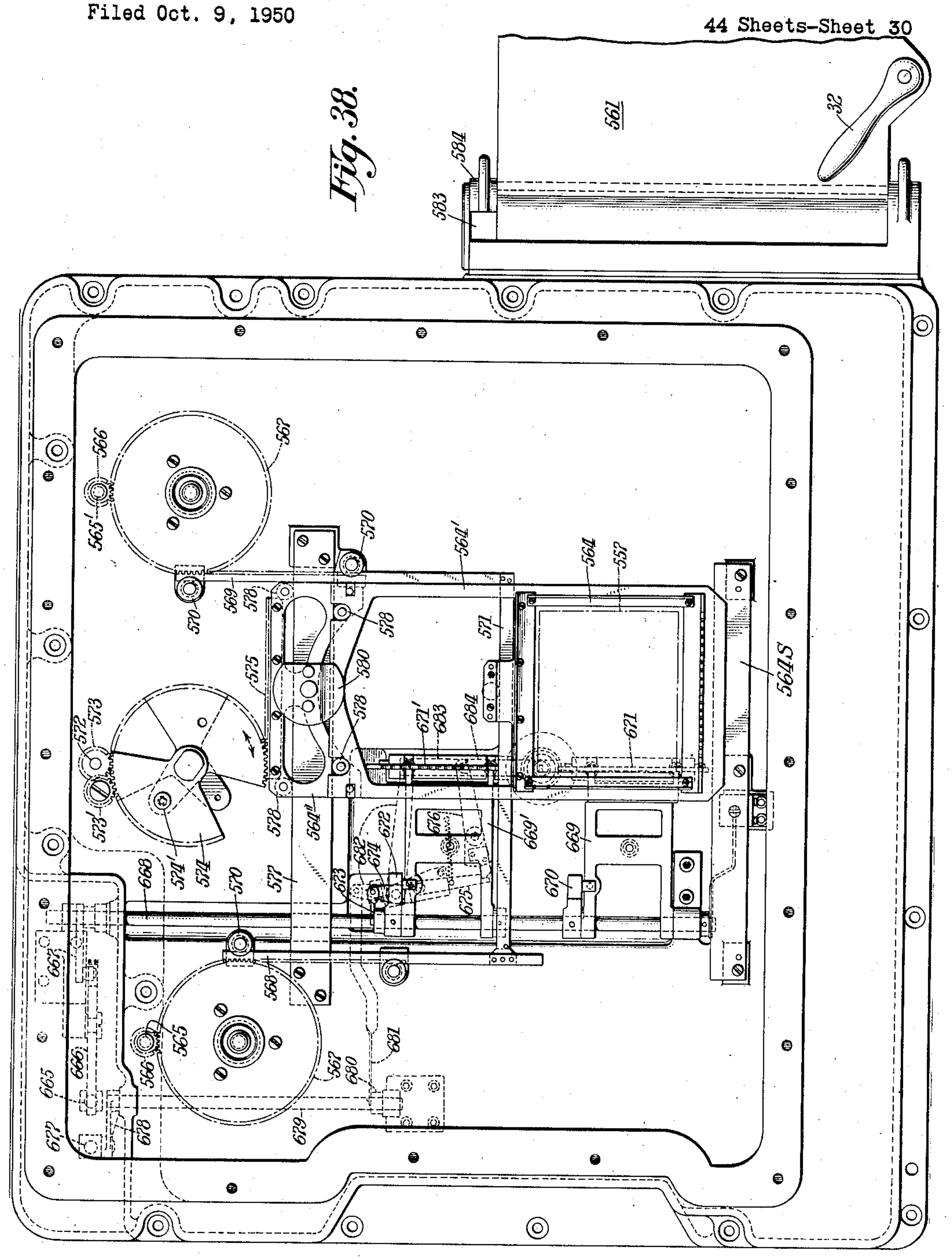
Figure 39:
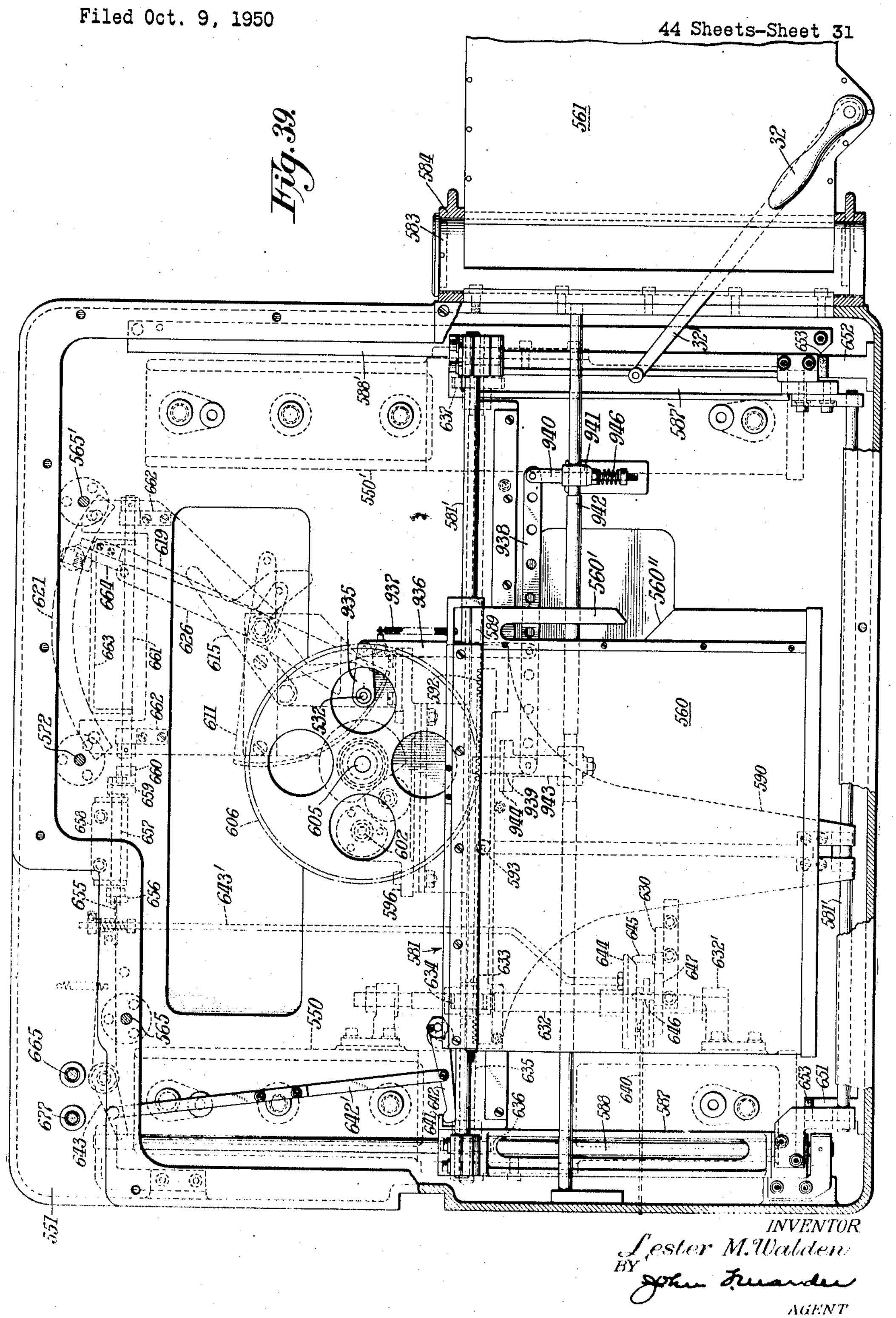
Figures 37A, 39A:
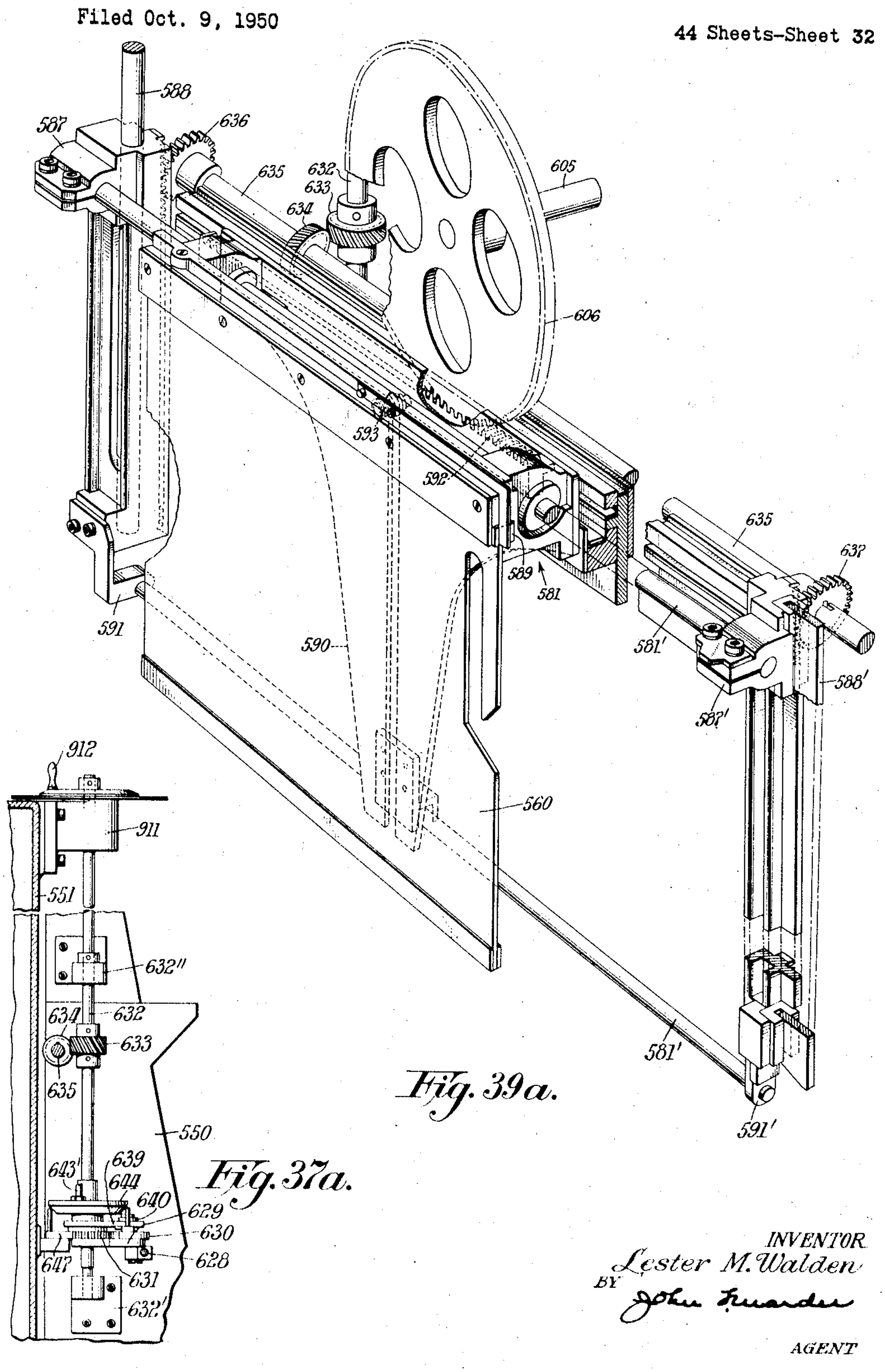
Figures 40, 41:
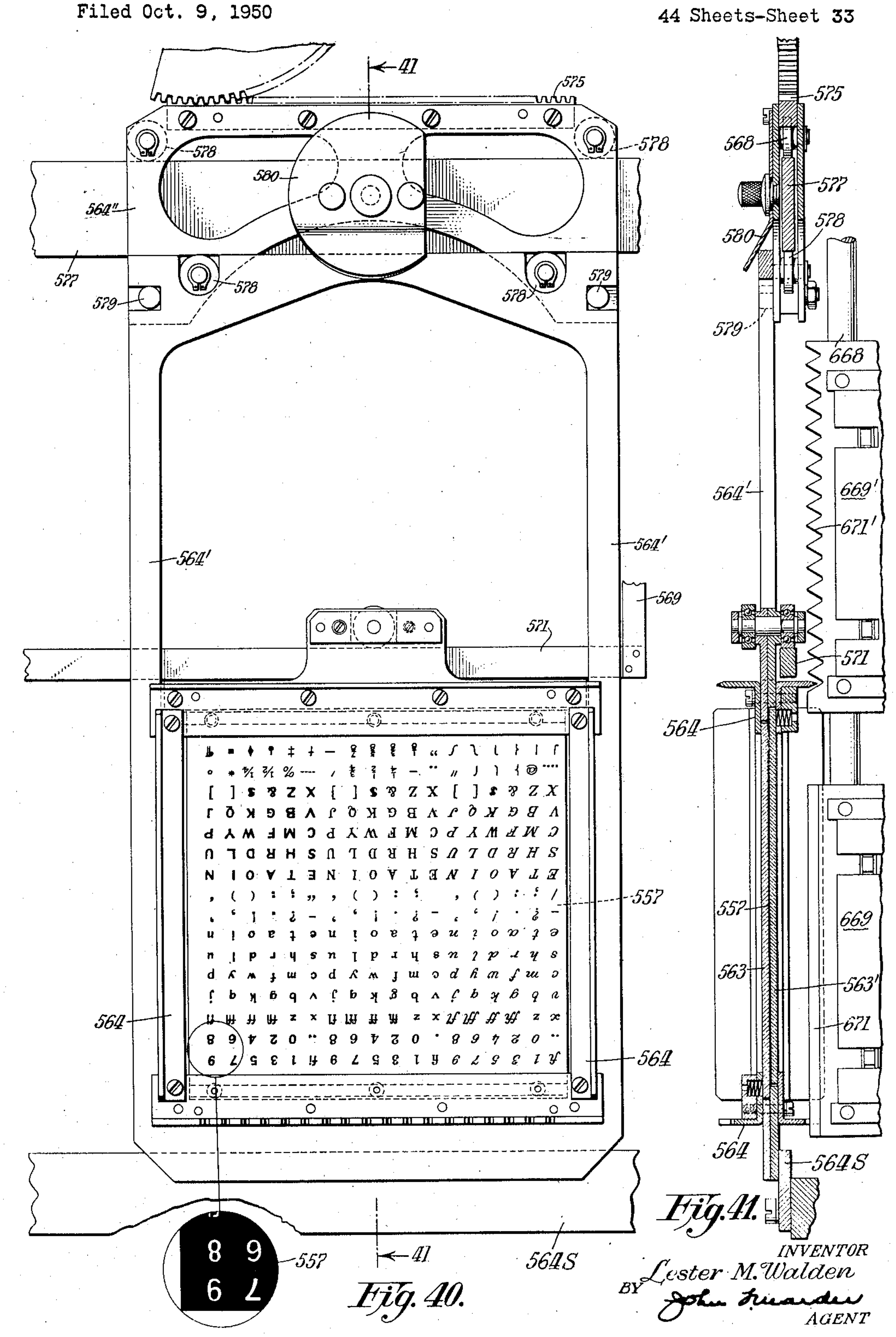
Figures 42, 42A, 43, 44:
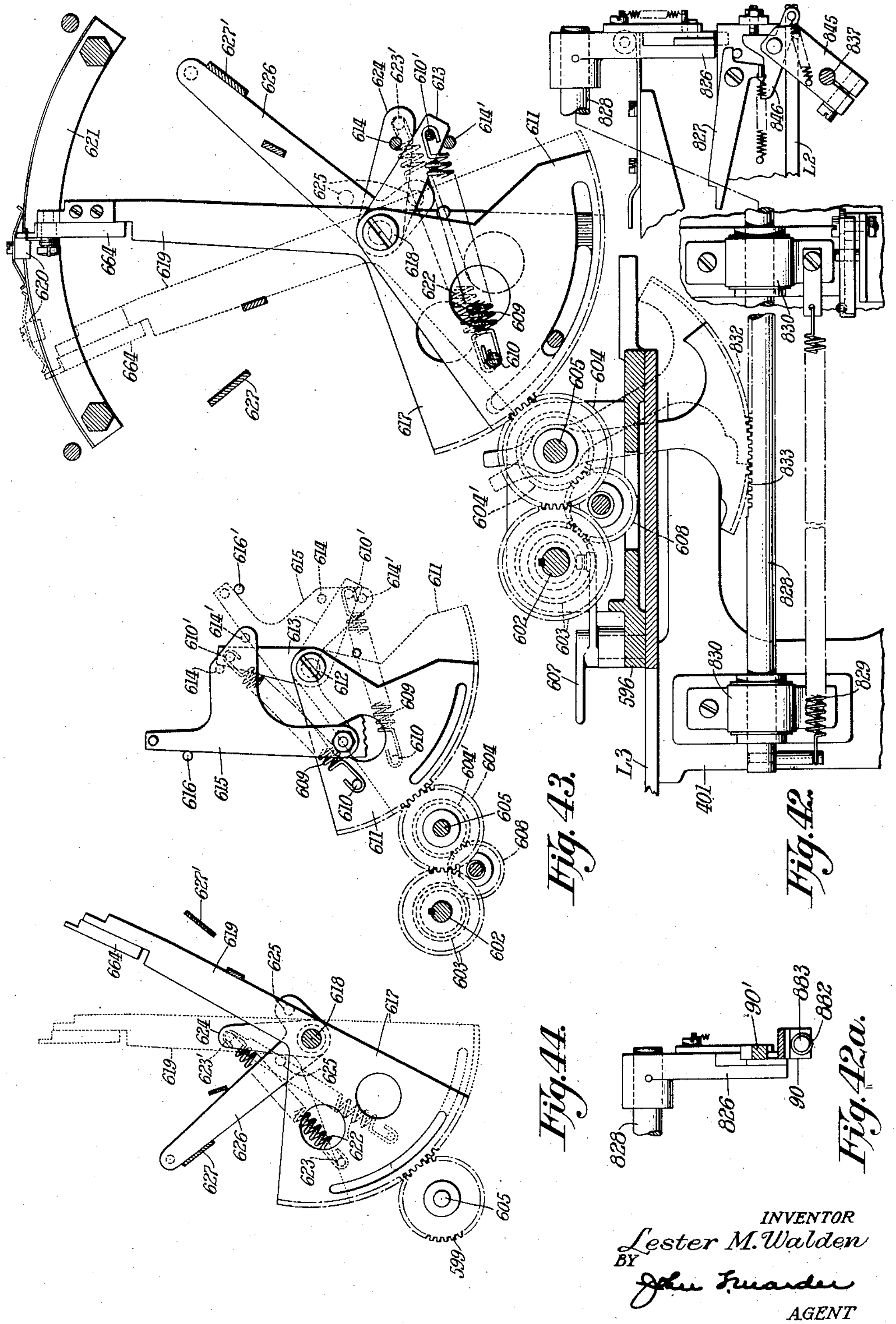
Figure 45:
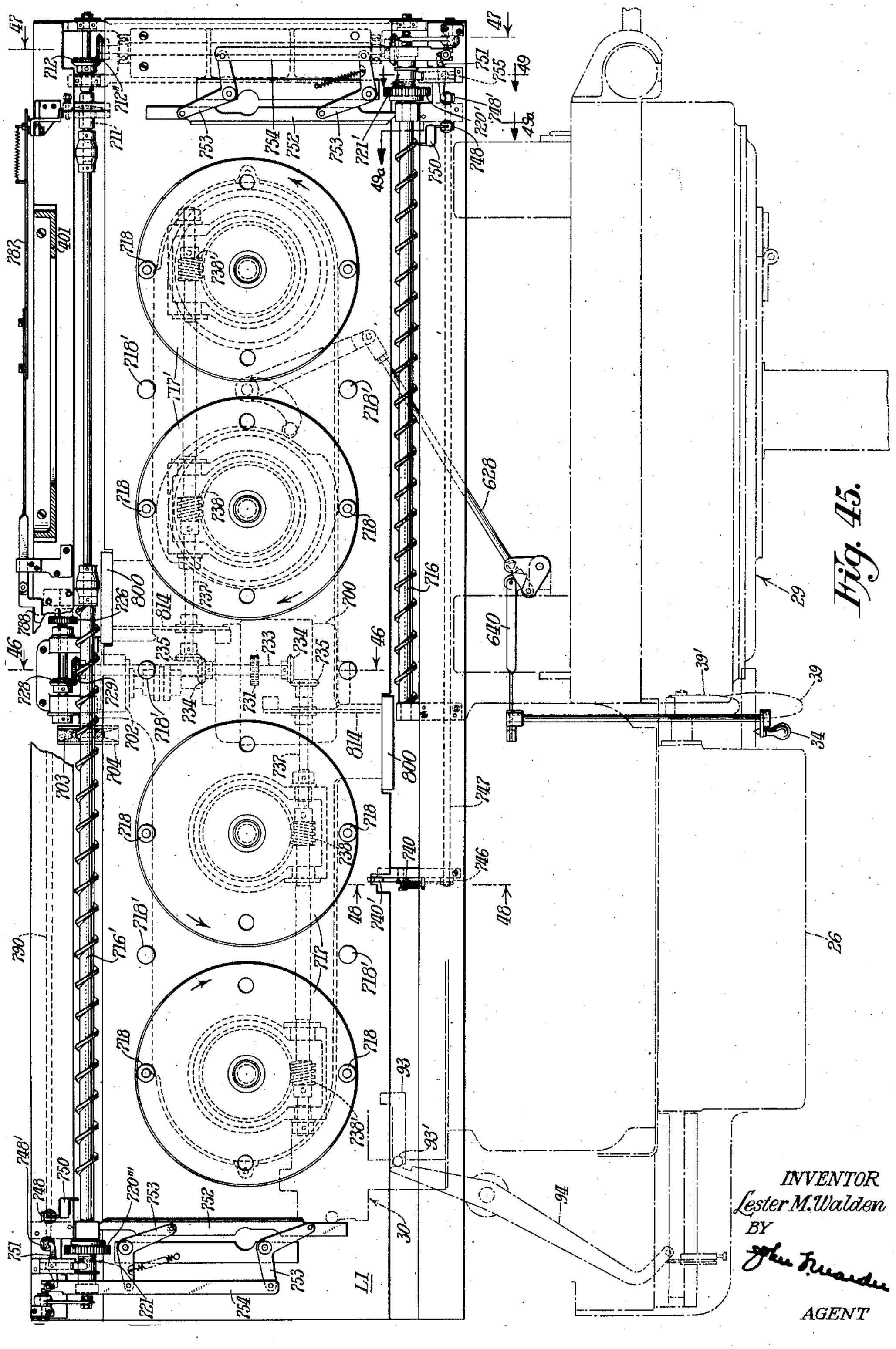
Figure 45B:
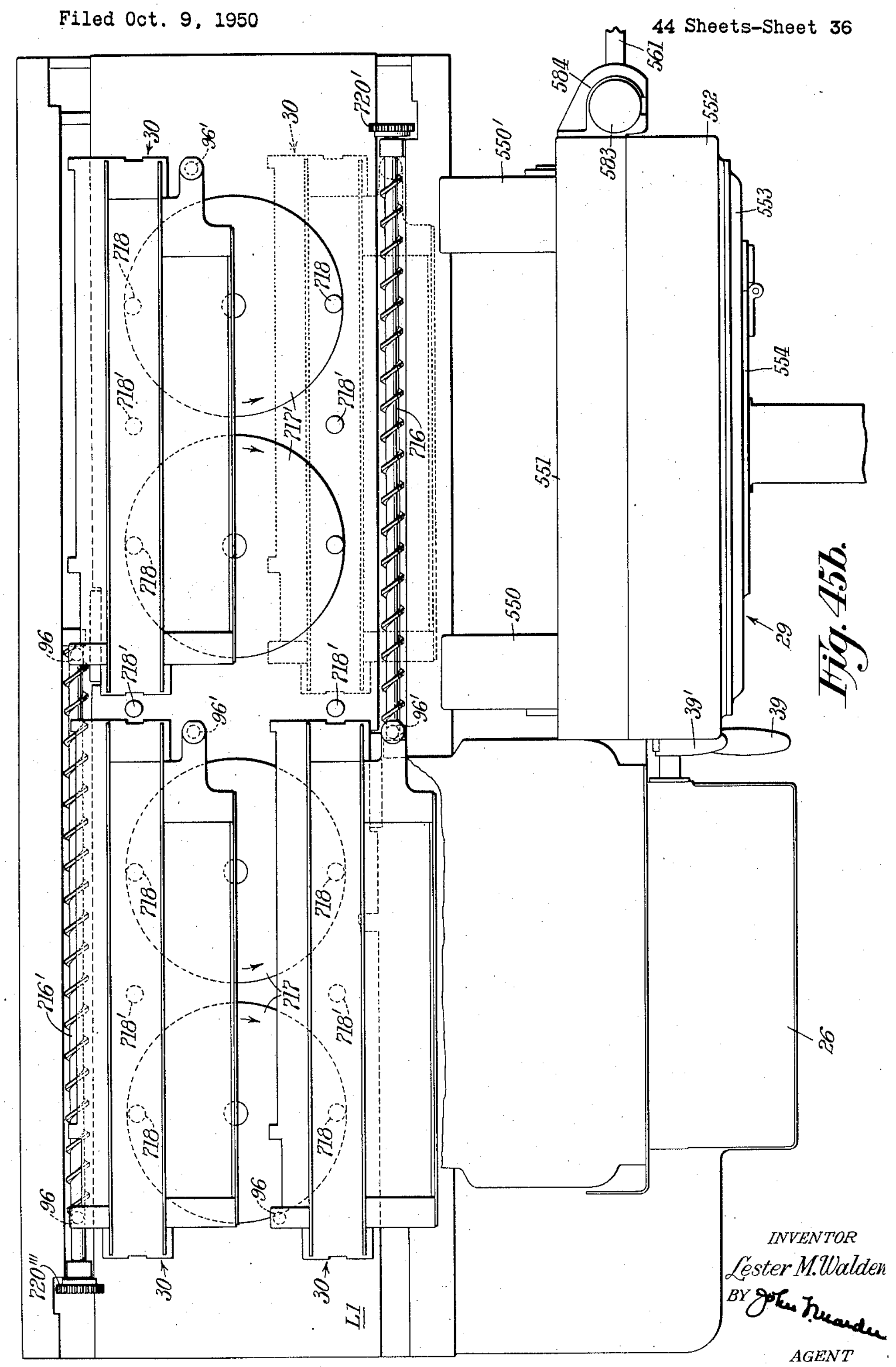
Figures 46, 50B:
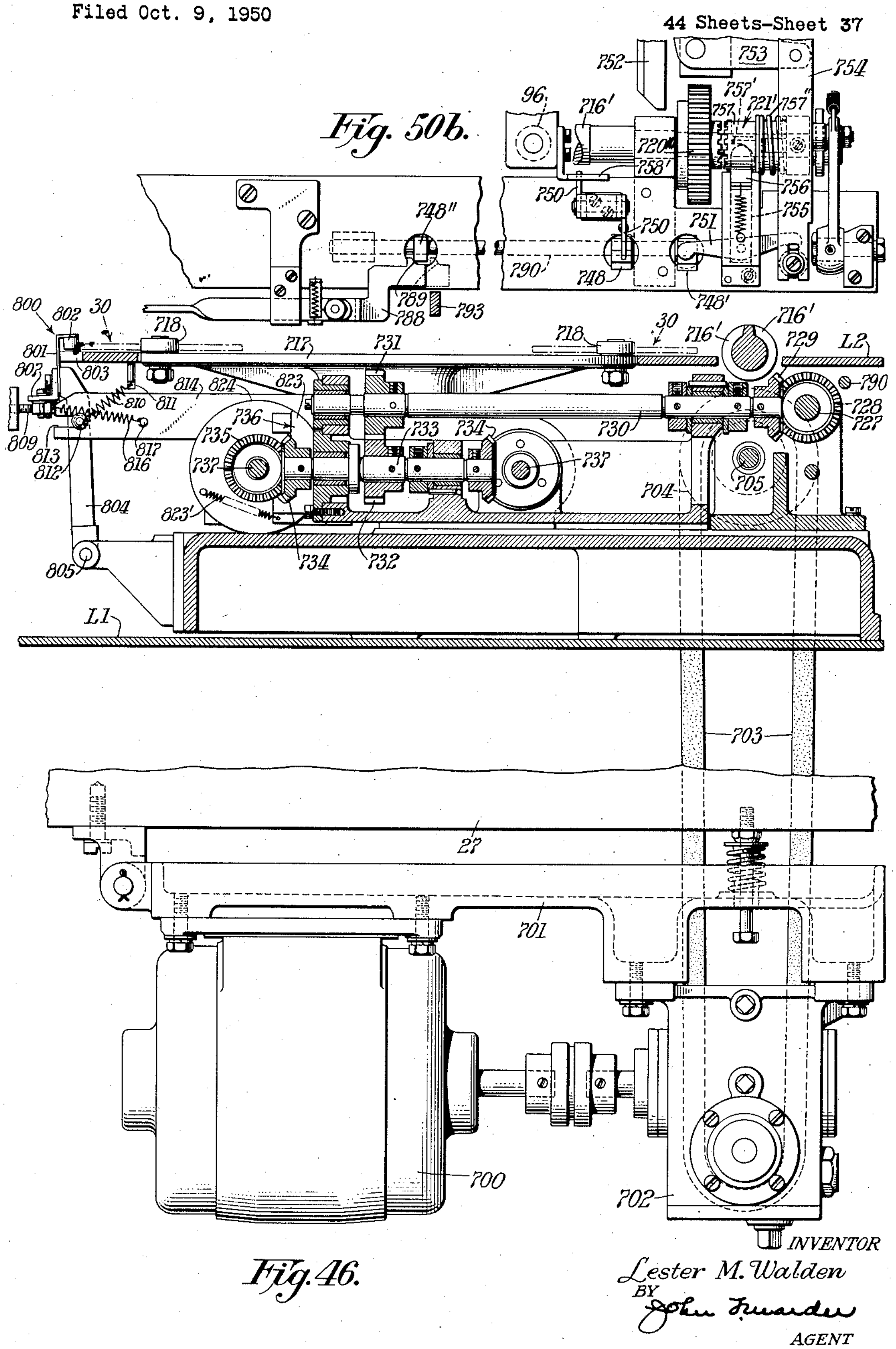
Figures 45A, 46C:
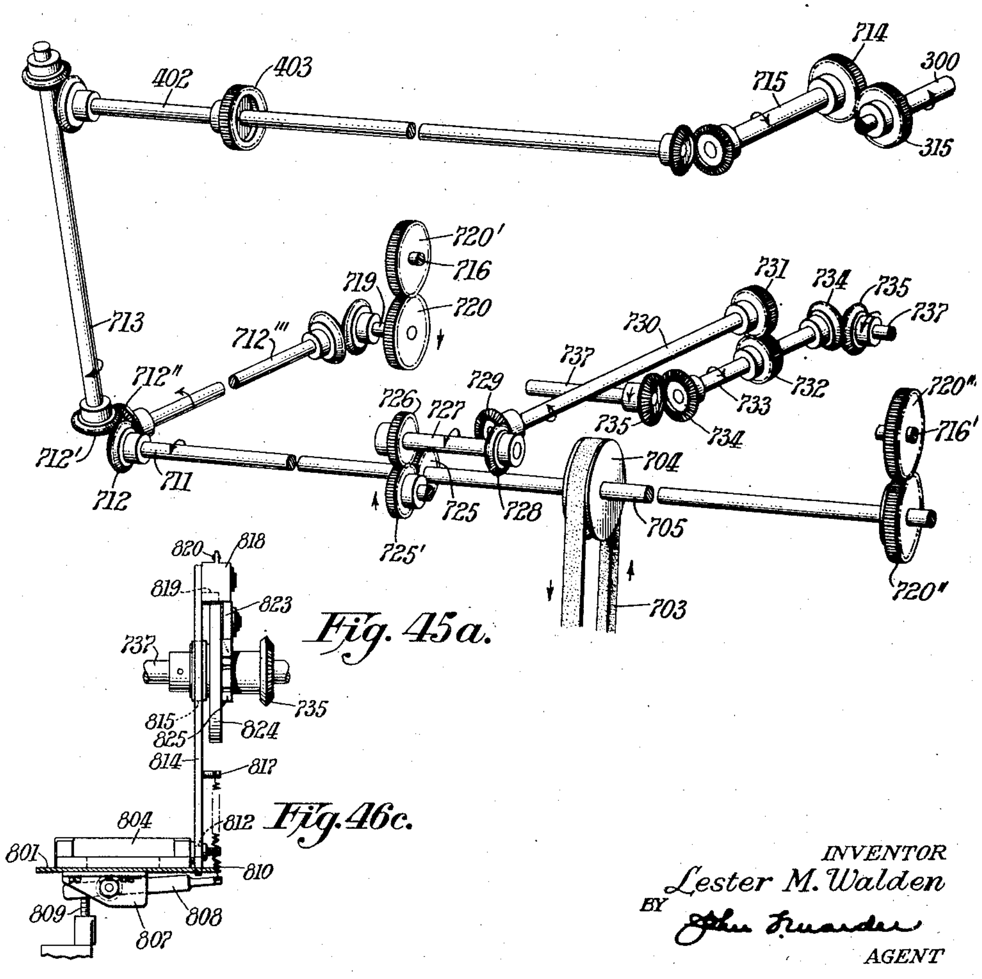

Figure 37 is a vertical cross-sectional view of the camera of Figure 36 taken on line 37—37 of that view, Figure 37*a* is a fragmentary view illustrating manual control for the film elevating mechanisms, Figure 38 is a face view of the interior of the camera taken on line 38—38 of Figure 37, Figure 39 is a face view taken interiorly of the camera on line 39—39 of Figure 37, Figure 39*a* is a perspective view illustrating vertical and horizontal film carrier positioning controls, Figure 40 is an enlarged front elevation view of the camera master plate together with its supports, Figure 41 is a central vertical cross-section view of the master plate and support taken on line 41—41 of Figure 40, Figure 42 is a cross-sectional elevation view of certain camera mechanisms segregated from other details of the photocomposing machine, Figure 42*a* is a fragmentary elevation view further illustrating camera operating mechanisms, Figures 43 and 44 are fragmentary views of parts of devices of Figure 42 taken at specific operating positions, Figure 45 is a top plan view of cradle shifting mechanisms and controls, Figure 45*a* is a schematic perspective view of drive shafting and gearing for the photo-composing machine of my invention, Figure 45*b* is a view similar to Figure 45 illustrating positions which the cradles assume during operation of the machine, Figure 46 is a cross-sectional view of driving and control devices taken on line 46—46 of Figure 45.

Figures 46A, 46B:
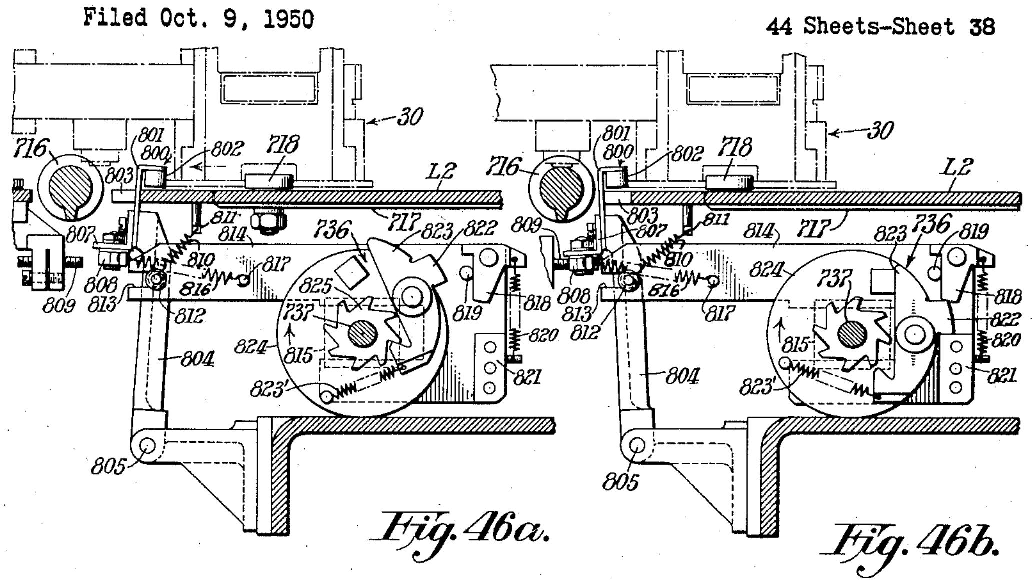
Figure 49:
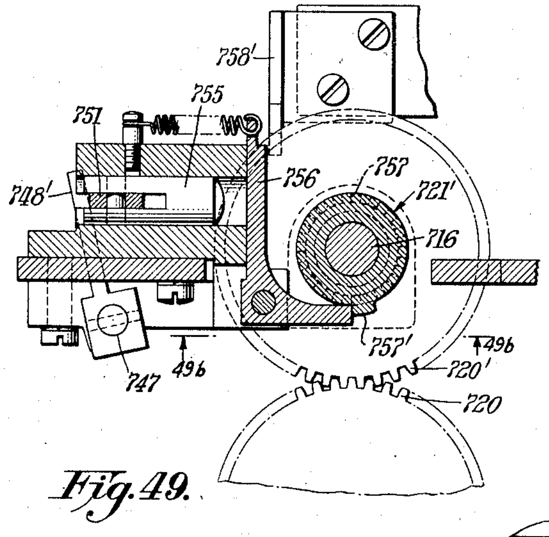
Figure 49A:
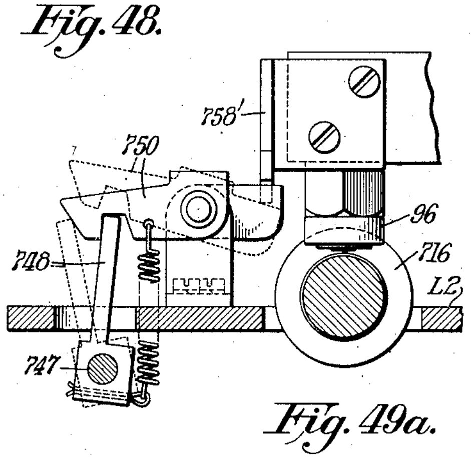
Figure 49B:
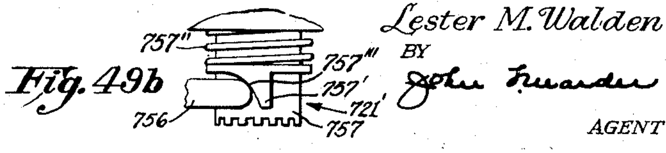
Figures 50, 50A, 51:
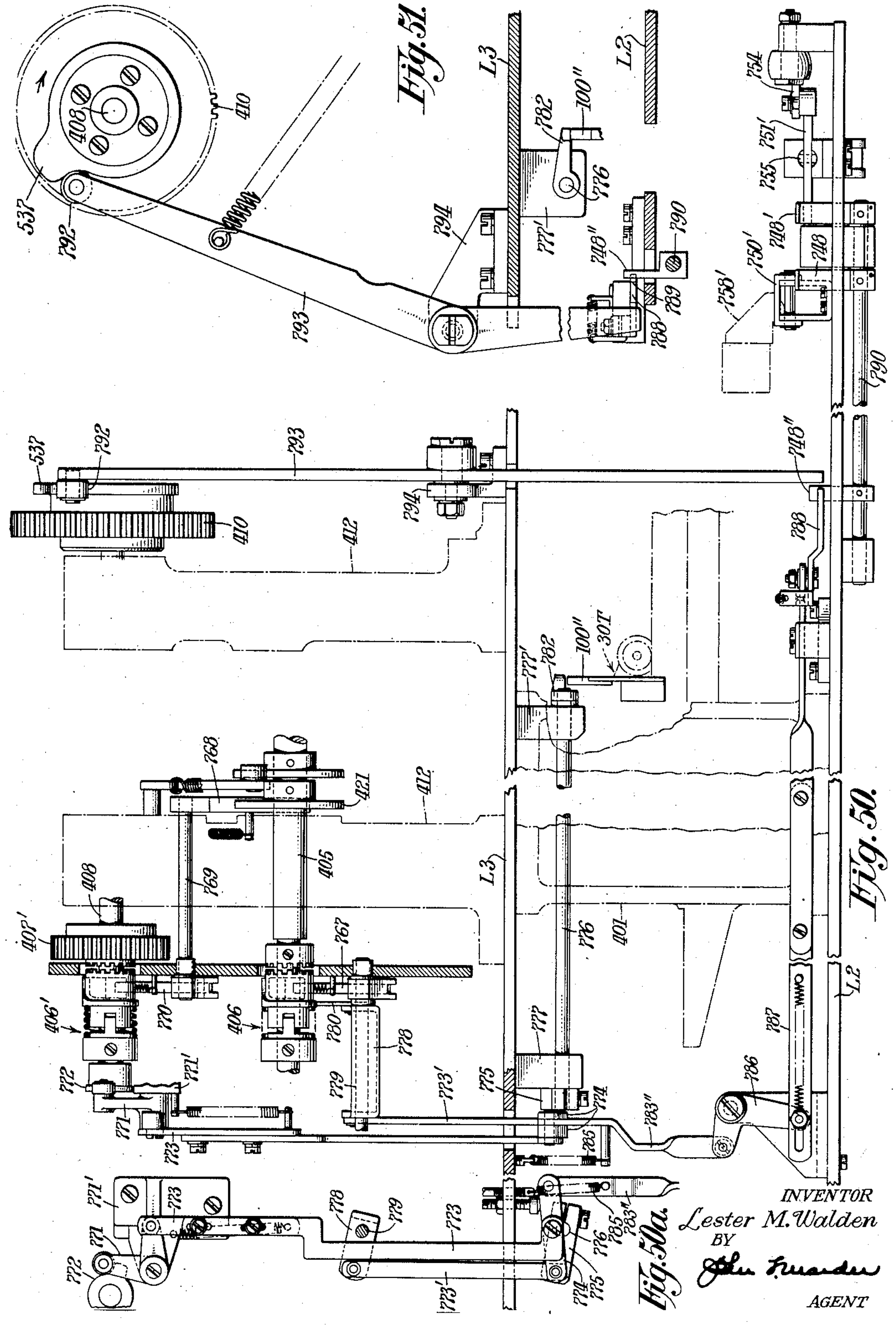

Figures 46*a* and 46*b* are fragmentary cross-sectional views of controls used for cradle transfer, taken on lines **46*a*—46*a* and 46*b*—46*b*** of Figure 45, Figure 46*c* is a top plan view of certain elements illustrated in Figures 46*a* and 46*b*, Figures 47, 48, and 49 are cross-sectional views taken on lines 47—47, 48—48, and 49—49 respectively of Figure 45, Figure 49*a* is a fragmentary cross-sectional elevation view of cradle transfer clutching controls, taken on line **49*a*—49a** of Figure 45, Figure 49*b* is a fragmentary view of the underside of a clutch involved in the cradle transfer mechanism, as seen at the line **49*b*—49*b*** of Figure 49, Figure 50 is a diagrammatic elevation view of interlocking controls for the photocomposing machine, taken at the rear of the "B" unit.

Figure 52:
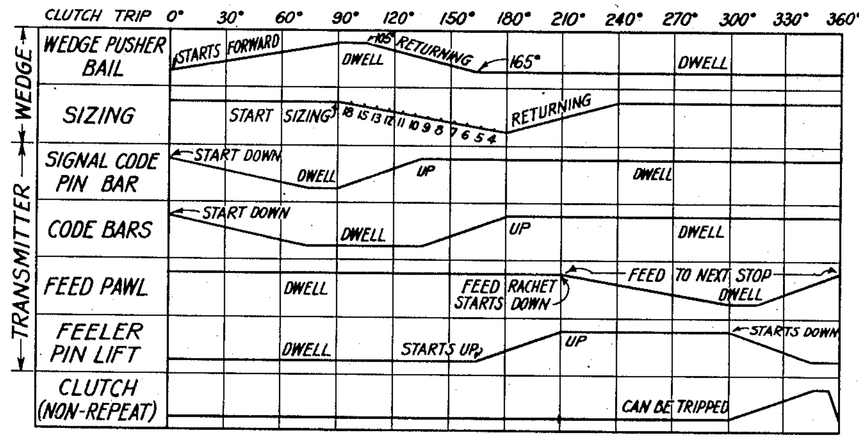
Figure 52A:
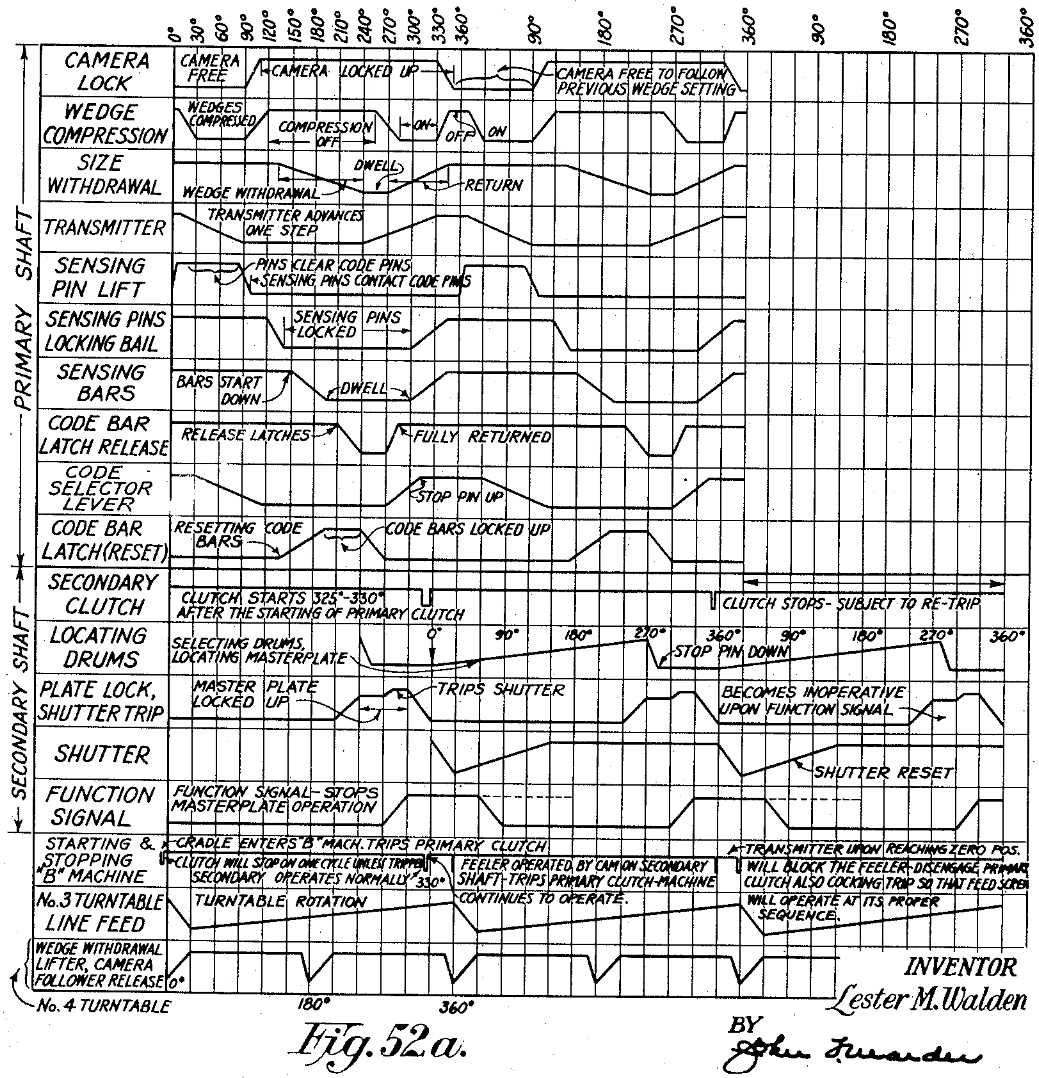
Figure 53:
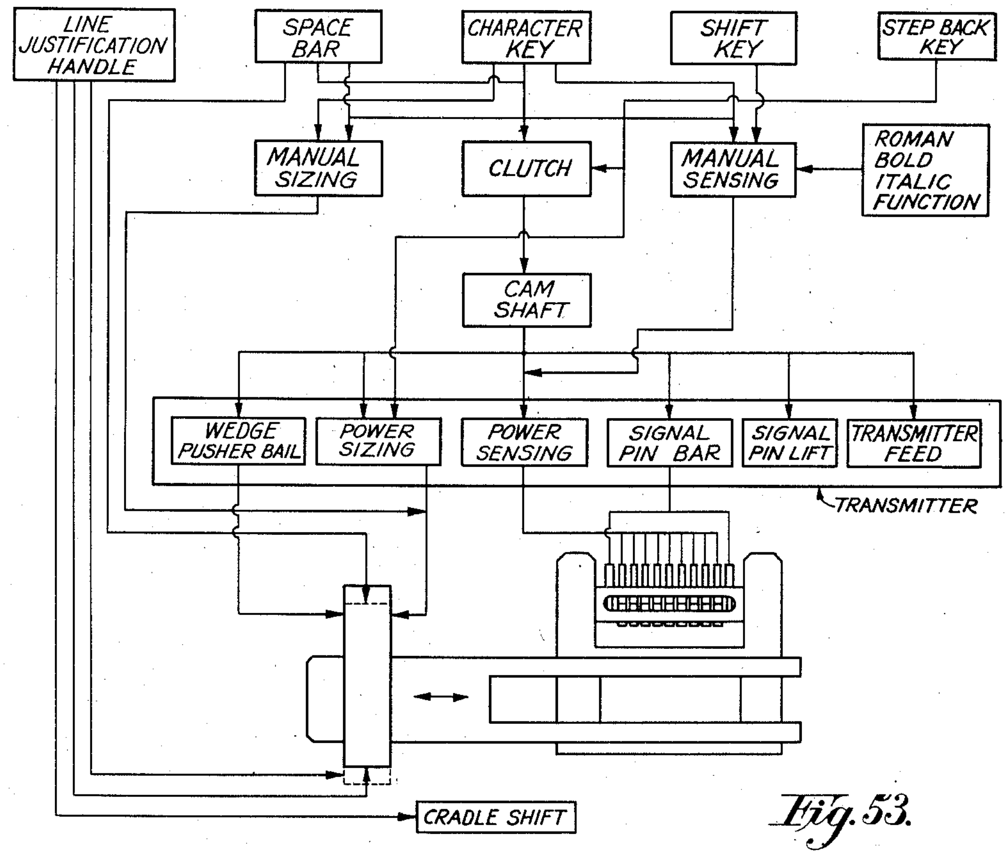
Figure 54:
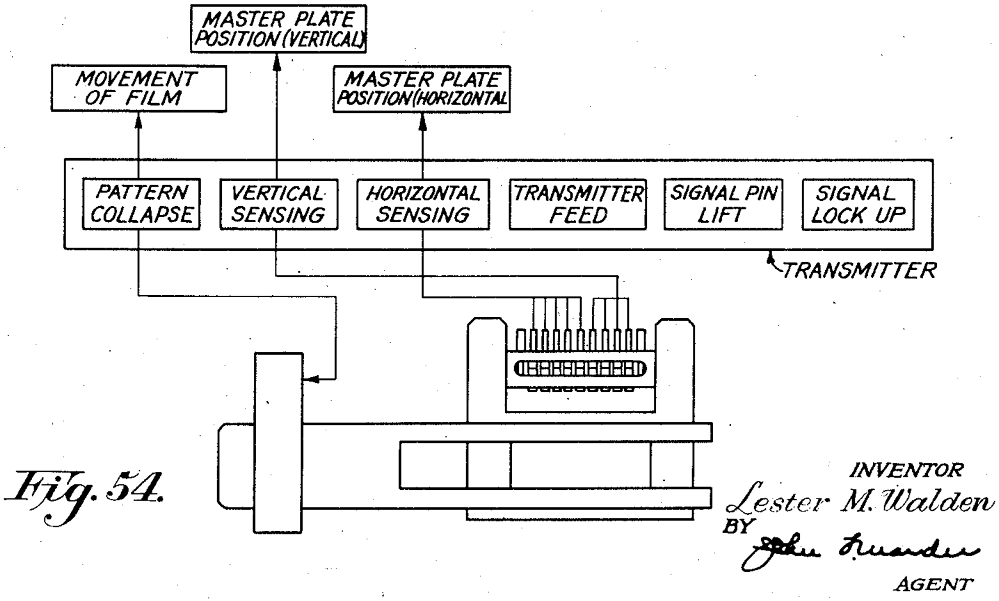
Figure 55:
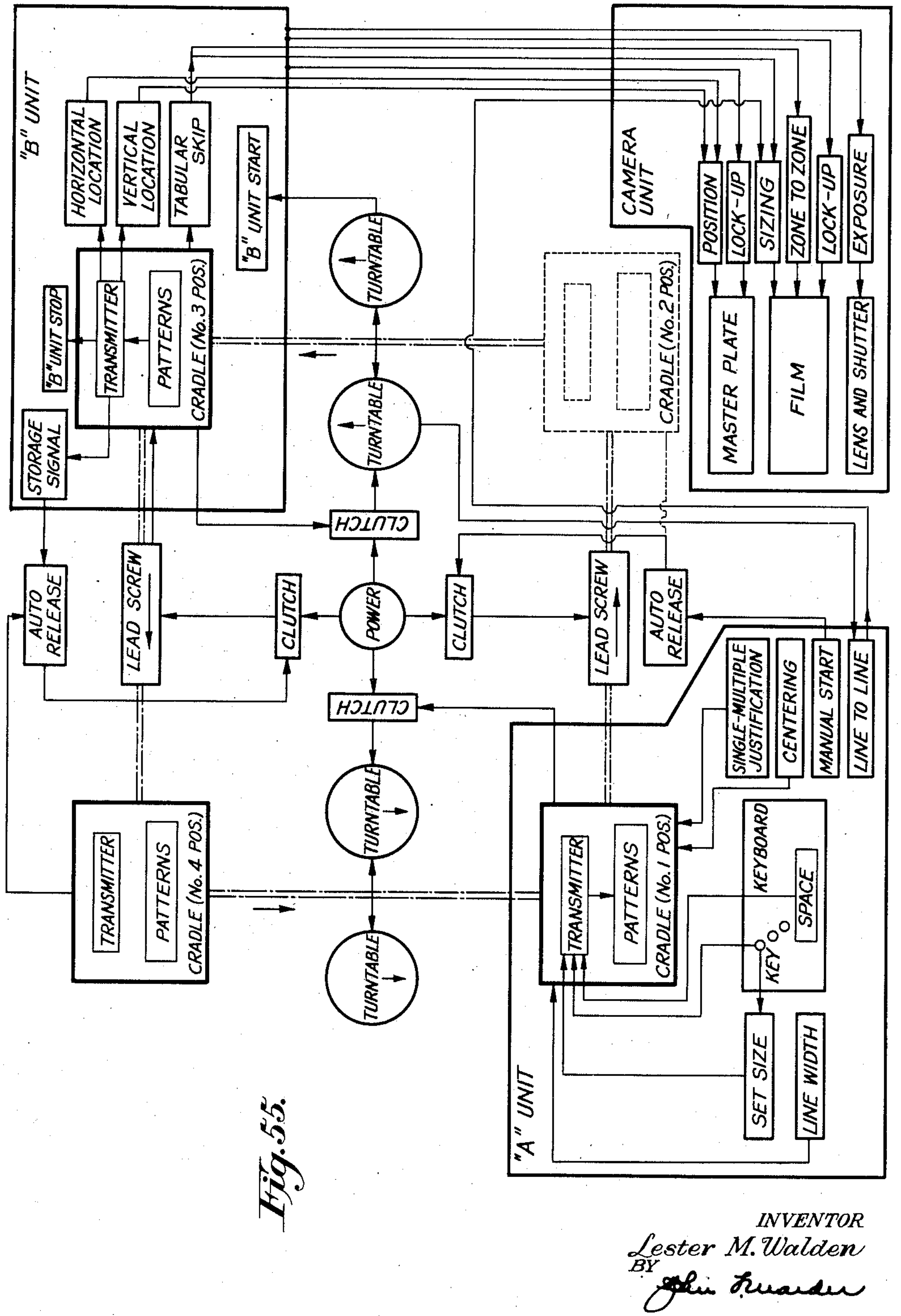
Figure 56:
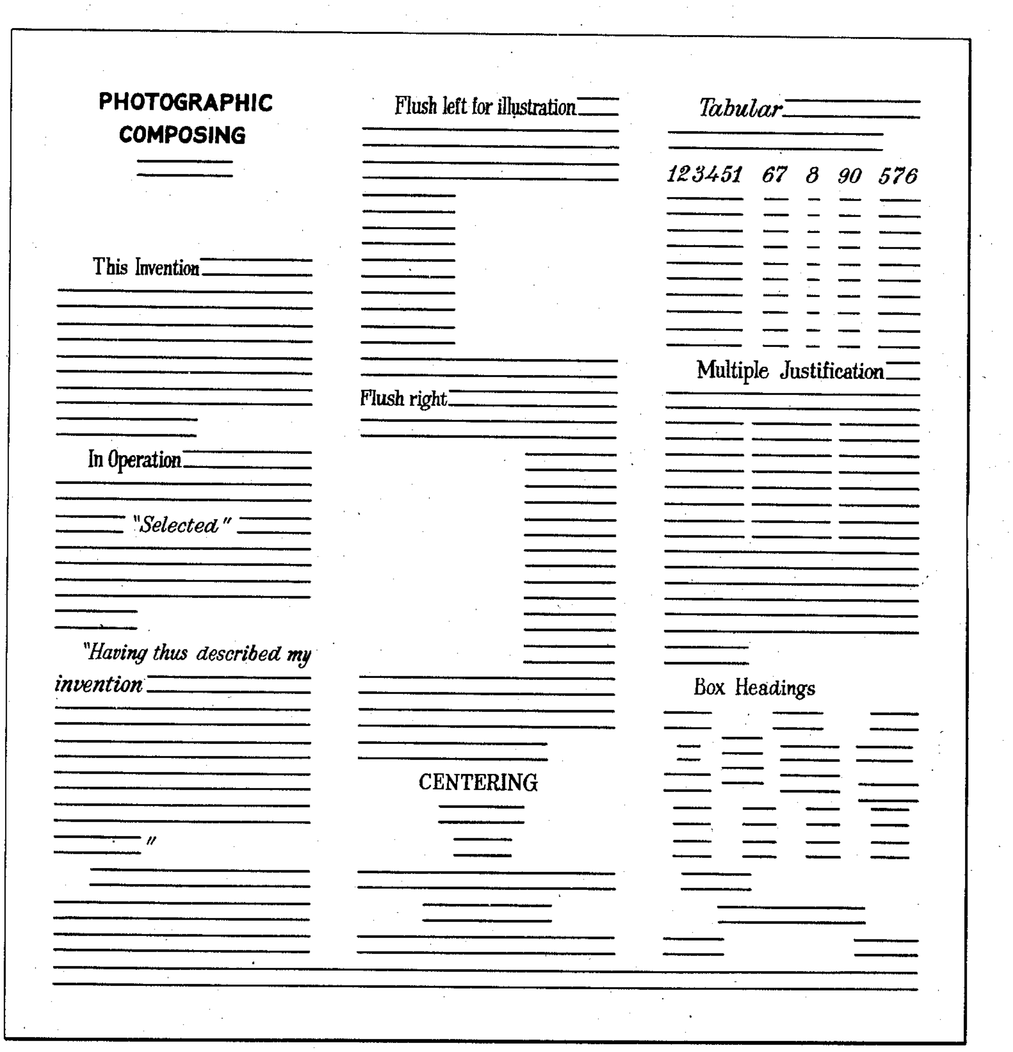

Figure 50*a* is a fragmentary side elevation view of linkages in Figure 50,

Figure 50*b* is a fragmentary plan view of longitudinal cradle transfer controls taken at the left, rear corner of the machine at the transfer level, Figure 51 is an end elevation view of certain controls of Figure 50, Figures 52 and 52*a* are timing charts for the operating mechanisms of my photocomposing machine, Figure 53 is a diagrammatic chart illustrating certain functions of the "A" unit affecting the pattern, Figure 54 is a chart illustrating certain functions of the "B" unit controlled by the pattern, Figure 55 is a chart explanatory of controls throughout the entire machine of my invention, and Figure 56 is a schematic page of composition illustrating various forms of type layout possible with my photocomposing machine.

GENERAL DESCRIPTION

Figures 1, 1*a* and 1*b* are provided for the purpose of illustrating the general arrangement of the machine of my invention. The "A" unit 25, Figure 1, which is provided for reading-in purposes, includes the keyboard 26 situated at the left hand side of the machine adjacent the front, above a full length supporting base 27, the latter of which is elevated to a satisfactory height on vertical column members 27'. The "B" unit 28, serving for reading-out purposes, is disposed at the right hand side to the rear of the vertical camera unit 29. Three circulating intelligence carriers or cradles 30, see Figure 1*b*, each carrying a bank of signal receiving members herein referred to as patterns and a transmitter mechanism 30T, move longitudinally and transversely of base 27 in sequence to operative positions with respect to the "A" unit 25 and the "B" unit 28, and to intermediate or neutral positions. The arrangement of the entire assembly is such that an operator may be seated in front of the machine at the keyboard with copy in a suitable copyholder fixed to the machine, and manipulations may be made without unnecessary reaching.

Before composing lines, an operator makes established pre-operational settings to prepare the machine for composing. A film holder 31 annexed to camera 29 is loaded in the machine in the angular arrangement of Figure 1, and is then oriented to a feeding-in position, whereafter hand lever 32 may be manipulated to convey the film to within the camera. Dial control 33 in the "A" unit, which regulates a standard of character to charatcer spacing, is set to a prescribed reading which normally corresponds with the size of characters on a master plate within the camera, and a line control 34 is set to regulate the spacing from line to line. The length of line, including any tabular settings, is adjusted by means of the tabulator stop devices generally indicated at 35. In the event that a line being composed is to be centered, the operator will arrange for centering by manipulation of the line centering apparatus control handle 36.

During line composing, and as each keyboard key is struck, a sizing mechanism 37 in the "A" unit, directly operative from the keyboard, establishes linkage settings representative of the width of the character chosen, to be later reflected as a size adjustment in one of the patterns in cradle 30. Likewise, sensing linkage settings corresponding with the identification of the character are established from the striking of a key by the sensing mechanism 38 in the "A" unit, to also be reflected in the form of adjustments in the pattern. The sensing linkage settings so established from the keyboard result in the vertical actuation of certain bars which extend over substantially the entire width of the "A" unit, and the bars are aligned with further actuating devices on transmitter 30T, the latter of which traverses the cradle 30 in step by step fashion and is automatically indexed to a position above a pattern designated to receive character identification adjustments. Corresponding adjustments are then carried to that pattern under the influence of power driving devices.

When the operator has completed a line, he actuates the line justifying handle 39 and the auxiliary handle 39' in a prescribed manner, whereby the assembly of control patterns in cradle 30 are justified by a wedging action, the justification usually taking place at spaces between words or characters, to result in a predetermined overall dimension representative of line length. Subsequently, handle 39 is further manipulated for cradle release and cradle 30 will be moved from its position in the "A" unit to a neutral zone in the "B" unit to await a further move into the "B" unit proper. In the "B" unit the sensing signal adjustments which have been made in the patterns will regulate, step by step, the movements of a master plate in the camera, and the line of characters represented will be photographed upon film. Spacing on the film will take place from margin to margin in accordance with the sizing settings established in the patterns and the cradle.

Three cradles 30 are employed in the machine where maximum automatic operation is desired and, while one line is being composed in a cradle in the "A" unit, a second cradle may be in the "B" unit regulating the actuation of the camera. The third cradle will be in transportation, either in the "A" unit, whereupon it may move in for a line to be composed, or awaiting clearance in the "B" unit so that it may move in to regulate camera operation.

After a line has been exposed on film in the camera, the cradle of patterns which produced the line will be automatically moved out of the "B" unit proper and into the "A" unit neutral or waiting zone and, at the same time, the film in the camera will be indexed to position for the next line and shifted for marginal justification. When the cradle has completely cleared the "B" unit, control devices will be actuated to permit another cradle to move in for the next succeeding line of composition.

Film used in the camera is in sheet form and provision is made to shift from column to column and from bottom to top in order to compose on the film with a minimum of wasted film, depending upon the sheet width and column size. Power drive for the machine of my invention is taken from an electrical motor with suitable shafting, cams, linkages, clutches, gear covers and other instrumentalities necessary to perform the machine operations.

Electric switching is utilized to initiate an electric motor drive, the latter of which operates continuously at substantially constant speed. As composing manipulations take place, manually actuated controls provide for certain phases of the machine operation which, in turn, further provide for automatic operation of other phases. For balance between the "A" unit operation, which is largely a combination of manual and automatic functions, and the "B" unit, which is entirely automatic, I prefer to increase the "A" unit speed over that of the "B" unit by a ratio based on a factor for maximum operational efficiency, whereby the "reading-in" of a complete line absorbs approximately the same amount of time or a slightly greater amount of time than the "reading-out" operation. Thus, the fixed rate of speed in the "B" unit is consistent with the highest rate of speed in the "A" unit and accordingly, I maintain a beneficial condition for wear and tear on the components of the machine and, at the same time, prevent delay which would otherwise be occasioned by setting lines faster than photographing lines.

Mechanisms and other facilities of my photocomposing machine are arranged at three spaced zones on levels which may be generally designated as levels L1, L2, and L3. The lowest level L1 at the top side of base 10 is an overall supporting level and provides for power drive devices which effect cradle circulation and actuate the moving parts of the machine as a whole. Level L2, next above level L1 and supported therefrom, is largely taken up with movement of the cradle 30 to its operative and neutral positions, together with interlocking control mechanisms for the machine regulated from and operated by cradle shifting. Above level L2 at level L3 are manually operated and power driven sizing and sensing devices and linkages employed for "reading-in" and "reading-out" the pattern signals and other signals in the "A" and "B" units. Like level L2, level L3 is spaced and supported on convenient frame members and spacing posts resting on level L2. While no strict zone divisions are adhered to and, while certain of the units which go to make up the machine of my invention are not assigned to a particular zone or level, reference is hereinafter made to levels L1, L2 and L3 in order to simplify an understanding of the machine of my invention.

Provision is included with the apparatus of my invention to perform modified operations which are customary and desirable in text type composing as, for example, line centering, box headings, and tabulation. With certain other adjustments, it is possible to produce reverse line copy. These and other variations in the composing procedure will be fully understood during consideration of the detailed specification which follows and which gives a comprehensive description of the photocomposing machine as a whole and its operation.

To simplify an understanding of the invention, in view of the rather complex structure of the components employed in its physical embodiment, the detailed description is broken down to treat specific sub-assemblies or mechanisms separately. A single pattern 30P, representative of a single character, is described at the outset, followed by a description of a cradle 30 containing a plurality of patterns, which, as a whole, may be considered representative of a line of characters. "Reading-in" or "coding" instrumentalities of the "A" unit and "reading-out" or "decoding" apparatus of the "B" unit follow in the description, together with details of the camera, driving mechanism and controls.

THE PATTERN

The pattern 30P, see Figures 25 and 26, which in the machine of my invention may be considered to be representative of a single character, receives signal adjustments impressed thereon in the "reading-in" or pattern setting procedure controlled from the keyboard in the "A" unit, and retains the character signal adjustments for an automatic "reading-out" procedure in the "B" unit and until it is reset during a subsequent "reading-in" operation in the "A" unit. As hereinbefore indicated, patterns circulate with the cradles and are set and re-set continuously in their respective groups during line composing operations.

Three fundamental signal adjustments are made in each pattern. One multiple adjustment, representative of the identification of a character chosen by the operator, is established in one or more of a series of movable sensing pins, to later control the photographing position of a master character plate. Likewise, a wedge adjustment, considered as a "sizing" adjustment, is established in each pattern indicative of character width or its unit value, which later controls the spacing on film for that particular character. A further adjustment is made in the patterns to indicate spaces in a line, which later provides for line expansion, so that, at the end of a line, space remaining unused by the characters in the line may be uniformly absorbed throughout the line.

As illustrated in Figure 24, each control pattern 30P includes a rectangular sensing pin carrrier 50, and an elongated, tined wedge member 51. These sub-assemblies are separable from each other when apart from the machine, as illustrated, but in the four views of Figures 25, 25*a*, 26, and 26*a* are shown adjacent each other in the positions which they occupy when assembled in the cradles 30. Figure 29 illustrates a series of patterns grouped in operative position apart from the cradle.

Considering the sensing pin carrier 50 as shown in the several views, two spaced, vertical posts 52, 52' integral with the body portion of the carrier are partly slotted down from their top ends for bridging therebetween the sensing pin frame 53 carrying nine equally spaced axially movable pins 54, flanked by a pair of fixed pressure anvils 55. Sensing pins 54 are free to move up or down in suitable clearance holes in pin frame 53 under the restraining influence of split spring friction sleeves 56, see also Figure 27, the latter having a normal inside diameter slightly smaller than the outside diameter of pins 54. As shown in Figure 25, sensing pins 54 may be disposed upward in frame 53 with their enlarged head portions 59 in contact with the under surface of the frame, thereby assuming their limit of upward movement, or they may be positioned downward to the extent that the head portions 59 abut the horizontal surface 60 on the member 50.

Pin settings in combination are used in the machine as a signal adjustment of specific character identification; for example, a lower case roman character "a" may be indicated by positioning the third, fourth, fifth, and seventh sensing pins 54, taken from the left side, to the down position. Likewise, the lower case italic "*z*" may be indicated by depressing the first, third, fourth, and seventh pins to down position. Other characters are represented by similar settings, as will be understood.

A pair of helical compression springs 61, fitted in drilled openings at the base of the slots in posts 52, 52′, bottom therein and exert pressure upwardly against the ledges 63 on pin frame 53, thus normally maintaining the pin frame 53 upward with respect to the carrier, with the top edges of ledge portions 63 in contact with abutment pieces 64 dovetailed and riveted within the top of the slotted portion of posts 52, 52′. In the pattern setting or "reading-in" operation of the machine, as will be hereinafter understood, downward pressure is exerted against pressure anvils 55 to press the entire frame 53 downward against the effect of springs 61, thus clearing out any previous character settings as pin heads 59 strike the flat surface 60 forcing the pins up in frame 53, and at the same time permitting the establishment of new pin settings by a holding down action imparted to the pins corresponding to a new character as pressure on anvils 55 is relieved permitting frame 53 to return to its upward position. It may be noted here that the abutment pieces 64, on their upper extremities, are shaped as rack teeth so that a suitable pinion on transmitter 30T may mesh therewith, providing transmitter movement over the patterns grouped in the cradle 30 while setting the pins 54 during "reading-in" and to provide movement of the transmitter during the "reading-out" of pin settings. Each one of the nine sensing pins 54 may be positioned either upwardly or downwardly in the sensing pin frame, and from these settings a total of 512 different combinations may be employed for character signals.

The wedge member 51, in cooperation with the pin carrier member 50, is used to control the width or unit value of a character. To accommodate wedge 51, a horizontal slot 65, see Figure 24, is cut across one face of carrier 50 adjacent the middle portion and at a slight incline, the wedge having a pair of corresponding inclined tines 67 slidably fitted between the sides of the slot. A rectangular aperture 66 in carrier 50, centrally located with respect to slot 65 is aligned with inside edges of tines 67 on wedge 51 to straddle a pattern supporting bar in the pattern cradle, as will be later understood.

In the position of Figures 25 and 25*a*, with the wedge 51 positioned to the extreme right, the wedge and plate relationship is such that the overall width of the plate and wedge assembly X, Figure 25*a*, is a minimum, representing zero character width. With the wedge positioned to the left, as shown in Figures 26 and 26*a*, this overall width of plate and wedge is increased to a dimension X′, Figure 26*a*, representative of the widest character. Intermediate positions of the wedge 51 with respect to the slide plate 50 are representative of character widths intermediate of the zero width and the widest characters.

The wedge justification operating plate 68, see also Figure 28, is confined over the right hand end of wedge 51 by means of a slot 69 formed therein which engages a reduced portion 70 on the wedge body, and is relatively movable with respect to the wedge, within the slot limits, in a vertically upward or downward direction to cooperate with the instrumentalities hereinafter described employed to set the wedge position with respect to the pin carrier for specific character widths and to justify the spacing in a line of composition. Plate 68 is held in its adjusted position by the use of a spring retained detent 71 assembled within the end of the wedge engaging the surface of the plate.

THE CRADLE

As previously considered in the general description, a group of patterns 30P, which may be considered to represent a line of composition, are supported side by side on each cradle 30, the latter of which may be considered as a carrier for intelligence representing a line of composition. The cradle is arranged to circulate horizontally in the photo-composing machine at level L2 under the influence of a power drive to four specific locations with respect to the "A" and "B" units designated as "A proper," "B neutral," "B proper," and "A neutral." A transmitter mechanism 30T is carried with each of the three cradles to "funnel" signal settings to each pattern while the cradle is in the "A" unit and similarly to "funnel" the signal settings from each pattern while the cradle is in the "B" unit. The cradle drive and the transmitter will be described later in the specification in greater detail, the present phase of description being directed to the cradle only as a pattern supporting and transporting facility.

In the present physical embodiment of my invention, I assemble 99 patterns in each cradle, this number being adequate for the composition of lines for maximum normal column widths. If lines of text composition are short and character size large, the character setting activity in the machine may be concentrated in a relatively small number of patterns located at one end of the cradle. Conversely, if the column is wide and the type character size is small, a greater number of patterns are used for the composition of each line.

Several of the views illustrate the cradle 30 as it is associated with other component units of the machine of my invention. Figures 3, 6, 7, 8 and 9, for example, indicate its position at the rear of the "A" unit. Figures 30 and 35 show the cradle in position centrally of the "B" unit. Figures 45 and 45*b* show the cradle associated with the driving mechanisms used to transport it to the four basic positions in the machine aforementioned, together with trip mechanisms with which the cradle cooperates during its cycle of positioning.

Details of the cradle are illustrated in Figure 10, including an irregularly shaped cradle bracket 72 at the left and a corresponding right hand cradle bracket 72′ which constitute end support members, between which is bridged a tubular, rectangular pattern guide bar 73. At the base of the cradle, see Figures 6 and 7, are front and rear longitudinal tie bars 74, 74′ respectively, also secured to brackets 72, 72′. Brackets 72 and 72′, Figure 10, are further provided with forwardly extending ledges or projections 75, 75′ respectively, to the ends of which is rigidly secured an elongated L section member 76 which serves to guide the overhanging wedge portions 51 of patterns 30P. The rectangular pattern guide bar 73, mentioned above, is exteriorly sized to provide a close fit within apertures 66 in patterns 30P, see Figure 24, and thus the patterns are permitted free longitudinal sliding thereover but are maintained in close confinement therewith. Pattern 30P on the right hand end of the assembly abuts against cradle bracket 72′, Figure 10, and the extreme left end pattern is engaged by a jaw-block 77, also slidably disposed over guide bar 73; jaw-block 77, in turn, being engaged by the short end of an elongated L-shaped blade 78 which is horizontally confined to movement within a pair of mated slots in the sides of bar 73. Adjacent the patterns the short end of blade 78 is engaged by a blade hook 78' which is biased to the right by a pair of coiled tension springs 79 arranged within guide bar 73 and interconnected between a suitable spring fastening crosspiece on hook 78' and a pair of ratchet gibs 80 fixed within the right hand end of bar 73. Thus, the tendency is for the patterns 30P to be crowded to the right, springs 79 exerting the necessary biasing force, yet permitting lateral pattern expansion to the left during machine operations.

For horizontal travel, cradle 30 rolls on a series of four identical pairs of corner rollers 81, Figure, 6 which project slightly below the under surface of the assembly and rest in contact with suitable recessed plate supporting surfaces at level L2, each roller of each pair of rollers being trunnioned at right angles with the other roller of the pair on vertical roller support members 82, 82', the latter of which are secured adjacent their lower extremities to the longitudinal transmitter guide tracks 83, 83' thereabove fixed to brackets 72, 72'.

Tracks 83 and 83' form a horizontal supporting structure for the transmitter 30T, whereby the transmitter may traverse the cradle step-by-step over the patterns for setting pins and wedges and, at the same time, these tracks serve to accurately confine the sensing pin carrier portions 50 of patterns 30P so that their top edges, which are cut in the shape of rack teeth, are properly alined to serve as continuous rack members, see Figure 8, to regulate the positioning of transmitter 30T. At the right hand end of the cradle assembly, Figure 13, supplementing the rack teeth formed by patterns 30P, is an auxiliary rack member 84 secured to a suitable surface area of bracket 72' to guide the transmitter 30T while it is positioned beyond the patterns adjacent the right hand end of the cradle during the setting of pins and wedges on the last few patterns assembled in the cradle.

It may be noted at this point that transmitter 30T moves from left to right on cradle 30 during pattern setting operations in the "A" unit, starting from the extreme left for the initial character of each line. For guiding purposes, the central portion of the transmitter is always located at a distance to the right of the pattern being set, and at a point where patterns 30P are completely contracted, since step by step expansion of the patterns due to wedge adjustment will correspondingly affect the pitch of the simulated rack. The close, rack-like association of patterns is reformed, step-by-step, during right to left movement of the transmitter during the "reading-out" operations in the "B" unit, and the reformed patterns again serve as a guide for the transmitter on a subsequent left to right traverse of the cradle in the "A" unit. It may be further noted that the least physical effort is necessary for setting pattern wedges at the extreme left hand end of the assembly, where the frictional effect of expansion is relatively small and where the tension of springs 79 resisting expansion is a minimum. As the number of characters in any particular line progressively increases, it becomes necessary for greater force to be exerted in order to expand the pattern being set and at the same time to move the previously expanded patterns a corresponding distance. The same is true in the "B" unit, and while the patterns are being contracted during "reading-out" operations, it becomes expedient to add positive facility for condensing the entire assembly. To this end, I provide a pivoting, spring biased hook finger 85, Figure 13, operable by bell crank 86, as will be more fully explained, pin 85' in the head of finger 85 being guided on the inclined surface of block 87 so that the hook portion will engage a tooth on the upper surface of the horizontal ratchet 88 slidable between gibs 80 and interconnected through rod 89 to blade hook member 78' at the left end of the pattern assembly, Figure 10.

Referring again to Figure 10, lateral pattern expansion during the "reading-in" process, through jaw-block 77, will move blade 78 to the left a distance corresponding to the expansion effected. This will result in leftward movement of the line guide bar 92 which abuts blade 78 and which is also confined in the mated slots in the sides of the hollow pattern guide bar 73. Stop 90, which is operatively associated with bar 92, by intervening mechanism to be later described illustrated at the extreme right hand top corner of the view, will also be moved to the left a distance corresponding to the pattern expansion. Stop 90 serves, in turn, to control the spacing of characters at the "B" unit. At the same time, during leftward travel, blade 78 will serve to advance the offset extension member 93 on bar 92 carrying roller 93', the roller being positioned to transmit a measure of pattern expansion through lever 94 to a tabulator stop device 35 at the front of the keyboard.

Line guide bar 92 and blade 78 are yieldingly secured with each other at the rear portion thereof to form the differential centering mechanism, generally indicated at 95 which carries an auxiliary stop 90'. As will be hereinafter more fully understood, the centering stop 90' may be moved to a regulatory position independently of the regular stop 90 to provide for centering a word or a series of characters with respect to a margin.

Transposition of the cradle to the several basic positions is accomplished through driving mechanisms, which are treated separately herein, the longitudinal drive between the "A" unit to the "B" unit taking place by means of helical feed screws which, for one direction of movement, engage cradle drive roller 96, Figure 12, secured to the rear side of cradle bracket 72 and for the reverse direction engage roller 96', Figure 11, secured to bracket 72'. Likewise, from the "neutral" position to the "A" and "B" unit "proper" positions respectively, the cradle is moved transversely by means of a series of intermittently operated driving turntables, rollers on which are arranged to contact opposed surfaces of spaced guide shoes 97, see Figures 6 and 8, appropriately secured along the bottom of the cradle and maintained in spaced relationship by means of the bridge member 98. Spacing under bridge 98 between guide shoes 97 is maintained in order to provide clearance for one pair of turntable rollers which move in the reverse direction to that of the cradle, and will be fully understood in the detailed description of cradle driving.

THE TRANSMITTER

One transmitter or transmitter trolley 30T, Figures 6 and 7, supplements each cradle 30 as an intermediate control and is arranged to move with the cradle at all times and to roll horizontally across the cradle from end to end during the "reading-in" process in the "A" unit, as well as during the "reading out" process in the "B" unit, starting at a zero cradle reference beyond the extreme left hand end pattern, see the broken line position of Figure 6, from which location it is automatically indexed to the right a distance equal to the closed width of a pattern during each "A" unit cycle of operation. When the cradle is in the "B" unit, the transmitter 30T is likewise indexed step by step in a reverse direction, returning to the zero reference with respect to the cradle. In the full lines of Figure 6, the transmitter is shown in a position adjacent the right hand extreme of movement, this view also showing a portion of the "A" unit sizing and sensing devices thereabove, operative on the transmitter to selectively set the pins and wedge of the pattern to which it is indexed.

An open rectangular transmitter framework casting 100, see Figure 15, supports the operating mechanisms of the transmitter, the entire assembly being movable with respect to the cradle on cradle tracks 83, 83', Figure 7, which are engaged by four flanged wheels 101 suitably trunnioned on spindles 102 carried in projecting end bearings integral with frame 100. Appropriate side flanges 100', Figure 16, are fixed to frame 100 to engage corresponding slots in the cradle tracks 83, 83' in order to retain the wheels 101 in contact with the track surfaces; and at the upper left corner of the transmitter of Figure 15 is secured a fixed cradle position control member 100''. Step by step indexing of the transmitter is provided for by the use of a pair of spur pinions 103, Figure 15, aligned with the simulated racks formed by nested patterns, pinions 103 being affixed to shaft 104 trunnioned in transmitter frame 100; shaft 104 extending outboard of the assembly, see Figure 15, whereby a third or driving pinion 105 having identical pitch with pinions 103 may be secured thereto. Pinion 105 is sustained against free turning by contact at its lower extremity with a cylindrical pin 106 fixed on one end of the bell crank 107 and a spring pin 110 and thus, if spur pinion 105 is turned through a distance equal to its pitch, the transmitter will be driven a corresponding distance with respect to the cradle and will be sustained relatively fixed at its new position, with pin 106 engaged between the next successive pair of teeth of pinion 105.

At the side of the transmitter are a pair of substantially identical linkages for effecting step by step rotation of gear 105 during operation of the machine, thus adjusting the transmitter position from one pattern to the next, the linkages on the right hand side being arranged to cooperate with certain driving mechanisms in the "B" unit and the linkages on the left hand side being arranged to cooperate with driving mechanisms on the "A" unit. For the purpose of the present description these driving linkages are considered to be identical although they are, of course, right and left hand. Furthermore, while unidirectional movement of the transmitter with respect to its cradle in the "A" unit is indicated above, additional provision for "step-back" is provided for the occasional requirement in making a change in one or more characters chosen by the machine operator.

Indexing lever 111 in the left hand driving linkages, one end of which projects slightly above the assembly at the left center of the transmitter, is pivoted at 112 and is spring retained counterclockwise by the use of depending tension spring 113 secured to frame 100. Lever 111, under the influence of spring 113, may turn until its projecting left hand end 114 strikes against the adjustably positioned stop 115 projecting from frame 100. The right hand end of lever 111 is provided with a roller 116, which is operated upon by a transmitter driving linkage hereinafter explained, and intermediate of the pivotal center 112 and roller 116 is a cam face 117 arranged to contact a mating face 117' on the depending auxiliary two-tooth rack member 118 which, in turn, is pivotally secured to a second lever 119 also pivoted at center 112 and spring biased in a counterclockwise direction by means of a second tension spring 120. Clockwise movement of lever 111 imparted from the "A" unit driving or indexing linkage during a cycle of "A" unit operation will first tilt rack member 118 counterclockwise against the effect of the lighter restraining tension spring 121 and into engagement with spur gear 105, whereafter further movement will pivot the right hand end of lever 119, to which rack member 118 is pivoted, until the lower end of the two-tooth rack strikes against abutment 122 secured to frame 100, resulting in one pitch angular movement of gear 105 and a corresponding movement of transmitter 30T with respect to the cradle. When pressure against lever 111 is released, the initial counter clockwise movement thereof will permit rack member 118 to become disengaged from spur gear 105 whereafter it may move upwardly into position for a subsequent engagement with gear 105 during the next machine cycle.

On the opposite side of the transmitter from the indexing assembly and extending toward the front, see Figure 15, is an irregularly shaped open secondary frame 125 which is used for the purpose of supporting devices associated with the wedge setting and wedge withdrawing operations. A pair of parallel horizontal rods 126, fitted at the angle of pattern tine 51 with respect to the frame 100, and also secured to frame 125, slidably carry the wedge pusher member 127 and wedge withdrawal member 128, the latter of which are arranged in a mutual opposition by means of a U-shaped spring wire 129, the open ends of the spring being fitted to the parts in opposition and the central coiled portion of the spring being suitably retained in place above the projecting leg 124 on frame 100 supporting secondary frame 125. Thus, as illustrated in Figure 9, a driving force to the right on wedge pusher member 127, aligned with pattern plate 68, will tend to drive a wedge 51 inwardly of its pattern and effect pattern expansion, while movement of the wedge withdrawal member 128 to the left, also in alining contact with pattern plate 68, shown in broken lines, will serve to contract the pattern.

Centrally of the frame 100, see Figures 9, 13, and 15 are a series of eleven vertically slidable transmittal pin members 130, the upper portions of which are square and the lower portions cylindrical. The square upper ends of these pins project to a uniform level above the frame 100 and are confined to slide in a suitable slot in transmitter cross member 131 and the lower ends are confined in circular apertures in the lower cross member 132. The nine central transmittal pin members 130 are in superimposed alignment with the nine sensing pins 54 of pattern 30P therebelow, when the transmitter is properly indexed therewith, the outer two pins 130' being arranged to contact the anvils 55 on sensing pin frame 53 in the pattern for the purpose of depressing the frame in setting and resetting pattern pins. Each of the nine central transmitter pins 130 are engaged by one of a series of nine pin control levers 134 which engage suitable clearance slots in the pin surfaces, Figure 8, and which are freely pivoted over the rod 135, Figure 13, mounted in frame 100.

Normally, transmitter pins 130 are retained downwardly in contact with the pattern sensing pins 54 by means of the individual coiled tension springs 136 interposed between the pin levers 134 and frame 100. Thus, they are positioned to regulate the setting of sensing pins in the "A" unit and, in the "B" unit, when a pattern sensing pin is disposed to a downward position, the corresponding transmittal pin thereabove will likewise be disposed downwardly to control certain operations taking place in the "B" unit.

When indexing the transmitter from one pattern to the next, it is necessary to lift the pins 130 away from the patterns to avoid mechanical interference. To this end, I provide a transmittal pin lift bail 137, Figure 14, also pivoted over rod 135, which may be rocked counterclockwise by the pin lift plunger 138, engaging the leftwardly projecting arm portion of the bail, plunger 138 being suitably confined in frame 100. The top end of plunger 138 extends a short distance above frame 100, corresponding with the extension of transmitter pins 130, being confined in its upward travel by the abutment of the circular end of bail 137 against the transmitter frame crosspiece 131'. As bail 137 is rocked, the cross-over portion thereof will contact the vertical extensions 133 on levers 134, providing clearance between the transmittal pins and the patterns during step by step operation.

Referring to Figures 8, 14 and 15, the anvil operating pins 130', which flank the transmittal pins 130, are in alignment with the anvils 55 on patterns 30P therebelow, being normally spring restrained upwardly for clearance with respect thereto. Engaging the lower central portions of pins 130' is a yoke 145, see also Figure 14, pivoted to frame 100 on a rod 139, to one side of which is secured an angularly extending arm 144. Arm 144 normally projects above the transmitter to the level of plunger 138 and is supplied with a contact roller 144'.

When depressed in the 'A" unit during reading in" operations, yoke 145 will, in turn, cause pins 130' to engage anvils 55 to depress the sensing pin frame 53 on pattern 30P. During "reading out" operations in the "B" unit there is no occasion to use this facility, as will be understood during a consideration of the operating characteristics of the machine hereinafter described.

For "B" unit operations only, I provide a pivoted sensing pin lock bail 140 at the right in Figure 14 to engage under the projecting ends of levers 134 and to thus lock those levers upwardly which have not assumed a downward position corresponding to their pattern sensing pin settings. Engaging lock bail 140 is the vertically reciprocable plunger member 130'', see also Figure 14, projecting above frame 100 as in the cases of transmittal pins 130 and the anvil operating pins 130'. Lock bail 140 is retained clockwise out of engaging position with regulating levers 134 by the use of tension spring 142, but may be rocked counterclockwise by the use of a locking linkage in the "B" unit to effect the desired locking action, as will hereinafter be more fully understood. The extent of clockwise movement of bail 140 is regulated by means of an adjusting screw 143 secured to frame 100.

It may be noted here, particularly by reference to Figure 15, that the control ends of the plungers, pins, and levers of the transmitter herein described are positioned at separate zones transversely of the unit. Thus, as the transmitter rolls along the cradle in the "A" and "B" units, the parallel linkage bars superimposed thereover will maintain the necessary operating connection therewith.

"A" UNIT

*The keyboard*

Reverting to the facilities of the machine employed to set code signals in patterns, the keyboard 26 and mechanisms closely associated therewith in "A" unit 25 are shown in Figures 2, 3, and 4. Composing on the machine, as with other keyboard operated machines, is performed by striking keys, whereupon a choice of characters is relayed, one by one, to the patterns 30P as sensing pin settings and the width or unit size of characters as wedge settings. In the case of a blank space between characters or between words, the absence of a character will be indicated by the depression of pattern sensing pins just as in the case of a character, and a nominal or standard space width adjustment will be made in the pattern wedge. At the same time, when spaces are indicated, the justification operating plate 68 on the end of wedge 51 of pattern 30P, Figure 25, will be moved to its "down" position to provide for further width adjustment to be performed at the end of the line, resulting in right hand marginal justification.

Referring to Figures 2 and 3, the character selection keys 151 are arranged at the front of the "A" unit in a regular banked series of four transverse rows. Sixty-five individual keys are employed, each of which may bear identifying surface marking as on typewriter keys, indicating the character or characters to which the key refers. Figure 4 shows the arrangement of the individual keys on the keyboard, and it will be noted that there are keys showing the letters of the alphabet, the various points commonly employed in composing, the quads, and the figures. A pair of shift keys 152 and 152' for lower case and upper case characters respectively are also provided in the front row and thus, as will be further described, each character key on the keyboard may be used to serve the purpose of two keys, i. e., for both the upper case characters and lower case characters, or for any other suitable combination of two characters. Four special keys designated "Italic," "Roman," "Bold," and "Function" appear in the top bank at the right hand side to provide for selecting italic, roman, or boldface type designs in a particular type style, and for functions to be later described. An elongated space bar 154 located at the front of the character keys, also arranged in banked relationship with the keys for ease of manipulation, provides for inserting spaces in a line of composition.

The keyboard, as illustrated in Figure 4, respresents a total of 288 selectable characters. This is fewer than the number of possible combinations available with nine pattern sensing pins, as noted in the description of the pattern, where it was indicated that a total of 512 combinations may be made. However, this differential of possible combinations in sensing pin arrangements over and above the requirement on the keyboard permits the use of standardization which, as will be later understood, simplifies the working mechanisms of the machine.

The character keys 151, Figure 3, are directly attached to character key pivot levers 155, spaced uniformly across the machine and extending horizontally rearwardly from the keyboard. Levers 155 pivot on a fixed shaft 156 which extends transversely through bearings in the keyboard side frame 150 and 150' secured at level L2. To the front of the pivot center the character key levers differ only in their lengths and in their vertically formed front ends, the latter being constructed to suit the banked position to which they belong, ranging from a short terminal group designated by 155' to the long terminal group 155'', all of the key levers being normally balanced clockwise and banking with the upstanding lugs 161 abutting cross rod 162. To the rear of the pivot center, each lever 155 carries a reed pusher link 157 pivoted thereto, the latter of which is directed substantially vertically upward by a confining pusher link shifting retainer 158 extending between the flanges 159 and 160 on the side frames 150, 150', Figure 4, and pivoted thereto on the pair of threaded pivot pins. Retainer 158 aligns all of the pusher links 157 with either the lower case reeds 163 or the upper case reeds 164 thereabove through the instrumentality of a horizontal guide comb 165 which adjoins the vertical guide plate 166 fixed to the top and front sides of the retainer respectively, see Figure 4*a*. Member 158 may be tilted either clockwise or counterclockwise, as desired, for lower case or upper case character selection by direct connection with the lower and upper case shift levers 152, 152' through links 167, 168 which are interposed between extension arms 171 and 171' on the retainer and projecting arms 170 and 170' on the shift levers. Figure 4*a* illustrates spring plunger detent apparatus whereby retainer 158 is held in fixed off-center position, either holding pushers 157 under the lower case reeds 163 or under the upper case reeds 164, depending upon whether the spring pressed plunger 173 carried therewith is behind or in front of pin 174 rigidly fixed in the base plate on L2. It will be understood at this point that, when the operator depresses the upper case shift key, member 158 will place the pusher links 157 under the upper case reeds 164 and, likewise, depression of the lower case shift key will position member 158 at the reverse angular position to direct pusher links 157 to position under the lower case reeds 163.

Space bar 154, see Figures 3 and 4, is secured adjacent its ends to a pair of corresponding levers 175, 175' parallel with and directly below the character key levers which, in turn, are fixed to shaft 176, the latter of which is pivotally arranged with respect to side frames 150, 150'. Further secured to shaft 176, inboard of frame 150' at the right hand end, Figure 4, is a rearwardly extending lever 177 which pivotally engages the vertical pusher member 178, Figure 9, which, in turn, extends upwardly through a suitable aperture in the flat, horizontally disposed rocker member 179 secured to the lower side of square shaft 180, the latter of which is also trunnioned in side frames 150, 150' on suitably turned ends. Fastened to the top side of square shaft 180 is the elongated space actuating plate 181 which is arranged to co-act with wedge pusher member 127 on transmitter 30T, irrespective of its step-by-step location, to depress plate 68 on the particular pattern to which the transmitter 30T is positioned and to thus effect a space setting on that pattern. At the same time the tilting of lever 177, see Figure 9, also raises a vertically disposed pusher link 182 pivotally secured adjacent the end of lever 177 and confined in the horizontal guide comb 165 on retainer 158 in alignment with a combination reed 183 providing a nominal space setting in the sizing linkage aforedescribed.

One key on the keyboard, identified with numeral 185, Figure 4, is provided for backspacing or step-back in the event that an operator has made an error knowingly and wishes to rectify the error before proceeding. Backspacing may proceed as far back in the line as is necessary, even to the initial letter in the line. Key 185 is secured to a rearwardly extending lever 186, Figure 4, secured to side extension member 186'. To the side of the member 186', Figure 9, is fixed a second lever 186'' pivotally connected to an upwardly directed link member 187 serving to transmit motion to the back spacing devices, described at a later point in the specification.

All of the character key levers 155, the space bar lever 177 and the step back lever 186 are so arranged that, upon being actuated, they will strike a U-shaped clutch tripping bail 188, Figure 9, pivoted within side frames 150, 150' on a bail shaft 189 fixed thereto. At the locations where other key operated levers would normally strike bail 188, appropriate notches are provided in the bail to prevent clutch trip operations about to be described. As one of these levers strikes the bail, thus raising it correspondingly, the upward motion is transmitted through a vertically pivoted link 190 to a clutch trip lever 191 secured to clutch trip shaft 192; see Figures 1 and 9, the clutch trip shaft being trunnioned in an outboard bearing 193 secured to member 194 vertically disposed on level L3. Clutch trip shaft 192 extends rearwardly from the front of the "A" unit to actuate clutch tripping devices, hereinafter described.

Additional provision may be made to actuate space plate 181 by the use of an individual swelling key 184 at the keyboard so that by depressing that key with another key for a particular character, that character may be manually given an expanded width. Such provision is effected by the use of a linkage similar to that described above for the space bar terminating in a supplementary pusher member 178', as illustrated in Figure 4.

"A" UNIT

*The manually operated sizing and sensing mechanisms*

Above and to the rear of the keyboard, in the "A" unit 25 on level L3, as shown in Figure 3, are manually operated sizing and sensing mechanisms which are generally indicated at numerals 37 and 38 respectively and which comprise the elements and linkages actuated manually from the manipulation at the keyboard. These mechanisms establish preliminary linkage signals which are subsequently relayed to the pattern 30P by power operated pattern setting mechanisms through the medium of transmitter 30T. This division in the continuity of drive from keyboard to pattern is made in order to provide for power actuation of moving parts requiring a greater force or greater precision than is practicable to provide entirely manually from a keyboard.

Each time a character key is depressed, the manually operated sizing mechanism 37, as an end result, tilts one of a series of twelve horizontal sizing levers 201, each of different length, see Figure 7, located at the lower rear portion of the sizing mechanism, thus later providing for one of twelve character widths in the camera, depending upon the particular character chosen. Twelve widths are considered adequate differentiation for the usual design of type characters to give a high quality of text composition, although a greater or smaller number of sizes could be employed. Likewise, as each character key is depressed, a manual setting is also made in one or more of the horizontal slide bars 276, Figures 3*a*, 6 and 22, at the end of the train of links and levers in the manual sensing mechanism 38, to later provide for power operated setting of sensing pin combinations to be established in a pattern corresponding to the character key which has been depressed.

Pivoting vanes are used as a mechanical expedient in the manually operated linkage trains for transmitting motion in both the sizing and sensing mechanism, and an understanding of the operation of these vanes with the moving parts closely associated therewith will simplify to some extent the description to follow. The vanes for sizing and the vanes for sensing are merely transversely extended rocker arms, as particularly illustrated in the diagrammatic view, Figure 3*a* to the left of Figure 3. This view shows a single keyboard character key 151 on a pivoted character key lever 155 having vertical pusher link 157 fastened at the end thereof and directed in alinement with a lower case reed 163, above which are a sizing vane 210 and a sensing vane 260 with associated parts. The sizing vane comprises a narrow elongated rectangular plate 211 to which is rigidly fastened a pivot shaft 212. The vane receives motion at the front side of its fixed pivotal center in an upward direction at any point along the underside of its surface near or at its front edge, motion being imparted to it by a projecting ledge 214 on vertically slidable reed 163. This movement is translated to movement in an opposite or downward direction against a ledge 215 on a second slidable reed 216 located on the opposite side of the pivoting center of the vane. Vane assembly 210 is elongated and made continuous so that it may be tilted by any one of the lower case reeds 163 or upper case reeds 164 disposed across the front of the machine having a horizontal projection 214 at the position of that vane and corresponding to characters having the same prescribed width, each of which will cause depression of the same rear sizing reed 216 on the reverse side of the pivot center to tilt one of the series of twelve sizing levers 201.

Substantially the same type of linkage is employed in the use of the rectangular sensing vanes 260 which include elongated rectangular plates 261 fixed to pivot shafts 262. Upward movement of a lower case reed 163 or an upper case reed 164, imparted by pusher 157, pivots a bell crank 255 at the top of the assembly clockwise, which action, in turn, slides reed 264 horizontally forward. Reed 264 for sensing is of open rectangular configuration and, as it slides forward, sensing vane assembly 260 is rocked counterclockwise by contact of the downwardly protruding reed ledge 263. Pivot shaft 262 is extended beyond the vane plate 261 and has a crank arm 265 attached at its end, the latter of which engages a notched depression in bar 276 therebelow, and counterclockwise movement of arm 265 will slide bar 276 to the right. This action will provide for setting one of the nine sensing pins in pattern 30P, as will be later described. If the character signal requires the setting of several of the sensing pins in the pattern, it is only necessary to include a plurality of depending ledges 263 on reed 264 and to thereby move a corresponding number of bars 276. The lower upwardly directed ledges 263' are employed on reeds 264 for tilting certain of the sensing vanes 260 in a counterclockwise direction, this action serving to "reset" other vanes than those "set" in the same operation. A more complete description of this function is also had at a later point in the specification.

Referring now to Figures 2, 3, and 5 for a comprehensive treatment of the details of the manual sizing assembly 37, a vane framework is provided consisting of a vertically arranged sizing bar frame casting 220 across the front of the "A" unit, a rear plate 221, and a pair of elongated companion vane bearings 222, the vane bearings being secured together by top and bottom tie bars 223 and 224. Left and right side companion angle brackets 225 and 225′ are rigidly attached to the vane bearings and provide for mounting the entire assembly to the horizontal platform at level L3. Brackets 225 further are notched as at 226 for supporting engagement with pins 227 on frame casting 220 and each bracket has a leaf spring 229 fixed thereto so that the sizing bar casting 220 may be readily attached and removed therefrom for servicing or for substituting like parts for other type faces having special characteristics. Likewise, a second set of catch springs 229′ are fixed directly to the vane bearings near their upper extremity and are also used to demountably secure the sizing bar frame 220 by interconnection with upper pins 227′.

Referring to Figure 2, a set of two reeds 163 and 164, the former for lower-case letter selection and the latter for upper case letter selection are provided across the front of the sizing framework for each character key. Reeds 163 and 164 are slidably confined between pairs of upper and lower spaced bar supports 235 and 236, Figure 3, fastened to the casting 220 and removable therewith. A slotted angle shaped guide 237 near the top of the casting 220 and a guide 238 near the lower portion of the casting assist to maintain the reeds in vertical alignment. One horizontally projecting tooth or ledge 214 is provided on each reed to rock a particular sizing vane 210, and each reed has a stop ledge 240 near its lower extremity for locating the reed vertically with respect to the reed pusher 157. In like manner, there are a series of twelve uniformly spaced sizing reeds 216 to the rear of vanes 210 vertically slidable against guides 237′, 238′ confined in spaced guides 235′ and 236′, each rear reed 216 having one projecting tooth or ledge 215 to receive downward movement from its vane 210 and each having a stop ledge 240′ to restrict its movement downwardly. The normal position for the sizing reeds is upward, suitable tension springs (not shown) serving to provide the necessary upward restraint.

Sizing levers 201, see Figures 3, 5, and 7 hereinbefore referred to in a description of details shown in the diagrammatic view, Figure 3*a*, are suitably spaced from each other and are arranged to rock independently of each other on pivot shaft 202 which extends between and is secured to a pair of supports 203 fixed to the vertical plate member 204. It will be remembered that each character is designed for one of twelve character widths, and in order to move one of the twelve sizing reeds 216 which will result in the desired character spacing, one of the vanes 210 pivotably mounted in the vane frame must be tilted in a clockwise direction. As each sizing lever 201 is tilted, the projection 201′ extending upwardly from the lever in the form of an inverted V will engage the detent bail 205 pivotally secured to the vertical bracket 206, whereby the lever will be retained in tilted position for sizing control until a subsequently actuated lever serves to again lift the bail for another character permitting it to drop by gravity to inoperative position.

Considering now the character size distribution, let us assume, for example, that there are three characters having the widest spacing. These may be the upper case W, M, and the double, dotted leader. The character reed corresponding thereto, which will be lifted when either of these character keys are struck, will have its ledge 214 at the lowest vane position so that upward movement thereof will rock the lowest vane 210 clockwise, which, in turn, will move the extreme left hand sizing reed, Figure 7, downward and tilt the longest sizing lever 201. Likewise, if there are twelve characters which have a second largest width or "set," the projecting ledges 214 on their respective reeds 163 or 164 will be at the second vane position upward, to rock the second sizing vane and to move a sizing reed 216 downward corresponding to the second longest lever length. As a matter of interest it may be noted here that for one of the standard type character styles, including upper case and lower case characters, points and figures for roman, bold and italic, there will be the following arrangement of characters, and their sizes. Figures representing size are unit values, the narrowest character being 5 units and the widest character 18 units, and the precise width of the characters being a constant proportion of the set size for the type face.

SPACING OR SET OF CHARACTERS, POINTS, AND FIGURES

| Character | Unit Size | Special Characters, Points and Figures | Unit Size |
|---|---|---|---|
| A | 13 | ff | 11 |
| B | 13 | ffl | 14 |
| C | 13 | fi | 10 |
| D | 15 | ffi | 15 |
| E | 13 | & | 13 |
| F | 12 | $ | 9 |
| G | 14 | . | 5 |
| H | 15 | , | 5 |
| I | 8 | ; | 5 |
| J | 9 | : | 5 |
| K | 15 | / | 9 |
| L | 12 | ' | 5 |
| M | 18 | ? | 7 |
| N | 15 | ! | 5 |
| O | 13 | - (hyphen) | 7 |
| P | 12 | – (en dash) | 9 |
| Q | 13 | — (em dash) | 18 |
| R | 14 | _ (en leader) | 9 |
| S | 10 | __ (em leader) | 18 |
| T | 13 | ( | 5 |
| U | 14 | ) | 5 |
| V | 13 | [ | 7 |
| W | 18 | ] | 7 |
| X | 15 | ⋀ | 18 |
| Y | 14 | ⋁ | 18 |
| Z | 11 | ' (apostrophe) | 5 |
| a | 9 | % | 18 |
| b | 10 | ⅛ | 9 |
| c | 8 | ¼ | 9 |
| d | 10 | ⅜ | 9 |
| e | 8 | ½ | 9 |
| f | 6 | ⅝ | 9 |
| g | 9 | ¾ | 9 |
| h | 10 | ⅞ | 9 |
| i | 5 | 1 | 9 |
| j | 6 | 2 | 9 |
| k | 10 | 3 | 9 |
| l | 5 | 4 | 9 |
| m | 15 | 5 | 9 |
| n | 10 | 6 | 9 |
| o | 9 | 7 | 9 |
| p | 10 | 8 | 9 |
| q | 10 | 9 | 9 |
| r | 7 | 0 | 9 |
| s | 7 | Em quad | 13 |
| t | 7 | En quad | 9 |
| u | 10 | | |
| v | 10 | | |
| w | 13 | | |
| x | 9 | | |
| y | 10 | | |
| z | 8 | | |

The manually operated sensing devices, generally indicated at 38, Figure 3, are situated above and at the rear of the sizing devices 37 and are operated from the series of flat bell cranks 255 pivoted on shaft 241 the latter of which is suitably trunnioned in brackets 242 fixed to the top of the sizing mechanism framework. Bell cranks 255 derive their movement from the upward movement of character reeds 163 and 164, one bell crank being supplied to contact each adjacent pair of upper and lower case reeds. As a character reed is raised by the depression of a character key at the keyboard, a corresponding bell crank 255 is rocked clockwise and, by reason of its interconnection at its rear, depending rounded end with a corresponding slot in the front portion of a sensing reed 264, it moves the sensing reed 264 to the left.

Referring to Figures 6 and 9, the open rectangular sensing reeds 264 are guided to move horizontally between the front and rear upper slide guides 266, 267 and the lower slide guides 268, 269, the upper guides being fastened to front and rear surfaces of the sensing frame top support 270 and the lower guides being fixed to the sensing frame main casting 271 which rests upon and is secured to level L3. The top support 270 and main casting 271 are spaced apart by the left and right hand vane bearing bars 272, 272′.

As a sensing reed 264 is moved to the left, downwardly projecting ledges 263 on the upper horizontal portion thereof will engage the top edges of one or more prescribed sensing vanes 260 therebelow, and those vanes 260 are rocked counter-clockwise. Likewise, the upwardly projecting ledges 263′ on the lower horizontal portion of reeds 264 will engage the lower edges of certain other vanes and rock them clockwise. There are nine sensing vanes in the sensing mechanism, which correspond to the nine sensing pins on patterns 30P, which from left to right may be considered as positions 1 through 9. It will be remembered that there is an excess in the number of possible combinations using nine pins above the number which is required for the choice of characters on the keyboard. Thus, the vanes which correspond to the first two pins on the pattern are devoted exclusively to shifting from italic to roman to boldface to functions, and they are operated by corresponding keyboard keys, and the sixth vane corresponding to the fifth pattern pin is set aside for shifting from upper case to lower case characters by keyboard keys. Deducting these three shift positions from the nine total leaves six positions to use for the necessary combinations, which permits two to the sixth power, or 64 possible pattern signals, including a zero signal. The number of characters to be selected, previously indicated as 288, is likewise decreased to one sixth of this number or 48 since there are three separate type styles as italic, roman, and boldface and, for each type style there are both upper and lower case characters. It will be seen, therefore, that there are still more than adequate combination possibilities for the requirements.

Each sensing reed 264 has a particular pattern of upper ledge 263 and lower ledges 263′. For example, and referring to Figure 19, the reed for character "A" or "*a*" has upper ledges at the third, fourth, fifth and seventh positions and, in moving to the left from the broken line position, will rock vanes 261 at positions 3, 4, 5, and 7 counter-clockwise; also lower ledges at the eighth and ninth positions rocking vanes 261 in positions 8 and 9 clockwise. The upper and lower case reeds, Figure 20, as previously mentioned, are operative at the sixth position only, the upper case reed at the left having a depending ledge for counter-clockwise rocking of the sixth position vane and the lower case reed at the right an upward ledge to rock vane number six clockwise depending upon which of the two classes are chosen. The four reeds associated with the "Roman," "Italic," "Boldface" and "Functions" keys on the keyboard, shown in Figure 21, all operate on vanes number 1 and 2. The roman vane at the top left has two upwardly projecting ledges to rock vanes 1 and 2 clockwise; the italic vane, lower left, rocks vane 1 counterclockwise and vane 2 clockwise. The boldface reed, upper right, rocks vane 1 counterclockwise and vane 2 clockwise, and the functions reed, lower right rocks vanes 1 and 2 counterclockwise.

Auxiliary to the reed assemblies above described are a series of special double reeds, Figure 2*a*, which permit flexibility for "points" when the machine is set for upper case, lower case, roman, italic, boldface or functions. Thus, when it may be desirable to use characters such as the period, question mark, semi-colon, hyphen or other common point, and in order to maintain these points singly in the master plate in the camera, as will be later understood, these spring retained double reed assemblies are employed.

Figure 2*a* illustrates two of these double reed assemblies one of which may, for example, be actuated by the upper case shift lever and the other by the lower case shift lever. In the case of the double reed on the left hand side associated with the upper case shift lever, this assembly consists of a main reed 241 carrying a secondary reed 242 adjacent thereto and interconnected therewith by means of the coil tension spring 243. Near the center of the reed is a beveled projection 244 extending toward the front which is engageable by means of a flat latch plate 245, the latter of which is pinned to a horizontal shaft 246 extending across the front of the reed assembly and suitably trunnioned therewith. Shaft 246 is normally biased in a manner which will permit finger 245 to engage the underside of ledge 244 in the event that the main reed 241 is raised for composing upper case letters. When the main reed is raised it will carry with it the secondary reed 242 which, in turn, will tilt the bell crank 255 thereabove to position the upper case sensing reed 264 to a forward position. This action will, in turn, tilt the corresponding upper case sensing vane counter clockwise. At the same time, by reason of the tension spring interconnection between main reed 241 and auxiliary reed 242, a positive force tending to shift the upper case sensing reed 264 rearwardly is permitted. Thus, for example, if the period were normally a lower case character located in the lower case master plate alphabet, its sensing reed 264 illustrated behind the upper case reed would have a projection on the lower edge thereof tending to tilt vane 260 in a clockwise direction. Therefore, if the key for the period, normally a lower case character, were actuated at the keyboard while composing upper case, the proper combination of sensing vanes could be tilted and the upper case vane would be turned clockwise to the lower case position. At the same time when pressure on the period key is released, the normal upper case position for sensing reed 264 would be reinstated due to the biasing tendency of coil spring 243. This same system would be followed, for example, with a lower case setting and if a character located in the upper case alphabet of the master plate were depressed while the main lower case vane is in operative position, the upper case position of the sensing vane will be temporarily effected during the depression of the key for that particular character located in the upper case section of the master plate.

Referring now to the extension of manual sensing movements, after rocking of vanes 260, pivot shafts 262 extend to the right, see Figure 6, through clearance holes in the bar 272′ and are trunnioned in side plate 275. As previously mentioned, each shaft carries one of a series of staggered depending levers 265 to slide one of a corresponding series of nine control bars 276 therebelow by means of a slotted connection therewith. Bars 276 are confined in grooves in front and rear horizontal support bars 277, 277′ rigidly supported at the left and right respectively against members 272′, 275.

Figure 22 illustrates one of the sliding bars 276 actuated by arm 265 to move the bar forwardly or rearwardly depending upon the clockwise or counterclockwise tilting of its sensing vane. Each bar contains a single notch 276′ cut in the lower edge adjacent its rearward extremity, positioned to either block or permit the passage therethrough of an upwardly extending lug 278 on one of a series of nine horizontal intermediate control slides 279 directly therebelow, as will be hereinafter more fully considered.

Justification, which is considered herein to be a manual sizing operation, is performed by manipulation of the justification operating handle 39 located at the right side of the keyboard, Figures 3 and 4, handle 39 being secured to the horizontal shaft 280 extending between and journalled in appropriate bushing members 281, 282 mounted in the left and right hand keyboard side frames 150, 150′ respectively. Bushing 282 further serves the purpose of housing a concentric sleeve associated with the auxiliary handle 39′, as will be more fully treated at a later point in the specification. Inboard of frames 150, 150′ and secured to shaft 280 are left and right hand justification levers 283, 283′, the latter of which are pivotally secured to the horizontally disposed justification links 284, 284′ below the keyboard mechanisms, these links further engaging the front corners of a wedge pusher plate 285. Plate 285 is confined to horizontal sliding between opposed pairs of rollers 286 supported in frames 150, 150′ and the rear face of the plate is directed in alignment with justification operating plates 68 on patterns 30P in cradle 30 and it is arranged to clear those plates 68 which are disposed normally upwardly, but to engage all such plates which may be disposed downwardly, as illustrated in the broken line position of Figure 9, whereupon they may be forced rearwardly. Thus, the patterns representative of spaces between words, after a line of characters has been chosen, may be expanded by downward actuation of handle 39 to the extent that a full column width of prescribed dimension will be represented in the final result on film.

After justification, any downwardly disposed justification operating plates 68 on patterns 30P may be returned to their normal upward position. Return of plates 68 is controlled by the bifurcated control handle 39', Figure 4, which is independently pivoted over shaft 280 and secured to the right hand side of the sleeve member 287 surrounding shaft 280 and confined in bushing 282. Immediately inboard of frame 150', and secured to the left side of sleeve 287, is the justification return lever 288, see Figure 3, the lower depending end of which engages a block 290 on the front end of the rearwardly slidable extension link 289. As lever 39' is depressed independently of handle 39, thereby rocking lever 288 counterclockwise, link 289 is moved rearwardly with respect to justification plate 285 to further tilt the bell crank 292', pivotally mounted on the rear end of the plate 285, whereupon bell crank 292' rocks counterclockwise carrying the rod bail 291, also secured to left hand crank 292, upwardly against pattern plates 68 to remove signals in the patterns representative of spaces. Further manipulation of justification handle 39 serves to release the cradle latch in the "A" unit and to engage the drive clutch for transporting the cradle from the 'A" unit to the "B neutral" position as will be referred to at a later point in the specification in the description of the driving elements.

"A" UNIT

*The power operated pattern setting mechanisms*

The power operated mechanisms of the "A" unit, which supplement the keyboard operated devices to establish sensing pin and wedge settings in the patterns through the medium of transmitter 30T, are driven by a cam shaft 300, Figure 2, at the right hand side of the "A" unit. As further illustrated in Figure 3, cam shaft 300 is rotatably trunnioned in front and rear anti-friction bearings 301, 302 respectively suitably supported in frames 194 and 312, the latter of which are rigidly fastened to the machine above the L3 level. Where practical, the "A" unit power driven mechanisms for performing "reading-in" functions in the patterns are arranged as unit assemblies so that they may be readily assembled or dismantled for orderly and economical construction and servicing.

It will be recalled from previous description, that when a character key or when the space bar is depressed, the clutch trip bail 188, Figure 9, is rocked upwardly by contact with the rising end of a corresponding key or space bar lever therebelow. This action raises link 190 which extends vertically and which is pivoted at its upper end to a clutch trip lever 191, see also Figure 2, the latter, in turn, being secured to a horizontally disposed rock shaft 192. Shaft 192 is suitably trunnioned in outboard bearing support 193 at its front end and in a plate 314 supported by bracket 312 at the rear end. As shaft 192 is rocked, instrumentalities associated therewith will trip the one revolution clutch 306 causing cam shaft 300 to become engaged with a continuously rotating drive and to turn through one complete revolution.

For a description of the one revolution clutch 306, and referring again to Figure 9, a continuously revolving driving gear, not shown, engages the driven spur gear 315, to which is rigidly fixed a bearing and hub portion 316 revoluble over shaft 300, the hub having axially projected teeth 318 aligned for engagement with corresponding teeth 319 on a driving ring 320. Ring 320 is slidable on shaft 300 and biased normally to the left under the influence of the coiled compression spring 321 interposed between an annular projecting ledge on member 320 and a like ledge on fitting 322 fixed to the end of shaft 300. Member 320 is slidably interlocked with fitting 322 as by keying so that, when the clutch trip shaft 192 is rocked by the depression of a character key or the like, then arm 323, on shaft 192 outboard of plate 314, serves to trip a spring retained latch 324 thus permitting member 320 to slide axially to the left under the influence of spring 321, whereupon teeth 319 engage corresponding teeth 318 on hub 316 to turn shaft 300. Release is effected after one complete revolution when latch 324 re-engages member 320 and disengages the driving connection by sliding member 320 to the right.

As shaft 300 rotates, thus revolving cam 328, second from the left on cam shaft 300, the wedge pusher bail arms 325, 325', see also Figure 6, fixed on opposite ends of bail shaft 326 will be rocked by movement imparted thereto from the follower cam arm 327, also fixed to shaft 326 and angularly adjustable therewith. Arms 325, 325', on their lower extremities, are connected with a wedge driver plate 329 through suitable roller and channel connections, see also Figure 4, plate 329 in turn, extending for substantially the full width of the "A" unit and being guided for horizontal movement between opposed pairs of confining guide rollers 330 suitably secured for rotation against the side frames 150 and 150', see Figure 3.

As illustrated in Figure 4, plate 329 in plan view has the appearance of an inverted channel and horizontal movement of this member rearwardly will drive the wedge pusher 127 on transmitter 30T, see Figure 3, horizontally and to the rear to appropriately force a pattern wedge to its extreme inward position. The particular pattern operated upon will, of course, depend upon the step-by-step position of transmitter 30T, details of which have been fully considered.

The sine bar assembly includes a group of elements which reciprocate horizontally of the "A" unit through one cycle of throw and return per character under the influence of wedge withdrawal cam 335, Figure 9, adjacent the front end of cam shaft 300 during a revolution of the cam shaft for the purpose of withdrawing a pattern wedge from its extreme inward position to a prescribed degree representative of the width of a particular character. The term sine bar is applied herein for the reason that angular adjustment of that bar provides increments of spacing, which are directly proportional to the sine of the angle of adjustment of the bar.

For an understanding of the details of the sine bar assembly, reference is made to the following: The wedge withdrawal cam 335 drives follower arm 337 pinned on shaft 336 counterclockwise against the resistance of torsion spring 338, Figure 6, the latter of which is provided over the shaft to urge the follower arm roller in contact with the cam surface during the operating cycle. Shaft 336 extends across the "A" unit from the right to the left side, and is supported for oscillatory movement in bearing brackets 341 and 342. Adjacent bracket 341 on the left is a depending lever 340 corresponding to the depending portion of arm 337. Levers 337 and 340 are pivotally joined at their lowermost ends to short connecting links 339, 339', Figure 9, which, in turn, are further pivotally fixed to sine bar guide blocks 343 and 343', see also Figure 7, slidably arranged on companion rods 344 fixed at the front and rear respectively in depending braces 204 and 345. An elongated horizontal wedge withdrawal rake 346, continuous across the "A" unit, is pivotally supported and carried between guide blocks 343 and 343' to provide engagement with the wedge withdrawal block 128 on transmitter 30T. The extent of withdrawal of a pattern wedge under the influence of wedge withdrawal rake 346 will be limited by the abutment of sine bar 348 against one of the sizing levers 201.

On the right hand side of the unit assembly, block 343' reciprocates a yoke 47 fitted thereover to which the sine bar 348 is swivelly connected through threaded stud 349. On the left hand side of the unit, the connection is such that the left hand end of sine bar 348 may be adjustably positioned with respect to the machine. A worm 350 pinned on shaft 351, the latter rotating in the depending bracket 352 and guided in member 221, provides the requisite adjustment, worm 350 being arranged to engage a fixed rack 353 which rests on the surface of block 343. The left hand end of the sine bar 348 is pivotably pinned to yoke 355 at 354, the upturned edges of the yoke being in abutting relationship with the ends of worm 350, so that as shaft 351, carrying worm 350 is turned, it is also displaced axially over rack 353 to effect a change of position of the end of sine bar 348 with respect to guide block 343.

Remote control of this function is provided so that the position of the sine bar may be varied directly from the operator's position at the front of the keyboard. Dial handle 33, Figure 3, is backed up with a stationary reference line disc 357 fastened to the sheetmetal cover 358 and terminates in and is fixed with the elongated pinion shaft 359 rotatable in a bearing bracket 360 fixed at level L3. Large pinion 361 on the end of shaft 359 drives an elongated pinion rod gear 362 therebelow which is mounted for rotation in members 352, 352′ and, in turn, is engaged to turn gear 364 on the end of shaft 351. Further connection is made from yokes 347, 347′ to the fixed abutment plate 346′, Figure 8, which cooperates with rake 346 in controlling the position of wedge withdrawal block 128.

Referring back to Figure 7, sine bar 348, in the absence of interference, would otherwise be reciprocated for the full throw of cam 335, thus withdrawing a pattern wedge outwardly to its extreme position after it had been driven to its extreme inward position by the wedge pusher bail. However, if one of the various sizing levers 201 has been tilted into the plane of movement of the sine bar, the travel of the bar is interrupted by the abutment of the end of lever 201 against one of the raised surfaces 367 on abutment plate 368 fastened to the sine bar. Inasmuch as the travel of the sine bar, while member 346 is withdrawing pattern wedge 51 from its inward position, is effected by torsion spring 338, there is no harmful mechanical interference since the follower on arm 337 will merely ride off of the surface of cam 335 and the actual withdrawal action will be terminated by sine bar contact with sizing lever 201, thus leaving the wedge at its proper position for the spacing of the character chosen at the keyboard.

It will be noted at this point that the sizing levers 201 are graduated in length and that they are positioned to form a straight line proportion from end to end, the longest lever at the left and the shortest lever at the right. Long lever 201, representing the smallest wedge withdrawal when positioned to interrupt the sine bar travel, will result in the widest character. By the same token, the shortest lever 201 when actuated will give the narrowest character.

In the present physical embodiment of the invention, I employ the long lever for character spacing equivalent to 18 units and the small lever for 4 unit spacing, these being the values assigned to a representative type style hereinbefore indicated. For normal 12 point type size, the 18 units will, as an end result, give M width or 12 points. The short lever 201 will provide $\frac{4}{18} \times 12$ points or 2.66 point character spacing. Spacing of the other font characters will be effected according to the proportional value of their unit value to 18 units, multiplied by the set of the type. Occasionally it may be desired to open up the spacing between characters, as for example a 10 point, 10 set normal may be opened to 10 point, 10½ set in which case the actual widths will correspond in point value with the actual set; i. e., 10½ set, rather than with the normal type face design size. Conversely, it may be desired to reduce the set from normal in a limited fashion as when using 10 point, 10 set normal at 10 point, 9½ set spacing.

All variations in character set mentioned above are effected by a change of the angular position of the face of the sine bar with respect to the theoretical line joining the ends of the sizing levers. Thus, when the sine bar is adjusted to the position of the broken lines of Figure 7, the character spacing will be minimum for the physical embodiment of the invention described herein giving greatest wedge withdrawal in operation. With the sine bar as shown in the full line, the spacing will be maximum resulting in the least amount of wedge withdrawal. The range of set size is conveniently calibrated on the dial 357 at the keyboard.

An alternative method of setting wedges for character size is provided for by the apparatus of Figure 9*a* substituting a single wedge setting cam 335′ for the pusher bail and sine bar actuating cams 328 and 335 of Figure 9. Cam 335′ is driven by a suitable single revolution shaft 331 associated with the "A" unit driving mechanism, the latter of which is trunnioned for rotation in bearings supported at level L3.

As previously explained in the description of the sine bar 348, reciprocation of the bar to the left takes place until its leftward travel is stopped as by the use of one of the series of twelve sizing levers 201. As cam 335′ revolves in the direction of the arrow, the bell crank 332 trunnioned in bracket 333 on level L3 will rock according to the rise and fall of the cam. Clockwise movement will tend to draw link 334 thereabove to the right through the yieldable connection with bell crank 332 as at 393. The left hand end of link 334 is directly attached to the vertical element 394 of tongs 395 which element, in turn, is further pivotally secured at its lower extremity to the sine bar actuating lever 337″. Cam rise will result in clockwise rocking of the sine bar reciprocating lever until the sine bar is stopped. Further rise of cam 335′ will be reflected in further movement in the tong assembly 395 which will be absorbed in clockwise pivoting of the right hand tong member 396 which is pivotally fixed to bracket 397 as by the use of the short link member 398. This, in turn, will rock the wedge pusher bail arm 325″ counter-clockwise, on the lower end of which is the wedge pusher bail 329 arranged to abut wedge pusher member 127 on the transmitter. As the cam rise continues the wedge pusher bail will tend to set the wedge to the pre-set position of the stop member 128 thus effecting the expansion of the pattern corresponding with the character chosen at the keyboard.

It will be noted at this point that the wedge pusher bail arm 325″ is spring retained at its lower extremity in a clockwise direction. The effect of this spring will be to retain that member against the initial movement of cam 335′ during sine bar positioning leftward to the stop lever 201, whereafter the spring will yield to permit arm 325″ to be rotated counterclockwise. It will also be noted at this point that the yielding connection between the bell crank 332 and link 334 will permit the sine bar setting and wedge setting functions to take place first, after which any further rise of the cam necessary to ensure the greatest inward setting of the wedge on a pattern may be had.

Referring to Figures 8 and 9, face cams 371, 372 and 373, which are fixed on the right hand end on shaft 300 inboard of bracket 312, provide a source of motion for elements of the sensing units therebelow, the various linkages incorporated in these units being co-extensive with the length of a cradle assembly 30 at level L2 in order that the transmitter 30T, which traverses the cradle in step by step fashion under the linkages units, may be made to operate in setting character identification on patterns 30P. Other functions of the linkage units include lifting transmitter pins for clearance, indexing of the transmitter 30T from one pattern to the next, and reversing the travel of the transmitter for back-spacing or step-back.

Sensing bar cam 371, through cam roller 375, see also Figures 13 and 22, on the stub shaft 376, rocks the vertical bifurcated bracket 377 pivoted on support shaft 378. As bracket 377 is rocked it carries a similarly bifurcated horizontal member 379 to which are assembled a series of nine double ended levers 380 free to pivot on shaft 381 locked in the projecting lobes of member 379. The upper end of each lever 380 engages a notch in one of a series of nine parallel bars 279 previously referred to which are arranged to slide horizontally. The lower ends of levers 380 engage notches in a second series of nine intermediate linkage bars 383 which are likewise supported for horizontal sliding. When, under the influence of cam 371, the bifurcated member 379 is moved to the right, see Figures 13 and 22, then either the top bars 279 or the intermediate linkage bars 383 must likewise move to the right. Since the intermediate linkage bars are normally spring retained against such movement to the right by coil tension springs 384 disposed between the projection 384′ on bars 383 and a suitable fixed mounting on the machine frame, the normal tendency is for the bars 279 to slide to the right thus tilting levers 380 clockwise, intermediate bars 383 remaining stationary. When interference is established which will prevent a bar 279 from sliding to the right, then its lever 380 will be tilted counterclockwise to overcome the resistance of spring 384 and move a corresponding bar 383 to the right, thereby setting in motion the linkage assembly therebelow.

As previously explained, each of the nine upper bars 279 is provided with a single interference projection 278, Figure 22, normally aligned with a corresponding notch 276′ in one of the horizontally slidable bars 276 the latter of which are moved as a direct result of keyboard manipulation. If one or more of the nine levers 265 have been tilted by operation from the keyboard, then notch 276′ no longer aligns with its corresponding projection 278 and interference is established which will prevent those upper bars 279 from movement to the right. This, in turn, will result in the operation of one or more of the nine linkage units in accordance with a character identification combination from the keyboard.

Each linkage bar 383 has pivotally pinned thereto the upper vertically disposed ends of a pair of bell cranks 385, Figures 6, 8, 13 and 22, which are fulcrumed on shafts 386 fixed in frame 387 on level L3. Likewise, the horizontal ends of bell cranks 385 are pivotably joined to each of a pair of vertical extensions 388 which are fixed to the lower linkage operating bars 389. Hence, when bars 383 are reciprocated horizontally, the horizontal motion is transmitted to vertical motion in bars 389. The nine bars 389 are in alignment with the nine sensing pin plungers 130 in the transmitter 30T therebelow, see Figure 8, and will actuate the plungers accordingly.

For step-by-step indexing of transmitter 30T, cam 373, Figures 8 and 9, rocks the double bracket 377′, also fulcrumed on support shaft 378, at the rear of bracket 377. By a combination of linkages similar to those previously described for the sensing bars, one of the wide lower indexing bars 389′ will receive downward travel. Normally in the operation of the "A" unit, the bar 389′ on the left receives motion while the right hand bar 389′ is blocked. However, if the step back key is depressed at the keyboard, the right hand bar 389′ will be operable and the left hand bar will be blocked. By alignment of bars 389′ with the indexing levers 111, right and left, on transmitter 30T, Figure 15, their downward travel will actuate the transmitter indexing mechanisms hereinbefore considered. Selective blocking of bars 389′ will be understood in a description of the step back linkages and their operation at a later point in the specification.

Linkage cam 372, Figures 9 and 17, at the left side of cam 371, Figure 9, is provided for the purpose of lifting the sensing pins at each "A" unit cycle to clear the transmitter plungers from interference with the pattern sensing pins during step-by-step travel of the transmitter. To this end, cam 372 rocks the follower 391 through roller 390 and as an end result oscillates an intermediate position linkage bar 383″, Figure 17, secured to the wide bell crank 385″, Figure 8. Downward travel of lower bar 389″ on the lower end of bell crank 385″ will cause the bar to depress sensing pin lift plunger 138 on the transmitter, Figure 15, referred to in the detailed description thereof, to raise the transmitter pin plungers accordingly.

To the right of cam 371 on shaft 300, Figure 9, is the sensing pin frame actuating cam 374 used to depress frame 53 on the pattern during each cycle, thus clearing previously set combinations of sensing pin settings and providing for the setting of a new combination of pins according to selection at the keyboard. Cam 374 engages roller 390′ and oscillates the spring retained lever 392, Figure 18, which will reciprocate intermediate bar 383‴, Figure 8, which, in turn, through bell crank 385‴ will produce downward travel of the lower linkage bar 389‴ to contact and depress roller 144′ on the transmitter 30T, Figure 13, roller 144′ being interconnected with the sensing frame actuating mechanism as considered with the details of the transmitter.

"B" UNIT

The "B" unit 28, Figures 1, 1*a* and 1*b*, to which cradles are transferred subsequent to "A" unit operation, hereinbefore referred to in the general description of the machine, serves the purpose of interpreting or "reading out," through the medium of transmitter 30T, the coded signals established in patterns 30P which were "read in" while cradle 30 was in the "A" unit and actuates camera mechanisms accordingly. Furthermore, the "B" unit serves to regulate the travel of film in the camera for each character or space as wedges in the pattern are withdrawn by a proportional escapement drive.

Operating mechanisms in the "B" unit are elevated to level L3 above the carriage circulating level L2 on a suitable platform which is, in part, supported on an open rectangular frame 401 at the rear of the machine, see Figures 30 and 31. Figures 31 and 32 are illustrative of the "B" unit with a cradle assembly 30, shown in phantom, in position for interpreting signals. Drive for the "B" unit is taken from the continuously driven shaft 402 above level L3, Figure 31, to which is affixed a driving spur gear 403 mating with driven spur gear 404 thereabove to carry the drive to the primary cam shaft 405 through one revolution clutch 406. Continuation of the drive from spur gear 404 is had through idler gear 407 to spur gear 407′ on secondary cam cylinder shaft 408 thereabove through one revolution clutch 406′. Shaft 408, in turn, drives a parallel cooperating cam cylinder shaft 409 at the same rate of speed, but in the reverse direction through mating spur gears 410 and 411 respectively on the opposite shaft ends, see Figure 32. The shafting and gearing above mentioned is suitably trunnioned in right and left hand vertical end frame castings 412 and 412′ supported on a platform at level L3.

Cam shaft 405, see Figure 33, revolves a series of single and dual-faced actuating cams, which, with linkages to be described, perform "B" unit interpreting and actuating functions. On the extreme left hand end of shaft 405, outboard of frame 412, is the wedge withdrawal cam 413. Adjacent the left hand end of the shaft, inboard of frame 412, is a dual cam 414, the left hand face of which is shaped to regulate a sensing bar lowering operation, while the right hand face operates the sensing pin latch. The second cam 415 from the left inboard of frame 412, has a single cam face on its right side provided to index the transmitter mechanism 30T in step by step relationship with respect to patterns in the cradle 30. To the right of cam 415 is a second dual-faced cam 416, the left hand face of which is adapted to operate a "butterfly trip" for code bar positioning, the right hand face being arranged for resetting the code bars. Approximately midway of the shaft 405 is cam 417 which in the end result serves to withdraw a pair of selector levers employed for actuating prescribed guide pins for co-ordinate character locating in the camera, to the right of which is a camera locking cam 418. Near the right hand end of shaft 405 are a series of three cams including cam 419, which is employed to lift sensing pins, cam 420 providing for operation of a clutch throw-out detent, and cam 421 which effects a timed trip from the primary shaft 405 to the secondary shaft 408, the latter two of which will be considered in the following description of driving devices and controls.

The operation of the "B" unit is such that when a cradle of patterns moves therein, clutch 406 on shaft 405, Figure 31, is tripped to initiate driving engagement, and to turn the shaft 360° before disengagement. While one complete revolution of primary shaft 405 also completes a cycle of operation of a major portion of the "B" unit mechanisms, I find it desirable to trip a second clutching device 406' during the cycle of cam shaft operation and to continue the period of operation for some "B" unit mechanisms actuated from shaft 408 beyond the end of the cycle of operation of the primary shaft. Just as long as there are pattern signals to be interpreted in the "B" unit, the interpreting operations will continue, and when the end of a line is reached, operation will be discontinued and the cradle of patterns will be permitted to move back again to the "A" unit, thus freeing the "B" unit for operations with respect to a subsequent cradle to move in. Details of the tripping devices for the primary and secondary shafts are further elaborated upon in the drive description which follows.

The various component mechanisms of the "B" unit will now be considered in detail, taken in the order of location of the particular motivating cam on cam shaft 405, with no particular regard at this point for sequence of operation, the latter of which will be covered more fully in detailed description of the operation of the machine as a whole. Wedge withdrawal cam 413, on the end of shaft 405, Figures 32 and 33, is positioned to control the rocking of lever 436 which is vertically pivoted adjacent side frame 412. Pivotably interconnected with the top end of lever 436 is the wedge withdrawal link 439 of adjustable length, which, on its opposite end is pivotably connected with a depending rocker lever 440 pinned to wedge withdrawal shaft 441, the latter of which extends through and is trunnioned in frames 412, 412', Figure 33. Torsion spring 437 secured to shaft 441 on one end and to frame 412 is arranged to hold roller 438 on lever 436 normally against the face of cam 413. A rocker lever 440' pinned on the right hand end of shaft 441 corresponds with lever 440, each lever being, in turn, connected by means of a coupling link 442 to right and left horizontally rolling carriage members 443. Carriages 443 are constrained to move horizontally with respect to tracks 444 on a series of rollers 445 which are mounted between appropriate carriage side pieces bearing against the sides of tracks 444, the tracks being fixedly mounted with respect to platform L3. Short extension arms 446 depend from carriages 443 through suitable clearance slots in platform L3 to provide for a wedge withdrawal pivot shaft 447, Figure 33, supporting wedge withdrawal arms 448 and 448', Figure 32, between which extends a hooked wedge withdrawal rake 450. Rake 450 is substantially co-extensive over the width of the "B" unit so that it may engage the wedge withdrawal face of element 128 of transmitter 30T to withdraw the wedge of any pattern to which transmitter 30T is positioned.

The sensing bar lowering mechanism derives its actuation from the left hand face of cam 414, Figures 33 and 34, which contacts roller 456 on lever 457 pinned to shaft 458, the latter of which is trunnioned in a pair of bifurcated extensions of bracket 459. As shaft 458 rocks under the influence of the cam, it carries an H shaped depending lever 460, Figure 36, within which is bridged a pusher bail 461 adapted to engage the flat ends of each of a series of nine horizontally slidable sensing bar operating bars 462. Motion of bars 462 is restricted in a horizontal direction by means of opposed upper and lower comb-like guides 463, Figure 34, fixed at one end of the assembly to bracket 459 and to brackets 459' on the other end of the assembly.

For each of the nine slidable operating bars 462, there is a corresponding horizontal sensing bar 465 spaced therebelow and interconnected therewith by means of left and right hand bell cranks 466 the latter being suitably fulcrummed in fixed side blocks 464, the top end of each bell crank being confined between inner edges of a vertically slotted guide block 467 on bar 462 and the other end being directly pinned to the upwardly extending arms 468, 468' on the sensing bar. Each sensing bar 465 is biased downwardly by one of a series of staggered spring plungers 469 disposed in a plunger guide frame 470 secured to the base casting 471.

Sensing bars 465 are substantially co-extensive with the "B" unit and are in alignment with pins 130 on the transmitter 30T, see Figure 32. Thus, as cam 414 turns and permits the bars 465 to be spring urged downwardly, the extent of their downward movement will be regulated by the pin settings of a particular pattern in the cradle 30 under transmitter 30T.

Referring again to Figure 34, the right hand side of cam 414 for actuating the sensing pin latch engages roller 475 on arm 476 adjacent arm 457 and likewise pivoted with respect to frame members 459 on shaft 477 trunnioned therein. During the cycle of "B" unit operation, arm 476 will be rocked clockwise, thus also rocking a latch arm 478 secured to shaft 477. Latch arm 478, in turn, engages a sliding operating bar 462', Figure 33, which corresponds in operation and in horizontal location with the bars 462 in the sensing pin operative devices described above to force down a pin latch bar 465', Figure 35, which is normally restrained upwardly by a tension spring 481, Figure 34. Pivoting bell cranks similar to the crank arms 466 for the sensing bars serve to interconnect bar 462' with bar 465' and, it will be noted at this point by reference to Figure 32 that bar 465' is positioned directly above the pin 130'' on the transmitter. Thus, actuation of bar 465' serves to further actuate the pin locking mechanism described hereinabove in the detailed specification relating to the transmitter.

The face of transmitter feed cam 415 contacts a roller 482 secured to pivot arm 483, see Figures 33 and 33*b*, for indexing transmitter 30T from one pattern to the next during a cycle of operation of the "B" unit. Arm 483 is suitably arranged for pivoting on a shouldered stud mounted in one of the extension portions of the frame 459. Below the pivotal center of arm 483 and secured thereto, a split rocker member 484 engages the horizontally reciprocable operating rod 462'', the latter of which is interconnected by use of bell cranks with the vertically movable transmitter pressure bar 465'', Figure 35. Bar 465'' is spring retained upwardly as by the coil tension spring 487, Figure 34. For each revolution of cam shaft 485, the transmitter feed cam will provide one cycle of vertical up and down movement of bar 465'' which, by its alignment with the transmitter feed arm roller 116 therebelow, will step the transmitter from one pattern to the next.

The right hand face of cam 416 adjacent cam 415, Figure 34, contacts roller 488 on arm 489, the latter of which is pinned to shaft 490 trunnioned in bracket 459. As shaft 490 is rocked it carries with it a pusher member 491 therewith to which is secured a wear plate 492, pusher member 491 being suitably fixed to shaft 490. Wear plate 492, in turn, is arranged to engage the right hand vertical surfaces of slots 493 in each of a series of nine horizontally slidable code bars 494 in order to move these bars to the right against the biasing of tension springs 495 secured to their left hand ends. When bars 494 are disposed in their extreme right hand position, as illustrated in Figure 34, the notched left hand ends thereof will permit their engagement by one of a series of nine corresponding latch members 496 pivotally centered on latch bearing shaft 497 and restrained counterclockwise by springs 498.

The left hand side of cam 416 engages a roller 500 on cam arm 501 secured to shaft 502 also trunnioned in bracket 459. Shaft 502 has pinned thereto a short upwardly extending bifurcated lever 503 carrying a horizontally reciprocable butterfly carrier member 504 guided on a stationary transversely disposed pin 505. Horizontal member 504, in turn, carries nine doubleended butterfly levers 506 the top ends of which engage the depending extension arms 507 on latch members 496 and the lower ends of which engage the tapered upwardly extending ends of arms 468 secured to the left hand ends of senisng bars 465. In operation, and when one or more of the sensing bars 465 are disposed downwardly, corresponding with a pattern pin setting, the lower end or ends of butterfly levers 506 will be permitted to pass by the upper tapered extensions of arms 468 and thus, the particular latch member or members 496 corresponding thereto will engage corresponding code bars 494. If, on the other hand, sensing bar 465 is in a raised position corresponding with a raised pattern pin, the tapered upwardly projecting extension on member 468 will interfere with its corresponding butterfly lever and, during cyclic leftward travel of the butterfly carrier 504, the latch member 496 will be disengaged from its corresponding code bar 494 permitting that code bar to slide to the left under the influence of its tension spring 495 until it abuts against the fixed stop 508 secured to frame 459. The timing and inter-association of the code bar latching mechanism and code bar reset will be more fully treated in the description of automatic operation of the machine. However, for present purposes, it will be understood that the positioning of these code bars to the right or left in combination will establish certain relationships to result in horizontal and vertical movement of the master plate in the camera for the selection of a particular character thereon corresponding with that combination of pins established in the pattern while in the "A" unit.

The selector operating lever cam 417 provides for withdrawal of selector levers instrumental in the coordinate positioning of the master plate in the camera. By reference to Figure 33*a*, fragmentarily illustrating this cam and its follower, it will be observed that the face of cam 417 contacts roller 510 on cam lever 511 pinned to shaft 512, the latter being trunnioned in castings 459 and 459', Figure 34. Further pinned to shaft 512 is the bail member 513 co-extensive with sixteen aligned, tiltable bell crank code selecting levers 514 thereabove, see Figures 34 and 35. While Figure 34 indicates the use of nineteen levers 514, three of these merely serve the purpose of anchoring tension springs 517, to be later described, for an additional series of nineteen levers on the opposite side of the assembly. On the left hand end of shaft 512, Figure 34, is an adjustably fixed extension lever 515, to one end of which is secured a roller 516, Figure 35, which engages the undersurface of a companion extension lever 515' pinned to shaft 512', the latter being co-extensive with a series of eighteen tiltable, opposed bell crank selecting levers 514' and one special bell crank lever 514'' for space control located at the end of the series of levers 514'. Bails 513 and 513' are arranged to engage the notched ends of levers 514, 514' and 514'' in order to spread these ends, under the influence of cam 417, against the biasing tendency of interconnecting coiled tension springs 517, tending to pivot the levers into engagement with code bars 494 thereabove. Code selecting levers 514' are arranged to contact the five left hand code bars 494 and likewise, code levers 514 will contact the four right hand code bars 494.

Code bars 494 are each provided with a series of prescribed notches 494' on their undersides, see Figure 35*a*, to permit clearance for one particular pattern selecting lever 514 and a particular selecting lever 514', depending upon their positioning. To those who are familiar with coding devices of this description it will be understood that shifting of the code bars back and forth may be utilized to provide selective clearance and thus, one lever 514 and one lever 514' may be simultaneously permitted complete travel into the slots for further control, while the balance of the levers will be blocked, whereupon corresponding right and left hand pivoted pusher levers 518, 518' thereabove will be engaged and tilted correspondingly. As pusher levers 518, 518' are tilted they in turn will strike against their respective right hand and left hand interference pins 519, 519' and they will project these pins angularly upwardly of guide 520 into radial interference with cam surfaces 521, 521' on the rotating cam drums 522, 522'.

Cam drums 522, 522' are free to slide longitudinally, but are angularly fixed with respect to their supporting shafts 408, 409 by the use of appropriate internal roller guides and, while they are being rotated, they are each transposed to a specific longitudinal location by the interference of pins 519, 519' with their cam surfaces 521, 521', see Figure 30. As the drums are driven either leftward or rightward, the horizontally guided rack members 523, 523' thereabove will also be moved to the left or to the right through interconnection with the drums, as by the use of rollers 524 and opposed guide rings 525 on the left hand drum ends. Horizontal movement of racks 523, 523' will further serve to rotate pinion gears 526, 526' which are in engagement therewith to develop clockwise or counterclockwise rotation of shafts 527, 527' and give co-ordinate travel to the master plate in the camera. It will be noted at this point that two like pinions 526 are used, spaced above and below the right and left hand ends of rack 523 to provide an equalized drive in opposite rotational directions for vertical master plate travel, while but one pinion 526' is employed for horizontal movement of the master plate. More comprehensive treatment of these functions is had in the description of the camera which follows.

One revolution of cam drums 522 takes place in a single cycle of operation. Any one pin which interferes with a drum cam, irrespective of the drum location at the time, will carry the drum to a central position at that pin during 270° of the cycle. For the balance of the cycle, the pin will be forced out of engagement with the cam drum by means of the extension cams 528 which are centrally located with respect to the drum cams, see Figure 35. To hold the cams at their selected position during the camming out process when no other longitudinal control is had, I provide fixed comb-like members 529, 529' which are slotted to engage extended circumferential ridges 525' on the end guide rings 525, the latter of which are suitably arranged on the guide rings for that portion of the periphery of the drum over which lateral control is otherwise lacking. Acceleration is minimized in cam moving apparatus by providing a series of auxiliary cam surfaces 521' intermediate of the end cam surfaces 521, the auxiliary surfaces serving the particular function of driving the cam drums for short distance pick-up to the same central position as with the end cam surfaces.

Cam 418, next to the right of cam 417, Figure 33, for camera locking is a side face cam arranged to contact roller 530, Figure 35, on rocking lever 531 pinned to shaft 532, the latter of which is coupled with a horizontal shaft extending to the camera. To the right of cam 418 is another side face cam 419 engaging cam roller 533 on lever 534 to rock shaft 535 during "B" unit operation. Shaft 535 is, in turn, trunnioned in extending portions of bracket 459' and carries a second lever 536 arranged to reciprocate an operating bar 462''', Figure 35, at the left side of the sensing bar operating bars 462. Operating bar 462''', by bell crank interconnection with an actuating bar 465''' therebelow will serve to depress the transmitter plunger 138 and lift the sensing pins as the transmitter is indexed from pattern to pattern.

In addition to those cams which are carried on cam shaft 405, a single cam 537 is provided on the end of the cam cylinder shaft 408, Figure 32, for control of the cradle travel. This cam and its inter-associated linkages will be described at a later point in the specification. On cam cylinder shaft 409 there are two cams 538 and 539, the former serving to lock the master plate in the camera and to trip the camera shutter and the latter being provided to reset the shutter.

Cam 538 has a gradual slope followed by a dwell and then a more abrupt slope. During the period of contact of roller 540 located on pivoted follower lever 541 across the gradual slope of cam 538, the notched end of horizontal arm 542 pivoted to follower lever 541 will engage a pin 543 on the pivoted auxiliary lever 544 to result in horizontal right hand thrust of the rod member 545 and, as will be later understood in the description of the camera, this motion will effect locking of the master plate in position for photographing. Further movement of lever 541 during the contact of cam roller 540 against the abrupt rise in the surface of cam 538 will trip the camera shutter. Just as long as the notched arm 542 remains in contact with pin 543 on lever 544, there will be effected master plate lock up and shutter trip in the camera. However, in the event that a function signal on the order of a space indicator is given, arm 542 will be lifted away from the pin on lever 544 during the period when that lever is returning to its left hand zero position. At full zero position an adjustable stop screw 546 on lever 544 will abut against the stationary stop pin 547 on bracket 548.

Referring to Figure 35, the signal for a function is regulated by the two left hand code bars 494 and, when notches in these bars are in alignment, the pivoted lever 514'' will be permitted to enter these notches, whereupon the depending end of lever 514'' will cause the long link 425 to be moved to the right carrying with it a short vertical link 426 pinned to rock shaft 427. On the opposite end of the "B" unit, shaft 427 carries the extension lever 428 interconnected with the vertically guided slide 429, see also Figure 32, elevating a series of two spaced operating pins 430. Upon being elevated, the lower pin 430 will strike against the lower side of the toggle plate 431 thus shifting the plate counterclockwise about its pivot center and raising horizontal arm 542 away from the pin 543 on lever 544. When slide 429 is lowered, the upper pin 430, by striking against the upper surface of toggle plate 431 will permit arm 542 to return to operating position with respect to the pin 543 on lever 544. Thus, as will be more fully understood in connection with the description of the camera, a function signal from the pattern will cause the master plate lock-up and camera shutter trip to become inoperative.

The general purpose of the function key and the chain of operation just described, whereby the shutter trip and master plate lock-up are rendered inoperative, will be indicated. For example, in setting up specialized matter as in the case of mathematical or chemical formulas, numbers written in as super-scripts or sub-scripts may be set up on different lines from the line on which the basic characters are set up. In such cases in making up the lines of which the sub-script or other displaced characters are to be located, the basic material on the principal line is again set up on the key-board in order to step off the mechanism up to the point where the displaced character occurs. However, the function key is actuated and serves to prevent the photographing of the characters on the base line and will be manipulated to permit only the setting up and photographing of the sub-script and super-script characters when the operation has proceeded to those points. In short, the function key may be employed wherever it is desired to step off the characters without photographing or printing them.

THE CAMERA

The camera unit 29, is fixed to the supporting framework at the front and to the right hand side of the keyboard position as illustrated in Figures 1, 1*a* and 1*b*. Mounting brackets 550, 550' resting on base 27 at level L1, see Figures 36 and 37, are provided to secure the camera in position with the large main light tight casing 551 overhanging the front of the base. Fixed to the main casing 551 is a secondary or outer casing section 552; and a front closure plate 553 is provided to complete the camera casing assembly, to the latter of which is hinged a master plate access door 554.

The main camera casing 551 contains the film with its mobile support permitting "character to character," "line to line," and "zone to zone" indexing. Secondary casing 552 encloses the film space against the entrance of light and supports the lens 555 and shutter 556 in their proper relationship with respect to the film. Adjacent the outer face of secondary casing 552 is the master plate 557 with supplementary mechanisms which provide for co-ordinate movement corresponding to character positioning. A source of light 558 and condenser 559 are secured to the front access door 554, through an aperture of which light from the source may travel to the master plate and lens and thence to the film on the optical axis of the camera. Drive for the film, shutter, and master plate, hereinafter described, is received from the "B" unit in the form of rotation or oscillation of shafts which enter the camera casing through suitable light tight bushings.

The master plate 557, see Figures 38, 40 and 41, consists of a rectangular film style negative with transparent areas corresponding to characters of the alphabet, points, and figures, centrally pressed between two plates of optical glass 563, 563', devoid of distorting imperfections. The glass plates are maintained accurately positioned in a master plate case 564, the case, in turn, being arranged to slide vertically between the depending sides of an open frame 564' sustained on a cross slide carrier 564'' and guided on its lower edge by the support member 564S. By the co-ordinate transposition employed, any character on the master plate may be accurately positioned on the optical axis of the camera in front of the lens for photographing on film.

The master plate 557, Figure 40, is divided into six zones, three of which are in the upper half of the plate and the other three in the lower half of the plate. The bold, roman and italic upper case alphabets, together with some of the points, are inverted in the upper half section of the master plate, and the lower case alphabets are in the lower half of the plate. The three vertical subdivisions preferably contain these three characteristic designs of a particular style of type as the italic, roman and bold, although any other suitable combination of type faces or styles may be situated in these areas depending upon requirements. The points, figures and logotypes are suitably dispersed in the spaces remaining apart from the alphabetical characters with those most frequently used located centrally of the master plate in order that the extent of master plate displacement during composing, both horizontal and vertical, will be maintained at a minimum. Likewise, the alphabetical characters are also located centrally on the master plate so that those most frequently used in normal composing require minimum travel of the master plate to the right and left and up and down.

Light from source 558, Figure 37, traveling through condenser 559 and thence through the master plate will be focused on the film via lens 555 to expose the film precisely in accordance with the character shape, thus resulting in a positive image. Characters are, as noted above, inverted in the master plate and hence become erect images when photographed and they are aligned so that during photographing the left hand column margins of composition will be uniform. Coordinate spacing of the characters on the master plate is equal, the specific character spacing on film being taken care of by non-uniform film travel during cyclic operation of the machine and alignment is maintained for the horizontal rows of characters to provide uniformity of lines on the finished film.

The co-ordinate movement of the master plate is derived from the "B" unit. Reviewing the derivation of master plate motion from the "B" unit, the five left hand code bars 494, Figure 35, are used to selectively control the positioning of drum cam 522 to one of eighteen locations in accordance with that particular positioning pin 519 which was placed in interference therewith. Following this to the camera, Figures 37 and 40, one of eighteen horizontal positions of the master plate will be aligned on the optical axis of the camera corresponding with the eighteen vertical character rows. Likewise, the remaining four right hand code bars 494, Figure 35, through pin 519' and drum cam 522', are employed to position the master plate vertically to one of the sixteen horizontal rows of characters. By simultaneously effecting vertical and the horizontal movement, any single character on the master plate may be rapidly positioned on the optical axis of the camera to be successively photographed at each cycle of "B" unit interpreting. In order to maintain a minimum total master plate displacement, I arrange the characters as illustrated in Figure 40 as aforementioned in two horizontal zones of upper case characters and three vertical zones according to the design of the type face as roman (central), italic (right hand) and bold (left hand). I further minimize travel by selectively placing those characters most frequently used such as the vowels toward the center of the plate and its zone divisions.

Master plate movement vertically of the camera is controlled by the two equalizing horizontal shafts 565, 565', Figure 36, which are driven by shafts 527 in the "B" unit and are suitably trunnioned in the camera casing 551. On the end of each of these shafts is a small spur pinion gear 566, Figure 38, arranged to engage idler spur gears 567 rotatably secured adjacent the camera frame. From previous description it will be recalled that shafts 527 in the "B" unit, to which shafts 565, 565' are thus joined, turn simultaneously and in opposite directions under the control of the single rotating cam drum 522. Each of the two larger spur gears 567, in turn, engages one of the left and right, vertically guided, slidable rack members 568, 569 appropriately confined between oppositely disposed pairs of aligning rollers 570 which are in fixed relationship with the camera frame. Bridging the depending ends of the vertical rack members 568, 569 is a horizontal master plate case supporting bar 571 upon which the master plate case 564 is arranged to roll horizontally to the left and right. Thus, as pin settings from patterns are successively interpreted in the "B" unit for vertical master plate positioning, corresponding upward or downward movement will be effected in the master plate to index the plate to the particular horizontal column in which the character is located.

Horizontal travel of the master plate is controlled from the centrally located shaft 572, Figure 36, which derives its actuation from the other drum cam 522' in the "B" unit during operation thereof. Motion of this shaft, see Figures 37 and 38, is transmitted to a dual pinion 573, the outer gear of which engages one element of the dual segment 574 suitably trunnioned in the camera frame, the latter of which, in turn, is positioned to engage the horizontal rack 575 fixed to the top edge of the cross slide carriage 564". Carriage 564" rolls on the horizontal guide bar 577 secured to and spaced from the camera frame. The inner element of pinion 573 meshes with an idler gear 573' which, in turn, engages the inner member of dual segment 574. Thus, if pin member 574' interconnects the outer element of dual segment 574, with the lower segment, the motion imparted to rack 575 will be in one direction, while if the inner member of dual segment is pinned to lower segment 577, motion will be in the reverse direction.

Upper and lower pairs of guide rollers 578 supported on carriage 564" contact the fixed cross-slide 577 to maintain alignment of the carriage during its horizontal travel. To detach the master plate carriage 564" from cross-slide 577 it is merely necessary to rotate the latch member 580 until the flat portion is in a lower horizontal position, permitting the slide to be removed from association with its supporting pins 579 fixed to carriage 564". Accordingly, in addition to the vertical positioning of the master plate, as hereinbefore described, provision is made to move the master plate horizontally so that the vertical column containing any particular character on the master plate may be simultaneously established on the optical axis of the lens.

Referring now to the devices used to control loading and positioning of sheet film in the camera, film holder 560, Figures 39 and 39*a*, after being discharged from the film case 561 at the right into the camera becomes an integral part of the film carrier head 581, the latter of which is arranged for horizontal and vertical travel during character to character indexing and during line to line and zone to zone control. When loading film in the camera, see Figures 36, 36*a* and 36*b*, the film case 561 carrying a fixed, cylindrical inner sleeve at one edge mating with a concentric, rotatable outer sleeve 583 is inserted, bayonet fashion, into the fixed receptacle 584 with pin 585 in the outer sleeve engaged in a corresponding groove 585' in receptacle 584. This loading takes place with the film case 561 disposed in the position of the broken lines of Figure 36 and in this position the aperture 586, Figure 36*a*, at the end of the film case is blanked off by the concentric sleeve. At the same time an aperture 586' in the outer concentric sleeve is in alignment with aperture 586" opening into the camera, the latter of which are arranged at 90° with aperture 586 in film case 561. Film case 561 is then rotated through 90° to the position of **36*b* so that aperture 586 aligns with apertures 586' and 586" in the outer concentric sleeve and in the receptacle respectively, whereupon film carrier 560 may be discharged into the camera as by the use of lever handle 32**.

Carrier head 581, see Figures 39 and 39*a*, may slide horizontally on shaft-like track 581', the latter of which terminates at its ends in elongated, opposed brackets 587, 587' located within the left and right sides of the camera casing 551. Brackets 587, 587', are, in turn, slidably supported for vertical movement on the left and right hand bracket guides 588, 588' fixed within the camera casing. Thus, the film holder 560 with film may be moved horizontally and vertically for positioning with respect to the axis of the camera lens.

Positioning of the film carrier horizontally is provided both during "character to character" and "zone to zone" control. Referring to the central sectional view of Figure 37, it will be noted that film holder 560 carries an elongated rectangular slide bar 589 across its upper margin which engages a corresponding channel in the front edge of carrier 581 and is suitably locked to the carrier. On the rear edge of carrier 581, behind track 581', is an irregularly shaped slotted guide plate 590, see also Figures 39 and 39*a*, which depends downwardly therefrom to further engage a lower guide track 581' the latter of which is supported at its ends in brackets 591, 591' secured to depending portions of brackets 587, 587'. Movement of carrier 581 with film holder 560 to the right and to the left is controlled by a horizontal sliding rack 592, Figure 39, fixed to the carrier which carries an interconnecting pin 593, the latter of which engages the vertical slot in the irregular guide plate 590; pin 593 being fitted with suitable anti-backlash bushing and spring elements as illustrated in Figure 37 to avoid lost motion in the slot.

Referring again to Figure 35, horizontal drive for rack 592 above-mentioned, is controlled from the step-by-step movement of transmitter 30T over the cradle during wedge withdrawal operations while cradle 30 is in the "B" unit, resulting in step-by-step rotation of the centrally located horizontal shaft 595. Shaft 595, in turn, see Figure 36, through a suitable universal joint, drives stub shaft 597 carrying the differential spider 598. By the use of ring and pinion gears associated with spider 598, and by locking the spur gear 599 attached to the front ring gear, angular movement of a second spur gear 600 trunnioned with the rear ring gear over stub shaft 597, is double that of shaft 595 in the same direction. Spur gear 600, in turn, meshes with driven gear 601 on shaft 602, and on the end of shaft 602 is a slidable dual driving spur gear 603 which, as illustrated, engages the driven spur gear 604 fixed on shaft 605 trunnioned in frame 596. Within camera casing 551, and on the opposite end of shaft 605, see Figure 39, is the spur driving gear 606 engaging rack 592.

Dual driving gear 603 on jack shaft 602 is slidingly keyed to the shaft and may be shifted forwardly or rearwardly as by the use of shift lever 607. When in the rearward position, as shown, the drive through to rack 592 will be as outlined above, providing counterclockwise rotation for driving gear 606, Figure 39. If, on the other hand, lever 607 is shifted so that the rear element of the dual driving gear 603 engages idler 608, then the drive to shaft 605 and gear 606 will be in a reverse or clockwise direction by reason of the engagement of idler 608 with a second driven gear 604' adjacent gear 604 on shaft 605, thus reversing the direction of travel of rack 592. Hence, it will be seen that film holder 560 with its associated parts may be selectively moved either from left to right or from right to left, step by step in coordination with the withdrawal of wedges in the "B" unit. While shaft 595 from the "B" unit serves to control the step-by-step positioning of rack 592 in the camera, the actual driving force required to move the rack with its interconnected elements is provided by means of the tension spring 609 located behind the camera casing, Figure 36, illustrated schematically in Figure 43. As shown in the full lines of that view, spring 609 is interconnected between a pin 610 on segment 611 pivoted to casing 596 as at 612 and a similar pin 610' on overthrow arm 613, also pivoted at 612. A stop pin 614 on adjusting lever 615 serves to prevent angular displacement of arm 613, lever 615, in turn, being stopped by pin 616 on the transmission frame. It will be observed that the resulting tendency is for segment 611 to move clockwise thus turning pinion 604 and shaft 605 counterclockwise as desired. Should clockwise rotation be desired for reverse photographing, then by shifting lever 615 manually in a clockwirse direction through approximately 60° to the broken line position, lever 613 will move a greater angular distance to its broken line position with lever 615 in stopped position against pin 616'. In this position spring 609 will be disposed below center 612 tending to rotate segment 611 counterclockwise to further provide clockwise rotation for pinion 604 and shaft 605.

Zone to zone control, Figure 36, and diagrammatic Figure 44, is had through the use of a spring biased segment stop 617 engaged with the adjustably locked spur gear 599 in the differential transmission described hereinbefore. Angular movement of segment 617 will, as an end result, provide rotation of gear 599 which gear, in turn, supplementing the step-by-step wedge withdrawal control, will displace film holder 560, Figure 39*a*, over a prescribed distance during transfer of composing from one column of film to an adjacent column. Thus, after one column of composition is completed and exposed on the film, segment 617 will be released to shift the film holder 560 and to thereby place a new vertical reference line in position for columnar photographing. Detail description of the stops and the trip mechanism to effect zone to zone shift will follow a description of the indexing apparatus.

Segment member 617, Figures 42 and 44, is actually a pair of individual segment gears side by side, each gear having spur teeth on its peripheral portion and each being angularly adjusted with respect to the other to avoid backlash during engagement with spur gear 599, see also Figure 37. The above parts of segment member 617 are adjustably fixed with respect to each other and they are appropriately pivoted at center 618, one of the two members having the upwardly extending arm 619 opposite the pivot center, the latter of which is arranged to selectively engage adjustable stops 620, Figure 42, on the arc shaped guage bar 621. Biasing of segment 617 is controlled by the use of a coiled tension spring 622 fitted between spring post 623 and a similar post 623' on the pivotally floating control arm 624, the control arm being in abutment with one or the other of two spaced stop pins 625 on the L shaped shift lever 626. When disposed as illustrated in the angular position of Figure 44, the upper extremity of shift lever 626 will strike against a fixed stop 627, and tension spring 622 will be arranged above the pivotal center 618, thereby tending to retain segment 617 clockwise. When shift lever 626 is repositioned clockwise against fixed stop 627', then floating lever 624 will swing into abutment with stop pin 625 on lever 626 at an increased angle with respect to the displacement of the lever and spring 622 will assume a new position below the pivotal center 618, as shown in Figure 42, and will therefore tend to bias segment member 617 counterclockwise. During machine operation arm 619 will initially be positioned at a stop 620 located at a central vertical position so that spring tension either clockwise or counterclockwise will be dependent upon the position of the lever 626. Then, to shift film from one column to the next column, the arm 619 may be released to one or more further adjustably fixed stops 620 which are angularly disposed along the guage bar 621 either to the right or to the left depending upon the established position of lever 626.

The driving mechanisms for character to character control and zone to zone indexing which result in horizontal film travel have now been considered. Tripping of the zone to zone mechanism takes place after the film carrier has moved upwardly from its lowermost position to the topmost position in line to line steps or through operator manipulation of the vertical field adjustment by means of the handle control member 912, Figure 37*a*, which connects to elevating shaft 632 through a suitable gear reducing element 911.

After each line is completed, and when a cradle is moving from the "B" neutral position to the "B" unit proper, a cam in the driving mechanism, to be later described, imparts a reciprocatory motion to the angular link 628, Figure 36, at the rear and left side of the camera transmission, which is interconnected with the oscillating disc member 629, see also Figure 37, to which is pivotally secured a pawl 630 spring biased into engagement with a ratchet 631 secured to the vertical shaft 632. Shaft 632 is trunnioned in a lower bearing member 632' and carries, adjacent its upper extremity, a fixed spiral pinion gear 633 which is in engagement with a worm gear 634 on the elevating shaft 635, the latter of which further carries a pair of spur pinion gears 636, 637 meshing with rack teeth cut in the depending legs of the vertically guided film carrier brackets 587, 587'. Thus, before a cradle takes its position in the "B" unit, motion is imparted through the aforementioned transmission to step up the film carrier a distance equivalent to the line to line spacing. Regulation of this spacing may be had by controlling the arc of travel of pawl 630 in contact with ratchet 631 as by the use of the adjustable shield 639, Figures 36 and 37, the latter of which may be moved from the keyboard by interconnection with the horizontal adjustment member 640.

When the film carrier is in its lowermost position, as illustrated in Figure 39, the right angle trip member 641 situated on the upper inside edge of the left hand carrier bracket will be in engagement with the horizontally pivoted trip arm 642 which carries a link member 642' extending upwardly into engagement with the crank lever 643, the latter of which is pivoted to the camera casing and spring urged counter-clockwise. When the film carrier has travelled to its upper extremity, trip 641 will strike against the leftwardly projecting end of crank lever 643 thus tending to force the vertical link 643' on the opposite end of the crank downwardly. Link 643', in turn, is joined at its lowermost extremity with a slidable pressure member 644 the bevel edge of which engages the upstanding pins 645 and 646 to disengage the ratchet dog 647 and the pawl 630. Upon being thus disengaged, shaft 632 and interconnected shaft 635 will be free to turn and the weight of the film carrier and its associated parts will carry the film by gravity to its lowermost extremity, until the travel of the carrier brackets 587 and 587' is interrupted by the left and right hand stop abutments 651 and 652. A block of suitable resilient material 653 may conveniently be secured to the abutment members 651 and 652 to arrest the motion of the film carrier brackets without appreciable noise or jarring. At the same time trip 641 will engage arm 642 tending to pull down link 642' and lever 643, thus raising connector 643' and disengaging pressure member 644 to permit pawl 630 and dog 647 to return to operative position with respect to ratchet 631.

Zone to zone trip is effected at the time that the trip 641 member abuts lever 643, this action causing the rightwardly projecting extension 655 of lever 643 also to rock the short lever 656 pinned to one end of shaft 657, see also Figure 37, the latter of which is trunnioned in a U-shaped bracket 658 secured to the camera casing. On the opposite end of shaft 657 is a second short lever 659, which has a pin and slot connection with lever 660 to rock the bail shaft 661 mounted in a pair of brackets 662. Intermediate of brackets 662, bail shaft 661 carries an elongated pusher bail 663 suitably aligned to depress the depending latch member 664, the latter of which, upon being moved, permits arm 619 to drop back to the next adjustable stop 620.

The master plate lock-up and camera trip is performed through the interconnection with the second reciprocating rod 665 located at the left hand side of the camera assembly, Figure 36, rod 665 deriving its back and forth motion from the "B" unit. As rod 665 is rocked forwardly it in turn, rocks lever 666 located centrally above the camera in a counterclockwise direction and this movement, in turn, will tend to rock a second lever 667 clockwise. Lever 667 is pinned to a vertical camera locking and trip shaft 668, Figure 38, trunnioned in suitable bearings in the camera frame and performs the dual function of first, locking the master plate to a prescribed rectilinear position according to the character position and second, tripping the shutter of the camera for an exposure. The former function, that of locking the master plate in position, is further a dual operation consisting of locking action in the vertical plane and locking in the horizontal plane. Horizontal locking is effected by means of the spring biased gate member 669 free to pivot over vertical shaft 668 and moved by the short engaging arm 670 pinned to shaft 668. Vertical locking takes place by means of similar gate 669' thereabove also trunnioned over vertical shaft 668 and actuated by means of the engaging arm member 672 thereabove also pinned to shaft 668.

Referring to Figures 37, 38, 40 and 41, it will be observed that the upper gate 669' carries a vertical, saw-toothed plate 671', the depressions in which are arranged to accept a reversible, extending, horizontal locating edge bordering the upper edge of the master plate frame. Likewise, the lower gate 669 carries a straight, vertical plate 671 which may be inserted in the depressions of the reversible, extended, saw-toothed locating edge bordering the lower extremity of the master plate frame. The pitch of the depressions in the saw-toothed elements corresponds with rectilinear positioning of characters in the master plate and thus, if the master plate is approximately positioned horizontally and vertically from the "B" unit to a particular character location, the locking action which is effected as the gates move in will locate the master plate precisely to character position. Accordingly, while there may be a reasonable amount of lost motion in locating the master plate from the "B" unit, this lost motion is eliminated by the precise location gained from the horizontal and vertical gate members on the locking device.

As vertical shaft 668 turns and following the action of master plate locking, see Figure 38, it will also tend to turn the horizontally disposed lever arm 673 for actuating the bell crank 674. Lever 673 is interconnected with and trips the shutter through a vertically pivoted crank member 675, the latter of which on its lowermost end is notched to engage the spring biased shutter trip lever 676.

Reset for the shutter is performed by the reciprocation of rod 677 from the "B" machine which enters the camera adjacent the top left corner thereof and which is connected to the horizontally disposed rocking lever 678, the latter of which will turn vertical shaft 679 suitably trunnioned within the camera casing. Adjacent the lower end of shaft 679 is a crank arm 680 interconnected with a horizontally disposed twisted link member 681, the right hand end of which is connected to the short arm of a bell crank 682. The long end of bell crank 682 engages the depending link 683 which is further pinned to the vertical shutter re-set slide 684, the latter of which is suitably arranged to engage a projection, not illustrated, on the shutter slide adjacent therewith and to draw the shutter slide upward to a cocked position for a subsequent tripping. This arrangement of a focal plane type of shutter is well understood by those conversant with camera technique and need not be further elaborated upon.

It is important to note at this point that the method pursued in projection of the character from the master plate to the film is such as to present the film in the focal plane of the lens giving exact character size without enlargement or reduction. In this manner the design of the letter on the master plate suffers no distortion as compared with photo-lettering and photo-composing machines of a style which employ enlargement or reduction from the master positive or negative to the film. This feature is particularly important in the accumulation of text type composition where characters are relatively small and where enlargement, for example, would tend to reduce serifs and fine lines resulting in imperfect copy or produce distortion which would present an undesirable appearance in the final printed result. In all instances of photographing the film is stationary and is positively pressed into the precise focal plane as by means of the pressure member and the reacting support thus further ensuring an exact reproduction from the master plate.

DRIVING DEVICES AND CONTROLS

Power for the operation of the composing machine of my invention is derived from a central electric motor 700, Figure 45, inverted on a hinged belt compensating base 701, Figure 46, appropriately fitted to the framework of the machine. From the motor, the drive is continued through a speed reducer 702 and thence upwardly by V belt 703 to a V pulley 704 fixed to the longitudinal drive shaft 705 located directly above the speed reducer and trunnioned in suitable bearing supports above level L1. From shaft 705 the drive is further interconnected with and provides power to the "A" unit, the "B" unit and the cradle traverse; the branches leading to these sub-mechanisms being coupled therewith through the use of clutches and interlocking controls to be hereinafter described. Motor 700 may be wired for a plug-in connection to a convenient source of current and appropriate switching means under the operator's control may be used for starting and stopping.

Figures 47, 48:
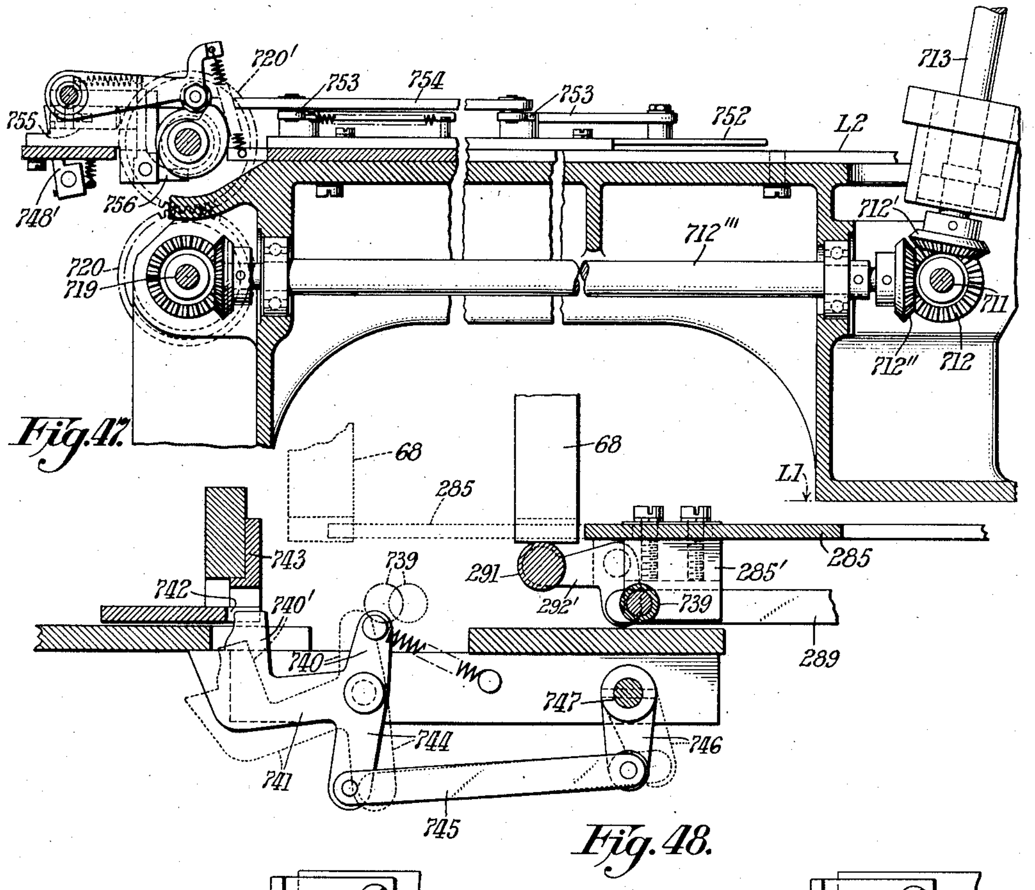

For the "A" and "B" units, see Figure 45, the longitudinal drive shaft extends to the right along the back of the machine and adjacent the right hand end, it is coupled with a stub shaft 711 carrying a driving bevel gear 712, see also Figures 45*a* and 47, which, in turn, meshes with driven bevel gears 712′ and 712″, the former gear being secured to the angular, upwardly directed shaft 713, see Figure 45*a*. Suitable provision is made to interconnect shaft 713 with upper drive shaft 402 for the "B" unit directly thereabove at level L3, as by the use of further bevel gearing outboard of the machine frame. Driving interconnection from shaft 402 is effected the "B" unit as hereinbefore described extending from spur gear 403 to primary cam shaft 405 and secondary cam shaft 408. For the "A" unit, upper drive shaft 402 extends at level L3 centrally of the machine and by the use of still further bevel gearing, carries the drive to spur gear 714 on shaft 715, gear 714 being in mesh with driven gear 315 in the "A" unit, Figure 9.

Referring again to Figure 45, selective transfer of cradles 30 to and from the four operating and neutral positions, as briefly treated in the detailed description of the cradle, is effected longitudinally by the use of front and rear helical feed screws 716 and 716′, leads of which are adapted to engage the fixed cradle traverse rollers 96, 96′, Figure 10. During longitudinal travel the cradle is guided by rollers 718 on turntable 717, 717′ during periods when the turntables are not operating, and by idler rollers 718′ axially secured to the base plate at level L2. Transverse travel of the cradles with respect to the machine is likewise effected by engagement of rollers 718 on turntables 717, 717′ between the spaced cradle guide shoes 97, Figure 6. It will be noted that each turntable has two diametrically opposite rollers 718 and, for a shift of cradle position, the turntables will revolve 180° with the cradle under control of one set of these rollers. The opposite set of rollers moving in the reverse direction will pass the cradle by means of suitable clearance between shoes 97.

The power take off from main drive shaft 705 for the front helical feed screw 716 comprises the bevel gear connection 712, 712″, see particularly Figure 45*a*, gear 712″ being located on the transverse shaft 712‴ extending from the rear to the front of the machine. By the use of a like set of bevel gears at the front, the drive is continued to the short spindle 719 which carries a driving spur gear 720 meshing with a driven spur gear 720′ thereabove freely rotatable on feed screw 716, Figure 45. Engagement of spur gear 720′ with screw 716 is effected upon operation of the toothed clutch 721′, as will hereinafter be more fully described in connection with Figures 49, 49*b* and 50*b*. For driving lead screw 716′ at the rear a similar interconnection is made from shaft 705 to spur pinion 720″ on the end of shaft 705 meshing with driven spur gear 720‴, the latter of which is rotatable on and may be coupled with lead screw 716′ through clutch 721 (see the upper left-hand portion of Figure 45).

The turntable drives, Figures 45 and 45*a*, also originate in the elongated pulley shaft 705 at the rear of the machine which carries a centrally located pinion 725 engaging idler 725′ meshing with spur gear 726 on a countershaft 727. From countershaft 727 the drive continues through a pair of bevel gears 728, 729 to an intermediate transverse shaft 730 supported for rotation directly below the level of the turntables. Adjacent the opposite end of intermediate shaft 730 is a driving spur gear 731 to turn a mating spur gear 732 therebelow mounted on shaft 733, the latter of which carries a front bevel gear 734 in mesh with a corresponding bevel gear 735. Bevel gear 735 is, in turn, connected through a clutch 736, Figure 45, to shaft 737 extending longitudinally of the machine to the left and carrying a pair of opposed worms 738, 738′ for driving suitable worm gears revolving the turntables in opposite directions. An identical power take-off is effected for the turntables on the opposite end of the machine.

Actuation of clutch 721′, Figure 45, for engaging the front helical feed screw 716 to move a cradle longitudinally from the "A" unit to the "B" neutral position is controlled primarily from the operator's position at the keyboard, Figure 3, by manipulation of the justification control handle 39. At the same time, handle 39 also serves as a release for the cradle in the "A" unit. In the latter instance, the underpivoted catch lever 40 is squeezed upwardly against the biasing pressure of the small coil spring used therewith to normally separate the lever from handle 39. This will tend to move the rearwardly extending end of handle 40 downwardly so that its rear face 40′ will clear the fixed stop plate 41 fixed to the machine framework and permit the handle 39 to be pivoted to an extreme counterclockwise position.

It will be recalled at this point that justification of patterns is manually performed by first depressing handle 39 to spread the space wedges for column width; and that by actuating the auxiliary handle 39′ the bell crank bail 291—292′ secured below the driver plate 285 may be rocked to lift wedge plates 68 to their normal upward position. When handle 39 is depressed fully, as with the present control, by actuation of the under-pivoted handle 40, the plate member 285 will be moved rearwardly beyond the throw required for maximum justification to a supplementary position for cradle control purposes about to be described.

Referring to Figure 48, the full line view illustrates the position of plate 285 and accompanying parts in their position prior to justification. The short dash broken line position to the left further illustrates the positions of plate 285 and roller 739 supported therefrom by block 285′ at maximum justification. To the left of that broken line position is an extreme position of roller 739 indicated by dot and dash representation to which the roller may travel (along with plate 285) when handle 40 is depressed. As it is moved to the left to this extreme position, roller 739 will engage the upstanding end 740 of latch 741, to pivot the latch counterclockwise from its full line position to the broken line position. This action will withdraw the upwardly directed pilot 740′ of latch 741 from engagement with the slot 742 in the cradle banking plate 743 thereabove, thus freeing cradle 30 for transposition from the "A" unit to the "B" neutral position. Latch 741 is normally spring biased clockwise for the purpose of accurately locating the cradle during "A" unit operation. At the same time, and during actuation of the latch, its depending end 744 will carry the horizontal link 745 rearwardly to rock the short lever 746 secured to the control rod 747. In Figure 45, control rod 747 is illustrated in broken lines extending from the "A" unit across the front of the machine to the right hand corner where it is appropriately journalled and carries two vertically arranged actuating fingers 748, 748′ which likewise will rock with rod 747.

After the patterns in a cradle have been set and justified, and the cradle is ready to be released to the "B neutral" position by manipulation of the justification handle 39 in the manner described above, the first actuating finger 748, see Figure 49*a*, is engaged and held by trip latch 750 to secure rod 747 in tripped position. At the same time finger 748', Figures 45 and 49, will rock the left hand end of a single-tree lever 751 giving that lever a clockwise angular position from that shown in the full lines. In case there is a cradle in the "B neutral" position which would preclude the entrance of another therein, it is essential that the helical feed screw drive to carry a cradle from the "A" unit be withheld until the interfering cradle has cleared out of the "B neutral" position permitting the next cradle to move in. To this end I provide a parallelogram control mechanism at the end of the drive for engagement with the right hand end of a cradle in the "B neutral" position consisting of a beam member 752 connected to a pair of spaced bell cranks 753 and yieldably disposed in the path of the cradle. If a cradle abuts against the beam member 752 pivoting bell cranks 753 will be urged clockwise, this action moving bar member 754 pivoted to the right hand ends of the cranks toward the front of the machine thus permitting single-tree 751 to rock clockwise without resulting in the engagement of the feed screw drive for the cradle. If, on the other hand, there is no cradle in the "B neutral" position to interfere with another cradle moving therein, bar member 754 will be disposed rearwardly of the machine with the small button 754' thereon holding the single-tree rearwardly and sliding plunger 755, to which the single tree is centrally pivoted, Figure 49, to the right against the spring biased, pivoted, L shaped clutch trip crank 756 and rocking the horizontal extending section thereof out of holding position with respect to lug 757' on the slidable toothed clutch member 757, the latter of which is keyed to feed screw 716, whereupon that member will be moved by the coil spring 757'' into engagement with the toothed hub of spur gear 720' to engage the feed screw cradle drive. Actuation of the clutch in this respect will drive a cradle into the "B" neutral position and the helical feed screw drive will be disengaged when the trip bracket 758' on the cradle, Figure 49*a*, contacts the end of pivoted latch member 750 to lift the latch from finger 748 and permit rod 747 to return to its counterclockwise position. Inasmuch as trip bracket 758' on the cradle passes the latched position before being stopped, it is possible for the operator to re-latch rod 747 for the next cradle after he has completed composition in the "A" unit, but in so doing the trip will not be effective until a previously composed cradle has cleared entirely from the "B neutral" position.

In order to accomplish the above described movement the parts 756 and 757 are constructed and related as follows: As best seen in Figures 49*b* and 50*b*, the lug 757' comprises an extension on the annular shoulder against which the coil springs 757'' press, said extension having upon its approach side a camming surface 757''' which, when the rounded nose of the L crank 756 is in holding position, will cause the clutch member 757 to be cammed axially against the urging of the spring 757'', releasing the teeth of the member 757 from engagement with the teeth of the hub of the gear 720'. The member 756 thus locks the member 757 against rotation and urges it out of clutch engaging position whenever the member 756 is moved to holding position.

Similar devices are contained in the machine at the rear left hand corner, Figure 45, to control actuation of feed screw 716' including an end engaging parallelogram mechanism, see also Figure 50*b*, to give partial operation to one end of the rear single tree 751, and also including a second trip latch 750 engageable by a cradle moving in the "A neutral" position. In this instance, however, there is no manual tripping of the cradle from the "B unit" to the "A neutral" position, but rather, this operation is performed automatically by the "B" unit during the driving cycle thereof through the medium of shaft 790.

When tripped into operation by a cradle moving therein, the "B" unit continues to operate to the full extent of the patterns representative of chosen characters in the cradle. Referring back to Figure 31, the initial trip for actuation of the "B" unit primary shaft takes place at the time a cradle strikes against the adjustably fixed screw 760 on the end of crank 761 located centrally of the unit between levels L2 and L3. Crank 761, in turn, tilts lever 762 downwardly, thereby carrying link 763 to a downward position. The upper end of link 763 is secured to a short lever 764 pivoted as at 765 which reacts to move crank arm 766 counterclockwise. This action further serves to pull down the latch arm 767 thus tripping clutch 406 and continuing further to clear the latch arm face for subsequent engagement therewith.

After this initial trip has taken place for operation of the "B" unit primary shaft 405 it is then necesary to trip clutch 406' to engage the drive to the secondary shaft 408 at approximately 330° of primary shaft rotation. The secondary trip, refer to Figure 50, is effected by means of cam 421 on primary shaft 405, hereinbefore referred to in a description of the "B" unit, a depression on the cam serving to rock lever 768 thereabove fixed to the auxiliary trip shaft 769. The left hand end of auxiliary trip shaft 769 carries a spring biased trip latch 770 for actuating the one revolution clutch 406'.

During each revolution of the secondary shaft, see also Figure 50*a*, the bell crank 771 pivoted to bracket 771' secured to the end of the "B" unit framework will be rocked clockwise by means of the face cam 772. This, in turn, will cause the feeler link 773 pivotally secured thereto to rise and fall periodically and to further rock lower lever 774, on the left hand end of which is pivoted an intermediate rocking lever 775 fixed to rock shaft 776 trunnioned in brackets 777, 777'. Each time that rock shaft 776 is actuated, it will further serve to pull down the parallel link 773' thus rocking intermediate bail 778 counterclockwise, Figure 50*a*, about its pivot 779 and serving to retrip the primary clutch 406 through link 780. In this manner, the primary shaft is arranged to periodically trip the secondary shaft and likewise, the secondary shaft is provided with facility for periodically retripping the primary shaft.

This tripping and retripping will occur just as long as there are patterns to be interpreted in the "B" unit and there is no interference between member 100'' on the transmitter, see Figures 50 and 51, and the blocking lever 782 on rock shaft 776. If, however, lever 782 is blocked by member 100'', at the last character position, then rock shaft 776 will not be permitted to turn and link 775 on the other end becomes fixed, thus obviating the possibility for retrip of the primary shaft. At the same time, with lever 775 fixed, the cam motion imparted to vertical link 773 will be transmitted downwardly against the restraining pressure of coil spring 785 fixed between link 783'' and the plate support at level L3 to rock bell crank 786 located immediately above level L2 counterclockwise carrying the horizontal link 787 to the right. As link 787 moves to the right, see also Figure 50*b*, it carries with it the hook member 788 on which is a beveled projection 789 arranged to latch-up with tripping finger 748'' fixed on undermounted trip rod 790. It may be noted at this juncture that rod 790 in the "B" unit corresponds in part with the manually operable rod 747 used with the justification lever 39 in the "A" unit serving when actuated to engage the latch member 750 at the rear left hand corner of the machine through finger 748, and further to tilt the single-tree lever by the use of a second finger 748' for clutch tripping.

The clutch trip does not, however, become effective until the completion of the secondary shaft cycle, and it is obvious that this is important to avoid transposition of a cradle from the "B" unit to the "A neutral" position before the secondary shaft cycle has been consumated. To this end I provide a face cam 537, Figure 51, on the left hand end of the secondary shaft contacting a roller 792 on angular crank lever 793 pivoted to bracket 794 secured above level L3. The lower end of lever 793, Figure 50, extends down to the vicinity of the pivoted hook member 788. The hook, if moved rightwardly to interfering position, as in the broken lines of Figure 50*b*, is in a position to be engaged by the lever 793 and caused to engage finger 748″ at which time the complete clutch trip is effected and the cradle may move from the "B" unit proper to the "A neutral" position provided that no cradle is already in the "A neutral" position. The same style of parallelogram mechanism for abutment with the end of a cradle will control the single tree side resulting in movement of the cradle from the "B" unit to the "A neutral" position in the event that both the trip rod 790 and the parallelogram rip have forced the single-tree to clutch tripping position and, like-wise, movement of a cradle to the "A" neutral location serves to disengage member 788 from latched position.

Transverse positioning for the cradles from front to back ("B" neutral to "B" positive) and from back to front ("A" neutral to "A" positive) is controlled by movement of the cradles longitudinally of the machine as will now be considered. In normal operating position, see Figure 45*b*, one cradle 30 will be situated in the "A" unit for processing or in the process of being composed. A second cradle will be in the "A" neutral position ready to move into the "A" unit at the time that a cradle is cleared therefrom in transposition to the "B" unit. The third cradle will be in the "B" unit awaiting transposition of a cradle out of the "A" neutral position.

When that cradle which is in the "A" unit has been completely composed and released to the "B" neutral position it passes out of interference with the spring biased trip 800, Figure 45, operable upon clutch 736 controlling the left hand turntables. A like spring biased trip 800 is correspondingly located at the rear of the machine, to control movement of a cradle from the "B" neutral to "B" positive position when a previous cradle has cleared out of the "B" unit. Figures 46*a*, 46*b* and 46*c* illustrate details of these tripping devices, Figure 46*b* showing the trip in its position as held out by the interference of a cradle and Figure 46*a* illustrating the trip when spring biased into transverse clutching position. On either side, the contact between the cradle and trip 800 is such that cradle interference is had continuously with member 800 while a cradle is in the "A" or "B" unit and until it has entirely cleared longitudinally to the next position.

Considering Figure 46*a* and 46*b*, trip 800 includes the elongated angular plate 801 which overhangs level L2 and carries a pair of edge mounted rollers 802. As illustrated in Figure 46*b*, rollers 802 are in abutment with the cradle 30 and plate 801 is thereby pressed to the left out of the notch 803. Plate 801 is further fixed to a vertically disposed trip lever 804 pivoted at 805, the pivot bracket therefor being secured to the sub-frame. Also fastened to lever 804 adjacent member 801 is an angular bracket 807 beneath which is pivoted a tripping beam 808, see Figure 46*c*, the short end of the beam being arranged to contact an adjustable set screw 809 fastened to the machine frame. Pivoting lever 804 carries a protruding pin 812 adjacent its upper end, which pin is disposed within a notch 813 in the horizontally disposed clutch tripping plate 814, which plate is arranged to slide horizontally on block 815 which idles on the turntable drive shaft 737. A coil spring 810 connects the longer end of the beam member 808 with the pin 817 carried by the tripping plate 814 and thus serves to resiliently urge the plate 814 toward the left when the beam 808 is swung by the contact of the shorter arm thereof with the set screw 809. To normally urge the system toward the right (as in Figure 46*a*) a coil spring 816 connects the pin 812 with the pin 811 fixed to the level L2. On the top rear corner of clutch plate 814 is a pivoted latch 818 which is normally restrained to the position indicated, in contact with stop pin 819 by means of coil tension spring 820, below which is a stop lug 821 secured at the rear edge of the plate.

Lug 821 is arranged to engage the projection 822 on a spring biased pivoting engagement pawl member 823 secured to disc 824 adjacent the bevel gear star wheel 825 and in alignment therewith. In the event that clutch trip plate 814 moves rightwardly to the extent that the projection 822 on pawl 823 falls out of engagement with lug 821 and latch 818, spring 823′ will pivot pawl 823 into engagement with the rotating star wheel, and the disc element 824 on shaft 737 will be rotated therewith. This, in effect, takes place at the time a cradle 30 passes out of interference with roller member 802 on member 801 during the final stage of transposition from a positive to neutral position, and at the time that it has substantially reached the extreme position ready for transfer by turntables 717 or 717′ from the neutral position to the subsequent positive position, as illustrated in Figure 46*a*. This clutching action will then engage drive shaft 737 to rotate worms 738, 738′ and drive the turntables as hereinbefore explained. De-clutching control is had, which becomes effective to disengage the transverse drive, when a cradle has completed transposition from the neutral position to the positive position whereupon the crade strikes against rollers 802 on the opposite side of the machine.

Attention is called at this point to the system of leverage provised for de-clutching, desirable because of the fact that cradle displacement per degree of angular movement of the turntables is a minimum when the de-clutching is effected. To this end the parts are arranged so that disposition of trip member 801 tends first to move beam 808, but clutch trip will not be effected until the left end of the beam has struck against set screw 809 to rotate the beam clockwise and draw plate 814 leftwardly through the medium of the spring 810.

Control for horizontal positioning of the film in the camera during composition is effected from the "B" unit. As a cradle 30 moves out of the "B" unit, member 826, shown in the lower right hand corner of Figure 30 and in Figure 42, which initiates movement of the film carrier, will be latched to maximum line position in contact with a pivoting latch member 827, as shown in the broken lines of Figure 30. Subsequently, a tripping device, to be hereinafter considered, will release the latch permitting the head to slide to the right to a secondary position corresponding with the length of line composed and represented by expansion of the patterns. Thrust shaft 828, to the end of which head 826 is fixed, is slidably supported in bearings 830, 831 and is spring biased to the right by coil tension spring 829. Sector gear 832 meshing with rack teeth 833 on shaft 828 is mounted on transmission shaft 595 and will be disposed angularly to the left of the center line when head member 826 is in latched position, shaft 595, as hereinbefore considered, being further interconnected with the differential film driving mechanism in the camera. Thus, the film, in turn, will be first indexed, as each cradle moves out of the "B" unit, to zero position ready for composing, then moved to a secondary position for line length as the next cradle reaches the "B" unit. Further indexing will take place thereafter under the influence of pattern collapse due to wedge withdrawal during "B" unit operation.

As a cradle moves into the "B" unit under the influence of the turntable drive for the reproduction of a line of characters, cam 835 on the under side of turntable 717′ will rock arm 836 fixed to shaft 837, the latter of which is pivotally secured in bracket 838 fastened against the under side of level L2. This rocking motion will raise link 839, the upper end of which is joined to the midsection of lever 840 pivoted at 841 and carrying upper and lower guide plates 842, 842′ which engage roller 843 to raise the wedge withdrawal rake, earlier considered in the description of the "B" unit, and to thereby avert interference between the rake and patterns as the cradle moves into position. At the same time, clockwise rocking of shaft 837, which takes place after the rake has dropped back to operative position, will effect corresponding motion in lever 845, also secured to the shaft. This, in turn, will tend to swing the spring biased latch 846 into abutment with adjustable stop 847 whereupon latch 846 will accordingly be rocked counterclockwise thereby serving to effect rocking of head latch 827 for releasing head 826 and for starting the line of composition in the cradle moving in. Head 826 will, in turn, strike against the stop 90, see Figures 42 and 42*a* which, in the cradle description, was indicated as movable according to pattern expansion and directly controlled therefrom. Subsequent wedge withdrawal during "B" unit functioning will permit stop 90 to move rightwardly step by step with pattern condensing resulting in corresponding step by step film positioning.

Centering or otherwise positioning irregular matter in the line is effected by displacing the film in the camera from its normal zero position by regulating, in the "A" unit, the position of the film control stop 90' on the cradle. The extent of displacement is proportional with the remainder of a prescribed line length not taken up by the patterns. In many instances equal space is desired on either side of the line of composition and it is for this particular adaptation that the centering devices 95 in Figure 10 are used, although other suitable irregular positioning equipment could be substituted as dictated by composing needs. L-shaped follower blade 78 normally progressively assumes a leftward location dependent upon the space consuming charcters in a line as hereinabove considered, carrying stops 90 and 90' therewith. To alter this condition and thereby add space before and after the composition in the line a rack 875 is cut on the side of blade 78 meshing with a pinion 876 of equal pitch secured to the sliding support member 877, Figure 10*a*, on the other side of which is a second elongated blade member 878 formed with an identical rack 879 meshing with pinion 876. It will be noted that the stop 90 is formed on or carried by the right-hand portion of the "floating" intermediate sliding support 877. A fixed bracket 880 secured to the cradle end support 72' slidably carries blades 78 and 878 above the support member 877 the latter of which is slidably confined in an appropriate aligning groove 881, in bracket 880, with the further expedient of an anti-friction roller 882 contacting the underside of bracket 880 and trunnioned on axle 883 fitted to the depending block 884. On its left hand end, blade 878 carries a tubular, inverted, U-shaped interconnecting member 885, the left hand end of which attaches to supplementary transverse blade 92 and is confined between the shoe 886 and a lock roller 887, Figure 10*b*, with a further guiding roller 882' bracketed to blade 92, the roller 887 being revolubly carried on a swinging arm 888 pivoted to the underside of shoe 886, whereby roller 887 is engageable in a wedging notch 889 in the L-shaped blade 78 and is confined therein under the influence of tension spring 890 interconnected between blade 92 and arm 78. Thus, roller 887 locks blades 78 and 878 together insofar as relative motion of the blades in one direction is concerned, yet permits blade 878 carrying stop 90' to be movable to the left without blade 78; and further provides for locking blade 878 with respect to blade 78 if the former is moved to the left for centering.

In operating the centering devices, movement of blade 878 to the left is effected at the keyboard of the "A" unit, Figure 11, by turning the centering control handle 36 secured to the rearwardly extending control rod 900, the latter being appropriately trunnioned in brackets 901, 902 under the plate at level L3, see Figure 3, and also reciprocable therein. By turning handle 36 in a clockwise direction, shaft 900 will, in turn, rock lever 903, Figure 12, the depending end of which carries roller 904 engageable with movable stop 90' in the extended position of the broken line of Figure 11*a* to move blade 878 to the left to a position representing a full line of type. Thereafter handle 36 is manipulated to push control rod 900 to the rear whereupon the auxiliary lever 905, pivoted centrally of lever 903 and biased therewith will press the stop 90' to the normal inward position of the full lines of Figure 11*a*. At the same time, while blade 878 was moved to the left to full type line position, blade 78 being at this time in a stationary position due to the spring urging of the blade against the pack of patterns 30P in the cradle 30, the floating support member 878 with stop 90 was moved only half of the distance corresponding with the space remainder in the line to the end that the character positioning on film will be central of the prescribed column.

Referring to Figure 10 of the drawings, it will be noted that the left-hand surfaces of the stops 90 and 90' coincide in the normal operation of the device, but when stop 90' is displaced by the lever 903 (Figure 11) this stop together with the blade 878 will travel twice the distance of the travel of stop 90, which is fixed to the carriage or support member 877. In the operation of centering a line of type over a column of reading matter, it is not desired to have the camera control engage stop 90' and thus the stop is positioned out of the control path, and the lever will contact the surface of stop 90 and thus the film in the camera will be offset to the correct amount resulting in equally spaced matter over a column width. This centering operation will be referred to again when the general operation of the machine for centering and flush right copy preparation is adverted to.

Figure 11 is further illustrative of the action of step back control by the step-back key lever 186", briefly described with the keyboard. Upon being rocked, lever 186" carries link 187 upwardly thereby rocking double lever 906 fulcrumed at 907 in bracket 908 and forcing reed 909 slidable in guides 227 and 277 to the rear against the action of coil spring 910. This, in turn, results in a blocking action against the left linkage member 279' which normally produces progressive step-ahead travel of the transmitter in the "A" unit and at the same time frees the right hand indexing linkage member 279' to function and to effect step-back travel by the devices normally reserved for indexing actuation in the "B" unit.

The tabulator stop control 35 at the keyboard may be adjustably set for line measure or for a multiple setting in accordance with copy. Likewise, as a multiple setting, the tabulator stop may be combined with centering and justification for a variety of printing effects. For multiple justification the patterns in the cradle are expanded in the usual manner until arm 94, Figure 4*b*, carrying pivoted plate 915 is halted in counterclockwise movement by the abutment of stop 916 fixed to the plate against the pivoted interference finger 920 on stop member 919. A guage 917 adjacent the ends of fingers 920 is employed to indicate the setting of stops 919 which are adjustably fixed to the serrated rack member 921 on guide 918. A swinging arm 922, Figure 4*c*, serves to interconnect arm 94 with plate 916 and to compensate for radial deflection of the end of the arm with respect to the line of travel of the plate.

Referring to Figures 4 and 4*e*, shaft 280 is used to release the tabulator stop control, this shaft being rocked during machine operation by means of the justifying control handle 39, Figure 4 attached thereto. This action, in turn, serves to rock lever 923 carrying link 924 downward to tilt the lower lever 925 against the effect of spring 926, serving to further press bail 928 secured between arms 927 downwardly against the rear extremity of finger 920. Thus, arm 94 may then travel further in a counterclockwise direction until member 916 again abuts against a holding finger positioned to indicate the end of a subsequent column.

A supplementary control in the camera includes the short, horizontal lever 935, Figure 39, affixed to the end of camera locking shaft 532, the extending end of the lever being pivoted to the vertical link 936, the latter of which is biased upwardly by spring 937. The lower end of link 936 is pivoted to a perforated, horizontal member 938 carrying a rack brake 939 on its left end and linked on the opposite end to a depending pressure yoke 940, see also Figure 37. Yoke 940, in turn, engages the top side of a rocking lever 941 on the end of a horizontally trunnioned shaft 942, to the midsection of which is secured a film pressure arm 943 carrying a yieldable tip portion 944 to press the film holder to the front against the circular abutment ring 945. Normal biasing for these assemblies is maintained by spring 946 so that the rack brake and pressure arm are inoperative, but when lever 935 is rocked clockwise through shaft 532 from the "B" unit, then brake 939 will be pressed in contact with the film positioning rack 592, and the film holder will be pressed firmly in the photographing plane for exposure.

Positive compression of the patterns in the cradle while the cradle is in the "B" unit, as by the compression hook finger 85, Figure 13, originates in the jogger arm 951, Figure 31, pivoted at 952 and operable by cam 950 on shaft 405. The left hand, bifurcated end of arm 951, in turn, engages the spool 953 on the upper end of the vertically guided shaft 954 spring biased upwardly as by coil springs 955, 955' which are adjustably fixed in position by collars 956, 956' fitted thereover. The lower end of shaft 954 contacts the roller on bell crank 86, earlier referred to in the cradle description, and actuates hook finger 85 once during each "B" unit cycle to ensure accurate pattern compression and hence accurate film positioning from character to character.

OPERATION OF THE MACHINE

The operation of the machine of my invention has, in part, been set forth in the preceding description of elements and assemblies. A more comprehensive description of the operation follows. Reference may be had at this point to the illustrative diagram of Figure 56 indicating typical composing which may be produced photographically with the machine of my invention.

In composing, the photo composing machine operator will receive manuscript or other copy to prepare in a desired style for printing. In general, the operator is supplied with all of the necessary informational detail including type size, type style, and other important layout instruction. He will be advised concerning headings and such irregularities in composition make-up as may be necessary for the inclusion of half-tones, line drawings or other space consuming material supplementing the text.

The first consideration, assuming the camera to be loaded with film and the optical system with its lighting means prepared for composing, will be to determine that the master plate in the machine corresponds with the type style and size indicated on the copy, and to check that the reed assembly corresponds with the unit system of the type style. A standard reed assembly will accommodate most usual type styles, but if a non-standard system is indicated, then the reed assembly must be removed and replaced with one which does correspond to the non-standard typographical style. The film to be produced will have opaque alphabetical characters on a transparent background and either "right reading" or "wrong reading" according to the printing process. For either "right reading" or "wrong reading" he will arrange the camera actuating transmission and the master plate as more fully treated hereinbefore in the description of the camera.

The second consideration will be to determine the point size (line to line) in which the matter is to be composed. The machine must then be set so that the line size indicator at the front of the keyboard corresponds to the point size of the matter to be used. In some instances the operator will be instructed to "lead" his composition, as is known in the art. In other words, the operator may be required to set six on eight point with six point type size on line to line spacing of eight point size. In this case he would check his master plate for six point size and set his line indicator for line to line spacing in accordance with eight point size.

The operator then proceeds to set the dial indicator for the "set" or width-wise measurement (character to character) corresponding to the type design. This setting effects the sine bar angular adjustment which provides for proportioning character widths. Thus, for a given point size the sine bar adjustment will regulate proportional sizes for the various characters according to a unit system of widths, and for another point size it will regulate, in the same system, another group of sizes varying from the first group as the sine of the first angular sine bar setting is to the sine of the second angular setting.

For column width, one or more stops at the left side of the keyboard are fixed in position for the right margins. These stops effect interference with the indexing lever as the latter describes an arc in accordance with the expansion of patterns. Multiple stop settings intermediate of the left and right column margin are provided in order to give multiple, justification within a single line, as is customary with the make-up of some tabular matter.

Following the establishment of the above settings the operator proceeds to strike keys on the keyboard; first depressing either the roman, bold, or italic key according to the copy. After setting one of these three keys he then manipulates the particular character keys, shift keys, and the space bar in a manner according to usual composing machine practice. The rate of speed at which he may strike the keys on a keyboard is determined by the speed at which the power driven mechanisms of the machine are operated and, when the operator observes the near completion of a line, as indicated by the approach of the indicating lever, to the pre-set tabular stop, it then becomes necessary to justify or expand the line to full column width and to proceed to the next line. In this latter respect, operation corresponds to routine of known machines for composing with lines terminating to the end of words or at syllabic division. If the operator consciously makes an error, it is possible to eliminate this error by back-spacing in which case he will strike the back space key to withdraw the sizing wedge on the pattern and to reversely index the transmitter.

To justify or expand the patterns and fill out the incomplete portion of the line, the operator depresses the line justifying handle 39 at the right of the keyboard which, in turn, will expand patterns in the cradle corresponding to spaces in the line to the extent that the remainder of the line is equally distributed throughout the spaces. When justification is completed the lever 39' above the justifying handle is depressed to clear out the space adjustments in the patterns and to thus restore them to normal operating position. Following this manipulation the operator releases the starting latch by further manipulating handle 39, and trips the clutch for driving the composed cradle to the "B" neutral position.

For flush left copy, or where blank space is to be provided on film behind composition, as illustrated in Figure 56, it is only necessary to set the right hand margin stop to the shorter measure and justify accordingly.

For flush right copy, where the blank space precedes the composition, the operator first inserts a quad at the keyboard and then manipulates the line centering handle 36 to move stop 90' on the cradle, together with bar 878 to the left until regulating arm 94 in the tabular stop has reached the prescribed column measure. Following this operation, the normal composing and justifying procedures are used. The quad is first inserted in order to make effective the braking action of roller 887 in the cradle centering apparatus which holds the longitudinal separation between bars 78 and 878.

Centering of material being composed may be effected as hereinbefore described for titles, headings or other instances in which it is desired to locate a character or a group of characters equal distances from the left and right hand column margins. Figure 56 illustrates the centering of a main heading, sub-headings and box-headings and there are various other instances where material is centralized with respect to a given measure.

In cases where line measure exceeds that which is possible with the number of patterns in a cradle, it is possible to compose a line with a plurality of cradles somewhat according to the method pursued with box-headings or the like. For example, composing of patterns could be effected for approximately half of the total line width preferably terminating in a space character, at which point the operator would establish a tentative right hand margin and would justify the line thereto. The operator would then discharge the cradle to the "B" unit in normal fashion. The following cradle would then be composed, using a left hand margin corresponding with the right hand margin of the previously composed cradle, employing the method for flush right copy. If two cradles satisfied the line for measure, then a zero line to line setting would be established before releasing the second cradle in order that the film would not index as the second cradle moved from the "B" neutral to "B" positive position.

For centering, as for flush right copy, a quad key or space key is struck before a character setting, followed by the striking of a similar balancing space key of equivalent width after character setting. The centering handle is then turned clockwise until the full column width is reached when the indicating lever strikes the columnar stop. After reaching this limit, the centering handle is pushed inwardly to position the auxiliary cradle stop, as hereinbefore explained, and to provide equal distances before and after the words or text being centered. For double or multiple justification the operator may set a plurality of stops within a column width and justify each sub-division in the manner of a complete line, with the exception that the cradle release latch sending the cradle to the "B" unit is not depressed at the end of each sub-division, but rather is only actuated when full column width is obtained. For letter spacing and to thereby provide an increase in the width of a word or group of characters the operator sets the sine bar as in the case of increased set or letter size. Conversely, when it is desired to reduce the width of a word or group of characters, condensation may be provided by reversing the angular positioning of the sine bar.

As lines are composed by the operator, preceding lines are being automatically photographed in the machine letter by letter on film or are being transferred between stations. When the film carriage completes the line at the low extremity of a given column, it will shift horizontally from the zero reference on that column to a corresponding zero reference on the next succeeding column and will shift vertically from bottom to top. Succeeding columns are composed and photographed until a suitable signal indicates that the film capacity has been reached for columns of prescribed size, after which the exposed film may be then removed from the machine for processing and unexposed film loaded in the camera.

To load film adjacent the camera, the film carrier 561 is inserted in the bayonet loading chamber at the right hand side of the machine, the film therein having been previously positioned in the carrier in a dark room with the roller on the end of lever 32', Figure 39, engaging the slot adjacent holder 560 formed by depending arm 560'. Swinging the carrier through 90° to the plane of the film in the camera will permit insertion of the carrier into the camera by manipulation of the loading handle. Film removal operations require a reverse procedure to those steps required for loading.

Transposition of the film carrier into the film carrier head 581 is then effected by manipulating handle 32, which swings lever arm 32' counter clockwise thus conveying the holder to a right hand zero position as the aforementioned roller strikes against the angular surface 560." As illustrated in Figure 39, the carrier head has further advanced automatically with "B" unit operations adjacent the extreme left end of its travel whereupon it may be manually returned to the right for further engagement of arm 32' with holder 560 and unloading.

Machine operations are performed in accordance with the timing charts, see Figures 52 and 52*a*, the first of these charts showing the cycle of operation in the "A" unit and the second being indicative of the sequence of operations in the "B" unit and the camera.

Referring to Figure 52, when the operator strikes a character key or the space key, the clutch in the "A" unit engages the power drive for the cam shaft in that unit and the several mechanisms therein will operate as follows. The clutch may be tripped prior to completion of the previous cycle, as indicated on the lowest line on the chart. After the clutch trips, and at the zero reference, see the top chart line, the wedge pusher bail 329 starts forward to engage the wedge on the particular pattern to which the transmitter is set through the intermediate control of the transmitter, and to thus push the wedge to its extreme of inward expanding movement. After a short dwell, between 90° and 105°, the wedge pusher bail returns and is completely returned at 165°, remaining motionless between that point and the end of the cycle.

During the period when the wedge pusher bail is being actuated to insert the wedge there is a dwell in motion of the sizing mechanism, followed by the sizing operation which takes place between 90° and 180°. It will be recalled that this operation withdraws the pattern wedge to a prescribed position for character to character spacing depending upon the setting of the sine bar and upon the sizing stop which forms an abutment against the sine bar in the sizing operation. At the same time the wedge pusher bail is either at the dwell position or is returning, and it will be noted here that the short period of dwell of the wedge pusher bail, after it has moved completely forward, is of sufficient duration to prevent any interference with the sizing operation which takes place. The sizing return movement follows the sizing operation from 180° to 240°, further followed by a period of dwell for the balance of the "A" unit cycle.

During the period the wedge pusher bail is operating in an inward direction, the signal code pin bar, third chart, starts down to depress the code pin carrier on the pattern, reaching the extreme downward position at approximately 75°. At the same time the code bars, fourth chart, corresponding with the character chosen, start their downward travel. A short period of dwell follows the downward travel of the signal code pin bar whereupon the code pin carrier is permitted to rise. At the same time the actuated code bars are retained downwardly during this rise until the pin carrier has completed its upward travel, thus holding down pins corresponding to the actuated code bars, creating a coded pin setting in the pattern. Of importance, it will be noted that this operation of depressing the code pin carrier by the code pin bars not only establishes new pin settings, but also serves to clear out previous setting in the pattern which may have been established during earlier composing on that pattern in the "A" unit. Those actuated code bars which were retained downwardly are then permitted to rise between 135° and 180°, and following this release operation, a period of dwell in the operation of the code bars extends through the balance of the cycle. It may be further noted at this point that the cycle of operation on the "A" unit and also that of the "B" unit ends with all operating bars returned to "up" position, permitting the transfer of the cradle with its transmitter from position to position without mechanical interference.

The second chart line from the bottom in Figure 52 illustrates the timing of the feeler pin lift which, from zero to 165°, is inoperative, with the pins of the transmitter resting upon the pin on the patterns. At 165° the feeler pin lever cam starts to elevate the transmitter feeler pins on the transmitter away from the pattern pins, and at 210° this lifting operation is substantially completed. At 212°, there follows a period of dwell and the feed pawl on the transmitter, third chart up, is actuated thus indexing the transmitter from pattern to pattern during the interval between 212° and 300° corresponding with the period during which the pins on the transmitter are held away from the pattern pins. Thus, the transmitter may move from pattern to pattern without mechanical interference. A short period of dwell on the transmitter indexing follows immediately thereafter, and the transmitter indexing mechanism returns to its initial period of dwell. At the same time the feeler pin lift operating mechanism starts downward so that at the initial point of the "A" unit cycle the transmitter pins are again free to follow the pattern pins and to assume a setting corresponding to the setting of the pattern pins.

Referring to Figure 52*a* for a consideration of the cyclic operation of the "B" unit, it will be noted that this chart is divided to show operations relating to the primary shaft above as well as operations relating to the secondary shaft below. It will be further noted that continuous operation of two or more complete cycles are illustrated inasmuch as the zero reference for the secondary shaft starts at 330° of operation of the primary shaft. Below the diagrams relating to the primary and secondary shaft are three supplementary charts corresponding in timing to those of the primary shaft and relating to transposition of the cradle.

The uppermost diagram of Figure 52*a* indicates camera locking which is effected from 90° to approximately 350° to secure the film carrier in the camera during the interval of wedge withdrawal, third diagram, which takes place between 130° and 240°. A period of dwell for "camera free" precedes the zero reference extending to the 90° mark so that the film carrier may travel to accommodate the decrease of overall wedge width due to withdrawal of the previous wedge. Wedges are compactly compressed from 30° to 90° before before camera lockup according to the second diagram in order for the film carrier to assume its new position representative of character spacing for that character photographed and to establish a position for photographing of the next subsequent character.

The third chart from the bottom in Figure 52*a* indicates operation of the primary shaft in the "B" unit which is initiated by the clutch operative as the cradle enters the "B" machine. This clutch will be released after one cycle of operation of the "B" unit unless it is tripped again by the interlocking control associated with the transmitter, the latter of which continues the operation of the "B" unit until the transmitter has entirely traversed the cradle and has returned to the zero position on the cradle. This interlocking feeler operated tripping mechanism has been described heretofore in connection with the description of the control units of the machine. When the transmitter has fully traversed the cradle to zero position, the "B" machine operation will be discontinued and the cradle in the "B" unit may then be carried to the "A" neutral position, if the "A" neutral position is available.

The first machine operation associated with the primary shaft is the advance of the transmitter one step, fourth chart from the top, after the clutch trips and following a short period of dwell necessary to permit the sensing pin lift, fifth chart, to be actuated to clear the code pins in the transmitter from the pattern pins. At 90° the transmitter travel has been completed after which a dwell in the drive extends to 240° and the transmitter actuating device returns to normal at 330°. The dropback of the transmitter over one pattern will effect a position for the transmitter pins directly above the last pattern set in the "A" unit and will compensate for the automatic indexing in the transmitter during the last cycle of operation in the "A" unit. Between 120° and 135°, see the sixth diagram down, the sensing pins are locked in the position which they assume over a pattern to be interpreted by means of the sensing pin locking bail, whereupon the sensing bars, seventh chart, start their downward travel toward the pins and continue this motion to approximately 195°, followed by a period of dwell to 300°. If pattern pins are depressed, the bars will assume their lower settings, but if pins are not depressed then the bars will be retained upward. Between 300° and 345° the sensing bars return to a normal upward position. During the dwell and action of the sensing bars as above noted, and while selected sensing bars are held down, the code bar release latches which correspond with the sensing bars in down position, eighth chart, are actuated to prevent those code bars from sliding under the influence of the code bar latch reset which would normally take place from 240° to 270°, tenth chart, and hence these code bars will be prevented from movement to the left, Figure 34, while the remainder of the code bars are normally guided to the left. It may be noted here that actuation of the code bar latches takes place from 210° to 240° and that they are fully retracted from interference with the abutment surfaces on the bars prior to the time that the code bars start to move. Hence, there will be no tendency for wear between engaging surfaces which would otherwise occur if the bars started to move prior to the time the latches were released. When code bar actuation is completed, with selected code bars 494 positioned to the right and the balance of the bars spring biased to the left, then the code bar selector levers 514 are actuated in accordance with chart nine, and the interference pins are fully projected between 270° and 315°. The particular pins, as heretofore described, are placed in interference with the drum cams which, in turn, will, guide these cams to specific positions.

The secondary clutch is tripped at approximately 325° of operation of the primary shaft, as illustrated in chart eleven down of Figure 52*a*, and operates for 360° thereafter unless retripped for subsequent pattern interpreting. At the point of secondary shaft clutch trip, the locating drums 522, 522', chart twelve, start to rotate and, upon interference of the peripheral cam surfaces thereon with appropriate stop pins, the drums will be guided to the left or to the right during rotation, so operating for 270° of the secondary shaft cycle, whereupon the longitudinal travel of the drum is completed for master plate positioning and the interference pins are cammed out. At this time the guide combs previously referred to in a description of the "B" unit control the position of the drum against longitudinal travel subject to a 75° dwell before the clutch is again tripped.

Referring to charts twelve and thirteen, the master plate travel is substantially completed between 240° and 270° during which interval the master plate lock-up is effected, chart thirteen, followed by a dwell of 30° and then by additional thrust in the locking linkages which accompanies tripping of the camera shutter. It will be noted that this is an appropriate photographing interval since the drum cams which position the master plate are confined in the guide combs and accordingly no interference can be present to disturb photographic positioning of the master plate. Chart number fourteen illustrates the resetting operation for the camera shutter which takes place between 30° and 150° followed by an extended dwell for the balance of the cycle.

In review of the operation of the machine of my invention, and considering the schematic views of Figures 53 and 54, the flow of control in the "A" unit according to Figure 53 is principally directed from the keyboard or other manual facilities to the pattern; and in the "B" unit according to Figure 54 the flow of operation is directed from the pattern to components of the camera having to do with master plate and film travel.

Character key actuation performs three main functions i. e., it effects a manual sizing control, a manual sensing control, and trips a clutch, the latter of which will cause the "A" unit cam shaft to be rotated, from which stems a series of controls operative upon a particular pattern by way of the transmitter. The manual sizing control cooperates with power sizing to regulate the extent of withdrawal of the pattern wedge which has been previously set to an extreme rightward position by the wedge pusher bail. Likewise, the manual sensing control will cooperate with the power sensing devices for setting a particular series of pattern pins corresponding with a selected character. Also instrumental in the transmitter operative elements are the signal pin bar for depressing the anvils during pin setting and the feeler pin lift and transmitter feed for stepping the transmitter from pattern to pattern.

The space bar operates in much the same fashion as a character key providing for a coded pin setting in the pattern and for a nominal space increment due to wedge adjustment. In addition, this element serves to depress the spacing tail piece of the pattern wedge and thus provides for increment in spacing depending upon unused line space upon actuation of the justifying handle at the keyboard. The shift key serves only to effect manual sensing which regulates the linkages as between capital and lower case alphabets and the step back key operates on the transmitter to reverse the indexing and to withdraw the sizing wedge. Roman, bold, italic and functions keys act in the manner of an adjustment to manual sensing for appropriately modifying the pattern pin setting accordingly.

Line justification, as by the actuation of the line justification handle at the end of a line first effects the desired spacing increment, whereafter the justification plates are pushed up to inoperative position. As a final line operation, the justifying handle is depressed to effect a shift of the cradle from the "A" unit to the "B" neutral position.

Figure 54 is rather self-explanatory of the controls which stem from patterns in the "B" unit, the code pins being arranged in two series, the five left pins effecting horizontal sensing in the transmitter and corresponding master plate positioning while the four right hand pins effect vertical sensing and vertical master plate position. Withdrawal of wedges is effected by pattern collapsing devices in the transmitter which, in turn, reflects itself in step by step movement of film. Other transmitter functions in the "B" unit are automatic as hereinbefore described.

Figure 55 is an overall flow type chart to illustrate the operative components of the entire machine. Starting with the keyboard of the "A" unit, actuation of the keyboard keys or space bar primarily effects components of the transmitter, the key signal being modified by set size adjustment of the sine bar. Line width, indicated at the left, is a regulatory control which goes to the cradle as does also the single, multiple justification control with which it is associated, shown at the right. Centering is a further control which is reflected as a cradle adjustment.

Manual starting control continues through an automatic release to the clutch which derives power from a source to actuate the helical feed screw and move a cradle to the "B" neutral position (No. 2), whereupon the clutch drive is disconnected. A cradle leaving the "B" unit (No. 3 position) will then actuate the clutch for driving that cradle from "B" neutral to "B" positive.

While in the "B" unit, interpretation of signals from the patterns will successively be reflected in master plate positioning in the camera unit, while adjustments in the cradle will make corresponding adjustments in the camera for horizontal film positioning; either for character to character sizing or for tabular skip, the former being also controlled at the "A" unit by line to line adjustment. Automatic controls from the "B" unit to the camera unit include those for master plate locking, film locking and exposure.

The transmitter in the "B" unit serves also to store a signal effecting release of the cradle to the "A" unit neutral position by the lead screw through the clutch in case there is no cradle at that position while further serving to continue the interpreting action until all pattern signals are read out. For moving the cradle out of the "A" neutral position (No. 4) a clutch actuating drive is provided which takes its control from a cradle in the "A" unit (No. 1) position.

Wherever the terms "compound," "compounded," "code," "coded," "permutable" or the like are employed in these descriptions and claims, they are intended to distinguish the applicant's signal adjustments carried by the patterns or signal receiving elements 30P from elements which have been used in the prior art which directly carry a representation of the printing character, as for direct photographing, or other direct signal adjustments which singly indicate a character, such as for example, a single displaceable pin which might be made to designate a character by its relative position on a coordinate grid. The applicant's compounded coded signals are understood to be multiple signals, a relatively few of which can be compounded or permutated to represent a far greater number of combinations which represent printing characters, and which must be translated by decoding or reading-out means before character identification or presentation for photographing purposes can be effected.

Wherever the term "character" appears in the claims, it is understood that this shall mean numbers or numerical quantities, as for example, as involved in computing machines or the like, as well as letters of the alphabet and punctuation.

I claim:

1. In a machine of the class described, in combination, an intelligence carrier including a support and a plurality of signal receiving elements permanently and adjustably positioned thereon, each of said signal receiving elements carrying a series of spaced pins movable therein to positions representative of printing characters and each of said signal receiving elements having a wedge movable to advanced positions for swelling the width of the member to a value representative of character width, a reading-in unit to establish intelligence in said carrier by adjustment of said spaced pins and wedges, a transmitter supported for movement to operative stations with respect to each signal receiving element whereby selected pin settings and wedge adjustment may be incorporated one by one in individual signal receiving elements by said reading-in unit, and a reading-out unit to translate the intelligence from said intelligence carrier.

2. In a machine of the class described, in combination, an intelligence carrier including a support and a plurality of signal receiving elements permanently and adjustably positiond thereon, a reading-in unit to establish intelligence in said carrier by adjustment of said signal receiving elements, a reading-out unit to translate the intelligence from said intelligence carrier; said intelligence carrier being relatively movable with respect to said reading-in and reading-out units, and a transmitter supported by and arranged for movement in one direction with respect to said carrier while the carrier is at said reading-in unit and arranged for movement in the opposite direction while the carrier is at said reading-out unit, whereby selected signal adjusments may be presented to and interpreted from individual signal receiving elements.

3. An intelligence carrier for a typographical composing machine including a support, a series of signal receiving elements carried by said support for expansion along a line, first adjustable means consisting of compound codal elements mounted on each element for indicating, after adjustment, the identification of a selected character, and second adjustable means mounted on each signal receiving element for expanding each signal receiving element along said line whereby to indicate, after expansion, the size of the selected character.

4. An intelligence carrier for a typographical composing machine comprising a plurality of individual character signal receiving elements disposed in series relationship, each element being provided with a rack tooth which, with corresponding teeth on adjacent signal receiving elements, forms a rack, and a transmitter movable with respect to said elements to establish signals in said elements step-by-step in accordance with the pitch of said formed rack.

5. An intelligence carrier for a composing machine comprising, in combination, a cradle, guides on the cradle for supporting a plurality of code carrying elements in registered side by side relationship, a series of code carrying elements on said guide, each element having movable signal components thereon to represent a printing character and each element having a rack tooth formed thereon which, in guided relationship with the teeth on other patterns simulates a continuous rack, a transmitter, means on said transmitter to establish adjustments in each code carrying element representative of a printing character, and indexing means on said transmitter to move the transmitter over said elements step-by-step in accordance with the pitch of said simulated rack.

6. An intelligence carrier for use in a composing machine comprising, in combination, a cradle, guides on the cradle for supporting a plurality of code carrying elements in side by side relationship, a series of code carrying elements on said guide, each element having movable signal components thereon to represent a printing character and each element having a gear tooth formed thereon which, in guided relationship with the corresponding teeth on other patterns simulates a continuous rack, a transmitter, means on said transmitter to establish adjustments in each pattern in step-by-step sequence representative of printing characters, and advancing mechanism on the transmitter engaging the simulated rack adjacent the particular element in which signal adjustments are to be made.

7. An intelligence carrier for use in a composing machine comprising, in combination, a cradle, a guide on the cradle for supporting a plurality of code carrying elements in side-by-side relationship, a series of code carrying elements on said guide, each element having a gear tooth formed thereon which, in guided relationship with corresponding teeth on adjacent patterns simulates a continuous rack, a code transmitter carried by said cradle movable over and operable on said elements step-by-step in accordance with the pitch of said simulated rack, including advancing and retracting devices thereon for engaging said simulated rack adjacent the element to which it is set, and an auxiliary rack fixed to said cradle adjacent said elements to regulate the movement of the transmitter beyond the confines of said series of code carrying elements.

8. Control mechanism for composing machines or the like comprising, in combination, a plurality of intelligance carriers, each adapted to have impressed therein a sequence of character signals, a reading-in unit at one location in a composing machine for impressing selected signals upon the intelligence carriers, a reading-out unit at a second location adapted to engage the intelligence carriers and to interpret the signals contained therein, and means supporting the intelligence carriers for quadrangular travel to and from the locations of said reading-in and reading-out units independently of each other.

9. Control mechanism for composing machines or the like comprising, in combination, a plurality of intelligance carriers, each adapted to have impressed therein a sequence of character signals, a reading-in unit for impressing selected signals upon the intelligence carriers, a reading-out unit adapted to engage the intelligence carriers and to interpret the signals contained therein, means supporting the intelligence carriers for movement independently of each other to operative relationship successively with said reading units, and tripping means operated by carriers at the respective units to hold one carrier in position at one reading unit subject to movement of a second carrier away from the second reading unit.

10. Control mechanism for composing machines or the like comprising, in combination, a series of three intelligence carriers, each adapted to have impressed therein a sequence of character signals, a reading-in unit for impressing selected signals upon the intelligence carriers, a reading-out unit adapted to engage the intelligence carriers and to interpret the signals contained therein, means to transport two of the carriers to operative positions with respect to said reading units and tripping means operated by carriers at the respective units to hold the third carrier in a neutral position awaiting clearance of one of said two carriers out of operative position.

11. In a machine of the class described, in combination, a keyboard, means for reading-in to a receptive medium a series of code signals representative of printing characters, interconnecting means linking said keyboard and said reading-in means whereby signals of selected characters chosen at the keyboard are relayed to said reading-in means, a shift key in the keyboard to present a modified code signal at said reading-in means by the striking of a character key, and a yielding connection in said interconnecting means whereby the modified code presented is ineffective for selected characters.

12. In a photographic composing machine, in combination, a camera, three independently movable intelligence carriers in which signals may be stored representative of alphabetical characters, reading-in means to impress signals in the carriers step-by-step to form composite signals representative of lines of printed composition, reading-out means to interpret the composite signals and to relay a designation thereof to the camera, means to transport each carrier in sequence to neutral and operative positions with respect to the reading-in and reading-out means, and trip means to manually discharge a carrier for transportation from the operative reading-in position to the neutral reading-out position subject to holding means for actuating the discharge only in the absence of a carrier in the neutral reading-out position.

13. An intelligence carrier for a typographical composing machine including, in combination, a plurality of signal receiving members adapted to receive adjustments representative of printing characters and for expansion along a line indicative of character spacing, stop means to control the extent of expansion of said members according to the length of a line of printing, a follower on the carrier movable in response to the expansion of said members, and means to locate the follower independently with respect to the stop to a position representative of the spacing of the characters from the extremities of the line of printing.

14. An intelligence carrier for a typographical composing machine including, in combination, a plurality of signal receiving members adapted to receive adjustments representative of printing characters and for expansion along a line indicative of character spacing, stop means to control the extent of expansion of said members according to the length of a line of printing, a follower on the carrier movable in response to the expansion of said members, and means to adjust the position of the follower independently of the expansion of the signal receiving members over a distance equal to one-half of the linear balance between the accumulated character spacing and the length of the line of printing.

15. An intelligence carrier for a typographical composing machine including, in combination, a plurality of signal receiving members adapted for expansion along a line, stop means to regulate the degree of expansion of said members, a follower on the carrier movable with respect thereto in response to signal member expansion, means to move the follower independently of signal member expansion in the direction of expansion, and means to restrict movement of the follower in the reverse direction with respect to the linear expansion of the signal receiving members.

16. Apparatus for establishing transitory signals in a machine of the class described, wherein the signal intelligence is initiated at a keyboard and results in typographic composition, comprising, in combination, an intelligence carrier, means to make adjustments in the carrier representative of the identification of alphabetical characters, power-driven means to actuate said adjusting means, a clutch to engage the power-driven means with the adjusting means, means to trip the clutch into engagement when a signal is directed from the keyboard, and means to disengage the clutch when the signal has been established in the carrier.

17. In a composing machine of the class described, in combination, an intelligence carrier including a support and a plurality of signal receiving elements permanently positioned upon said support, each of said elements provided with means for receiving compound coded adjustments representative of printing characters, a reading-in unit for establishing intelligence in said carrier, said reading-in unit including means for applying said coded adjustments to said signal receiving elements, and a reading-out unit for receiving and translating the intelligence established in said carrier, said reading-out unit including sensing means adapted to be affected by said coded adjustments of the signal receiving elements supported upon said carrier.

18. In a composing machine of the class described, in combination, an intelligence carrier including a support and a plurality of signal receiving elements permanently positioned upon said support, said elements being provided with means for receiving compound coded adjustments representative of printing characters, and also of the width and spacing of said characters, including all signals necessary to establish line justification, a reading-in unit for establishing intelligence in said carrier, said reading-in unit including means for applying said coded adjustments to said signal receiving elements, and a reading-out unit for receiving and translating the intelligence established in said carrier, said reading-out unit including sensing means adapted to be affected by said compound coded adjustments of the signal receiving elements supported upon said carrier for translating said coded adjustments into character identity, and for translating the width adjustment signals into the relative positioning of the characters in textual composition.

19. In a composing machine of the class described, in combination, an intelligence carrier including a support and a plurality of signal receiving elements permanently positioned upon said support, said elements being provided with means for receiving compound coded adjustments representative of printing characters, including all signals necessary to establish line justification, a reading-in unit for establishing intelligence in said carrier, said reading-in unit including means for applying said coded adjustments to said signal receiving elements, and a reading-out unit for receiving and translating the intelligence established in said carrier, said reading-out unit including sensing means adapted to be affected by said compound coded adjustments of the signal receiving elements supported upon said carrier for translating said coded adjustments into character identity and the relative positioning of the characters in textual composition for character width, word spacing, and line justification.

20. In a composing machine of the class described, in combination, an intelligence carrier including a support and a plurality of signal receiving elements permanently positioned upon said support, each of said elements provided with means for receiving coded adjustments representative of printing characters, a reading-in unit for establishing intelligence in said carrier, said reading-in unit including means for applying said coded adjustments to said signal receiving elements, and a reading-out unit for receiving and translating the intelligence established in said carrier, said reading-out unit including sensing means adapted to be affected by said coded adjustments of the signal receiving elements supported upon said carrier, said reading-in and reading-out units being spaced apart, means for movably supporting said intelligence carrier as a self-contained entity for transfer from the reading-in unit to the reading-out unit, whereby intelligence may be established in said carrier at said reading-in unit, the carrier moved to the reading-out unit, and at a later time the intelligence translated by said reading-out unit.

21. In a composing machine of the class described, in combination, an intelligence carrier including a support and a plurality of signal receiving elements permanently positioned upon said support, said elements provided with means for receiving compound coded adjustments representative of printing characters, including all signals necessary to establish line justification, a reading-in unit for establishing intelligence in said carrier, said reading-in unit including means for applying said coded adjustments to said signal receiving elements, and a reading-out unit for receiving and translating the intelligence established in said carrier, said reading-out unit including sensing means adapted to be affected by said compound coded adjustments of the signal receiving elements supported upon said carrier for translating said coded adjustments into character identity and the relative positioning of the characters in textual composition for character width, word spacing, and line justification, said reading-in and reading-out units being spaced apart, means for movably supporting said intelligence carrier as a self-contained entity for transfer from the reading-in unit to the reading-out unit, whereby intelligence may be established in said carrier at said reading-in unit, the carrier moved to the reading-out unit, and at a later time the intelligence including line justification translated by said reading-out unit from said self-contained carrier alone without recourse to the reading-in unit at such later time.

22. In a composing machine of the class described, in combination, an intelligence carrier including a support and a plurality of signal receiving elements permanently positioned upon said support, each of said elements provided with means for receiving coded adjustments representative of printing characters, a reading-in unit for establishing intelligence in said carrier, said reading-in unit including means for applying said coded adjustments to said signal receiving elements, and a reading-out unit for receiving and translating the intelligence established in said carrier, said reading-out unit including sensing means adapted to be affected by said coded adjustments of the signal receiving elements supported upon said carrier, each of said signal receiving elements comprising a frame carrying a plurality of spaced pins selectively movable in said frame for setting to adjusted positions, the combined settings of the plurality of pins in any one element being a coded representation of a printing character.

23. In a composing machine of the class described, in combination, an intelligence carrier including a support and a plurality of signal receiving elements permanently positioned upon said support, each of said elements provided with means for receiving coded adjustments representative of printing characters, a reading-in unit for establishing intelligence in said carrier, said reading-in unit including means for applying said coded adjustments to said signal receiving elements, and a reading-out unit for receiving and translating the intelligence established in said carrier, said reading-out unit including sensing means adapted to be affected by said coded adjustments of the signal receiving elements supported upon said carrier, each of said signal receiving elements comprising a frame carrying a plurality of spaced pins selectively movable in said frame for setting to adjusted positions, the combined settings of the plurality of pins in any one element being a coded representation of a printing character, and means in said reading-in unit for clearing out previously made pin positioning in the signal receiving elements of the carrier immediately before the establishment of new pin positioning.

24. In a composing machine of the class described, in combination, an intelligence carrier including a support and a plurality of signal receiving elements permanently positioned upon said support, each of said elements provided with means for receiving coded adjustments representative of printing characters, a reading-in unit for establishing intelligence in said carrier, said reading-in unit including means for applying said coded adjustments to said signal receiving elements, and a reading-out unit for receiving and translating the intelligence established in said carrier, said reading-out unit including sensing means adapted to be affected by said coded adjustments of the signal receiving elements supported upon said carrier, said reading-in and reading-out units being spaced apart, means for movably supporting said intelligence carrier as a self-contained entity for transfer from the reading-in unit to the reading-out unit, whereby intelligence may be established in said carrier at said reading-in unit, the carrier moved to the reading-out unit, and at a later time the intelligence translated by said reading-out unit, said carrier including a transmitter device supported thereon for movement to operative stations with respect to each signal receiving element on the carrier, whereby selective coded signal adjustments may be presented through the intermediary of said transmitter by said reading-in unit to said elements, and read therefrom by said reading-out unit through said transmitter device.

25. In a composing machine of the class described, in combination, an intelligence carrier including a support and a plurality of signal receiving elements permanently positioned upon said support, each of said elements provided with means for receiving coded adjustments representative of printing characters, a reading-in unit for establishing intelligence in said carrier, said reading-in unit including means for applying said coded adjustments to said signal receiving elements, and a reading-out unit for receiving and translating the intelligence established in said carrier, said reading-out unit including sensing means adapted to be affected by said coded adjustments of the signal receiving elements supported upon said carrier, said reading-in and reading-out units being spaced apart, means for movably supporting said intelligence carrier as a self-contained entity for transfer from the reading-in unit to the reading-out unit, whereby intelligence may be established in said carrier at said reading-in unit, the carrier moved to the reading-out unit, and at a later time the intelligence translated by said reading-out unit, the several signal receiving elements being disposed in alignment on the carriage, said carrier including a transmitter carriage supported thereon for movement therealong to successive operative stations with respect to each signal receiving element on the carrier, whereby selective coded signal adjustments may be presented sequentially through the intermediary of said transmitter by said reading-in unit to said elements, and read therefrom by said reading-out unit through said transmitter carriage.

26. In a typographical composing machine or the like, reading-in mechanism, reading-out mechanism, and a signal receiving and character identifying element for the transmission of intelligence from the reading-in mechanism to the reading-out mechanism, said element comprising a body portion, guiding contours on said body portion for cooperation with supporting means on the composing machine, whereby said element may be nested in registering alignment with other similar elements representing adjacent characters to be printed, a pin-carrying frame on each of said body portions, a plurality of pins positionally adjustable on said frame, said pins adapted to be variously adjusted among themselves by the reading-in mechanism to exhibit a compounded coded signal representative of a printing character, to be decoded by said reading-out mechanism.

27. For use in an intelligence transmitting or receiving machine or the like, a signal receiving and character identifying mechanical element, so constructed and arranged that a prescribed compound character code may be established therein and held for decoding, said element for this purpose comprising: a flat, plate-like body portion, guide and retaining surfaces on said body portion for permanent association with cooperating guiding and retaining means on the machine, whereby said element may be secured in alignment with other similar elements against detachment but for relative displacement along a line, and a series of permutable mechanical sub-members movably adjustably carried by said body portion, the relative positioning of said sub-members forming the compound coding representative of a printing text character, said sub-members being returnable to initial normal position for re-coding, whereby said elements are susceptible of continual reuse.

28. The combination with the element set forth in claim 27, of a mandrel-like guide member carried by the machine and passing through a non-circular opening in the element, the non-circular opening constituting the said guiding contour of the body portion of the element and adapted to register with similar openings in adjacent character identifying elements.

29. For use in a typographical composing machine or the like, a signal receiving and character identifying element, so constructed and arranged that a prescribed character code may be established thereon and held for decoding, said element for this purpose comprising: a body portion, guiding contours on said body portion for cooperation with supporting means on the machine, whereby said element may be secured in alignment with other similar elements against detachment but for relative displacement along a line, and a series of permutable submembers adjustably carried by said body portion, the relative positioning of said sub-members forming the compound coding representative of a printing text character, the permutable sub-members comprising code pins movable to adjusted positions in said body portion.

30. A signal receiving and character identifying element as set forth in claim 29 in which a pin-carrying frame is carried by the body portion of the element and the pins are frictionally retained in said frame.

31. A signal receiving and character identifying element as set forth in claim 30 in which the means for frictionally supporting said pins comprise a spring sleeve frictionally surrounding each pin and adapted to continually contact a fixed portion of said element.

32. A signal receiving and character identifying element as set forth in claim 30 in which the element comprises a flat plate-like member having a rectangular guide opening through the central portion thereof and upstanding posts at each end and in which the pin carrier frame bridges the space between said posts and is slidably mounted thereupon.

33. A signal receiving and character identifying element as set forth in claim 32 in which the projecting end of each of said posts is conformed to the general configuration of a rack tooth, whereby it may, together with the other posts of the signal receiving elements of a group, provide a rack for the indexed travel of a cooperating gear-carrying signal transmitter member step-by-step therealong.

34. A signal receiving and character identifying element as set forth in claim 30 in which the element comprises a flat plate-like member having a rectangular guide opening through the central portion thereof and upstanding posts at each end and in which the pin carrier frame bridges the space between said posts and is slidably mounted thereupon to and from the main part of the body portion, and in which the pin carrying frame is co-planar with the body portion of the plate-like element, in which the pins extend entirely through the frame and are adapted to be selectively depressed to coded signal retaining positions by displacement in said frame toward the body portion and restored to normal uncoded position by depression of the frame itself toward the body portion, whereupon the inner ends of said pins abut the body portion and are aligned in the frame.

35. A signal receiving and character identifying element as set forth in claim 34 in which resilient means is provided for urging said pin carrying frame outwardly away from the main body portion of said element.

36. A signal receiving and character identifying element as set forth in claim 35 in which anvil pins are provided which are rigid with said pin carrying frame and are adapted to be contacted by suitable operating mechanism to urge the pin carrying frame toward the main body portion against the resistance of said resilient means, whereby the coded pins may strike the main body portion and be restored to their original alignment.

37. For use in an intelligence transmitting or receiving machine or the like, a signal receiving and character identifying element, so constructed and arranged that a prescribed character code may be established thereon and held for decoding, said element for this purpose comprising: a body portion, guiding contours on said body portion for cooperation with supporting means on the machine, whereby said element may be secured in alignment with other similar elements against detachment but for relative displacement along a line, and a series of permutable sub-members adjustably carried by said body portion, the relative positioning of said sub-members forming the compound coding representative of a printing text character, said signal receiving and character identifying element having a minimum thickness representative of that of the narrowest printing character used, and being provided with individually associated means for expanding it to a width representative of a character of greater width than said minimum, whereby any of said elements may be called upon to be coded to represent a character of minimum width.

38. A signal receiving and character identifying elemena as set forth in claim 37 in which the element is provided individually with a wedge slidably confined with respect to said body portion to increase or decrease the over-all width of the member according to character width, said wedge constituting said expanding means.

39. A signal receiving and character identifying element as set forth in claim 38 in which the element is provided with a tapering groove in one side face and its accompanying wedge is provided with a corresponding taper and is fitted to the groove for sliding adjustment therein to increase the over-all thickness of said element in accordance with the desired swelling thereof for character width or for justification purposes, whereby the outer faces of the element proper and of the associated wedge are maintained parallel in all positions of adjustment.

40. A signal receiving and character identifying element as set forth in claim 39 in which the wedge is provided with an adjustable abutment piece movable on the wedge from an operative to an inoperative position, and adapted when in operative position to be abutted by means for moving the wedge to apply further spacing adjustments above and beyond that provided for character width.

41. A signal receiving and character identifying element as set forth in claim 40 in which said abutment piece is frictionally carried by said wedge whereby it is automatically retained in any position to which it is adjusted.

42. A signal receiving and character identifying element for use in typographical composing machines or the like comprising a plate-like piece adapted to be nested in such machine in alignment with other similar pieces, each respective piece embodying therein an adjustable compound coded signal which in its entirety is representative of the identification of a typographical character, but which must be decoded and translated to depict such character, and also embodying an adjustable signal which is representative of the desired width of the character represented by the coded identification signal, the compound character identifying signal comprising a plurality of pins selectively adjustable to set up a code representative of a single character, and the width signal comprising a wedge individually associated with said piece and adjustable with respect thereto to expand or contract the over-all width of the piece to a width representative of the character width.

43. In an intelligence transmitting and receiving machine or the like, a self-contained intelligence carrier movable as a unit through said machine and comprising a supporting cradle, a pack of separable plate-like signal receiving and character identifying elements permanently disposed in series relationship side-by-side upon said cradle, a plurality of relatively movable parts embodied in each of said elements and susceptible of a compound code adjustment which altogether represents a single typographical character selection, but which must be decoded and translated to depict such character and another movable part embodied in each of said elements susceptible of receiving other adjustments representative of the desired width of the character represented by the coded identification signal.

44. An intelligence carrier as set forth in claim 43 in which said last named width adjustment part when moved serves to expand the respective element in the direction of alignment with relation to the other elements on the cradle and said width adjustment part being provided with a portion adapted to be selectively acted upon to further actuate certain of the same expanding parts to effect an expansion of selected ones of said elements to provide an over-all width of the pack proportional to the length of a line of text composition, as for effecting line justification.

45. An intelligence carrier as set forth in claim 43, in which the cradle is provided with a protruding element adapted to be engaged by a feed screw for transporting it longitudinally from one station to another on the machine, and is further provided with ledges adapted to be contacted by orbital pushing elements for moving the cradle in a transverse direction on the machine, these ledges being cut away at certain points for permitting the orbitally moving elements to pass idly therethrough.

46. An intelligence carrier as set forth in claim 43 in which there is provided a single transmitter device carried by and individually associated with each one of said cradles, said transmitter containing actuatable members through the intermediary of which members suitable reading-in means may successively apply coded signals to the signal receiving elements on the cradle proper, and through the intermediary of which members suitable reading-out means may successively read the coded signals from the signal receiving elements.

47. An intelligence carrier set forth in claim 44 in which a fixed stop is provided at one end of said cradle against which one end of said pack of elements abuts, and a spring pressed follower is carried by said cradle and contacts the opposite end of said pack and resiliently urges the signal receiving elements toward said fixed stop and into snug side-by-side contact with each other, and thus to yieldingly resist expansion of the pack upon expansion of the individual elements thereof.

48. An intelligence carrier as set forth in claim 47 in which there is provided an adjustably fixed limiting stop to confine the total expansion of the pack to a predetermined extent.

49. An intelligence carrier as set forth in claim 47 in which there is provided supplemental means for applying positive retracting and condensing force to said pack in addition to that afforded by the spring urged means.

50. An intelligence carrier as set forth in claim 47 in which the spring pressed follower which urges the pack into condensed form against the fixed stop is provided with differential adjusting means including guiding stop elements on the cradle adapted to be selectively positioned for controlling the position of the carrier for text-centering purposes.

51. An intelligence carrier as set forth in claim 48 in which the spring pressed follower is provided with a longitudinally extending toothed rack which meshes with a pinion carried by a floating element which carries a guiding stop element; and in which a second follower member is provided which carries a second toothed rack adapted to mesh with said pinion on the side thereof opposite said first named rack; and an adjustable guiding projection is carried by said second follower element, whereby one of said guiding stop elements moves twice the distance that the other moves and thus the space remaining after initial adjustment of the signal receiving and character identifying elements may be divided in half for centering the coded line of character elements upon final transmission of intelligence to the text composing portion of the machine.

52. An intelligence carrier as set forth in claim 44 in which the element expanding means comprises wedges, each wedge constituting a permanently associated part of its corresponding character identifying element, in which the cradle frame is provided with a laterally extending outrigger frame projecting beyond the signal receiving and character identifying elements proper, and is adapted to lend support to the wedges which move to and from expanding and contracting positions with respect to the signal elements proper.

53. An intelligence carrier as set forth in claim 46 in which the transmitter device, individually carried by the cradle, is mounted to travel longitudinally of the cradle step-by-step during reading-in and reading-out procedures, and indexing means is provided for positioning the transmitter device adjacent each successive signal receiving element for operating thereon to code and decode said elements.

54. An intelligence carrier as set forth in claim 53 in which the transmitter device is provided with wheels and the cradle proper is provided with tracks along which said wheels may roll, and in which safety retaining means are provided interlocking the transmitter with the cradle to prevent intermittent dislodgment of the transmitter therefrom.

55. An intelligence carrier as set forth in claim 53 in which said indexing means comprises a rack on the cradle and a pinion carried by the transmitter, and means for rotating the pinion step-by-step to move the transmitter from operative position upon one of the signal elements to operative position upon the next adjacent signal element.

56. An intelligence carrier as set forth in claim 55 in which a yielding detent is provided which is adapted to press against said pinion to retain it in successive indexed positions with respect to the rack, against inadvertent dislodgment until again indexed.

57. An intelligence carrier as set forth in claim 56 in which ratchet elements are provided on the transmitter for stepping the pinion forward for indexing the transmitter, said ratchet devices adapted to be actuated during the reading-in and reading-out of intelligence.

58. An intelligence carrier as set forth in claim 57 in which the rack carried by the cradle is formed of individual teeth respectively carried by the aligned signal receiving elements thereon, which teeth in the aggregate constitute a simulated rack along which the transmitter pinion may be indexed when said signal receiving elements are in normal unexpanded condition.

59. An intelligence carrier as set forth in claim 58 in which signal transferring means are carried by the transmitter and disposed in spaced relationship along the line of travel with respect to the point of contact of the pinion with the rack, whereby displacement of the rack teeth upon expansion of the signal receiving elements for character width coding, takes place at a point behind the successive contacts of the pinion with the rack in respect to the direction of travel of the transmitter therealong.

60. An intelligence carrier as set forth in claim 57 in which the ratcheting devices for indexing the rack-engaging pinion on the transmitter are duplicated upon either side of said pinion for actuation during reading-in procedure upon one of said devices and reading-out procedure upon the other of said devices.

61. An intelligence carrier as set forth in claim 57 in which the ratcheting devices for advancing the indexing pinion comprise rack-carrying levers having compound movement, and means for actuating said levers for initially causing the teeth of the ratchet rack to engage the teeth of the pinion and by further movement causing the pinion to advance one unit.

62. In an intelligence transmitting and receiving machine or the like, an intelligence carrier comprising a supporting cradle, a pack of signal receiving and character identifying elements disposed in series relationship side-by-side upon said cradle, means embodied in each of said elements susceptible of a compound coded adjustment representative of typographical character selection, and means embodied in each of said elements susceptible of receiving adjustments representative of corresponding character width, said last named width adjusting means comprising means for individually expanding the respective element in the direction of alignment with relation to the other elements on the cradle, said element expanding means comprising wedges, each wedge constituting a permanently associated part of its corresponding character identifying element, said cradle frame being provided with a laterally extending outrigger frame projecting beyond the signal receiving and character identifying elements proper, and is adapted to lend support to the wedges which move to and from expanding and contracting positions with respect to the signal elements proper, a transmitter device carried by and individually associated with the cradle, through the intermediary of which transmitter device suitable reading-in means may successively apply coded signals to the signal receiving elements on the cradle proper, and through the intermediary of which suitable reading-out means may successively read the coded signals from the signal receiving elements, said transmitter device also including a laterally extending outrigger frame upon which is carried width-coding wedge actuating devices by means of which width-coding signals are transmitted during reading-in procedure to the respective signal member expansion wedges projecting from the cradle.

63. An intelligence carrier as set forth in claim 62 in which wedge-pusher members are provided on guide means carried by the outrigger frame for expanding the signal receiving elements, and wedge-withdrawal members for contracting the signal receiving elements are also carried by said guide means.

64. An intelligence carrier as set forth in claim 63 in which a U-spring is provided on the transmitter outrigger frame having its arms contacting respectively the wedge-pusher and wedge-withdrawal members to yieldingly urge them apart against the impulsion of width-coding signals applied thereto in respective opposite directions.

65. In a typographical composing machine or the like, an intelligence carrier comprising a supporting cradle, a pack of signal receiving and character identifying elements disposed in series relationship side-by-side upon said cradle, means embodied in each of said elements susceptible of a compound coded adjustment representative of typographical character selection, and means embodied in each of said elements susceptible of receiving adjustments representative of corresponding character width, said last named width adjusting means comprising means for individually expanding the respective element in the direction of alignment with relation to the other elements on the cradle, said element expanding means comprising wedges, each wedge constituting a permanently associated part of its corresponding character identifying element, said cradle frame being provided with a laterally extending outrigger frame projecting beyond the signal receiving and character identifying elements proper, and is adapted to lend support to the wedges which move to and from expanding and contracting positions with respect to the signal elements proper, a transmitter device carried by and individually associated with the cradle, through the intermediary of which transmitter device suitable reading-in means may successively apply coded signals to the signal receiving elements on the cradle proper, and through the intermediary of which suitable reading-out means may successively read the coded signals from the signal receiving elements, each signal carrying element in the cradle being provided with character coding pins adapted to be selectively and adjustably depressed with respect to the elements, corresponding movable elements in the transmitter each adapted to be associated with one of the signal receiving element pins, and each adapted during reading-in operation to selectively depress its associated pin, and during reading-out operation to be brought into contact with its respective pin and assume a position corresponding to the coded position of the pin, whereby sensing devices during the reading-out operation may derive intelligence from the relative positions assumed by said movable elements on the transmitter.

66. An intelligence carrier according to claim 65 in which locking means are provided on the transmitter adapted to engage certain of the movable elements inward to resist inadvertent displacement thereof from coded position by contact with the sensing devices upon reading-out.

67. An intelligence carrier as set forth in claim 65 in which the character identification coding pins of the signal receiving elements are carried in movable frames which in turn are provided with anvil abutments, and in which means are provided on the transmitter device for selective movement to contact these abutments and press the frame to restore the coded pins to original position.

68. An intelligence carrier as set forth in claim 67 in which spring retaining means are provided on the transmitter device to yieldingly urge the movable elements toward contact with the pins of the signal receiving members.

69. An intelligence carrier as set forth in claim 68 in which automatically operative means are provided to retract the movable elements from contact with the pins of the signal receiving elements during indexing of the transmitter from one of said elements to the other.

70. In a typographical composing machine or the like, at least three intelligence carriers each adapted to have impressed therein a sequence of character signals, a reading-in device for impressing selected signals upon the intelligence carriers, a reading-out device adapted to engage the intelligence carriers and to interpret the signals contained therein, and means supporting the intelligence carriers for movement along a fixed, endless, closed circuit within the machine, said circuit having definite stations therealong, one at said reading-in device, one at said reading-out device, and at least one being at a point on the circuit intermediate said reading-in and reading-out stations, means for independently propelling said separate carriers along said circuit into operative relationship successively with said stations, whereby one of said carriers may be operatively associated with the reading-in device and another simultaneously operatively associated with the reading-out device, while the third occupies a waiting idle position between said devices.

71. A typographical composing machine or the like as set forth in claim 70 in which the circuit is quadrangular, and an idle or waiting station is interposed in the circuit between the reading-in and reading-out stations upon each side of said station.

72. A typographical composing machine or the like as set forth in claim 71 in which means are provided to lock one intelligence carrier in position at one of said reading devices and means automatically to release said locking means upon movement of a second carrier away from the other reading device.

73. A typographical composing machine or the like as set forth in claim 70 in which each of said intelligence carriers includes means for receiving and retaining coded signals representative of printing characters, means are provided in the reading-in unit for impressing signals onto the carrier step-by-step to form composite signals representative of a line of printed composition, means in said reading-out unit for interpreting the composite signals step-by-step and relay a designation thereof to a camera, means are provided to transport each carrier in sequence to neutral and operative positions with respect to the reading-in and reading-out units, and means for controlling the movement of two of said carriers in response to the movement of a third carrier.

74. A typographical composing machine or the like as set forth in claim 73 in which there are provided trip means to control the movement of a carrier from the operative reading-in position to the neutral position in advance of the reading-out position, said means being rendered operable by the absence of a carrier in said last mentioned position.

75. A typographical composing machine or the like as set forth in claim 74 in which there are provided trip means for initiating the movement of carriers from the neutral advance positions to operative positions in association with the reading-in and reading-out devices in the absence of carriers in said operative positions.

76. In a typographical composing machine or the like, a plurality of intelligence carriers each adapted to have impressed therein a sequence of character signals, a reading-in device for impressing selected signals upon the intelligence carriers, a reading-out device adapted to engage the intelligence carriers and to interpret the signals contained therein, and means supporting the intelligence carriers for movement independently of each other into operative relationship successively with said reading-in and reading-out devices whereby one of said carriers may be operatively associated with the reading-in device and another simultaneously operatively associated with the reading-out device, there being provided detent means for holding a carrier at the reading-in station adjacent said reading-in device, manually operable means at said reading-in device for releasing said detent and initiating the movement of the carrier so held toward the reading-out unit, means disposed at a farther point in the path of said carriers beyond said reading-in unit for detecting the presence of a preceding carrier at said point and for rendering the movement initiating the means ineffective until said preceding carrier has passed beyond said point.

77. A typographical composing machine or the like as set forth in claim 76 in which there are provided tripping means actuatable by the arrival of a carrier at said farther point to reset the said detent, and releasing and movement initiating means for subsequent operation with respect to a following carrier.

78. A typographical composing machine or the like as set forth in claim 77 in which there is provided a singletree lever, said manually operable means being operatively pivotally connected with said singletree lever at one point therealong, an actuating member for moving a carrier, said actuating member being connected to said singletree lever at a second point spaced longitudinally of the lever from said first named point, means for operatively connecting said carrier detecting means at still a third point along said singletree lever spaced from said first two points, whereby considering said third point as a fulcrum for the singletree lever the shifting of the fulcrum according to whether or not a carrier is in contact with said detector means determines whether the actuating member is moved by the urging of the manually operated means.

79. A typographical composing machine or the like as set forth in claim 77 in which the detent means comprises a pivoted latch member adapted to abut a portion of a carrier, and which is operatively connected to a rockshaft extending toward said farther point, said rockshaft being provided with a crank arm, a floating singletree lever, operative connections between said crank arm and a point on said singletree lever, means connecting said actuating member for moving the carrier to said singletree lever at a second point spaced longitudinally from said first named point, means for operatively connecting said carrier detecting means at still a third point on said singletree lever spaced longitudinally from said first points, whereby considering said third point as a fulcrum for the singletree lever the shifting of the fulcrum according to whether or not a carrier is in contact with said detector means determines whether the actuating member is moved by the urging of the crank arm of the rockshaft.

80. A typographical composing machine or the like as set forth in claim 79 in which power operated drive means are provided for the machine and the said actuating member for moving the carrier comprises a clutch which serves to connect and disconnect the carrier moving means with said drive means.

81. In a typographical composing machine or the like, a plurality of intelligence carriers each adapted to have impressed therein a sequence of character signals, a reading-in device for impressing selected signals upon the intelligence carriers, a reading-out device adapted to engage the intelligence carriers and to interpret the signals contained therein, and means supporting the intelligence carriers for movement independently of each other into operative relationship successively with said reading-in and reading-out devices whereby one of said carriers may be operatively associated with the reading-in device and another simultaneously operatively associated with the reading-out device, the means for moving the carriers comprising one or more rotatable screw shafts carried by the machine and cooperating with a projection on each of said carriers which interlocks with the threads of the screw shaft and moves therealong when the shaft is rotated.

82. In a typographical composing machine or the like, a plurality of intelligence carriers each adapted to have impressed therein a sequence of character signals, a reading-in device for impressing selected signals upon the intelligence carriers, a reading-out device adapted to engage the intelligence carriers and to interpret the signals contained therein, and means supporting the intelligence carriers for movement independently of each other into operative relationship successively with said reading-in and reading-out devices whereby one of said carriers may be operatively associated with the reading-in device and another simultaneously operatively associated with the reading-out device, while the third occupies a waiting idle position between said devices, there being provided trip means at said reading-out device adapted to be tripped automatically upon the arrival of a carrier at reading-out position in order to initiate the reading-out process by said unit.

83. A typographical composing machine or the like as set forth in claim 82 in which there are included also automatically actuated means for initiating the movement of a carrier from the reading-out position adjacent the reading-out device only upon completion of the reading-out of intelligence carried by said carrier at said device.

84. A typographical composing machine or the like as set forth in claim 83 in which each intelligence carrier is provided with a series of signal carrying elements, and means are provided in the reading-out device for reading and decoding the signals successively from said signal carrying elements disposed along the length of the carrier, and means in the reading-out unit for continuing the reading-out operation as long as there are signal carrying elements in the intelligence carrier to be read, means in the reading-out device operable upon completion of the reading-out process of all of the signal carrying elements to trip the carrier moving means to initiate the movement of the carrier out of reading-out position with respect to the reading-out device.

85. A typographical composing machine or the like as set forth in claim 84 in which a single revolution clutch is provided in the reading-out unit for connecting its driving means with the source of power, means are provided for actuating said clutch once for each signal carrying element in the carrier to accomplish the sequential reading of the signal carrying elements, means for automatically retripping the clutch for repeated cycles of reading-out operation as long as there are signal carrying elements in the carrier to be read, means associated with the final signal carrying elements for preventing the retripping of the clutch actuated reading-out mechanism when the last signal carrying element has been read, and means for tripping the carrier moving mechanism into operation subsequent to the completion of the last cycle of operation of the reading-out means.

86. A typographical composing machine or the like as set forth in claim 84 in which the reading-out mechanism of the reading-out device is adapted to be actuated through successive cycles of operation, each cycle comprising the reading of a signal from one of sequentially arranged signal carrying elements disposed along a carrier, and in which there are provided trip means for initiating the first cycle of operation of the reading-out mechanism automatically upon the arrival of a carrier at said reading-out device, means for retripping the mechanism for repeated reading cycles for successive signal carrying elements on a carrier, means associated with the last element to be read for preventing the retripping of the mechanism for a succeeding cycle, and means for initiating the transporting of the carrier from reading-out position only upon the completion of the last cycle of operation of the reading-out mechanism.

87. In a typographical composing machine or the like, a plurality of intelligence carriers each adapted to have impressed therein a sequence of character signals, a reading-in device for impressing selected signals upon the intelligence carriers, a reading-out device adapted to engage the intelligence carriers and to interpret the signals contained therein, and means supporting the intelligence carriers for movement independently of each other into operative relationship successively with said reading-in and reading-out devices whereby one of said carriers may be operatively associated with the reading-in device and another simultaneously operatively associated with the reading-out device, there being provided a trigger constituting trip means held in idle position during the time a carrier is at the reading-in or reading-out positions but permitted to trip as said carrier leaves such positions, power operated means for moving the next succeeding carrier from a waiting position up to such reading-in or reading-out position, and means operatively connecting said trip means with said power operated means to activate the latter.

88. A typographical composing machine or the like as set forth in claim 87 in which there is provided a clutch for connecting said power operated means with a source of power, and the trip means is operatively connected to actuate said clutch.

89. In a typographical composing machine or the like, a plurality of intelligence carriers each adapted to have impressed therein a sequence of character signals, a reading-in device for impressing selected signals upon the intelligence carriers, a reading-out device adapted to engage the intelligence carriers and to interpret the signals contained therein, and means supporting the intelligence carriers for movement independently of each other into operative relationship successively with said reading-in and reading-out devices whereby one of said carriers may be operatively associated with the reading-in device and another simultaneously operatively associated with the reading-out device, the power operated means for moving the carriers up to reading-in or reading-out position from preliminary waiting positions comprising at least one turntable having contact points thereon spaced radially from their centers of rotation for sliding contact with appropriate surfaces of said carriers for moving the latter rectilinearly while the turntable elements move in a circular orbit.

90. A typographical composing machine or the like as set forth in claim 89 in which twin turntables are employed having a common drive means and rotating in opposite directions.

91. In a typographical photo-composing machine or the like, a master plate having a plurality of typographical characters thereon and adapted to be moved to as many positions as there are characters thereon to bring the characters selectively into position for adding that character to the desired composition on a film, a film carrier supported adjacent said master plate, a film carried by said film carrier, means for moving said film carrier to progressive positions to have successive areas of the film exposed to the successive characters presented by the controlled movement of said master plate, a self-contained mechanical intelligence carrier, a series of signal receiving elements mounted in a line on said intelligence carrier, each of said signal receiving elements being expansible and contractible in the direction of such alignment, signal adjustments carried by each of said signal receiving elements representative of character identification and selection, means for expanding said signal receiving elements in accordance with the appropriate width and spacing of the selected characters, means for reading-out the character selection adjustments serially from said signal receiving elements and transmitting said adjustments to appropriately position said master plate, and means operative according to the degree of expansion of said signal receiving elements for moving said film carrier a distance required by the width and spacing of the associated character.

92. The typographical composing machine as set forth in claim 91 in which the intelligence bearing unit carries a contact element which moves in a step-by-step manner as the successive contractions of the signal carrying members occur, and is operatively connected with film carrier moving mechanism, whereby the film is correspondingly mover a distance equivalent to the width and spacing of the respective characters, means for moving said intelligence bearing unit into and out of the field of action of said film moving mechanism, and means for setting the film moving mechanism to a zero position upon withdrawal of the intelligence bearing unit and for setting the film moving mechanism to a position corresponding to line length upon introduction of the intelligence bearing unit into said field.

93. In a typographical composing machine, a master plate having a plurality of typographical characters thereon arranged in coordinate positions, i. e. in lines and rows, and adapted to be moved to as many positions as there are characters thereon to bring the characters selectively into position for adding that character to the desired composition, a signal carrying member having a series of indicating adjustments which when adjusted represent severally a character line on the master plate and severally representing a character row on the master plate, and means for reading-out the adjustments in the signal carrying member and moving the master plate accordingly to such selected coordinate positions to present the proper character for composing purposes, a frame for supporting said master plate for sliding movement in one coordinate direction and means for supporting said frame for movement in the other coordinate direction, means for moving said frame, means for moving said plate in said frame, said last named means comprising an elongated element extending in the direction of movement of said frame along which element said plate has sliding movement, whereby said element has constant operative connection with said plate whatever the position of the frame, said frame also adapted to support said plate in reversed position gearing operatively connecting the plate moving and frame moving means with said reading-out means whereby the one moving means is regulated in accordance with the character line signal adjustments and the other in accordance with the character row signal adjustments, and reversing means included in said gearing whereby the master plate may be adjusted in response to any given signal selectively in either of two opposite directions, depending upon whether the plate is installed in ordinary or reversed position.

94. In a typographical composing machine, a master plate having a plurality of typographical characters thereon, and adapted to be moved to as many positions as there are characters thereon to bring the characters selectively into position for adding that character to the desired composition; means whereby said plate may be installed in a reversed position a film carrier supported adjacent said master plate, bearing a film, and adapted to be moved to progressive positions to have successive areas of the film exposed to the successive characters presented by the controlled movement of said master plate; a signal carrying element having adjustments thereon which, when adjusted, represent character identification and character spacing; means for reading-out the adjustments in the signal carrying element and for regulating the position of the master plate accordingly, whereby a particular character is presented in position to be photographed on said film; means for moving the film carrier in response to the character spacing adjustment on the signal carrying element; means for supporting the film for character-to-character adjustment in one coordinate direction and for line-to-line adjustment in the other coordinate direction; reversing means in the operative connections between the reading-out means and the film carrier whereby left-hand composition may be effected as well as right-hand depending upon whether or not the master plate is installed in ordinary or reversed position.

95. The machine according to claim 94 in which differential gearing is provided for the transmission of film shifting movement according to character width, character spacing, and line justification from the reading-out means, in accordance with the signals in the signal carrying elements, and an idler gear is interposed in the differential gearing train in order to effect reversal of direction of movement of the film carrier.

96. In a typographical composing machine, a master plate having a plurality of typographical characters thereon, and adapted to be moved to as many positions as there are characters thereon to bring the characters selectively into position for adding that character to the desired composition; a film carrier supported adjacent said master plate, bearing a film, and adapted to be moved to progressive positions to have successive areas of the film exposed to the successive characters presented by the controlled movement of said master plate; a signal carrying element having adjustments thereon which, when adjusted, represent character identification and character spacing; means for reading-out the adjustments in the signal carrying element and for regulating the position of the master plate accordingly, whereby a particular character is presented in position to be photographed on said film; means for moving the film carrier in response to the character spacing adjustment on the signal carrying element; a light-tight casing for the camera portion of the machine, a light-tight container for said film carrier and film when not in the camera, and a light-lock closure on the container which is adapted to be introduced into an opening in the camera casing and operated to open to discharge the film carrier and its supported film into the camera casing.

97. The machine according to claim 96 in which manually operable means are provided for engaging the film carrier in its container and moving it into the camera casing through said closure and into supported and guided position with respect to the film shifting devices controlled by the reading-out means during operation of the machine.

98. In a typographical composing machine, a master plate having a plurality of typographical characters thereon, and adapted to be moved to as many positions as there are characters thereon to bring the characters selectively into position for adding that character to the desired composition, a signal carrying element having a series of indicating adjustments which when adjusted represent character identification, and means for reading out the adjustments in the signal carrying element to successively move the master plate to positions to present the character appropriate to the successive signals of the series for composing purposes, said last named means comprising at least one cam drum mounted for rotation and axial movement, transmission means responsive to the axial displacement of said drum and operatively connected with the master plate for shifting it in the process of selecting a character thereon, power means for rotating said drum through a cycle of rotation for each character selection, and means responsive to the indicating adjustments on the signal carrying elements for selectively projecting an abutment into the path of the cam drum during a rotation thereof to cause the drum to be cammed axially to an axially displaced position called for by the character identification signal adjustment on said signal receiving element.

99. The typographical composing machine as set forth in claim 98 in which said signal receiving element includes pins selectively displaced from normal initial positions in coded relationship, and in which are provided feeler bars in the reading-out means adapted to at least indirectly contact and be positioned by the coded signal adjustments of said pins, abutmetns adapted selectively to be projected into the path of said cam drum by the action of said feeler bars to cam the drum axially to the appropriate axially displaced position.

100. In a typographical composing machine, a master plate having a plurality of typographical characters thereon arranged in coordinate positions, i. e. in lines and rows, and adapted to be moved to as many positions as there are characters thereon to bring the characters selectively into position for adding that character to the desired composition, a signal carrying element having a series of indicating adjustments which when adjusted represent severally a character line on the master plate and severally representing a character row on the master plate, and means for reading-out the adjustments in the signal carrying element and moving the master plate accordingly to such selected coordinate positions to present the proper character for composing purposes, said last named means comprising two cam drums each mounted for rotation and axial movement, transmission means responsive to the axial displacement of one of said drums operatively connected with said master plate to shift it for character line selection, and transmission means responsive to the axial displacement of the other of said drums operatively connected with said master plate to shift it for character row selection, power means for rotating said drums through a cycle of rotation for each character selection, means responsive to the indicating adjustment on said signal receiving element representative of character line selection for projecting an abutment into the path of one of said cam drums during a rotation thereof to cause the drum to be cammed axially to an axially displaced position called for by the said line signal adjustment, and means responsive to the indicated adjustment on said signal receiving element representative of character row selection for projecting an abutment into the path of the other of said drums to cause it to be cammed axially to an axially displaced position called for by the row signal adjustment of said signal receiving element.

101. The typographical composing machine as set forth in claim 100 in which said signal receiving element includes pins selectively displaced from normal position in coded relationship, certain pins on the signal receiving element being coded for an indication of row-to-row displacement of said master plate along one of its coordinates, and other pins for line-to-line displacement of the plate along the other coordinate, and in which there are provided two sets of feeler bars in the reading out means each set adapted to at least indirectly contact and be positioned b ythe coded signal adjustment of one set of said pins, drum centering stop pins operatively connected with and projectible by said respective feeler bars into the path of said respective cam drums to guide said drums axially to axially displaced positions corresponding to the selected position on the respective coordinates.

102. The typographical composing machine as set forth in claim 101 in which means are provided for camming the central stop pins back to retracted position toward the end of a cycle of rotation of said drum, and locking means for said drums which hold them in selected positions after said centering pins have been cammed back.

103. The typographical composing machine as set forth in claim 101 in which a rack is fixed to each drum to extend in an axial direction with respect thereto, a pinion meshes with each of said racks and is carried upon a rotatable shaft which extends into the camera means and is connected by suitable gearing to move the master plate.

104. In a typographical composing machine, which comprises a master plate having a plurality of typographical characters thereon, and adapted to be moved to as many positions as there are characters thereon to bring the characters selectively into position for adding that character to the desired composition, a signal carrying element having a series of indicating adjustments which when adjusted represent character identification, and means for reading-out the adjustments in the signal carrying element to successively move the master plate to positions to present the character appropriate to the successive signals of the series for composing purposes; a film to receive successively images of the selected characters from the master plate, a film carrier movably carried adjacent the master plate and camera means for exposing successive areas of said film to successively presented characters on said master plate, each of said signal receiving elements comprising mechanical elements adapted to be impressed with a coded adjustment representative of a type character, and a plurality of said signal receiving elements being combined into a self-contained mobile intelligence bearing unit representing a line of characters; said composing machine being characterized by the inclusion in said reading-out means of a power operated device including an operation controlling shaft, a one-revolution clutch for intermittently connecting said shaft to a power source for a single cycle of reading-out movement, means for transporting the intelligence bearing unit into and out of the operative field of said device, and means for tripping the clutch for repeated cyclic operation of the shaft as long as said intelligence bearing unit is within said operative field.

105. In a typographical composing machine, which comprises a master plate having a plurality of typographical characters thereon, and adapted to be moved to as many positions as there are characters thereon to bring the characters selectively into position for adding that character to the desired composition, a signal carrying element having a series of indicating adjustments which when adjusted represent character identification, and means for reading-out the adjustments in the signal carrying element to successively move the master plate to positions to present the character appropriate to the successive signals of the series for composing purposes; a film to receive successively images of the selected characters from the master plate, a film carrier movably carried adjacent the master plate and camera means for exposing successive areas of said film to successively presented characters on said master plate, each of said signal receiving elements comprising mechanical elements adapted to be impressed with a coded adjustment representative of a type character, and a plurality of said signal receiving elements being combined into each of a plurality of self-contained mobile intelligence bearing units representing a line of characters; said units adapted to be successively moved into the control of and away from the reading-out means said composing machine being characterized by the inclusion in said reading-out means of a power operated device adapted to accomplish through various transmission trains multiple operations involved in reading-out the intelligence carried by said unit and involved in adjusting, controlling and operating the camera means, means in said reading-out means controlled by means on said intelligence bearing unit for causing said device to repeat one cycle of its operation once for each of its successive signal receiving elements and for stopping said device when all coded signal receiving elements carried by the intelligence bearing unit have been read out, and means for thereafter freeing the unit for movement away from said reading-out means upon the arrival of a preceding unit at a predetermined point.

106. The typographical composing machine as set forth in claim 105 in which the intelligence bearing unit includes a series of expanding devices one associated with each of said signal receiving elements and adapted to swell the width of the latter a distance commensurate with the width of the character represented thereby, means for moving said film step-by-step in the camera portion of the machine for the photographing of successive characters, and means controlled by the degree of movement of said expanding device for determining the length of movement of said film.

107. The typographical composing machine as set forth in claim 106 in which are provided means in the power operated device for successively withdrawing the expanding devices as the coded signals are read-out from the signal carrying members, and means for condensing the intelligence bearing unit as each expanding device is so withdrawn.

108. The typographical composing machine as set forth in claim 106 in which the expanding devices are wedge members, each constituting an operative part of one of said signal receiving elements, said wedge members adapted to be adjusted for character width, and also selectively further adjusted to space the signal receiving elements for line justification purposes, cam means are provided in said power operated devices, and a rake is provided for actuation by said cam means to periodically and successively withdraw said wedge members.

109. In a typographical composing machine, a master plate having a plurality of typographical characters thereon, and adapted to be moved to as many positions as there are characters thereon to bring the characters selectively into position for adding that character to the desired composition, a signal carrying element having a series of indicating adjustments which when adjusted represent character identification, and means for reading-out the adjustments in the signal carrying element to successively move the master plate to positions to present the character appropriate to the successive signals of the series for composing purposes; a film to receive successively images of the selected characters from the master plate, a film carrier movably carried adjacent the master plate and camera means for exposing successive areas of said film to successively presented characters on said master plate, each of said signal receiving elements comprising mechanical elements adapted to be impressed with a coded adjustment representative of a type character, and a plurality of said signal receiving elements being combined into a self-contained mobile intelligence bearing unit representing a line of characters; said reading-out means comprising a power operated device adapted to accomplish through various transmission trains multiple operations involved in reading-out the intelligence carried by said unit and involved in adjusting, controlling and operating the camera means, each of the signal receiving elements including a series of pins adapted to be depressed selectively by appropriate reading-in means, said reading-out means including a series of feeler bars which are adapted to be moved into sensing relationship with said pins, means associated with said sensing bars for transmitting the coded intelligence derived from the relative positions of said pins to the master plate to move the last named to position the selected character to the camera means, and means included in the power operated device for advancing said sensing bars cyclically once for the presentation of each signal carrying member.

110. The typographical composing machine as set forth in claim 109 in which a trolley-like transmitter is mounted upon said intelligence bearing unit for progressive movement therealong to overlie and operate upon each of the signal receiving elements in succession during the reading-out process, and intervening means are provided on said transmitter for operatively connecting the sensing bars of said reading-out unit with the signal carrying pins of the signal receiving element.

111. The typographical composing machine as set forth in claim 110 in which said transmitter includes a series of sensing pins corresponding in number and position wth the code pins of the signal carrying member, and adapted to contact the coded pins and themselves adopt a position corresponding to that of their associated code pins, and means for locking said sensing pins in coded position until contacted by the sensing bars of the reading-out unit, and means driven from said power operated device for actuating the sensing pin lock.

112. The typographical composing machine as set forth in claim 111 in which there are provided in the reading-out unit a plurality of code bars adapted to be latched into positions determined by the position of the sensing bars, means for latching said code bars, and means for transmitting to said master plate a movement determined by the resulting position of said code bars.

113. The typographical composing machine as set forth in claim 111 in which certain of the code pins of the signal carrying members convey signals for one coordinate movement of said master plate and the others convey signals for movement of the plate in the other coordinate direction, and thus certain code bars in the reading-out unit transmit corresponding movements, whereby certain of the code bars are adapted to actuate a transmission to effect one of said movements and the others to actuate a second transmission to effect the other of said coordinate movements.

114. The typographical composing machine as set forth in claim 113 in which each of said transmissions includes a stop cam pin and a cam drum, the latter mounted for both rotary and axial movement in said reading-out unit, each of said cam pins being actuated by a code bar to cam its associated drum, during rotation thereof, to an axial position corresponding to one coordinate position of said master plate.

115. The typographical composing machine as set forth in claim 112 in which are provided means actuated by said power operated device to reset the code bars after they have once functioned, and means also actuated by said power operated device for latching the code bars.

116. The typographical composing machine as set forth in claim 114 in which selector levers associated respectively with said cam pins are brought into feeler contact with said code bars which are notched and positioned according to the coded intelligence being transmitted and are moved to cam-pin-actuating position depending on whether or not they encounter a notch in the code bar, and in which means are provided in said power operated device for moving said selector levers.

117. The typographical composing machine as set forth in claim 111 in which means are provided in said power operated device for lifting the sensing pins of the transmitter after the reading-out operation.

118. In a typographical composing machine, a master plate having a plurality of typographical characters thereon, and adapted to be moved to as many positions as there are characters thereon to bring the characters selectively into position for adding that character to the desired composition; a film carrier supported adjacent said master plate, bearing a film, and adapted to be moved to progressive positions to have successive areas of the film exposed to the successive characters presented by the controlled movement of said master plate; an intelligence bearing unit carrying a series of aligned signal receiving elements each coded with an adjustment for character identification and an adjustment for character width and spacing; a reading-out device including means under the control of said character identification adjustment for regulating the movement of said master plate for character selection, and including also an element movable step-by-step as the signal carrying members are read-out a distance corresponding to the width and spacing of the instant character; and means in the reading-out device actuated by said step-by-step element and operatively connected with the film carrier to step the latter along a distance corresponding to said width and spacing for the next character exposure.

119. The typographical composing machine as set forth in claim 118 in which transfer means are provided for moving said intelligence bearing unit into and out of the field of action of said reading-out device, means for setting automatically the film carrier stepping means at a zero position upon the withdrawal of the intelligence bearing unit, and means for setting said stepping means at a position representing the full length of a line of composition upon the arrival of the intelligence bearing unit in the said field of action.

120. The typographical composing machine as set forth in claim 119 in which the adjustment for character width and spacing is accomplished by the projection and retraction of a wedge element associated with each of said signal carrying members; means for causing the progressive change in the signal carrying members due to the movement of said wedges to move said step-by-step element accordingly; and the film carrier moving means in the reading-out device comprising an abutment operatively contacted by said step-by-step element, said abutment carrying a rack which meshes with a gear member which in turn is fixed to a shaft extending into the camera portion of the machine and, through other rack and bearing transmission, moves the film an appropriate distance for each character.

121. In a typographical composing machine, a master plate having a plurality of typographical characters thereon, and adapted to be moved to as many positions as there are characters thereon to bring the characters selectively into position for adding that character to the desired composition, a film carrier supported adjacent said master plate, bearing a film, and adapted to be moved to progressive positions to have successive areas of the film exposed to the successive characters presented by the controlled movement of said master plate, a signal carrying element having adjustments thereon which, when adjusted, represent character identification and character spacing, means for reading-out the adjustments in the signal carrying element and for regulating the position of the master plate accordingly whereby a particular character is presented in position to be photographed on said film, and means for moving the film carrier in response to the character spacing adjustment on the signal carrying element, a light aperture and lens system lined up in the camera portion of the machine opposite the point of presentation of the selected master plate character and the next spot on the film to be exposed for character imprinting, vertical guides in said camera portion, a horizontal guide frame vertically adjustable in said vertical guide, and means for supporting said film carrier on said horizontal frame for horizontal adjustment therealong, automatically operable means for moving the film carrier and guide frame vertically for line-to-line shift upon the completion of the composition of a line of characters, and automatic means adapted to be tripped by the arrival of the film carrier and guide frame at the end of its limit of vertical movement as upon the completion of a column of composition, for shifting the film carrier laterally and restoring it to its initial point of vertical movement for the composition of a subsequent column.

122. The typographical composing machine as set forth in claim 121 in which the line-to-line shift of the film carrier and guide frame is effected by a pawl and ratchet device and in which the ratchet is blanked out of contact with the pawl for the purpose of effecting zone-to-zone shift as for starting a new column.

123. The typographical composing machine as set forth in claim 121 in which supplemental manually operated means is provided for effecting zone-to-zone shift as for the beginning of a new column.

124. In a typographical composing machine, a master plate having a plurality of typographical characters thereon, and adapted to be moved to as many positions as there are characters thereon to bring the characters selectively into position for adding that character to the desired composition, a film carrier supported adjacent said master plate, bearing a film, and adapted to be moved to progressive positions to have successive areas of the film exposed to the successive characters presented by the controlled movement of said master plate, a signal carrying element having adjustments thereon which, when adjusted, represent character identification and character spacing, means for reading-out the adjustments in the signal carrying element and for regulating the position of the master plate accordingly whereby a particular character is presented in position to be photographed on said film, and means for moving the film carrier in response to the character spacing adjustments on the signal carrying element, a light aperture and lens system lined up in the camera portion of the machine opposite the point of presentation of the selected master plate character and the next spot on the film to be exposed for character imprinting, vertical guides in said camera portion, a horizontal guide frame vertically adjustable in said vertical guides, and means for supporting said film carrier on said horizontal frame for horizontal adjustment therealong, a differential gearing system incorporated in the transmission from the step-by-step element to the film carrier, said system including an idler gear adapted to be selectively brought into and out of operation in the system, for driving the film carrier in either one of its two directions of progressive movement to accomplish right-hand or left-hand reading.

125. In a typographical composing machine, a master plate having a plurality of typographical characters thereon, and adapted to be moved to as many positions as there are characters thereon to bring the characters selectively into position for adding that character to the desired composition, a film carrier supported adjacent said master plate, bearing a film, and adapted to be moved to progressive positions to have successive areas of the film exposed to the successive characters presented by the controlled movement of said master plate, a signal carrying element having adjustments thereon which, when adjusted, represent character identification and character spacing, means for reading-out the adjustments in the signal carrying element and for regulating the position of the master plate accordingly whereby a particular character is presented in position to be photographed on said film, and means for moving the film carrier in response to the character spacing adjustment on the signal carrying element, a light aperture and lens system lined up in the camera portion of the machine opposite the point of presentation of the selected master plate character and the next spot on the film to be exposed for character imprinting, vertical guides in said camera portion, a horizontal guide frame vertically adjustable in said vertical guides, and means for supporting said film carrier on said horizontal frame for horizontal adjustment therealong, spring means for urging the film carrier in its progressive character-to-character movement, said spring means being mounted for over-dead-center adjustment for reversing the direction of urging of the film carrier for right and left-hand feed thereof.

126. In a typographical composing machine or the like, in unitary structural combination, a self-contained mobile intelligence carrier, said carrier including a series of signal receiving elements mounted thereon in permanent alignment, means on each of said elements for receiving an adjustment representative of printing character identification, means associated with each of said elements for expanding itself in the direction of alignment with the other elements, to a degree representative of the width spacing of the character represented thereby; a reading-in unit including a keyboard and means operative from said keyboard for impressing step-by-step both the character identification adjustment and the appropriate expansion adjustment on the successive elements; a reading-out unit for translating both the identification and width spacing signal adjustments from said carrier and including means for successively contracting said elements to the same degree to which they were expanded by said reading-in unit; means for composing text according to the character selection and character width spacing; and means in said reading-out means operating in accordance with the degree of contraction of the said elements for controlling the character width spacing of the characters by the composing means.

127. In a composing machine or the like, apparatus for establishing coded signals in an intelligence carrier from which such signals may be read and interpreted as for typographical composition purposes, said apparatus comprising, in combination, a keyboard having selectively actuatable keys corresponding to printing characters; an intelligence carrier for receiving adjustments representative of said characters; a set of character coding elements; linkages operatively connected with said keys for setting up compound coded positional adjustments representative of a character in said set of elements; another set of adjustable elements susceptible of similar coded adjustments for impressing the corresponding coded signal adjustments on the carrier; and power operated means operatively interposed between said sets of elements and controlled by the first named manually adjustable key-positioned elements for providing power actuation of the second named adjustable elements, to relieve the key-positioned elements of the load of impressing the adjustments on the carrier.

128. The composing machine as set forth in claim 127 in which the first named coded elements comprise permutably positionable pieces provided with abutments, the second named group of elements comprise similar pieces provided with abutments and respectively spaced from said first named group; said power operated means comprising a plurality of levers, one end of each of said levers associated respectively wtih one of the pieces of one of said groups, and the other end of each lever associated respectively with one of the pieces of the other of said groups; a support upon which said levers are freely pivoted, means connecting said support with said power means for intermittently moving said support; whereby such levers whose ends encounter abutments on the manually positioned pieces will pivot and their opposite ends will correspondingly actuate the pieces of the second named group to powerfully apply the proper selected coded signals to the intelligence carrier representative of a character.

129. In a composing machine or the like, apparatus for establishing coded signals representative of printing characters in an intelligence carrier from which said signals may subsequently be read and translated as for typographical composition purposes, which apparatus comprises an intelligence carrier adapted to receive said coded signals representative of a printing character; and a keyboard having the usual complement of keys each representing a printing character; the improvement which is characterized by the provision of a group of mechanical elements far fewer in number than the keys of the keyboard and susceptible of selectively permutable coded adjustments within said group, each compound adjustment of the group representing a single character, and adapted to impress their adjustment on said carrier; means for setting up said compound coded signals in said group of elements from the single actuation of a selected key; said last named means comprising a plurality of movable pieces equal in number to the keys on the keyboard and each actuated by one of said keys, each piece having at least one abutment thereon, the number and location of said abutments in each of said pieces being different, a series of trippable pieces extending in proximity to all of said first named pieces and adapted to be tripped selectively by said variously arranged abutments to represent a character, and operative connections between said second group of pieces and said group of mechanical elements which impress the carrier.

130. In a composing machine or the like, apparatus for establishing coded signals representative of printing characters in an intelligence carrier from which said signals may subsequently be read and translated as for typographical composition purposes, said apparatus comprising, in combination, an intelligence carrier adapted to receive said coded signals representative of a printing character; a keyboard having the usual complement of keys each representing a printing character; a group of mechanical elements far fewer in number than the keys of the keyboard and susceptible of selective permutable coded adjustments within said group, each compound adjustment of the group representing a single character, and adapted to impress their adjustment on said carrier; means for setting up said compound code signals in said group of elements from the single actuation of a selected key; said last named means comprising a plurality of slidable hollow rectangular frames equal in number to the keys on the keyboard, arranged side by side, and each adapted to be moved in one direction respectively by the actuation of one of said keys, a series of lugs on each of said frames the lugs occupying different positions in each frame; a series of vanes far fewer in number than the keys and the frames, extending through all of the frames, pivoted at their central portions, and having their edges disposed in the paths of certain of the lugs on said frames; the permutable arrangement of the lugs on the various frames determining whether or not a vane is tilted; means operatively connected with said vanes for transmitting their selective coded tilting to similarly move said carrier impressing elements.

131. The composing machine as set forth in claim 130 in which are provided means for effecting shift from lower case to upper case and vice versa comprising a shift key on said keyboard, transmission means connecting said shift key with a movable piece similar to said first named piece which actuates a vane which in turn modifies the compound signal impressed on the carrier in accordance with whether the character is lower case or upper case.

132. In a composing machine or the like, apparatus for establishing coded signals representative of printing characters in an intelligence carrier from which said signals may subsequently be read and translated as for typographical composition purposes, said apparatus comprising, in combination, an intelligence carrier adapted to receive said coded signals representative of a printing character; a keyboard having the usual complement of keys each representing a printing character, a group of mechanical elements far fewer in number than the keys of the keyboard and susceptible of selectively permutable coded adjustments within said group, each compound adjustment of the group representing a single character, and adapted to impress their adjustment on said carrier; means for setting up said compound code signals in said group of elements from the single actuation of a selected key; said last named means comprising a plurality of slidable hollow rectangular frames equal in number to the keys on the keyboard, arranged side-by-side, and each adapted to be moved in one direction respectively by the actuation of one of said keys; a series of lugs on the opposite sides of each of said frames, the lugs occupying different positions in each frame; a series of vanes far fewer in number than the keys and the frames, extending through all of the frames, pivoted at their central portions, and having their opposite edges disposed in the paths of certain of the lugs on the opposite sides of said frames, the permutable arrangement of the lugs on the opposite sides of the various frames determining whether or not a vane is tilted and in which direction; means operatively connected with said vanes for transmitting their selective coded tilting to similarly move said carrier impressing elements.

133. In a composing machine or the like, apparatus for establishing signals in an intelligence carrier from which such signals may be read as for typographical composition purposes, said apparatus comprising, in combination, a keyboard having selectively actuatable keys corresponding to printing characters; an intelligence carrier for receiving adjustments representative of said characters, and also for reeciving other adjustments representative of the width and spacing of such characters; means for transmitting, for each depression of a character key, a signal representative of corresponding character width to said carrier; said last named means comprising a device movable with respect to the carrier a distance proportionate to the width of the character, a series of trippable stop abutments; a member forming a part of said movable device adapted to abut a selected tripped one of said stop abutments to limit its movement in accordance with the width of the character selected by the key; transmission mechanism operatively connecting said stop abutments with said keys; said transmission mechanism comprising a series of tiltable vanes one for each width of character provided for, a plurality of elements disposed in proximity to the edges of said vanes upon one side thereof and each operatively connected to one of the character keys to be moved thereby relatively to said vanes, a number of movable elements operatively connected with said trippable stop abutments and arranged in proximity to the edges of said vanes on the opposite side thereof, lugs on said last named elements for abutment by said respective vanes to actuate the corresponding stop abutment, and variably positioned lugs on said first named key-connected elements coded for tilting said vanes selectively according to the width appropriate to the character on the key depressed, and means for actuating said movable width signal applying device once for each depression of a key.

134. The composing machine as set forth in claim 133 in which said stop abutments are arranged in parallel alignment and are of various graduated lengths, in which said member which forms a part of said movable device and abuts the stop abutments is elongated in the direction of alignment of the stop abutments, in which means are provided for pivoting said member at one of its ends to the movable device, and means are provided for adjustably positioning the opposite end of said member with respect to the device to alter its angularity with respect to the series of graduated stop abutments, and means adapted to be actuated by the operator to vary the angularity of said member according to the variations in the range of set sizes of type desired.

135. In a composing machine or the like, apparatus for establishing signals in an intelligence carrier from which such signals may be read as for typographical composition purposes, said apparatus comprising, in combination, a keyboard having selectively actuatable keys corresponding to printing characters; an intelligence carrier for receiving adjustments representative of said characters, and also for receiving other adjustments representative of the width and spacing of such characters; a series of permutable movable elements for impressing coded signals on said carrier representative of a printing character, said elements being far fewer in number than the number of character keys on the keyboard; a series of controlling elements selectively actuatable to apply said width signals to said carrier, each of said elements representing one of the limited number of widths of characters within the range provided for and each width appropriate to one or more printed characters; transmission means actuated by the depression of any character key to set up coded adjustments in said permutable elements and comprising movable piece one for each character key, said pieces each provided with variably positioned abutments, a series of tiltable elements adapted to be moved by said abutments in coded variable combinations, and means for causing the tilting of said elements to actuate said first named permutable movable elements to impress a coded compound signal on the carrier; transmission means also actuated by the depression of any character key to move one of a series of members relatively to a second series of tiltable elements, one of said tiltable elements for each width of character provided, lugs on said members positioned thereon in accordance with the width of character represented by the key with which it is associated, said lugs adapted to selectively actuate the tiltable element of said second series appropriate to the character width, and means connecting said second series of tiltable elements with the said controlling elements for applying width signals to the carrier.

136. In a composing machine of the class described, in combination, an intelligence carrier having a plurality of signal receiving elements arranged side-by-side thereon, each of said elements provided with means for receiving coded adjustments representative of a printing character, and each of said elements provided with a wedge movable in either direction to respectively swell or condense the width of said element, the adjusted width of said element constituting a signal representative of the width of the character represented by the coded signal impressed thereon; means for reading and interpreting said character identifying and width signals; and reading-in means for establishing said signals in the carrier; said reading-in means comprising a keyboard, coding mechanism for setting up character identification signals in said signal receiving element on the carrier, transmission means operatively connecting said character keys with said mechanism to operate it in accordance with the character selected, said reading-in means also comprising means for adjusting said wedges for swelling the signal receiving elements to any one of a limited range of widths, and transmission means for operatively connecting said keys with said wedge adjusting mechanism, said last named transmission means embodying means for automatically operatively connecting the keys of all characters of any given width with the means for adjusting the wedges to represent that width.

137. The composing machine as set forth in claim 136 in which limiting stops are provided for confining the accumulated swelling of said signal receiving elements in the carrier to the maximum length of a line of type, certain signal receiving elements adapted to be coded to represent word-spaces, wedges associated with said word-spacing signal receiving elements, and means at the keyboard for moving said word-space wedges further to expand the line of elements for line justification.

138. In a composing machine of the class described, in combination, a self-contained mobile intelligence carrier adapted to receive signals representative of textual composition at a reading-in station and to have said signals read-out at a reading-out station, said carrier containing a series of signal receiving elements side-by-side thereon, each signal receiving element adapted to be impressed with a coded signal representative of a character in a line of type composition, wedges extending between said elements and adjustable for establishing a signal indicative of character width, other wedges associated with elements representative of word-spaces; a reading-in machine at said reading-in station comprising means for establishing character identification signals in said signal receiving elements on the carrier, means for adjusting certain of said wedges for character width and spacing, and still other means for further adjusting the word-space wedges for expanding the line of signal receiving elements for establishing line justification signals in the self-contained carrier.

139. The composing machine as set forth in claim 138 in which are provided shiftable actuating abutment pieces one carried by each wedge, character-size adjusting means in said reading-in machine adapted to operate on a wedge through said abutment when said abutment is in one position of adjustment, and justification adjusting means adapted to operate on a wedge through said abutment when it is in another position of adjustment; and means in said reading-in machine for shifting said abutments.

140. The composing machine as set forth in claim 138 in which means are provided in said reading-in machine for setting up a limiting stop for the maxium expansion of the signal receiving elements collectively on said carrier which stop confines the adjustment of the wedges for justification to the extent necessary for that purpose.

141. The machine as set forth in claim 140 in which tabular setting means are provided in the reading-in device for varying the position of said justification line limit means in accordance with tabulation requirements in the copy to be composed.

142. The composing machine as set forth in claim 138 in which the means for adjusting the wedges for justification purposes is a manually operable member at the keyboard, and means operatively connected with said manually operated member are provided to initiate the travel of said mobile carrier from the reading-in station.

143. The composing machine as set forth in claim 139 in which means are provided in the reading-in machine for restoring said shiftable abutments to normal position after the justification movement has been accomplished.

144. In a machine of the class described, in combination, a keyboard having character selecting keys; mechanism for reading into a receptive medium a series of code signals representative of capital or lower case printing characters, interconnecting means linking said keyboard and said reading-in mechanism whereby signals representative of characters selected by the depression of the respective character keys are relayed to said reading-in means; said interconnecting means including pairs of reciprocatable reeds, the reeds of each pair being positioned closely to each other with their remote ends operatively connected with elements in said reading-in mechanism associated respectively with upper case and lower case coding means for the same character, and their near ends offset slightly from each other; a plunger operatively connected with each character key and having its opposite end disposed in the vicinity of the near ends of said reeds, and swinging means guiding said plunger toward one or the other of the reeds of said pair; and a shift key on said keyboard operatively connected with said swinging guide means to shift the latter in accordance with whether upper case or lower case characters are to be selected.

145. In a composing machine or the like, in combination, an intelligence carrier; a reading-in unit, provided with a keyboard, for impressing signals on said carrier representative of printing character identification and also signals representative of character spacing; and a reading-out unit for receiving said signals from said carrier and effecting typographical composition based thereon; the signals representative of character spacing comprising extension adjustments of sliding elements carried by said carrier; said reading-in unit including means operative upon the depression of any character key to move said sliding elements to a maxium limit in one direction and means operative by the same depression of a key to afterward move said sliding elements back to a graduated degree representative of selected charactei spacing, and graduated stop means for limiting such return movement to that appropriate for the character selected, and means operatively connecting each of said graduated stop means with all character keys representing characters of the same spacing requirements.

146. The machine as set forth in claim 145 in which the second named sliding element moving means includes an angularly adjustable abutment bar adapted to strike selected ones of said graduated stop means, and manually operable means are provided for varying the angularity of said bar to vary the increments of graduation of said stop means for desired changes in the set of the typography.

147. In a composing machine or the like, in combination, an intelligence carrier; a reading-in unit, provided with a keyboard, for impressing signals on said carrier representative of printing character identification and also signals representative of character spacing; and a reading-out unit for receiving said signals from said carrier and effecting typographical composition based thereon; the signals representative of character spacing comprising extension adjustments of wedges carried by said carrier; said reading-in unit including power means operative upon the depression of any character key to move said wedges to a maxium limit in wedge-applying direction and power operated rake means operative by the same depression of a key to afterward move said wedges back to a graduated degree representative of selected character spacing, and graduated stop means for limiting such return movement to that appropriate for the character selected, and means operatively connecting each of said graduated stop means with all character keys representing characters of the same spacing requirements.

148. In a composing machine or the like, in combination, an intelligence carrier; a reading-in unit, provided with a keyboard, for impressing signals on said carrier representative of printing character identification and also signals representative of character spacing; and a reading-out unit for receiving said signals from said carrier and effecting typographical composition based thereon; the signals representative of character spacing comprising extension adjustments of sliding elements carried by said carrier; said reading-in unit including means operative upon the depression of a selected character key for selectively contacting said sliding elements upon one side thereof to move them in applying direction relatively to the carrier, and means also operative upon the depression of said key for contacting said elements upon the opposite side to move them respectively in the opposite or withdrawing direction, an abutment piece operatively connected with the said withdrawing means, and a series of selectively actuatable graduated stop elements each adapted to be placed in the path of said adjustment piece to limit the withdrawal movement of said second named contacting means to a degree commensurate with the setting of the sliding element for the width of character selected by the key depressed, common means for yieldingly operating both of said contacting and moving means, whereby both are caused to operate upon the selected sliding element, the movement of said withdrawing means predominating until it is stopped by the graduated abutment piece whereupon the oppositely moving means urges the sliding element in applying direction up to contact with the other means.

149. In a composing machine or the like, in combination, an intelligence carrier; a reading-in unit, provided with a keyboard, for impressing signals on said carrier representative of printing character identification and also signals representative of character spacing; and a reading-out unit for receiving said signals from said carrier and effecting typographical composition based thereon; means for causing said intelligence carrier to travel from said reading-in unit to said reading-out unit the intelligence carrier comprising a series of signal receiving elements each of which comprises a frame carrying a row of frictionally adjustable code receiving pins and each provided with an adjustable wedge for effecting a character width and spacing setting of the element a wedge pusher in said reading-in unit for moving selected wedges in one direction and a wedge rake in said reading-in unit for moving the wedges to a degree in the opposite direction proportionate to the width of the character selected, code pin adjusting means in said reading-in unit adapted to set the pins on the signal receiving element, and means for restoring the code pins to normal position, a power shaft in said reading-in unit, means for rotating said shaft through successive cycles of operation, and separate cams on said shaft for respectively actuating the wedge pusher, wedge rake, pin setter, and pin restoring devices.

150. In a composing machine or the like, in combination, an intelligence carrier; a reading-in unit, provided with a keyboard, for impressing signals on said carrier representative of printing character identification and also signals representative of character spacing; and a reading-out unit for receiving said signals from said carrier and effecting typographical composition based thereon; the intelligence carrier comprising a series of signal receiving elements each of which comprises a frame carrying a row of frictionally adjustable code receiving pins and each provided with an adjustable wedge for effecting a character width and spacing setting of the element, a transmitter device adapted to move progressively along said carrier in one direction for successively transmitting the coded pin positional signals to the elements from the reading-in unit and from said elements to the reading-out unit, a wedge pusher in said reading-in unit for moving selected wedges in one direction and a wedge rake in said reading-in unit for moving the wedges to a degree in the opposite direction proportionate to the width of the character selected, code pin adjusting means in said reading-in unit adapted to set the pins on the signal receiving element, and means for restoring the code pins to normal position, means on said transmitter for transmitting the pin setting, pin clearing, wedge pushing and wedge raking motions from the reading-in unit to the carrier and means for indexing the progressive movement of said transmitter along said carrier, a power shaft in said reading-in unit, means for rotating said shaft through successive cycles of operation, and separate cams on said shaft for respectively actuating the wedge pusher, wedge rake, pin setter, pin restoring and transmitter indexing devices.

151. The machine as set forth in claim 150 in which means are provided in the reading-in unit keyboard for stepping said transmitter backward past one or more of said signal receiving elements.

152. In an intelligence transmitting and receiving machine of the class described, a coded signal reading-in unit, a reading-out unit, a signal receiving and character identifying element, means for moving said element from said reading-in unit to said reading-out unit and return, said element being so constructed and arranged that a prescribed character code adjustment may be established thereon at said reading-in unit and held thereon for decoding at said reading-out unit and maintained thereon until the return of said element to said reading-in unit, means for applying said adjustments at said reading-in unit and for sensing said adjustments for decoding the said reading-out unit without disturbing the code adjustment, means at said reading-in unit for clearing said signal code adjustment immediately prior to establishing another code adjustment in said element.

153. The device as set forth in claim 152 in which the coded adjustment comprises the selective and variable positioning of certain of a series of movable parts with respect to each other, a movable frame carrying said parts, and a common abutment on said element against which all of said parts may be brought by movement of said frame, means for moving said frame toward said abutment for restoring said parts to normal initial relative position and thus clearing the previous code adjustments, means for effecting return movement of said frame, and means for contacting said parts during said return movement of said frame for establishing a new code therein.

154. In an intelligence transmitting and receiving machine of the class described, an intelligence carrier comprising a supporting cradle, a pack of separable signal receiving and character identifying elements permanently disposed in series relationship side-by-side upon said cradle, a plurality of relatively movable parts in each of said elements and susceptible of a compound code adjustment which altogether represents a single typographical character selection and another movable part embodied in each of said elements susceptible of receiving code adjustments representative of corresponding character width, said last named width adjustment part when moved serving to expand the respective elements in the direction of alignment with relation to the other elements on the cradle, a fixed stop provided at one end of said cradle against which one end of said pack of elements abuts, and a spring pressed follower carried by said cradle and contacting the opposite end of said pack and resiliently urging the signal receiving elements toward said fixed stop and into snug side-by-side contact with each other and thus to yieldingly resist expansion of the pack upon expansion of the individual elements thereof, said width adjusting part of each element being disposed upon the side of the element facing toward said spring pressed follower, whereby the expansion of the pack is outwardly away from the element being adjusted so that the position of the element as a whole is not disturbed and thus the impressing of the character code adjustment may take place simultaneously with the actuation of the width adjustment part.

155. The intelligence carrier as set forth in claim 154 in which the character code adjustment of each element comprises a series of pins carried by the element and relatively movable in permutation, and the width adjustment part comprises a wedge slidable transversely of the element on the side of the element toward said spring pressed follower.

References Cited in the file of this patent

UNITED STATES PATENTS

| | | |
|---|---|---|
| 581,815 | Eaton | May 4, 1897 |
| 1,149,490 | Bagge | Aug. 10, 1915 |
| 1,259,355 | Bunnell | Mar. 12, 1918 |
| 1,317,406 | Von Siemens | Sept. 30, 1919 |
| 1,553,920 | Smothers | Sept. 15, 1925 |
| 1,603,953 | Hunter | Oct. 19, 1926 |
| 1,805,333 | Hunter | May 12, 1931 |
| 1,808,320 | Schaffer | June 21, 1931 |
| 1,901,013 | Uher | Mar. 14, 1933 |
| 1,933,650 | Bascom | Nov. 7, 1933 |
| 1,957,864 | Tuttle | May 8, 1934 |
| 2,067,182 | Green | Jan. 12, 1937 |
| 2,115,990 | Jones | May 3, 1938 |
| 2,178,380 | Spievak | Oct. 31, 1939 |
| 2,229,689 | Westover | Jan. 28, 1941 |
| 2,231,972 | Turner | Feb. 18, 1941 |
| 2,283,383 | McNaney | May 19, 1942 |
| 2,346,251 | Bryce | Apr. 11, 1944 |
| 2,351,126 | Highton | June 13, 1944 |
| 2,364,188 | Bryce | Dec. 5, 1944 |
| 2,377,801 | Milk et al. | June 5, 1945 |
| 2,378,371 | Tholstrup | June 12, 1945 |
| 2,388,961 | Elliott | Nov. 13, 1945 |
| 2,392,224 | Bryce | Jan. 1, 1946 |
| 2,402,750 | Huebner | June 25, 1946 |
| 2,441,899 | Ogden | May 18, 1948 |
| 2,475,497 | Harrold et al. | July 5, 1949 |
| 2,486,406 | Higonnet | Nov. 1, 1949 |
| 2,600,168 | Klyce | June 10, 1952 |
| 2,682,814 | Higonnet | July 6, 1954 |